(12) United States Patent
Kaino et al.

(10) Patent No.: US 8,385,602 B2
(45) Date of Patent: Feb. 26, 2013

(54) IMAGE PROCESSING DEVICE METHOD, PROGRAM, AND RECORDING MEDIUM FOR IMPROVING DETECTION PRECISION OF A MOTION VECTOR

(75) Inventors: Akihiko Kaino, Kanagawa (JP); Takashi Horishi, Tokyo (JP); Yukihiro Nakamura, Kanagawa (JP); Kunio Kawaguchi, Kanagawa (JP); Yasuaki Takahashi, Kanagawa (JP); Norifumi Yoshiwara, Tokyo (JP); Takafumi Morifuji, Tokyo (JP); Yuta Choki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1338 days.

(21) Appl. No.: 12/066,091

(22) PCT Filed: Sep. 7, 2006

(86) PCT No.: PCT/JP2006/317734
§ 371 (c)(1),
(2), (4) Date: Apr. 29, 2008

(87) PCT Pub. No.: WO2007/029764
PCT Pub. Date: Mar. 15, 2007

(65) Prior Publication Data
US 2009/0136146 A1    May 28, 2009

(30) Foreign Application Priority Data
Sep. 9, 2005  (JP) ................. 2005-261430

(51) Int. Cl.
| | | |
|---|---|---|
| *G06K 9/00* | (2006.01) | |
| *G06K 9/46* | (2006.01) | |
| *G06K 9/66* | (2006.01) | |
| *G06K 9/36* | (2006.01) | |
| *H04N 5/228* | (2006.01) | |
| *H04N 5/14* | (2006.01) | |
| *H04N 9/64* | (2006.01) | |

(52) U.S. Cl. ..... 382/107; 382/190; 382/236; 348/208.1; 348/699

(58) Field of Classification Search .................. 382/107, 382/190, 236; 348/208.1, 699
See application file for complete search history.

(56) References Cited

U.S. PATENT DOCUMENTS
5,296,925 A * 3/1994 Kondo et al. .............. 348/208.1
(Continued)

FOREIGN PATENT DOCUMENTS
| | | |
|---|---|---|
| JP | 60 158786 | 8/1985 |
| JP | 4 10873 | 1/1992 |
| JP | 9 73540 | 3/1997 |

OTHER PUBLICATIONS

U.S. Appl. No. 12/066,092, filed Mar. 7, 2008, Nakamura, et al.

*Primary Examiner* — Bernard Krasnic
(74) *Attorney, Agent, or Firm* — Oblon, Spivak, McClelland, Maier & Neustadt, L.L.P.

(57) ABSTRACT

An image processing device and method, a program, and a recording medium whereby the detection precision of a motion vector by the gradient method is further improved. A counter value computing unit acquires the number of valid pixels, the number of pixels having no gradient in the horizontal direction, and the number of pixels having no gradient in the vertical direction from a valid pixel number counter, a no-horizontal-gradient counter, and a no-vertical-gradient counter, computes the ratio between valid pixels within a computation block and one-sided gradient pixels among the valid pixels, and controls the value of a flag which a flag setting unit sets in accordance with the computation results. The flag setting unit sets the value of a gradient flag, and outputs the gradient flag to the subsequent stage. At the subsequent stage, gradient method computation and vector evaluation processing are executed based on the gradient flag. The above can be applied to a signal processing device for performing frame frequency conversion processing from a 24P signal to a 60P signal.

10 Claims, 72 Drawing Sheets

U.S. PATENT DOCUMENTS

| | | | |
|---|---|---|---|
| 6,208,763 B1 * | 3/2001 | Avinash | 382/254 |
| 2005/0259738 A1 | 11/2005 | Horishi et al. | |
| 2005/0259739 A1 | 11/2005 | Nakamura et al. | |
| 2006/0055827 A1 * | 3/2006 | Kawahara | 348/671 |

* cited by examiner

FIG. 67

| flg | gladflg | OBJECT OF COMPARISON | ITERATION |
|---|---|---|---|
| 0 | * | NONE | NO |
| 1 | 1 | 0 VECTOR | NO |
| | 2 | 0 VECTOR | NO |
| | 3 | 0 VECTOR | NO |
| | 4 | $V_{n-1}$ | DEPENDING ON COMPARISON RESULT |
| 2 | * | $V_{n-1}$ | NO ($V_{n-1}$) |
| 3 | * | $V_{n-1}$ | NO ($V_{n-1}$) |
| 10 | * | NONE | NO |

IMAGE PROCESSING DEVICE METHOD, PROGRAM, AND RECORDING MEDIUM FOR IMPROVING DETECTION PRECISION OF A MOTION VECTOR

CROSS-REFERENCE TO RELATED APPLICATIONS

This is a National Stage Application of International Application No. PCT/JP06/317734, filed Sep. 7, 2006, which claims the benefit of priority under 35 U.S.C. §119 from Japanese Patent Application No. 2005-261430, filed Sep. 9, 2005.

TECHNICAL FIELD

The present invention relates to an image processing device and method, a program, and a recording medium, and particularly, relates to an image processing device and method, a program, and a recording medium whereby the detection precision of a motion vector can be improved by determining the ratio of one-sided gradient pixels which have a gradient in either the horizontal direction or vertical direction of valid pixels within a computation block.

BACKGROUND ART

With image processing devices for performing moving image frame frequency conversion processing or moving image compression processing, it is common to perform motion detection processing on a moving image, and to perform processing using the detected motion vector (see Patent Document 1). With this motion detection processing, as a method generally employed, the block matching, iterative gradient method, and so forth are available.

This iterative gradient method has a feature capable of detecting the motion of a sub-pixel with simple computation, but is poor in precision regarding detection in increments of pixels, so in an ordinary case, detection of a motion vector is frequently performed by integrating values in increments of blocks.

Accordingly, heretofore, gradient method computing has been performed by employing a pixel of interest serving as an object from which a motion vector is detected, or all the pixels within a computation block set on the periphery of a pixel of interest. Ideally, a likely motion vector can be detected in the case of the pixels within the computation block having generally the same action.

[Patent Document 1] Japanese Unexamined Patent Application Publication No. 9-172621

DISCLOSURE OF INVENTION

Note however, an object pixel having a different motion from the motion of a pixel of interest or a block of interest has been mixed in this computation block in some cases, and in this case, an unlikely motion vector has been frequently detected, and consequently, the detection precision of a motion vector has markedly deteriorated.

Also, in the case of the computation block being included in a region where there is a gradient only either the horizontal direction or vertical direction (one-sided gradient region) as well, an unlikely motion vector has been frequently detected.

Moreover, an image subjected to frame frequency conversion by employing the motion vector obtained as a result thereof has a possibility of marked visual deterioration being caused thereby, particularly such as occurrence of noise around the boundary of the object thereof, occurrence of discontinuity, and so forth.

The present invention has been made in light of such a situation, which enables the detection precision of a motion vector using the gradient method to be improved.

An image processing device according to an aspect of the present invention is an image processing device configured to detect a motion vector from an image frame, including: valid pixels determining means configured to determine, based on pixel differences within a computation block serving as an object of gradient method computation for detecting a motion vector, regarding whether or not a pixel within the computation block is valid for detection of the motion vector; one-sided gradient pixel determining means configured to determine regarding whether or not there are many pixels having no gradient in either the horizontal direction or the vertical direction among valid pixels determined to be valid for detection of the motion vector by the valid pixels determining means; and computation switchover means configured to switch the gradient method computation to integrated gradient method computation employing the sum of squared differences or independent gradient method computation to be executed in either the horizontal direction or vertical direction, based on the determination results by the one-sided gradient pixel determining means.

The computation switchover means switch the gradient method computation to the integrated gradient method computation, in the event that the one-sided gradient determining means determine that there are a few pixels having no gradient in either the horizontal direction or the vertical direction. The image processing device may further include integrated gradient method computing means configured to execute the integrated gradient method computation switched by the computation switchover means employing valid pixels alone determined to be valid for detection of the motion vector by the valid pixels determining means, of the pixels within the computation block.

The computation switchover means switch the gradient method computation to the independent gradient method computation to be executed for each of the horizontal direction and vertical direction, in the event that the one-sided gradient determining means determine that there are many pixels having no gradient in either the horizontal direction or the vertical direction. The image processing device may further include independent gradient method computing means configured to execute independent gradient method computation in the horizontal direction switched by the computation switchover means employing pixels alone having gradient in the horizontal direction, of valid pixels determined to be valid for detection of the motion vector by the valid pixels determining means, and execute independent gradient method computation in the vertical direction switched by the computation switchover means employing pixels alone having gradient in the vertical direction, of valid pixels determined to be valid for detection of the motion vector by the valid pixels determining means.

The image processing device may further include vector evaluation means configured to correct the motion vector detected by the gradient method computation, according to a result of comparing the evaluation value of the motion vector detected by the gradient method computation and the evaluation value of a predetermined vector to be compared, based on the determination results by the one-sided gradient pixel determining means.

The image processing device may further include iterative determining means configured to determine regarding whether to iterate the gradient method computation based on the determination results by the one-sided gradient pixel determining means.

The image processing device may further include gradient detection means configured to detect whether or not valid pixels determined as to be valid for detection of the motion vector by the valid pixels determining means include a gradient in either the horizontal direction or vertical direction; wherein the one-sided gradient pixel determining means determine regarding whether or not there are many pixels having no gradient in either the horizontal direction or vertical direction among the valid pixels, based on the determination results by the gradient detection means.

The valid pixels determining means includes: first spatial difference calculating means configured to calculate the pixel difference of first space of a pixel within the computation block in a first frame from which the motion vector is detected; second spatial difference calculating means configured to calculate the pixel difference of second space of a pixel within the computation block in a second frame which is the next frame of the first frame; temporal difference calculation means configured to calculate the pixel difference in the temporal direction of a pixel within the computation block in the first frame and the second frame; and gradient condition determining means configured to determine regarding whether or not the pixel within the computation block satisfies a condition focusing attention on a gradient in the horizontal direction, a condition focusing attention on a gradient in the vertical direction, and a condition focusing attention on a gradient in the horizontal direction and vertical direction, based on the first and second space calculated by the first and second spatial difference calculating means, and the temporal difference calculating means, and the pixel difference in the temporal direction; wherein in the event of the gradient condition determining means determining that the pixel of the computation block satisfies at least one of the condition focusing attention on a gradient in the horizontal direction, the condition focusing attention on a gradient in the vertical direction, and the condition focusing attention on a gradient in the horizontal direction and vertical direction, determination can be made that the pixel within the computation block is valid for detection of the motion vector.

The condition focusing attention on a gradient in the horizontal direction, the condition focusing attention on a gradient in the vertical direction, and the condition focusing attention on a gradient in the horizontal direction and vertical direction, based on a condition satisfied by valid pixels determined to be valid for detection of the motion vector by the gradient condition determining means, the one-sided gradient pixel determining means can determine regarding whether or not there are many pixels having no gradient in either the horizontal direction or vertical direction among the valid pixels.

An image processing method according to an aspect of the present invention is an image processing method of an image processing device configured to detect a motion vector, and generate a pixel value based on the detected motion vector, which includes: a valid pixel determining step for determining, based on the pixel difference within a computation block which is an object of gradient method computation for detecting a motion vector, regarding whether or not a pixel within the computation block is valid for detection of the motion vector; a one-sided gradient pixel determining step for determining regarding whether or not there are many pixels having no gradient in either the horizontal direction or vertical direction among valid pixels determined to be valid for detection of the motion vector by the processing in the valid pixel determining step; and computation switchover step for switching the gradient method computation to integrated gradient method computation employing the sum of squared differences, or to independent gradient method computation to be executed in either the horizontal direction or vertical direction, based on the determination results by the processing in the one-sided gradient pixel determining step.

A program according to an aspect of the present invention is a program for causing a computer to execute processing for detecting a motion vector, and generating a pixel value based on the detected motion vector, which includes: a valid pixel determining step for determining, based on the pixel difference within a computation block which is an object of gradient method computation for detecting a motion vector, regarding whether or not a pixel within the computation block is valid for detection of the motion vector; a one-sided gradient pixel determining step for determining regarding whether or not there are many pixels having no gradient in either the horizontal direction or vertical direction among valid pixels determined to be valid for detection of the motion vector by the processing in the valid pixel determining step; and computation switchover step for switching the gradient method computation to integrated gradient method computation employing the sum of squared differences, or to independent gradient method computation to be executed in either the horizontal direction or vertical direction, based on the determination results by the processing in the one-sided gradient pixel determining step.

A program recorded in a recording medium according to an aspect of the present invention is a program for causing a computer to execute processing for detecting a motion vector, and generating a pixel value based on the detected motion vector, which includes: a valid pixel determining step for determining, based on the pixel difference within a computation block which is an object of gradient method computation for detecting a motion vector, regarding whether or not a pixel within the computation block is valid for detection of the motion vector; a one-sided gradient pixel determining step for determining regarding whether or not there are many pixels having no gradient in either the horizontal direction or vertical direction among valid pixels determined to be valid for detection of the motion vector by the processing in the valid pixel determining step; and computation switchover step for switching the gradient method computation to integrated gradient method computation employing the sum of squared differences, or to independent gradient method computation to be executed in either the horizontal direction or vertical direction, based on the determination results by the processing in the one-sided gradient pixel determining step.

With an aspect of the present invention, based on the pixel difference within a computation block serving as an object of gradient method computation for detecting a motion vector, determination is made regarding whether or not pixels within the computation block are valid for detection of the motion vector, and with regard to the valid pixels determined to be valid for detection of the motion vector, determination is made regarding whether or not there are many pixels having no gradient in either the horizontal direction or vertical direction. Subsequently, the gradient method computation is switched to integrated gradient method computation employing the sum of squared differences, or to independent gradient method computation to be executed in either the horizontal direction or vertical direction, based on the determination results.

According to an aspect of the present invention, the detection precision of a motion vector particularly using the gradient method can be improved.

BRIEF DESCRIPTION OF THE DRAWINGS

FIG. 67 is a diagram for describing the object of comparison of vector evaluation with each flag value, and iteration determining results.

REFERENCE NUMERALS

Figure 1:
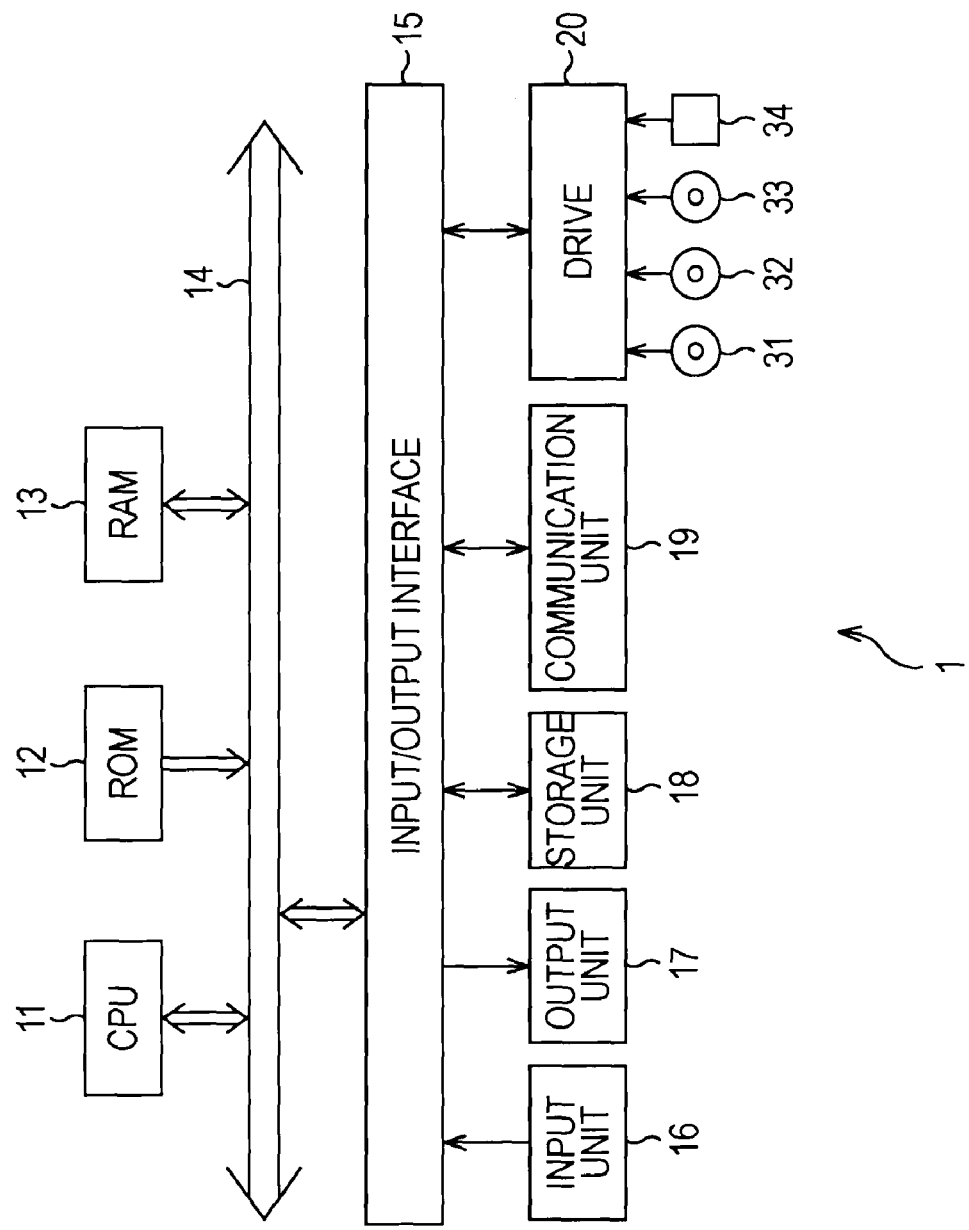
FIG. 1 is a block diagram illustrating a configuration example of a signal processing device according to the present invention.

1 signal processing device
51 frame memory
52 vector detection unit
53 detected-vector memory
54 vector allocating unit
55 allocation vector memory
56 allocated-flag memory
57 allocating compensation unit
58 image interpolation unit
61, 61A, 61B evaluation value computing unit
101 initial vector selection unit
103 iterative gradient method computing unit
104 vector evaluation unit
105 shifted initial vector allocation unit
106 evaluation value memory
107 shifted initial vector memory
404 valid pixels determining unit
405 gradient method computing unit
412 evaluation determining unit
421 pixel difference calculating unit
422 pixel determining unit
423 counter
424 gradient method continuous determining unit
425 computation execution determining unit
461 pixel difference calculating unit
462 computation determining unit
463-1 integrated gradient computing unit
463-2 independent gradient computing unit
464 vector calculating unit
521 initial vector selection unit
522 iterative gradient method computing unit
523 vector evaluation unit
524 initial candidate vector memory
531 valid pixels determining unit
541 evaluation determining unit
551 gradient method continuous determining unit
561 vector evaluation unit
571 0 vector flag region
581 evaluation determining unit

BEST MODE FOR CARRYING OUT THE INVENTION

Description will be made below regarding embodiments of the present invention with reference to the drawings.

FIG. 1 represents a configuration example of a signal processing device 1 to which the present invention is applied. The signal processing device 1 is configured of a personal computer and so forth, for example. In FIG. 1, a CPU (Central Processing Unit) 11 executes various types of processing in accordance with a program stored in ROM (Read Only Memory) 12 or a storage unit 18. A program which the CPU 11 executes and data and the like are stored in RAM (Random Access Memory) 13 as appropriate. These CPU 11, ROM 12, and RAM 13 are mutually connected by a bus 14.

Also, an input/output interface 15 is connected to the CPU 11 via the bus 14. The input/output interface 15 is connected with an input unit 16 made up of a keyboard, a mouse, a microphone, and so forth, and an output unit 17 made up of a display, speakers, and so forth. The CPU 11 executes various types of processing in response to instructions input from the input unit 16. Subsequently, the CPU 11 outputs an image or audio or the like obtained as a result of the processing to the output unit 17.

The storage unit 18 connected to the input/output interface 15 is configured of a hard disk for example, and stores the program which the CPU 11 executes and various types of data. A communication unit 19 communicates with an external device via the Internet or another network. Also, an arrangement may be made wherein a program is obtained through the communication unit 19, and is stored in the storage unit 18.

With a drive 20 connected to the input/output interface 15, upon a magnetic disk 31, optical disc 32, magneto-optical disk 33, semiconductor memory 34, or the like being mounted thereupon, such a medium is driven, and a program and data and the like recorded therein are obtained. The obtained program and data are transferred to the storage unit 18 as necessary.

Note that the signal processing device 1 can be regarded as a television set, optical disc player, or a signal processing unit thereof, for example.

Figure 2:
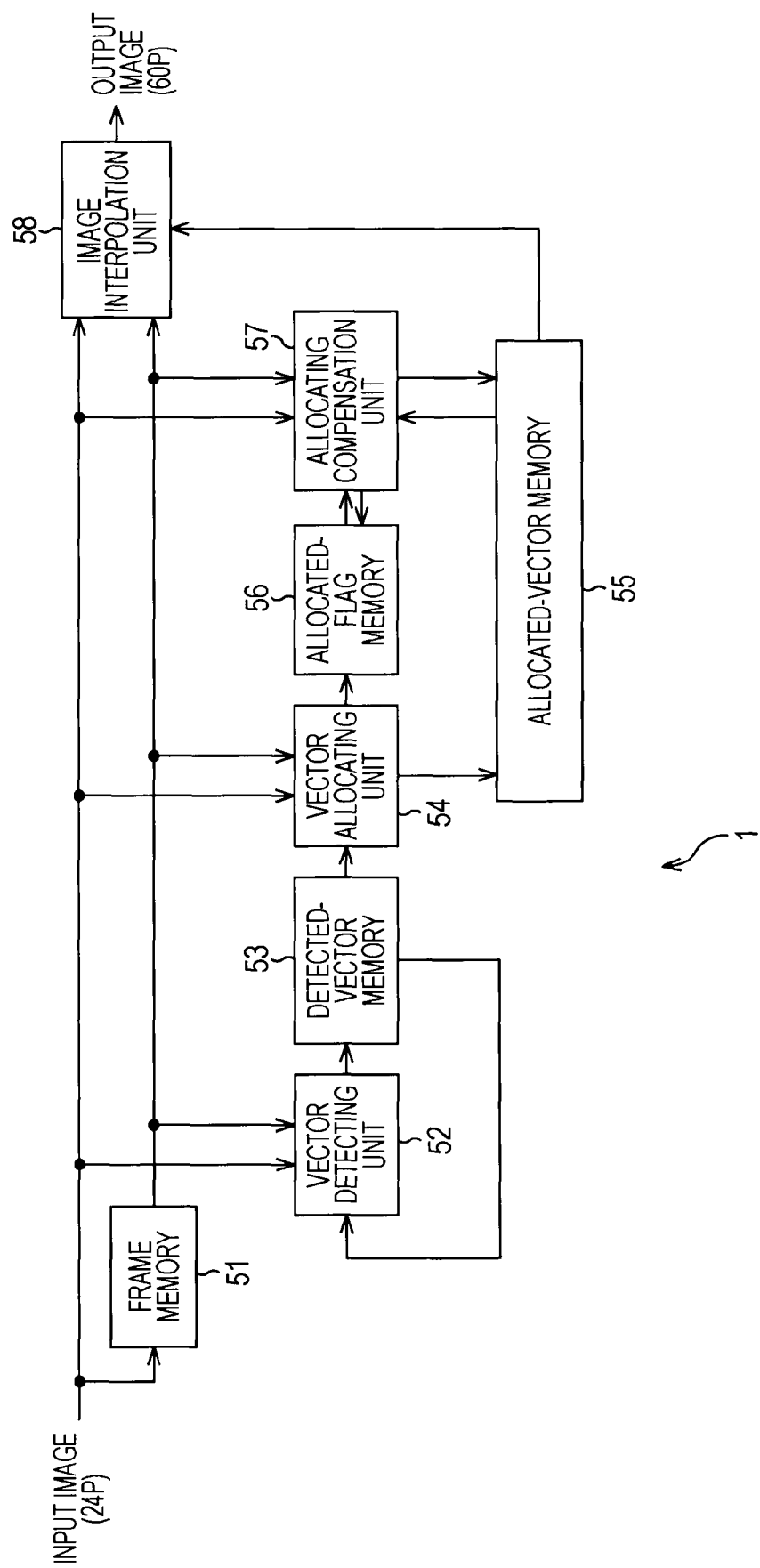
FIG. 2 is a block diagram illustrating the configuration of the signal processing device.

FIG. 2 is a block diagram illustrating the signal processing device 1.

Note that the various functions of the signal processing device 1 may be realized with either hardware or software. That is to say, the respective block diagrams of the present Specification may be considered as hardware block diagrams, or may be considered as functional block diagrams with software.

With the signal processing device 1 of which the configuration is shown in FIG. 2, for example, an image made up of a progressive image signal having a 24-Hz frame frequency (hereafter, referred to as a 24P signal) is input, the input image (input image) is converted into an image made up of a progressive image signal having a 60-Hz frame frequency (hereafter, referred to as a 60P signal), and output. That is to say, FIG. 2 is a diagram illustrating the configuration of the signal processing device which is an image processing device.

The input 24P-signal image input to the signal processing device 1 is supplied to frame memory 51, a vector detection unit 52, a vector allocating unit 54, an allocating compensation unit 57, and an image interpolation unit 58. The frame memory 51 stores the input image in increments of frame. The frame memory 51 stores a frame at point-in-time t which is one ahead of the input image at point-in-time t+1. The frame at point-in-time t stored in the frame memory 51 is supplied to the vector detection unit 52, vector allocating unit 54, allocating compensation unit 57, and image interpolation unit 58. Note that hereafter, the frame at point-in-time t on the frame memory 51 will be referred to a frame t, and the frame of the input image at point-in-time t+1 will be referred to as a frame t+1.

The vector detection unit 52 detects a motion vector between a block of interest of the frame t on the frame memory 51, and an object block of the frame t+1 of the input image, and stores the detected motion vector in detected-vector memory 53. As for this detection method of a motion vector between two frames, the gradient method or block matching method or the like is employed. The details of the configuration of the vector detection unit 52 will be described later with reference to FIG. 17. The detected-vector memory 53 stores the motion vector detected by the vector detection unit 52 at the frame t.

The vector allocating unit 54 allocates the motion vector obtained on the frame t of a 24P signal to a pixel on the frame of a 60P signal to be interpolated (hereafter, the frame of a 60P signal will also be referred to as an interpolation frame in order to distinguish this from the frame of a 24P signal) on allocated-vector memory 55, and rewrites the flag of allocated-flag memory 56 of the pixel to which the motion vector is allocated to 1 (true). The details of the configuration of the vector allocating unit 54 will be described later with reference to FIG. 71.

The allocated-vector memory 55 stores the motion vector allocated by the vector allocating unit 54 so as to be associated with each pixel of the interpolation frame. The allocated-flag memory 56 stores an allocated flag indicating the presence/absence of a motion vector to be allocated for each pixel of the interpolation frame. For example, an allocated flag which is true (1) indicates that the corresponding pixel has been allocated with a motion vector, and an allocated flag which is false (0) indicates that the corresponding pixel has not been allocated with a motion vector.

The allocating compensation unit 57 compensates a pixel of interest to which a motion vector has not been allocated by the vector allocating unit 54 with the motion vector of the peripheral pixel of the pixel of interest with reference to the allocated flag of the allocated-flag memory 56, and allocates this on the interpolation frame of the allocated-vector memory 55. At this time, the allocating compensation unit 57 rewrites the allocated flag of the pixel of interest to which a motion vector has been allocated to 1 (true). The details of the configuration of the allocating compensation unit 57 will be described later with reference to FIG. 75.

The image interpolation unit 58 interpolates and generates the pixel value of the interpolation frame using the motion vector allocated to the interpolation frame of the allocated-vector memory 55, and the pixel values of the frame t and the next frame t+1. Subsequently, the image interpolation unit 58 outputs the generated interpolation frame, following which outputs the frame t+1 as necessary, thereby outputting a 60P-signal image to the unshown subsequent stage. The details of the configuration of the image interpolation unit 58 will be described later with reference to FIG. 78.

Note that, hereinafter, a pixel value will be referred to as a brightness value as appropriate.

Figure 3:
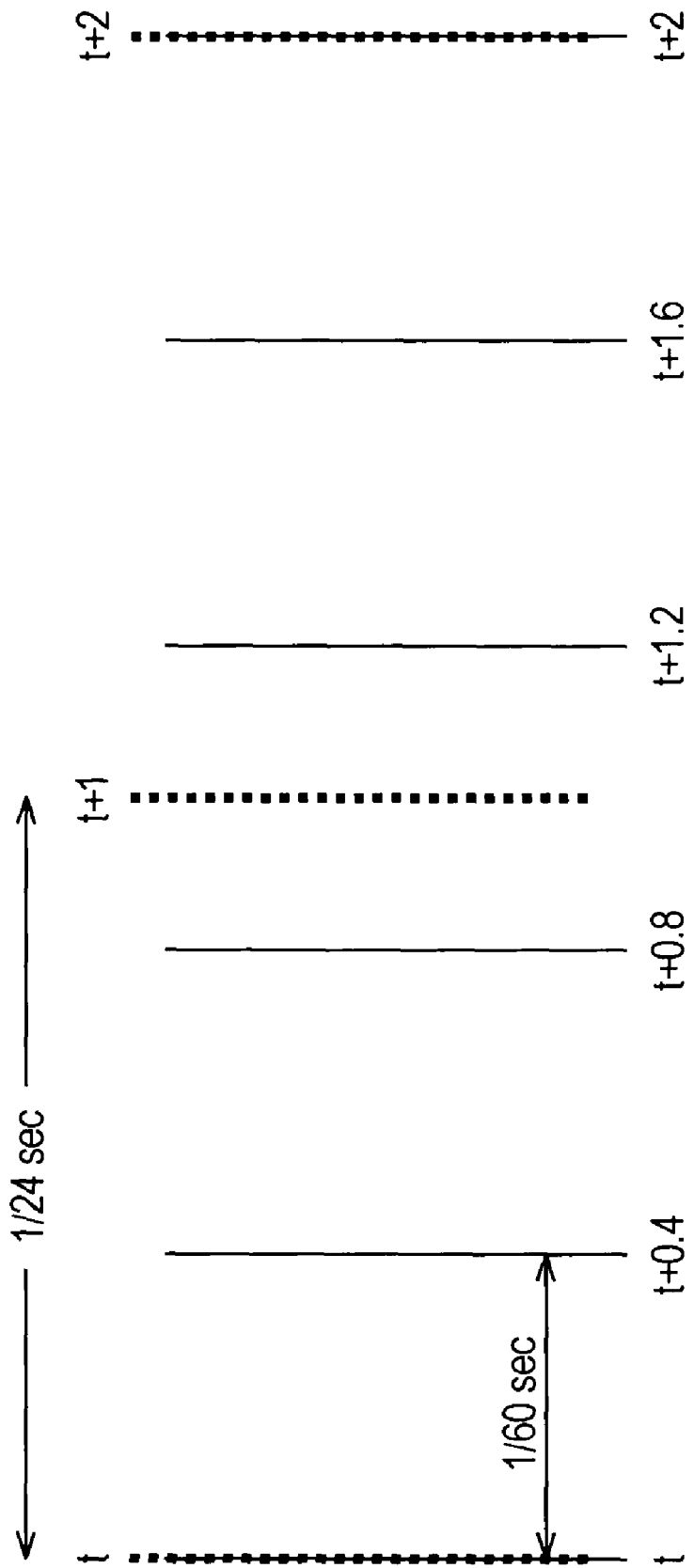
FIG. 3 is a diagram explaining the principle of processing according to the present invention.

FIG. 3 is a diagram describing the principle of the processing of the signal processing device 1 according to the present invention. With the example in FIG. 3, dotted lines represent the frames of a 24P signal at point-in-time t, t+1, and t+2 to be input to the signal processing device 1, and solid lines represent the interpolation frames of a 60P signal at point-in-time t, t+0.4, t+0.8, t+1.2, t+1.6, and t+2 to be generated by the signal processing device 1 from the input 24P signal.

In general, in order to convert a 24P signal into a 60P signal, 5/2 times as many frames are necessary. That is to say, five 60P-signal images need to be generated from two 24P-signal images. At this time, in order to uniform the frame intervals thereof, the 60P-signal interpolation frames to be generated are disposed at positions where the time phases on the 24P signal are 0.0, 0.4, 0.8, 1.2, and 1.6. Of these, the four frames except one frame at point-in-time t of which the time phase is 0.0 (t+0.4, t+0.8, t+1.2, and t+1.6 frames) are images which do not exist. Accordingly, upon a 24P-signal image being input, the signal processing device 1 generates four interpolation frames from the two 24P-signal frames at point-in-time t and point-in-time t+1. Consequently, 60P-signal images made up of the five frames at point-in-time t, t+0.4, t+0.8, t+1.2, and t+1.6 are output from the signal processing device 1.

Thus, the signal processing device 1 executes the processing for converting a frame frequency from a 24P-signal image to a 60P-signal image.

Note that, in principle, as described above, the five 60P-signal frames at point-in-time t, t+0.4, t+0.8, t+1.2, and t+1.6 are generated from the two frames at point-in-time t and point-in-time t+1 of the 24P signal, but in actuality, in the case of the example in FIG. 3, based on the two frames at point-in-time t and point-in-time t+1 of the 24P signal, the 60P-signal frames of t, t+0.4, and t+0.8 are generated, and based on the two frames at point-in-time t+1 and t+2 of the 24P signal, the 60P-signal frames of t+1.2, t+1.6, and t+2 are generated.

Figure 4:
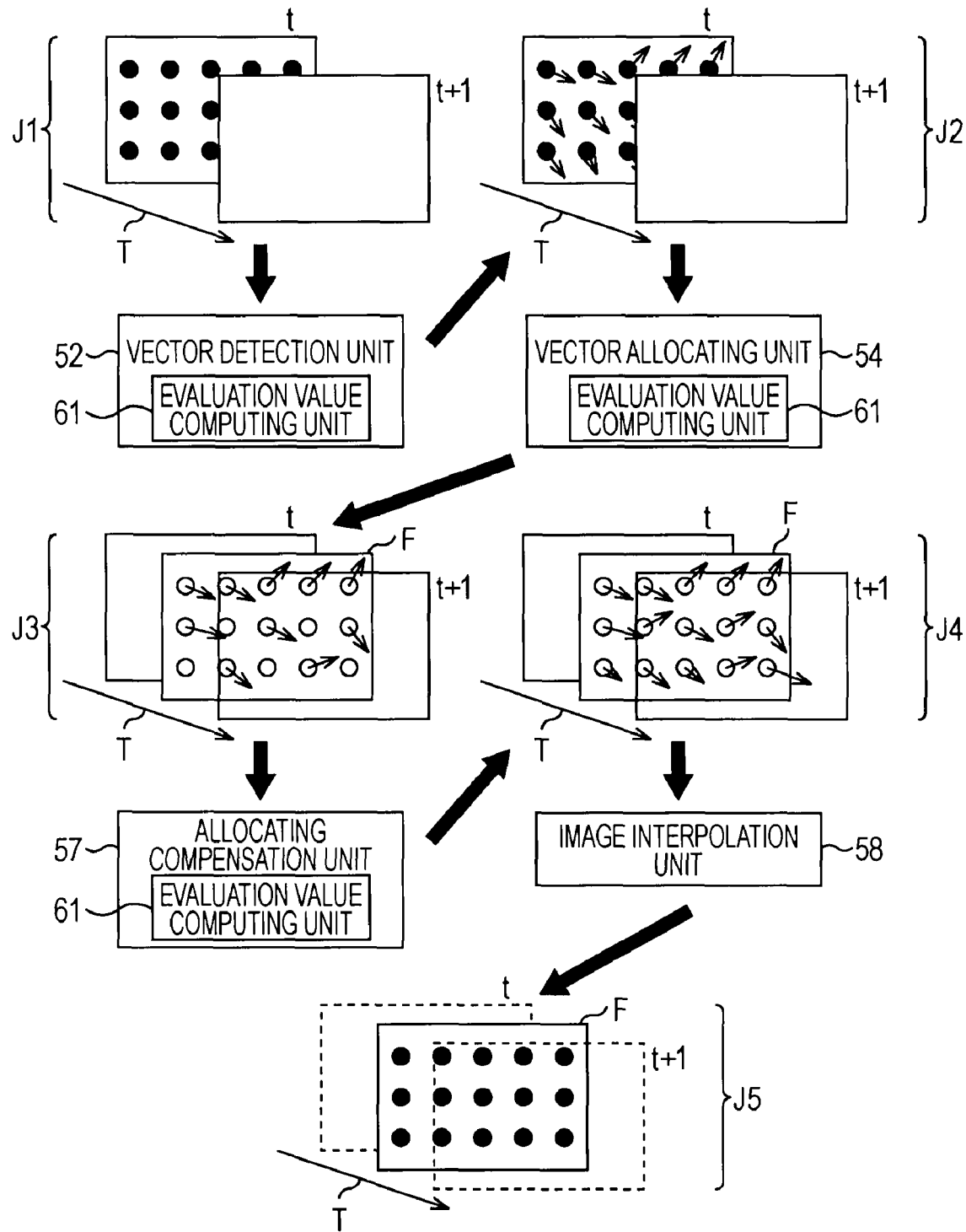
FIG. 4 is a diagram explaining specifically processing according to the present invention.

FIG. 4 is a diagram more specifically describing the processing of the present invention. With the example in FIG. 4, thick line arrows represent a transition to each state, and arrows T represent the passage-of-time directions in states J1 through J5. Also, the states J1 through J5 conceptually represent a frame t at point-in-time t of a 24P signal, a frame t+1 at point-in-time t+1 following point-in-time t, or an interpolation frame F of a 60P signal generated between the frame t and frame t+1, at the time of inputting/outputting to/from each unit making up the signal processing device 1. That is to say, in actuality, for example, a frame where a motion vector such as that shown in the state J2 is detected is not input to the vector allocating unit 54, and the frame and the motion vector are separately input to the vector allocating unit 54.

Also, with the example in FIG. 4, the vector detection unit 52, vector allocating unit 54, and allocating compensation unit 57 each include an evaluation value computing unit 61 for computing an evaluation value for evaluating the reliability of precision of a motion vector.

The state J1 represents the states of the frame t and frame t+1 of a 24P signal to be input to the vector detection unit 52. Black spots on the frame t of the state J1 represent pixels on the frame t.

The vector detection unit 52 detects to which positions the pixels on the frame t in the sate J1 move at the frame t+1 at the next point-in-time, and outputs the motions thereof as the motion vectors corresponding to the respective pixels, such as those shown on the frame t in the state 82. As for a detection method of motion vectors between two frames, the block matching method or the gradient method or the like is employed. Note that at this time, in the case of multiple motion vectors being detected as to a pixel, the vector detection unit 52 causes the evaluation value computing unit 61 built therein to compute an evaluation value regarding each motion vector, and selects a motion vector based on the computed evaluation values.

The state J2 represents the states of the frame t and frame t+1 to be input to the vector allocating unit 54. In the state J2, the arrow of each pixel of the frame t represents a motion vector detected by the vector detection unit 52.

The vector allocating unit 54 extends the motion vector detected as to each pixel of the frame t in the state J2 to the next frame t+1, and obtains which position on the interpolation frame F positioned at a predetermined time phase (e.g., t+0.4 in FIG. 3) the motion vector passes through. This is because if we assume that between the frame t and frame t+1 is a constant motion, the point where the motion vector passes through the interpolation frame F becomes the pixel position on the frame thereof. Accordingly, the vector allocating unit 54 allocates this passing motion vector to adjacent four pixels on the interpolation frame F in the state J3.

Also, at this time, depending on a pixel of an interpolation frame, there are cases, such as a case wherein no motion vector exists or a case wherein multiple motion vectors can become allocated candidates. In such a latter case, the vector allocating unit 54 causes the evaluation value computing unit 61 built therein to compute an evaluation value regarding each motion vector, and selects a motion vector to be allocated based on the computed evaluation value, in the same way as with the vector detection unit 52.

The state J3 represents the state of the frame t and frame t+1, and the interpolation frame F to which motion vectors have been allocated, which will be input to the allocating compensation unit 57. With the interpolation frame F in the state J3, pixels to each of which a motion vector has been allocated by the vector allocating unit 54, and pixels to each of which no motion vector has been allocated thereby are shown.

The allocating compensation unit 57 compensates a pixel to which no motion vector has been allocated in the sate J3 with the motion vectors allocated to the peripheral pixels of the pixel thereof. This is because if an assumption that the adjacent regions of a certain pixel of interest have the same action holds, the motion vectors of the peripheral pixels of the pixel of interest are similar to the motion vector of the pixel of interest. Thus, a certain degree of accurate motion vector is provided to the pixel to which no motion vector has been allocated, and consequently, a motion vector is allocated to all of the pixels on the interpolation frame F in the state 84.

Note that in this case also, the motion vectors of multiple peripheral pixels exist as candidates, so the allocating compensation unit 57 causes the evaluation value computing unit 61 built therein to compute an evaluation value regarding each motion vector, and selects a motion vector to be allocated based on the computed evaluation value, in the same way as with the vector allocating unit 54.

The state J4 represents the state of the frame t and frame t+1, and the interpolation frame F of which all of the pixels have been allocated with a motion vector, which will be input to the image interpolation unit 58. According to the motion vectors allocated to all of the pixels, the image interpolation unit 58 can determine the positional relation between the pixels on the interpolation frame F and the pixels of the frame t and frame t+1.

Accordingly, the image interpolation unit 58 interpolates and generates pixel values on the interpolation frame F such as shown in the black spots of the interpolation frame F in the state J5 using the motion vectors allocated onto the interpolation frame F, and the pixel values of the frame t and frame t+1. Subsequently, the image interpolation unit 58 outputs the generated interpolation frame, following which outputs the frame t+1 as necessary, thereby outputting a 60P-signal image to the unshown subsequent stage.

Next, the evaluation value of a motion vector to be employed at the signal processing device 1 according to the present invention will be described with reference to FIG. 5. As described above with reference to FIG. 4, with the respective units of the signal processing device 1 (vector detection unit 52, vector allocating unit 54, and allocating compensation unit 57), a motion vector most allocate to the subsequent processing is selected.

At this time, with the respective units of the signal processing device 1, a displaced frame difference (DFD) representing a correlation value between blocks, which is shifted by the vector quantity of interest of the two frames, is computed by the evaluation value computing unit 61 of the respective units, and is employed as an evaluation value as to the motion vector.

Figure 5:
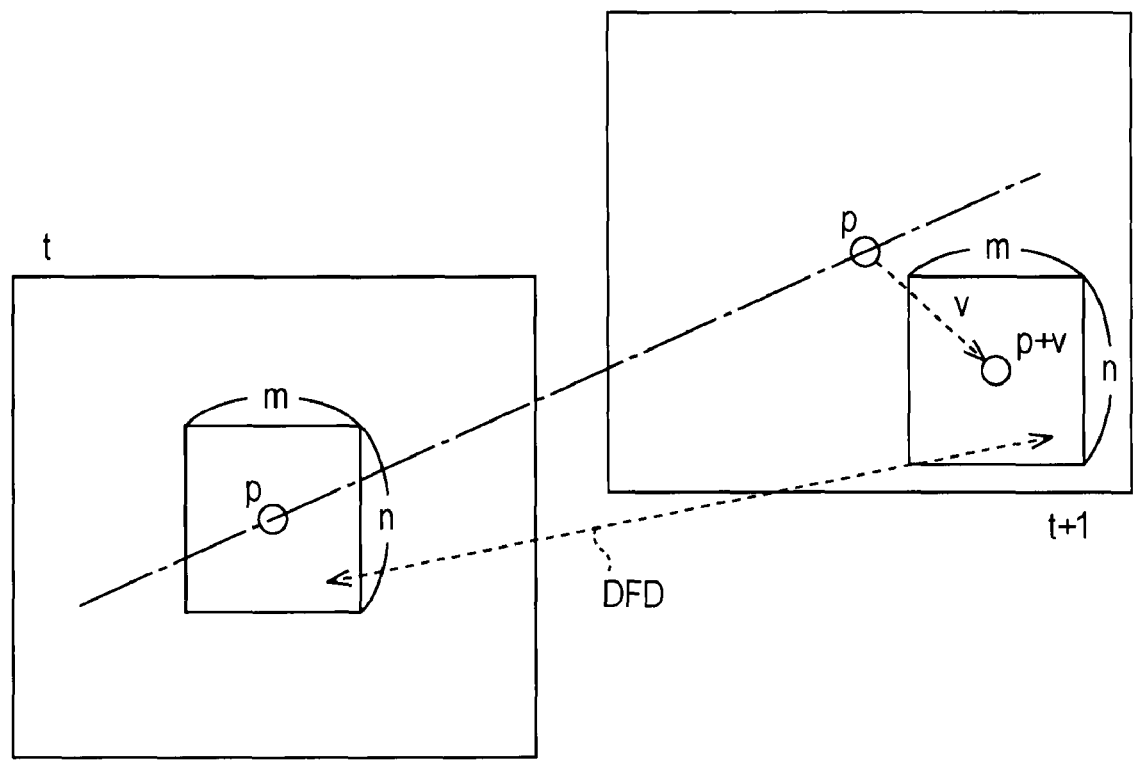
FIG. 5 is a diagram for describing an evaluation value of a motion vector used with the signal processing device.

With the example in FIG. 5, two blocks are shown wherein one is an m×n block with a pixel position p as the center on the frame t at point-in-time t, and the other is an m×n block with a pixel position p+v as the center, which is shifted by the vector quantity of a motion vector v of interest from the pixel position p, on the frame t+1 at point-in-time t+1. A displaced frame difference $DFD_t(p)$ obtained between these two blocks sis represented with the following Expression (1).

[Mathematical Expression 1]

$$DFD_t(p) = \sum_{x,y}^{m \times n} |F_{t+1}(p_{x,y} + v) - F_t(p_{x,y})| \quad (1)$$

Here, Ft(p) represents the brightness value of the pixel position p at point-in-time t, and m×n represents a DFD computation range (block) for obtaining a displaced frame difference. This displaced frame difference represents a correlation value between the DFD computation ranges (blocks) of the two frames, so in general, the smaller this displaced frame difference is, the more the waveforms of the blocks between frames are identical, and accordingly, determination is made that the smaller the displaced frame difference is, the higher the reliability of the motion vector v.

Thus, this displaced frame difference (hereafter, referred to as evaluation value DFD) is employed in the case of the most probable motion vector being selected from multiple candidates, or the like.

Further, description will be made in detail regarding an evaluation value DFD.

Figure 6:
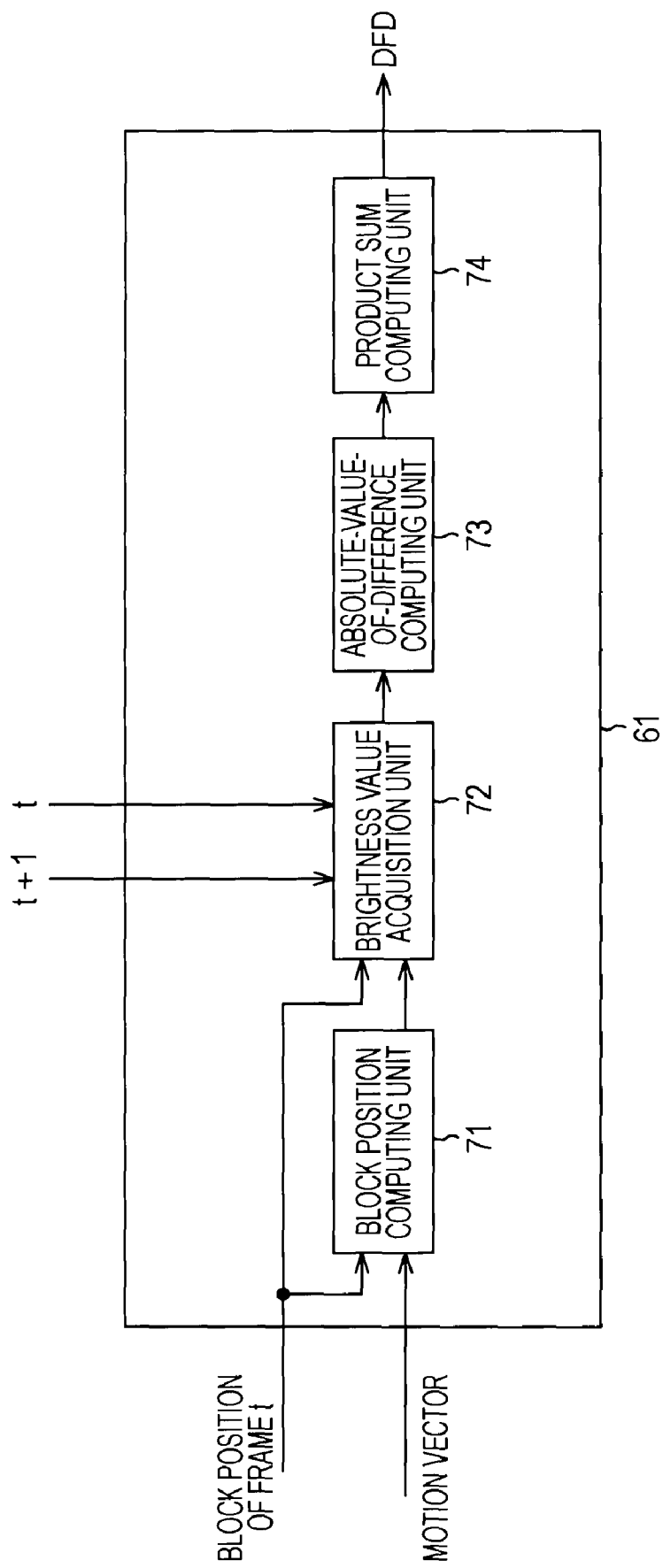
FIG. 6 is a block diagram illustrating a configuration example of an evaluation value computing unit for computing an evaluation value DFD.

FIG. 6 is a block diagram illustrating a configuration example of the evaluation value computing unit 61 for computing an evaluation value DFD. With the example in FIG. 6, an image frame t at point-in-time t, and an image frame t+1 at point-in-time t+1 from the frame memory 51 are input to a brightness value acquisition unit 72.

The evaluation value computing unit 61 is configured of a block position computing unit 71, a brightness value acquisition unit 72, an absolute-value-of-difference computing unit 73, and a product sum computing unit 74.

The block (DFD computation range) position of the frame t and a motion vector to be evaluated are input to the evaluation value computing unit 61 from the previous stage. The block position of the frame t is input to the block position computing unit 71 and brightness value acquisition unit 72, and the motion vector is input to the block position computing unit 71.

The block position computing unit 71 computes the block position of the frame t+1 using the block position of the input frame t and the motion vector, and outputs this to the brightness value acquisition unit 72. The brightness value acquisition unit 72 acquires the brightness value corresponding to the block position of the input frame t from the unshown frame memory of the frame t, acquires the brightness value corresponding to the block position of the input frame t+1 from the frame memory 51 of the frame t+1, and outputs the acquired respective brightness values to the absolute-value-of-difference computing unit 73.

The absolute-value-of-difference computing unit 73 computes the absolute values of brightness difference using the brightness values within each of the frames t and t+1 from the brightness value acquisition unit 72, and outputs the computed absolute values of brightness difference to the product sum computing unit 74. The product sum computing unit 74 acquires an evaluation value DFD by integrating the absolute values of brightness difference computed by the absolute-value-of-difference computing unit 73, and outputs the acquired evaluation value DFD to the subsequent stage.

Figure 7:
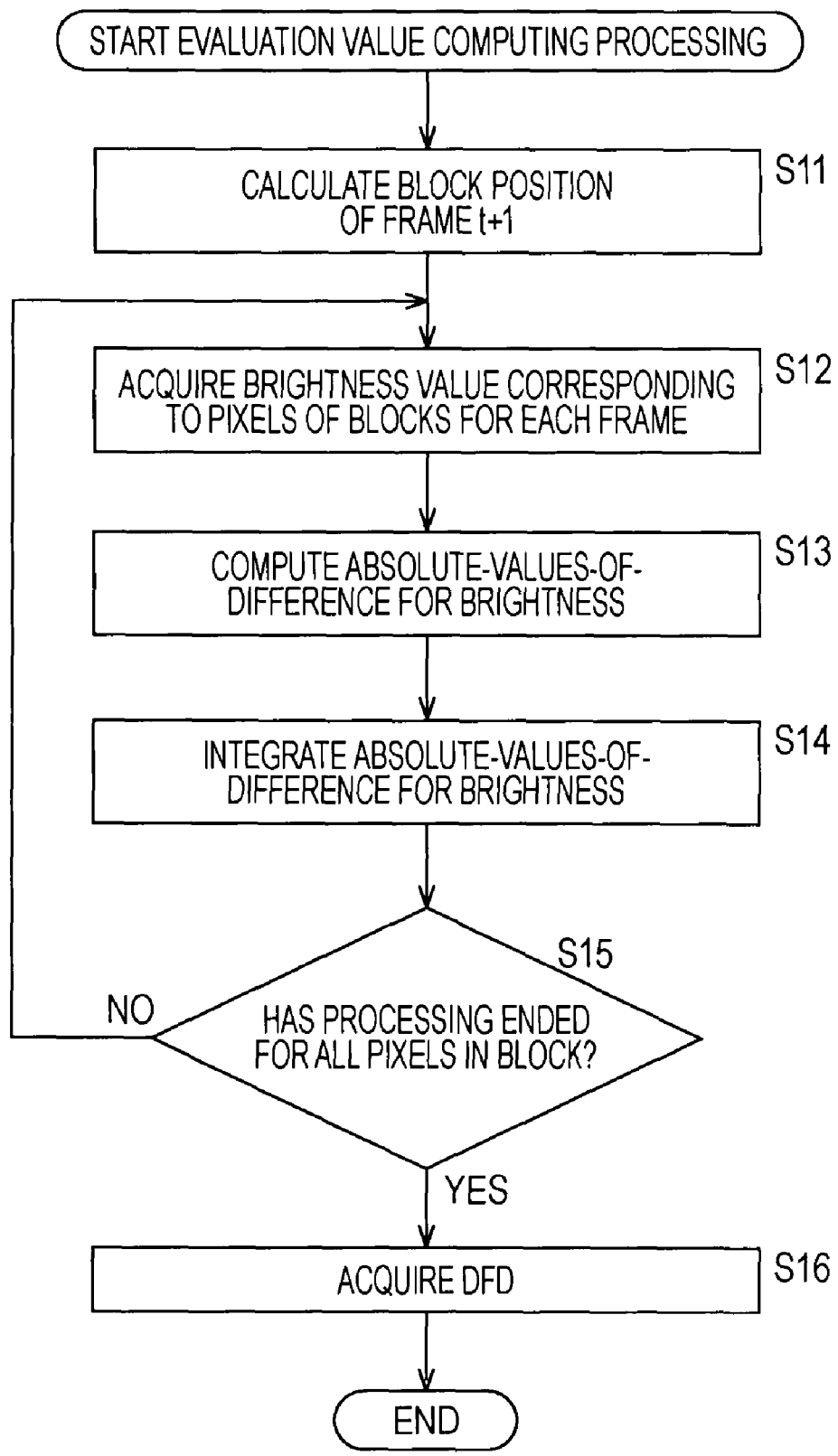
FIG. 7 is a flowchart for describing evaluation value computing processing at the evaluation value computing unit shown in FIG. 6.

Next, the evaluation value computing processing of the evaluation value computing unit 61 in FIG. 6 will be described with reference to the flowchart in FIG. 7.

The block (DFD computation range) position of the frame t and a motion vector to be evaluated are input to the evaluation value computing unit 61 from the previous stage. Upon the block position of the frame t and a motion vector to be evaluated being input, in step S11 the block position computing unit 71 computes the block position of the frame t+1 using the block position of the input frame t and the motion vector, and outputs this to the brightness value acquisition unit 72.

In step S12, the brightness value acquisition unit 72 acquires the brightness values of the pixels of the block (DFD computation range) of each frame based on the block positions of the input frame t and frame t+1, and outputs the acquired respective brightness values to the absolute-value-of-difference computing unit 73. Note that the brightness value acquisition unit 72 starts acquisition from the brightness value of the pixel at the upper left of a block.

In step S13, the absolute-value-of-difference computing unit 73 computes the absolute values of difference using the brightness values of the pixels of the frame t and frame t+1 from the brightness value acquisition unit 72, and outputs the computed absolute values of brightness difference to the product sum computing unit 74.

In step S14, the product sum computing unit 74 integrates the absolute values of differences from the absolute-value-of-difference computing unit 73, and in step S15 determines whether or not the processing has been completed as to all of the pixels within the block. In the event that determination is made in step S15 that the processing has not been completed as to all of the pixels within the block, the processing returns to step S12, and the processing thereafter is repeated. That is to say, the processing as to the next pixel of the block is performed.

On the other hand, in the event that determination is made in step S15 that the processing has been completed as to all of the pixels within the block, in step S16 the product sum computing unit 74 acquires an DFD which is a result of the absolute values of brightness differences being integrated, and outputs this to the subsequent stage as an evaluation value DFD. Thus, the evaluation value computing processing is completed.

As described above, an evaluation value DFD can be obtained by integrating the absolute values of differences of the brightness values within a block (DFD computation range), so in general, determination is made that the smaller an evaluation value DFD is, the more the waveforms of the blocks between frames are identical, the higher the reliability of the motion vector v is.

Note however, in the case of an average brightness level changing greatly between frames of which the evaluation values will be obtained due to the movement of a light source or shadows traversing or the like, it is difficult to accurately evaluate a motion vector using an evaluation value DFD.

Next, description will be made regarding an evaluation value DFD when an average brightness level changes with reference to FIG. 8 and FIG. 9. With the example in FIG. 8, an arrow T indicates the passage of time from a left-front frame t at point-in-time t to a right-back frame t+1 at point-in-time t+1 in the drawing.

An m×n block B0 with a pixel p0 as the center is illustrated on the frame t.

A motion vector v1 which is a correct motion vector of the pixel p0 between the frames t and t+1 is illustrated on the frame t+1, and an m×n block B1 is illustrated with a pixel p1+v1 as the center which is a position shifted from a pixel p1 to which the pixel p0 on the frame t corresponds by the vector quantity of the motion vector v1. Also, a motion vector v2 which is an incorrect motion vector of the pixel p0 between the frames t and t+1 is illustrated on the frame t+1, and an m×n block B2 is illustrated with a pixel p1+v2 as the center which is a position shifted from the pixel p1 to which the pixel p0 on the frame t corresponds by the vector quantity of the motion vector v2.

Figure 8:
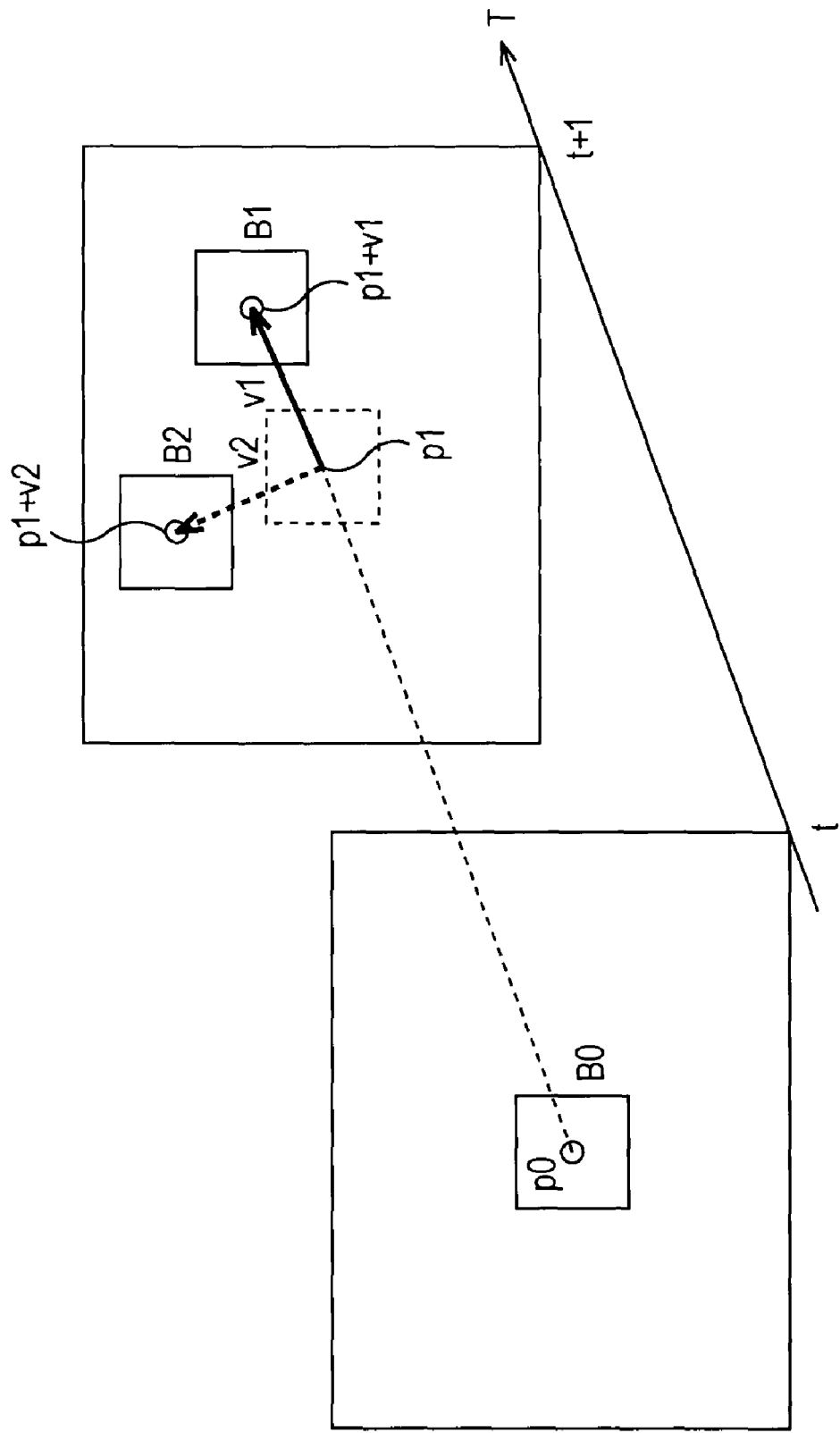
FIG. 8 is a diagram for describing the evaluation value DFD at the time of change in average brightness level.
Figure 9:
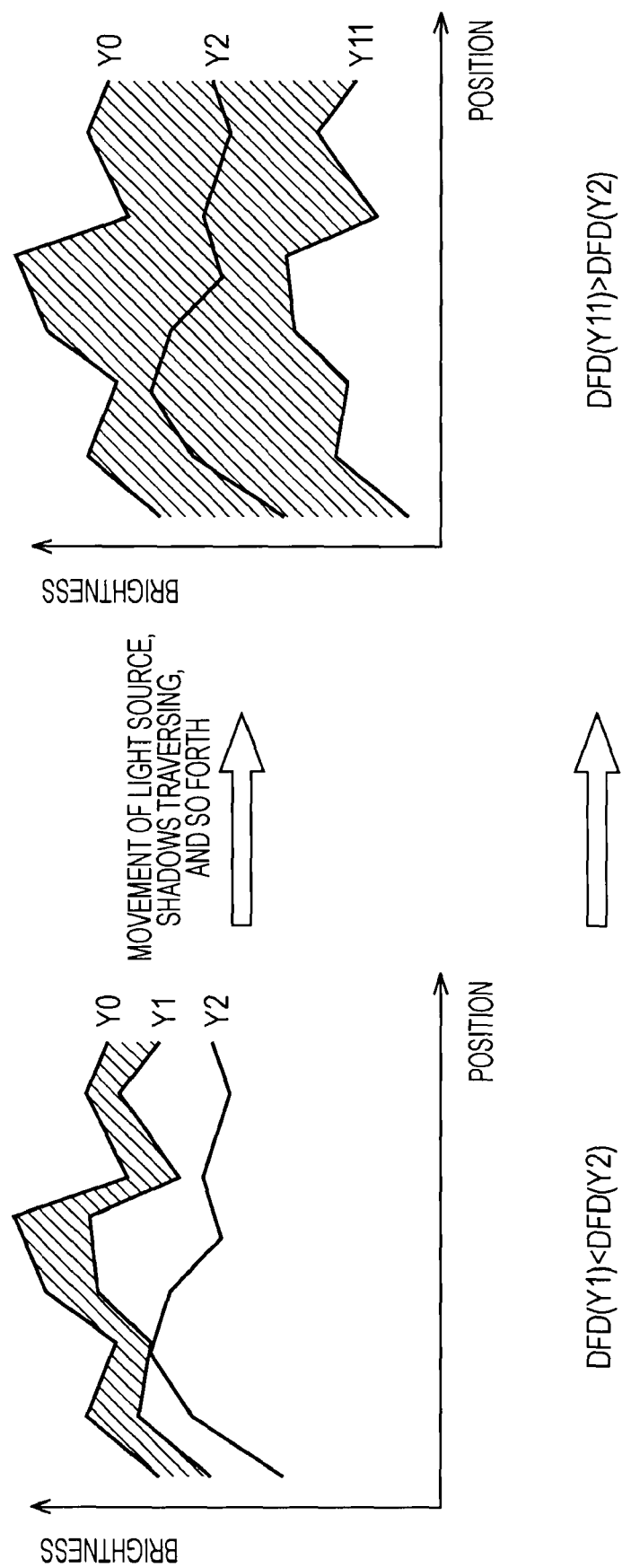
FIG. 9 is a diagram for describing the evaluation value DFD at the time of change in average brightness level.

A graph on the left-hand side of FIG. 9 illustrates the waveforms Y0, Y1, and Y2 of brightness values at the respective (pixel) positions of the block B0, block B1, and block B2 in FIG. 8 in a common case (i.e., in the case of the movement of a light source, shadows traversing, and so forth being not included in between frames), and a graph on the right-hand side illustrates the waveforms Y0, Y11, and Y2 of brightness values at the respective (pixel) positions of the block B0, block B1, and block B2 in FIG. 8 in the case of the block B1 including the movement of a light source, shadows traversing, or the like, and the block B1 being affected with those.

That is to say, the blocks B0 and B2 are not affected with the movement of a light source or shadows traversing, the waveforms Y0 and Y2 of the brightness values in the left and right graphs are not changed, i.e., the same.

As shown in the graph on the left-hand side in FIG. 9, in a common case, the waveform Y1 of the brightness value of the block B1 is similar to the waveform Y0 of the brightness value of the block B0 than the waveform Y2 of the brightness value of the block B2, as shown in a shadow area between the waveform Y0 and waveform Y1, so the evaluation value DFD (Y1) between the block B0 and block B1 is smaller than the evaluation value DFD (Y2) between the block B0 and block B2. Accordingly, determination is made that the reliability of the motion vector v1 which is a correct motion vector is higher than the reliability of the motion vector v2 which is an incorrect motion vector.

Note however, as shown in the graph on the right-hand side of FIG. 9, in the case of the block B1 on the frame t+1 including the movement of a light source or shadows traversing or the like, and only the block B1 being affected with those, the brightness value of the block B1 which was the waveform Y1 is greatly changed at a brightness level as a whole (averagely), as shown in the waveform Y11. That is to say, the waveform Y11 of the brightness value of the block B1 is separated from the waveform Y1 of the graph on the left-hand side by the change quantity of an average brightness value level, and consequently, as shown in a shadow area between the waveform Y0 and waveform Y11, the waveform Y11 of the brightness value of the block B1 is separated from the waveform Y0 of the brightness value of the block B0 rather than the waveform Y2 of the brightness value of the block B2.

Accordingly, the change quantity of the average brightness value level is superimposed as an offset, the evaluation value DFD (Y11) between the block B0 and block B1 in this case becomes greater than the evaluation value DFD (Y2) between the block B0 and block B2, and consequently, determination is made that the reliability of the motion vector v1 which is a correct motion vector is lower than the reliability of the motion vector v2 which is an incorrect motion vector.

As described above, in the case of the average brightness level of an object having a motion v being changed greatly due to the movement of a light source or shadows traversing or the like, the change quantity of the average brightness value level is superimposed upon an evaluation value DFD as an offset, so the evaluation value DFD becomes great, and consequently, the reliability as to the true motion quantity v becomes lower.

Therefore, instead of an evaluation value DFD, with the vector detection unit 52 of the signal processing device 1, as another example of an evaluation value as to a motion vector, difference variance (dfv) is employed, which is calculated between blocks including the starting point and terminal point of a vector serving as an evaluation object in the same way as with an evaluation value DFD, and a motion vector most suitable to the subsequent stage processing is selected. If we say that a motion vector to be evaluated is v, difference variance is represented with the following Expression (2).

[Mathematical Expression 2]

$$dfv_t(p) = \sum_{x,y}^{m \times n} \{(F_{t+1}(p_{x,y}+v) - \overline{F_{t+1}(p_{x,y}+v)}) - (F_t(p_{x,y}) - \overline{F_t(p_{x,y})})\}^2 \quad (2)$$

Here,

[Mathematical Expression 3]

$$\overline{F_t(p)}$$

represents the mean of the brightness values in the computation range of difference variance of m×n pixels.

Note difference variance is, in actuality, as can be understood from Expression (2), the sum of squares of values obtained by subtracting the average difference between the brightness value of the pixel position p at point-in-time t and the brightness values in the computation range of the pixel position p at point-in-time t from the average difference between the brightness value of the pixel position p+v at point-in-time t+1 and the brightness values in the computation range of the pixel position p+v at point-in-time t+1, but a brightness value difference variance expression (later-described Expression (5)) within a computation block can be obtained by expanding Expression (2), so this is referred to as difference variance.

Difference variance is also an evaluation value which takes the coincidence of the waveforms of the blocks between frames as the reliability of a vector, in the same way as with an evaluation value DFD, and determination can be made that the smaller the value is, the higher the reliability of the vector v is.

Figure 10:
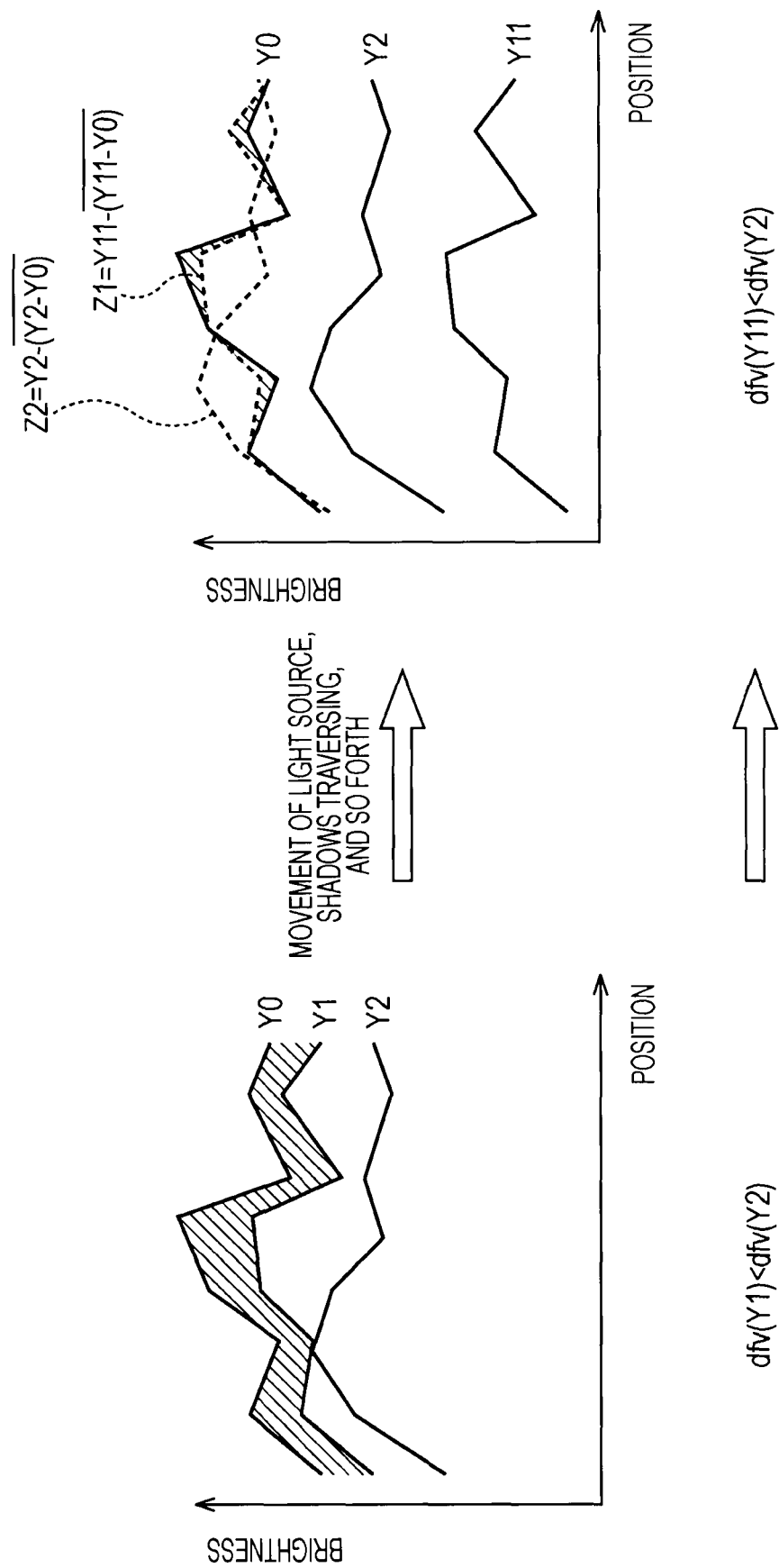
FIG. 10 is a diagram for describing difference variance at the time of change in average brightness level.

FIG. 10 is a diagram describing difference variance when an average brightness level changes. Note that FIG. 10 illustrates an example of difference variance dfv corresponding to the example of an evaluation value DFD described with reference to FIG. 9, and with the example in FIG. 10, in the same way as with the example in FIG. 9, description will be made with reference to the block B0, block B1, and block B2 in FIG. 8.

A graph on the left-hand side of FIG. 10 illustrates, in the same way as with the case of FIG. 9, the waveforms Y0, Y1, and Y2 of brightness values at the respective (pixel) positions of the block B0, block B1, and block B2 in FIG. 8 in a common case (i.e., in the case of the movement of a light source, shadows traversing, and so forth being not included in between frames), and a graph on the right-hand side illustrates the waveforms Y0, Y11, and Y2 of brightness values at the respective (pixel) positions of the block B0, block B1, and block B2 in FIG. 8 in the case of the block B1 including the movement of a light source, shadows traversing, or the like, and the block B1 being affected with those.

As shown in the graph on the left-hand side in FIG. 10, in a common case, the waveform Y1 of the brightness value of the block B1 is similar to the waveform Y0 of the brightness value of the block B0 than the waveform Y2 of the brightness value of the block B2, as shown in a shadow area between the waveform Y0 and waveform Y1, so in the same way as with the case of the evaluation value DFD in FIG. 9, dfv (Y1) which is difference variance between the block B0 and block B1 is smaller than dfv (Y2) which is difference variance between the block B0 and block B2. Accordingly, determination is made that the reliability of the motion vector v1 which is a correct motion vector is higher than the reliability of the motion vector v2 which is an incorrect motion vector.

On the other hand, as shown in the graph on the right-hand side of FIG. 10, in the case of the block B1 on the frame t+1 including the movement of a light source or shadows traversing or the like, and only the block B1 being affected with those, the brightness value of the block B1 which was the waveform Y1 is greatly changed at a brightness level as a whole (averagely), as shown in the waveform Y11. That is to say, the waveform Y11 of the brightness value of the block B1 is separated from the waveform Y1 by the change quantity of an average brightness value level, and consequently, the waveform Y11 of the brightness value of the block B1 is separated from the waveform Y0 of the brightness value of the block B0 rather than the waveform Y2 of the brightness value of the block B2.

Now, with the graph on the right of FIG. 10, a waveform Z1 and a waveform Z2 which are shown with a dotted line are illustrated. The waveform Z1 represents the waveform of a brightness value wherein the difference average between the waveform Y11 and waveform Y0 is subtracted from the waveform Y11, and the waveform Z2 represents the waveform of a brightness value wherein the difference average between the waveform Y2 and waveform Y0 is subtracted from the waveform Y2.

As shown in Expression (2), difference variance is the sum of squares of brightness values from which the brightness value average within a computation block is subtracted for each frame as an offset, i.e., statistics quantity from which the brightness value average within a computation block is subtracted for each frame as an offset.

Accordingly, the difference between the waveform Y0 and waveform Z1 which is a shadow area with the graph on the right of FIG. 10 represents the waveform Y0 from which the difference between the waveform Y11 and the difference average between the waveform Y11 and waveform Y0 is subtracted, i.e., represents the portion within the parenthesis of the sum of squares of Expression (2) for obtaining dfv (Y11) which is difference variance between the block B0 and block B1, of which the value is smaller than the difference between the waveform Y0 and waveform Z2 which represents the waveform Y0 from which the difference between the waveform Y2 and the difference average between the waveform Y2 and waveform Y0 is subtracted, i.e., represents the portion within the parenthesis of the sum of squares of Expression (2) for obtaining dfv (Y2) which is difference variance between the block B0 and block B2.

Thus, even in the case of the average brightness level of an object having a motion v being changed greatly due to the movement of a light source or shadows traversing or the like, the dfv (Y11) which is the difference variance between the block B0 and block B1 is smaller than the dfv (Y2) which is the difference variance between the block B0 and block B2. Accordingly, determination is made that the reliability of the motion vector v1 which is a correct motion vector is higher than the reliability of the vector v2 which is an incorrect motion vector.

As described above, even in the case of the average brightness level between frames changing which has been difficult to handle at the time of employing a DFD as an evaluation value, difference variance (hereafter, also referred to as evaluation value dfv) is employed as an evaluation value, whereby the reliability of a vector can be evaluated correctly.

Note that an evaluation value dfv is, as shown in Expression (2), an expression of the sum of squares, so it is necessary to employ a multiplying unit, and consequently, the circuit scale relating to hardware is larger than that in the case of computing an evaluation value DFD.

Therefore, a DFD which takes a brightness average offset into consideration (hereafter, referred to as an mDFD (mem DFD)) can be cited as an evaluation value employing no square, and the evaluation value of a motion vector corresponding to change in an average brightness level which is a feature of difference variance (evaluation value dfv). An mDFD can be represented with Expression (3).

[Mathematical Expression 4]

$$mDFD_t(p) = \sum_{x,y}^{m \times n} |(F_{t+1}(p_{x,y} + v) - \overline{F_{t+1}(p_{x,y} + v)}) - (F_t(p_{x,y}) - \overline{F_t(p_{x,y})})| \quad (3)$$

An mDFD also represents, in the same way as with difference variance, the coincidence of waveforms which takes an average brightness level into consideration, and is the evaluation value of a motion vector corresponding to the case of an average brightness level greatly changing between frames. Accordingly, hereafter, an mDFD will also be referred to as an evaluation value mDFD.

Further, description will be made in detail regarding an evaluation value mDFD.

Figure 11:
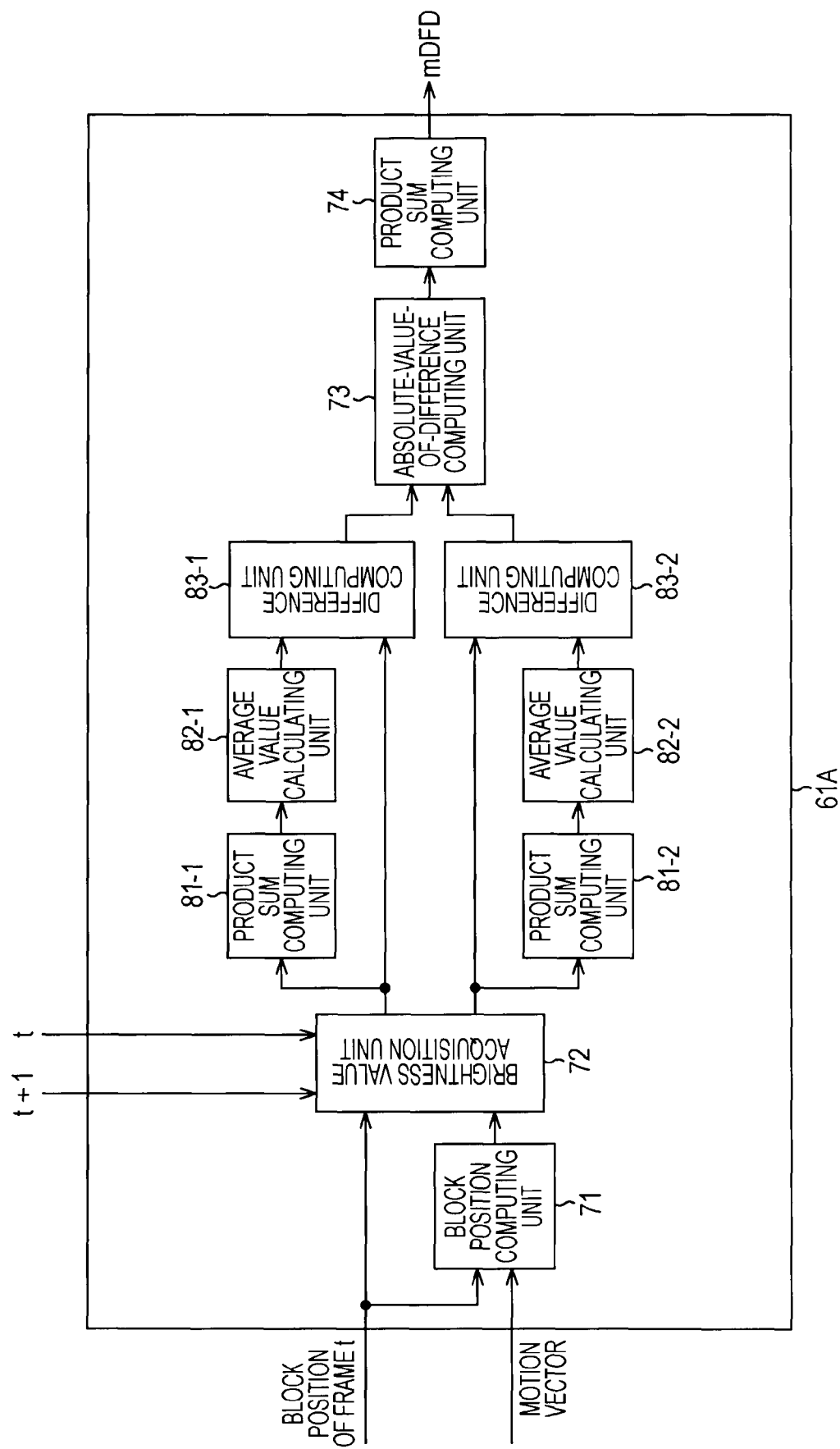
FIG. 11 is a block diagram illustrating a configuration example of the evaluation value computing unit for computing an evaluation value mDFD.

FIG. 11 is a block diagram illustrating a configuration example of an evaluation value computing unit 61A for computing an evaluation value mDFD.

Note that the example in FIG. 11 is common to the evaluation value computing unit 61 in FIG. 6 in that the block position computing unit 71, brightness value acquisition unit 72, absolute-value-of-difference computing unit 73, and product sum computing unit 74 are provided, but differs from the evaluation value computing unit 61 in FIG. 6 in that product sum computing units 81-1 and 81-2, average value calculating units 82-1 and 82-2, and difference computing units 83-1 and 83-2 are added thereto.

With the example in FIG. 11, the brightness value acquisition unit 72 acquires a brightness value corresponding to the block position of a frame t input from unshown frame memory of the frame t, and outputs the brightness value of the acquired frame t to the product sum computing unit 81-1 and difference computing unit 83-1. Also, the brightness value acquisition unit 72 acquires a brightness value corresponding to the block position of a frame t+1 input from the frame memory 51 of the frame t+1, and outputs the brightness value of the acquired frame t+1 to the product sum computing unit 81-2 and difference computing unit 83-2.

The product sum computing unit 81-1 integrates the brightness values of all the pixels within the block of the frame t, and outputs the integrated brightness value to the average value calculating unit 82-1. The average value calculating unit 82-1 calculates the brightness average value within the block using the integrated brightness value from the product sum computing unit 81-1, and outputs the calculated brightness average value within the block to the difference computing unit 83-1.

The difference computing unit 83-1 computes the difference between each pixel within the block of the frame t and the brightness average value within the block using the brightness value from the brightness value acquisition unit 72 and the brightness average value within the block from the average value calculating unit 82-1, and outputs the computed difference of the frame t to the absolute-value-of-difference computing unit 73.

The product sum computing unit 81-2, average value calculating unit 82-2, and difference computing unit 83-2 subjects the frame t+1 to the same processing as that of the product sum computing unit 81-1, average value calculating unit 82-1, and difference computing unit 83-1.

That is to say, the product sum computing unit 81-2 integrates the brightness values of all the pixels within the block of the frame t+1, and outputs the integrated brightness value to the average value calculating unit 82-2. The average value calculating unit 82-2 calculates the brightness average value within the block using the integrated brightness value from the product sum computing unit 81-2, and outputs the calculated brightness average value within the block to the difference computing unit 83-2.

The difference computing unit 83-2 computes the difference between each pixel within the block of the frame t+1 and the brightness average value within the block using the brightness value from the brightness value acquisition unit 72 and the brightness average value within the block from the average value calculating unit 82-2, and outputs the computed difference of the frame t+1 to the absolute-value-of-difference computing unit 73.

With the example in FIG. 11, the absolute-value-of-difference computing unit 73 computes the absolute values of brightness difference using the brightness values within the block of the frame t from the difference computing unit 83-1, and the brightness values within the block of the frame t+1 from the difference computing unit 83-2, and outputs the computed absolute values of brightness difference to the product sum computing unit 74. The product sum computing unit 74 obtains an evaluation value mDFD by integrating the absolute values of brightness differences computed at the absolute-value-of-difference computing unit 73, and outputs the obtained evaluation mDFD to the subsequent stage.

Next, the evaluation value computing processing of the evaluation value computing unit 61A in FIG. 11 will be described with reference to the flowcharts in FIG. 12 and FIG. 13.

The block (DFD computation range) position of the frame t and a motion vector to be evaluated are input to the evaluation value computing unit 61A from the previous stage. Upon the block position of the frame t and the motion vector to be evaluated being input, in step S31 the block position computing unit 71 computes the block position of the frame t+1 using the input block position of the frame t and motion vector, and outputs the computed result to the brightness value acquisition unit 72.

In step S32, the brightness value acquisition unit 72 acquires the brightness values of the pixels of each block (DFD computation range) based on the block positions of the input frame t and frame t+1, outputs the brightness values of the pixels of the acquired frame t to the product sum computing unit 81-1, and outputs the brightness values of the pixels of the acquired frame t+1 to the product sum computing unit 81-2. Note that at this time, the brightness value acquisition unit 72 also outputs the brightness values of the pixels of the acquired frame t to the difference computing unit 83-1, and also outputs the brightness values of the pixels of the acquired frame t+1 to the difference computing unit 83-2.

In step S33, the product sum computing unit 81-1 integrates the brightness values of the pixels of the frame t from the brightness value acquisition unit 72, and in step S34 determines whether or not the processing has been completed as to all the pixels within the block. In the event that determination is made in step S34 that the processing has not been completed as to all the pixels within the block, the processing returns to step S32, and the processing thereafter is repeated. That is to say, the processing as to the next pixel of the block is performed.

In the event that determination is made in step S34 that the processing has been completed as to all the pixels within the block, the product sum computing unit 81-1 outputs the value obtained by integrating the brightness values of all the pixels within the block of the frame t to the average value calculating unit 82-1.

In step S35, the average value calculating unit 82-1 calculates the brightness average value within the block of the frame t using the integrated brightness value from the product sum computing unit 81-1, and outputs the calculated brightness average value within the block to the difference computing unit 83-1.

Figure 13:
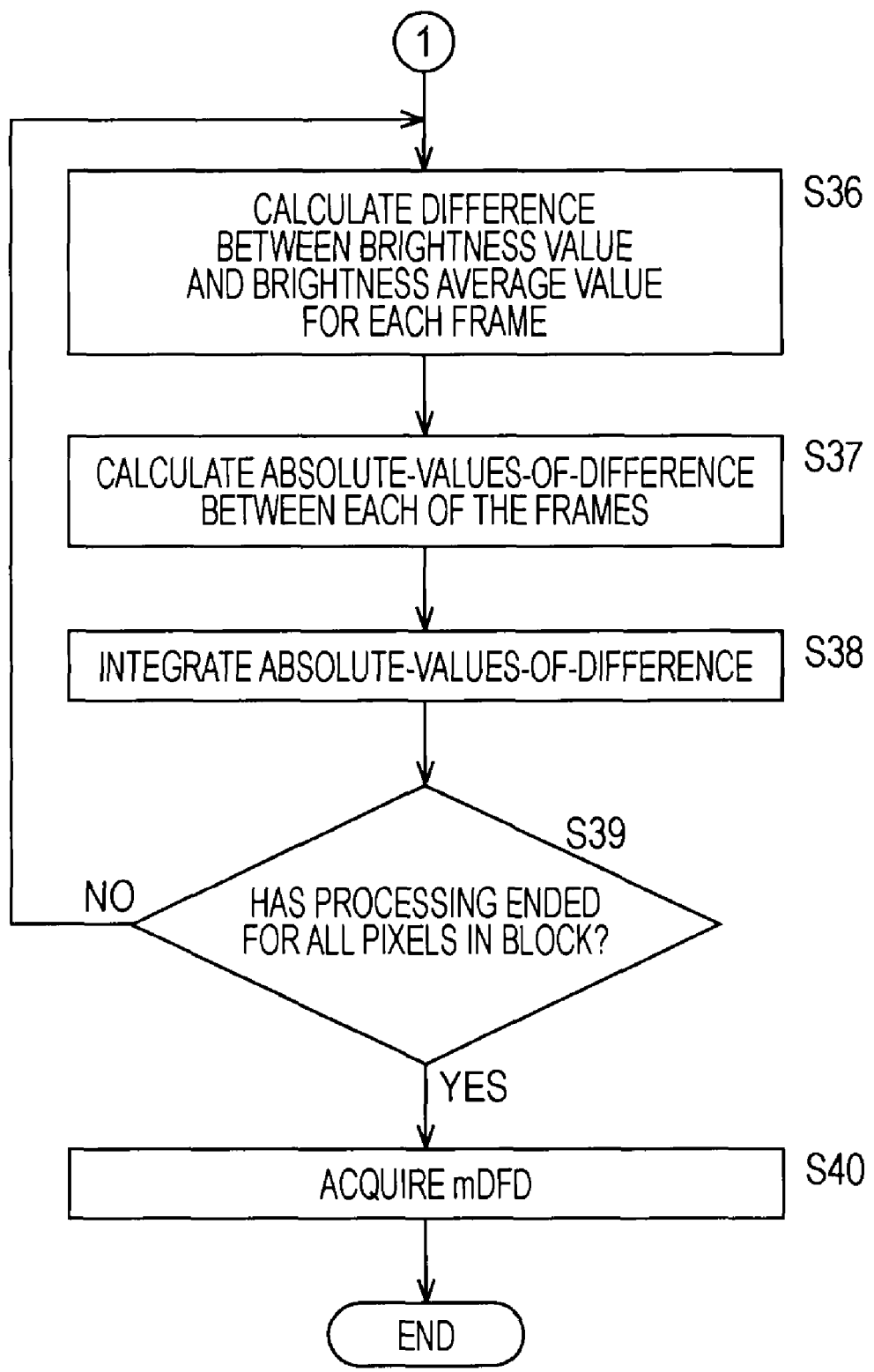
FIG. 13 is a flowchart for describing evaluation value computing processing at the evaluation value computing unit shown in FIG. 11.

In step S36 in FIG. 13, the difference computing unit 83-1 computes the difference between each pixel within the block of the frame t and the brightness average value within the block using the brightness value from the brightness value acquisition unit 72, and the brightness average value within the block from the average value calculating unit 82-1, and outputs the computed difference of the frame t to the absolute-value-of-difference computing unit 73.

Note that description will be a repetition, so will be omitted for convenience of description, but with the product sum computing unit 81-2, average value calculating unit 82-2, and difference computing unit 83-2 as well, the above-mentioned processing of steps S32 through S36 is performed as to the frame t+1 in the same way. Accordingly, in step S37, the difference between each pixel within the block of the frame t and the brightness average value within the block is calculated by the difference computing unit 83-1, and is output to the absolute-value-of-difference computing unit 73.

In step S38, the absolute-value-of-difference computing unit 73 integrates the absolute values of brightness difference from the difference computing unit 83-1 and difference computing unit 83-2, and in step S39 determines whether or not the processing has been completed as to all the pixels within the block. In the event that determination is made in step S38 that the processing has not been completed as to all the pixels within the block, the processing returns to step S36, and the processing thereafter is repeated. That is to say, the processing as to the next pixel of the block is performed.

On the other hand, in the event that determination is made in step S39 that the processing has been completed as to all the pixels within the block, in step S40 the product sum computing unit 74 obtains DFD which takes a brightness average offset into consideration which is a result of integrating the absolute values of brightness differences (i.e., mDFD), and outputs this to the subsequent stage as an evaluation value mDFD.

Thus, the evaluation value computing processing is ended, and consequently, an evaluation value mDFD can be obtained, which serves as the evaluation value of a motion vector corresponding to the case of an average brightness level changing greatly between frames.

Thus, the evaluation value computing unit 61A in FIG. 11 for computing an evaluation value mDFD needs no multiplying unit, so there is no need to increase circuit scale relating to hardware.

Figure 12:
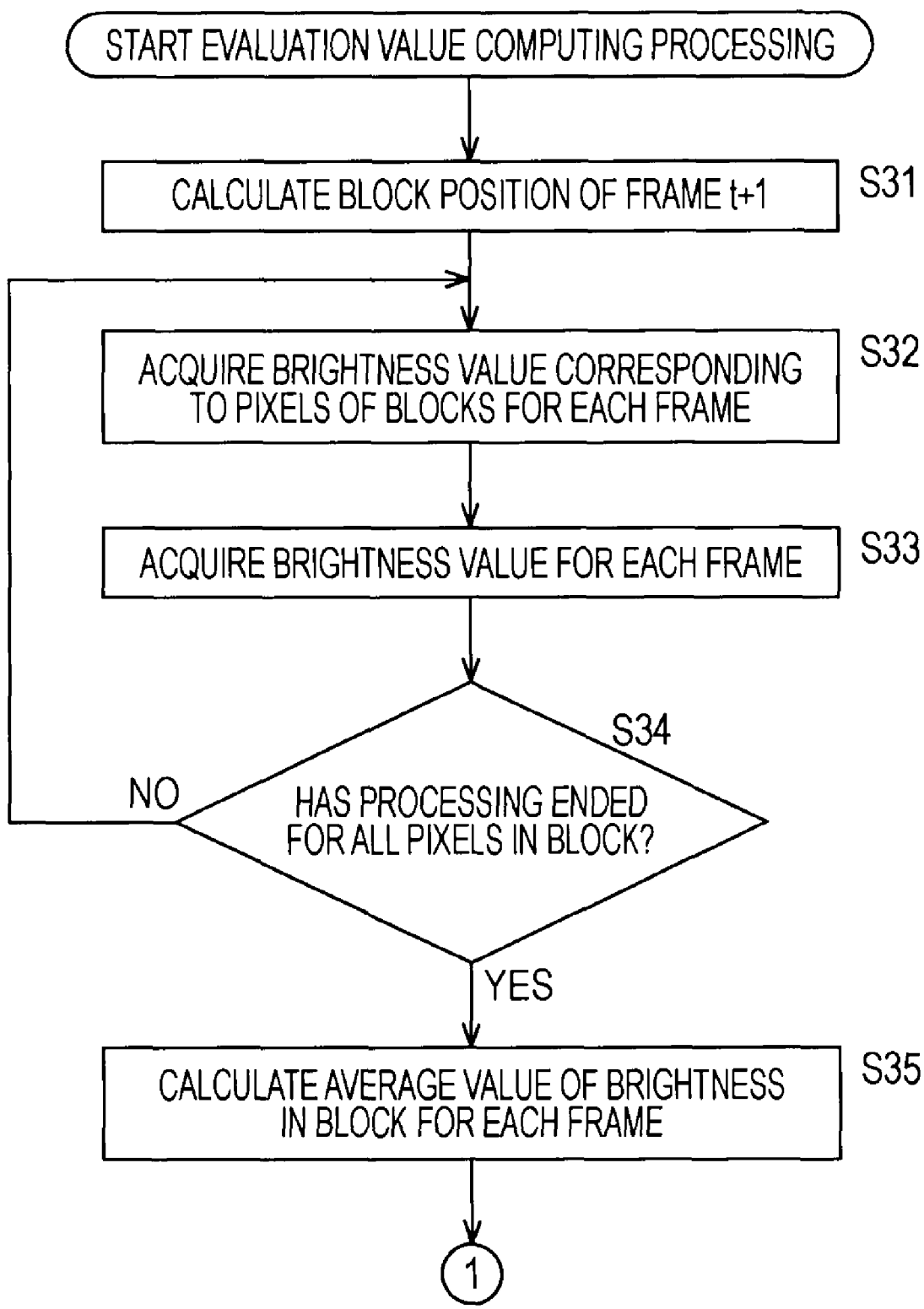
FIG. 12 is a flowchart for describing evaluation value computing processing at the evaluation value computing unit shown in FIG. 11.

Note however, with the computing processing of an evaluation value mDFD, as can be apparent from Expression (3) and FIG. 12, once the average brightness value within each block is calculated, and the average brightness value within each block is determined, there is a need to perform a procedure for subtracting the corresponding average brightness value from the brightness value of each pixel within the block, and integrating the differences thereof. That is to say, with the computing processing of an evaluation value mDFD, the next processing cannot be performed until the average brightness value within each block is determined.

Now, description will be made again regarding the difference variance represented with Expression (2). The following Expression (4) represents the difference between frames with a motion vector v at a pixel position Px, y.

[Mathematical Expression 5]

$$Dt(p_{x,y}, v) = F_{t+1}(p_{x,y}+v) - Ft(p_{x,y}) \quad (4)$$

Upon the above-mentioned Expression (2) of difference variance dfv being transformed using the above-mentioned Expression (4), difference variance is represented with the following Expression (5).

[Mathematical Expression 6]

$$dfv_t(p) = \sum_{x,y}^{m \times n} \{D_t(p_{x,y}, v) - \overline{D_t(p_{x,y}, v)}\}^2 \quad (5)$$

Expression (5) indicates that difference variance is the variance of a brightness value Dt within an evaluation value computation block. Accordingly, Expression (5) can be transformed to such as Expression (6) through the expansion of the variance expression.

[Mathematical Expression 7]

$$dfv_t(p) = (m \times n)\left[\frac{1}{m \times n}\sum_{x,y}^{m \times n}\{D_t(p_{x,y}, v)\}^2 - (\overline{D_t(p_{x,y}, v)})^2\right] \quad (6)$$

$$= \sum_{x,y}^{m \times n}\{D_t(p_{x,y}, v)\}^2 - \frac{1}{m \times n}\left\{\sum_{x,y}^{m \times n}D_t(p_{x,y}, v)\right\}^2$$

As shown in this Expression (6), difference variance can be separated into the term of the sum of squared differences and the term of the squared sum of differences. That is to say, in the event of computing difference variance, the computing unit of difference variance can be configured so as to compute each term in parallel.

Figure 14:
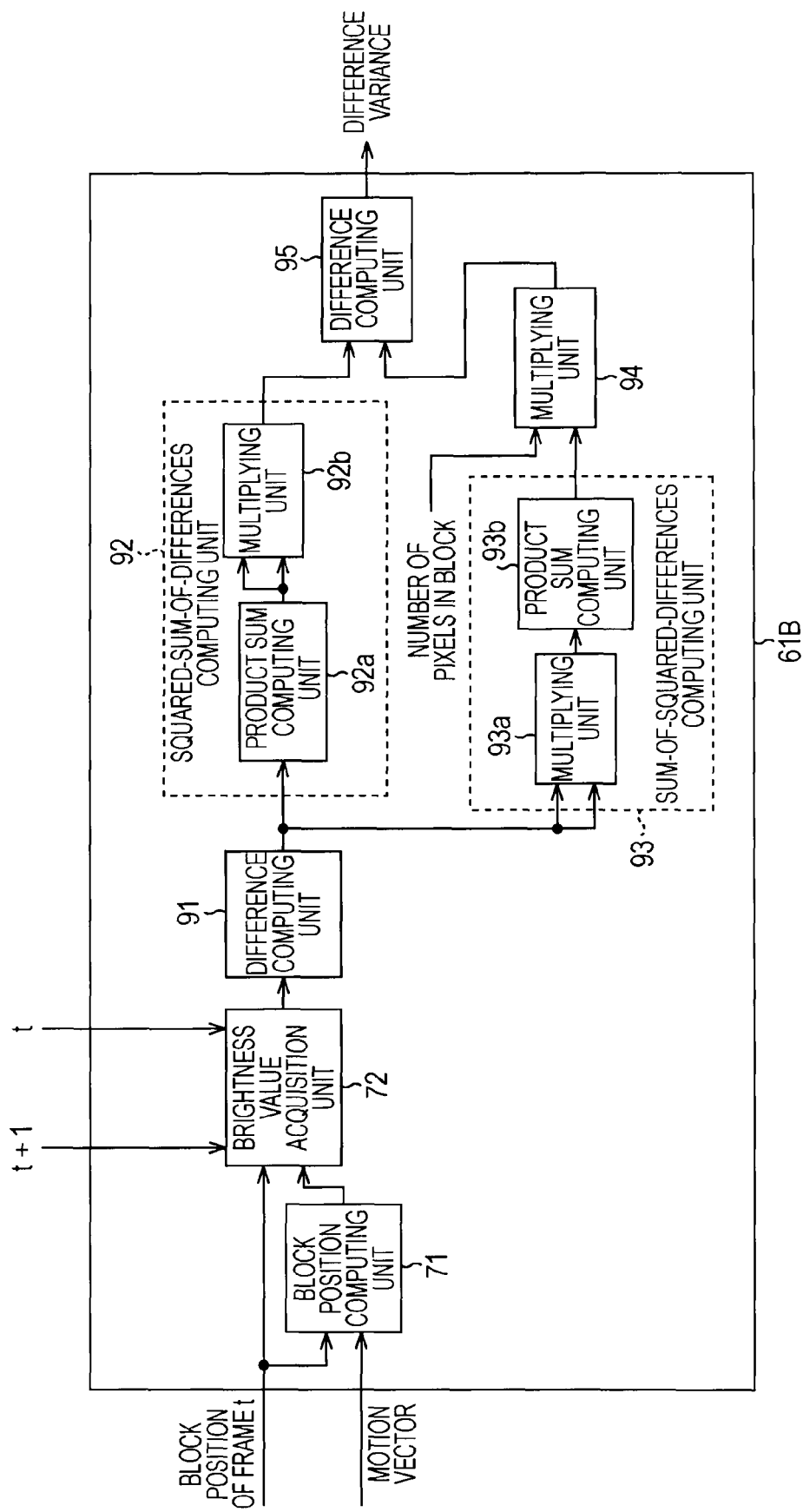
FIG. 14 is a block diagram illustrating a configuration example of the evaluation value computing unit for calculating an evaluation value dfv.

FIG. 14 is a block diagram illustrating a configuration example of an evaluation value computing unit 61B for computing difference variance (i.e., an evaluation value dfv).

Note that the example in FIG. 14 is common to the evaluation value computing unit 61 in FIG. 6 in that the block position computing unit 71, and brightness value acquisition unit 72 are provided, but differs from the evaluation value computing unit 61 in FIG. 6 in that product a difference computing unit 91, a squared-sum-of-differences computing unit 92, a sum-of-squared-differences computing unit 93, a multiplying unit 94, and a difference computing unit 95 are added thereto instead of the absolute-value-of-difference computing unit 73 and product sum computing unit 74.

With the example in FIG. 14, the brightness value acquisition unit 72 acquires a brightness value corresponding to the block position of a frame t input from unshown frame memory of the frame t, acquires a brightness value corresponding to the block position of a frame t+1 input from the frame memory 51 of the frame t+1, and outputs the acquired respective brightness values to the difference computing unit 91.

The difference computing unit 91 computes the difference of the brightness values of a pixel to be processed, and outputs the computed difference of the brightness values to the squared-sum-of-differences computing unit 92, and sum-of-squared-differences computing unit 93.

The squared-sum-of-differences computing unit 92 is configured of a product sum computing unit 92a and a multiplying unit 92b. The product sum computing unit 92a integrates the difference of brightness values from the difference computing unit 91 by the same number of times as the number of blocks, and outputs the integrated difference of brightness values (sum of differences of brightness values) to the multiplying unit 92b. The multiplying unit 92b squares the sum of differences of brightness values from the product sum computing unit 92a, and outputs the squared sum of differences of brightness values to the difference computing unit 95.

The sum-of-squared-differences computing unit 93 is configured of a multiplying unit 93a and a product sum computing unit 93b. The multiplying unit 93a computes the squared difference of brightness values from the difference computing unit 91, and outputs the computed squared brightness difference to the product sum computing unit 93b. The product sum computing unit 93b integrates the squared brightness differenced by the same number of times as the number of blocks, and outputs the integrated squared difference of brightness values (sum of squared difference of brightness values) to the multiplying unit 94.

The number of pixels within a block is input to the multiplying unit 94 from an unshown control unit or the like. The multiplying unit 94 multiplies the number of pixels within a block and the sum of squared brightness differences, and outputs this to the difference computing unit 95.

The difference computing unit 95 obtains difference variance by subtracting the sum of squared differences of brightness values from the multiplying unit 92b from the sum of squared brightness difference values multiplied by the number of pixels within a block from the multiplying unit 94, and outputs this to the subsequent stage as evaluation value dfv.

Figure 15:
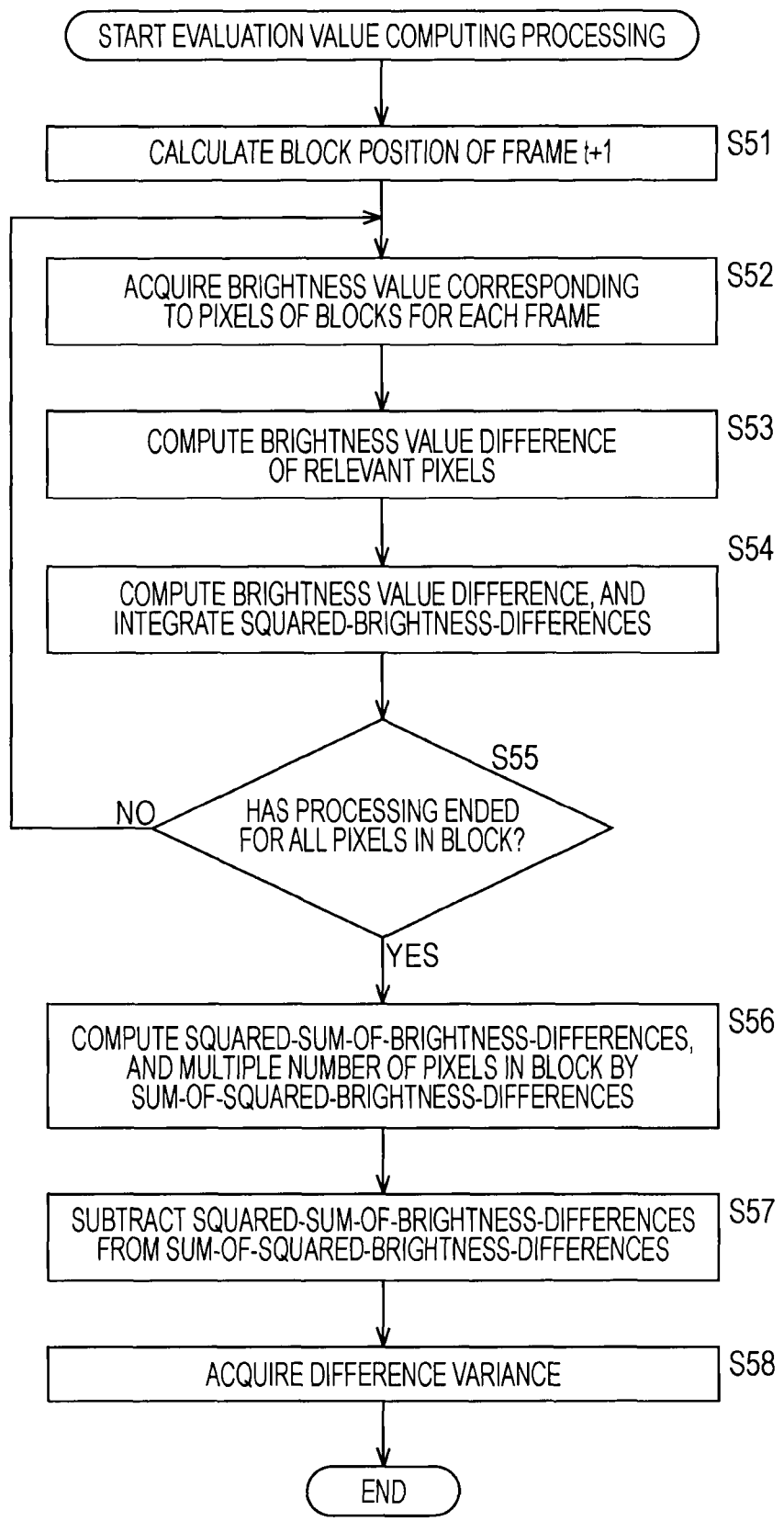
FIG. 15 is a flowchart for describing evaluation value computing processing at the evaluation value computing unit shown in FIG. 14.

Next, the evaluation value computing processing of the evaluation value computing unit 61B in FIG. 14 will be described with reference to the flowchart in FIG. 15.

The block (DFD computation range) position of the frame t and a motion vector to be evaluated are input to the evaluation value computing unit 61B from the previous stage. Upon the block position of the frame t and the motion vector to be evaluated being input, in step S51 the block position computing unit 71 computes the block position of the frame t+1 using the input block position of the frame t and motion vector, and outputs the computed result to the brightness value acquisition unit 72.

In step S52, the brightness value acquisition unit 72 acquires the brightness values of the pixels of the blocks (DFD computation range) of each frame based on the block position of the input frame t and frame t+1, and outputs the acquired respective brightness values to the difference computing unit 91.

In step S53, the difference computing unit 91 computes the difference of the brightness values of a pixel to be processed, and outputs the computed difference of the brightness values to the squared-sum-of-differences computing unit 92 and sum-of-squared-differences computing unit 93.

In step S54, the difference of the brightness values is computed, and squared difference of the brightness values is integrated. That is to say, in step S54, the product sum computing unit 92a of the squared-sum-of-differences computing unit 92 integrates the difference of the brightness values from the difference computing unit 91. At this time, simultaneously, the product sum computing unit 93b of the sum-of-squared-differences computing unit 93 integrates the squared difference of the brightness values wherein the brightness difference from the difference computing unit 91 is computed by the multiplying unit 93*a*.

In step S55, the product sum computing unit 92*a* and product sum computing unit 93*b* determine whether or not the processing has been completed as to all the pixels within the block. In the event that determination is made in step S55 that the processing has not been completed as to all the pixels within the block, the processing returns to step S52, and the processing thereafter is repeated. That is to say, the processing as to the next pixel of the block is performed.

On the other hand, in the event that determination is made in step S55 that the processing has been completed as to all the pixels within the block, the product sum computing unit 92*a* outputs the integrated difference of the brightness values (sum of differences of brightness values) to the multiplying unit 92*b*, and the product sum computing unit 93*b* outputs the integrated squared difference of the brightness values (sum of squared differences of brightness values) to the multiplying unit 94.

In step S56, the squared sum of differences of the brightness values is computed, the number of pixels within the block, and the sum of squared differences of the brightness values are computed. That is to say, in step S56, the multiplying unit 92*b* of the squared-sum-of-differences computing unit 92 squares the sum of differences of the brightness values from the product sum computing unit 92*a*, and outputs the squared sum of differences of the brightness values to the difference computing unit 95. At this time, simultaneously, the multiplying unit 94 multiplies the number of pixels within the block and the sum of squared brightness difference values, and output these to the difference computing unit 95.

In step S57, the difference computing unit 95 subtracts the sum of squared brightness difference values which has been multiplied by the number of pixels within the block from the squared sum of differences of the brightness values from the multiplying unit 92*b*, and in step S58 acquires difference variance which is the subtraction result, and output to the subsequent stage as evaluation value dfv.

Thus, the evaluation value computing processing is ended, and consequently, an evaluation value dfv can be obtained, which serves as the evaluation value of a motion vector corresponding to the case of an average brightness level changing greatly between frames.

Consequently, according to difference variance being employed as an evaluation, the evaluation of a vector with high reliability can be performed, even in the case of an average brightness level changing greatly between frames.

Also, with this evaluation value computing processing for computing difference variance, in step S54 and step S56, the squared-sum-of-differences computing unit 92 and sum-of-squared-differences computing unit 93 can perform the computing processing in parallel. Accordingly, as shown in the evaluation value computing unit 61B in FIG. 14, difference variance needs to have a multiplying unit, so that hardware implementation becomes great, but on the other hand, the circuits can be parallelized, whereby computing processing time can be reduced as compared with that in the case of an mDFD.

Thereafter, when reference is not made in particular, let us say that with the vector detection unit 52 of the signal processing device 1, an evaluation value dfv is employed instead of an evaluation value DFD as an evaluation value in the case of a motion vector being selected, and with the other vector allocating unit 54 and allocating compensation unit 57, the sum of the absolute values of differences (hereafter, referred to as evaluation value DFD) is employed as an evaluation value in the case of a motion vector being selected.

Accordingly, description will be made below, assuming that the vector detection unit 52 includes the evaluation value computing unit 61B therein, and the vector allocating unit 54 and allocating compensation unit 57 include the evaluation value computing unit 61 therein.

Note that it goes without saying that an arrangement may be made wherein with not only the vector detection unit 52 but also the vector allocating unit 54 or allocating compensation unit 57, an evaluation value dfv is employed instead of an evaluation value DFD.

Figure 16:
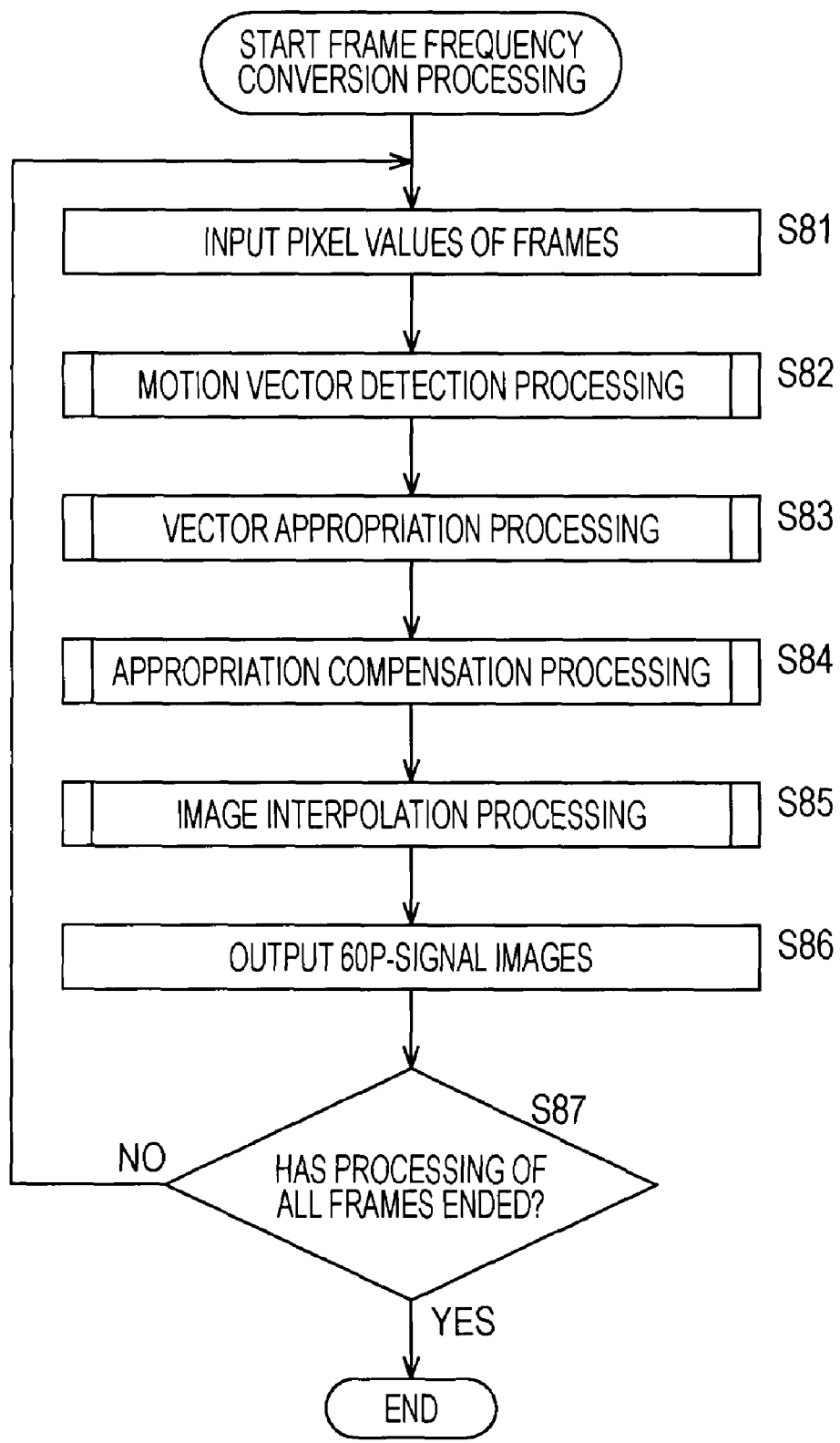
FIG. 16 is a flowchart for describing frame frequency conversion processing at the signal processing device.

Next, processing for converting the frame frequency of the signal processing device 1 will be described with reference to the flowchart in FIG. 16.

In step S81, the vector detection unit 52 inputs the pixel values of input image frame t+1 at point-in-time t+1 and frame t point-in-time t which is one ahead of the input image of the frame memory 51. Note that at this time, the vector allocating unit 54, allocating compensation unit 57, and image interpolation unit 58 also input the pixel values of input image frame t+1 at point-in-time t+1 and frame t point-in-time t which is one ahead of the input image of the frame memory 51.

In step S82, the vector detection unit 52 executes motion vector detection processing. That is to say, the vector detection unit 52 detects a motion vector between a block of interest of the frame t on the frame memory 51, and a block to be processed of the next frame t+1 which is an input image, and stores the detected motion vector in the detected-vector memory 53. As for a detection method of a motion vector between two frames, the gradient method, block matching method, or the like is employed.

Also, in the case of multiple motion vector candidates existing, with the vector detection unit 52, an evaluation value dfv (difference variance) is obtained as to each motion vector by the evaluation value computing unit 61B, and a motion vector with high reliability based is detected based on the obtained evaluation value dfv. That is to say, in this case, within a block of interest where a motion vector is detected, the most reliable motion vector is selected, and detected. The details of the motion vector detection processing in step S82 will be described later with reference to FIG. 20.

In step S83, the vector allocating unit 54 executes vector allocation processing. That is to say, in step S83, the vector allocating unit 54 allocates the motion vector obtained on the frame t to a pixel of interest on the interpolation frame to be interpolated on the allocated-vector memory 55, and rewrites the allocated-flag of the allocated-flag memory 56 of the pixel to which the motion vector has been allocated to 1 (true). For example, an allocated-flag which is true indicates that a motion vector has been allocated to the corresponding pixel, and an allocated-flag which is false indicates that a motion vector has not been allocated to the corresponding pixel.

Note that in the case of multiple motion vector candidates existing regarding each pixel, with the vector allocating unit 54, an evaluation value DFD is obtained as to each motion vector by the evaluation value computing unit 61, and a motion vector with high reliability is allocated based on the obtained evaluation value DFD. That is to say, in this case, with a pixel of interest to which a motion vector is allocated, the most reliable motion vector is selected, and allocated. The details of the vector allocation processing in step S83 will be described later with reference to FIG. 73.

In step S84, the allocating compensation unit 57 executes allocation compensation processing. That is to say, in step S84, the allocating compensation unit 57 compensates a pixel of interest to which no motion vector has been allocated by the vector allocating unit 54 with the motion vectors of the peripheral pixels of the pixel of interest with reference to the allocated-flag of the allocated-flag memory 56, and allocates these onto the interpolation frame of the allocated-vector memory 55. At this time, the allocating compensation unit 57 compensates the motion vectors, and rewrites the allocated-flag of the allocated pixel of interest to 1 (true).

Note that in the case of the peripheral pixel having multiple motion vectors, with the allocating compensation unit 57, an evaluation value DFD is obtained as to each motion vector by the evaluation value computing unit 61, a motion vector with high reliability is allocated based on the obtained evaluation value DFD. That is to say, in this case, with the pixel of interest to which a motion vector is allocated, the most reliable motion vector is selected, and allocated. The details of the allocation compensation processing in step S84 will be described later with reference to FIG. 76.

In step S85, the image interpolation unit 58 executes image interpolation processing. That is to say, in step S85, the image interpolation unit 58 interpolates and generates the pixel values of the interpolation frame using the motion vector allocated to the interpolation frame of the allocated-vector memory 55, and the pixel values of the frame t and frame t+1. The details of the image interpolation processing in step S85 will be described later with reference to FIG. 79. In step S86, the image interpolation unit 58 outputs the generated interpolation frame, following which outputs the frame t+1 as necessary, thereby outputting a 60P-signal image to the unshown subsequent stage.

In step S87, the vector detection unit 52 determines whether or not the processing as to all of the frames has been completed, and in the case of determining that the processing as to all of the frames has not been completed, returns to step S81, and repeats the processing thereafter. On the other hand, in the case of determining that the processing as to all of the frames has been completed, the vector detection unit 52 ends the processing for converting the frame frequency.

As described above, the signal processing device 1 according to the present invention detects a motion vector from the frame of an input 24P-signal image, and allocates the detected motion vector to a pixel on the frame of a 60P signal, and generates a pixel value on the frame of a 60P signal based on the allocated motion vector.

At this time, with the vector detection processing, the signal processing device 1 selects a motion vector with higher reliability based on evaluation value dfv (difference variance), and outputs this to the subsequent stage. Accordingly, with the signal processing device 1, the reliability of a motion vector can be correctly evaluated even in the case of an average brightness level changing greatly between frames from which a motion vector is obtained. Thus, a motion is suppressed from failure, and a more accurate image can be generated.

Next, description will be made regarding the details of the configuration of the vector detection unit 52.

Figure 17:
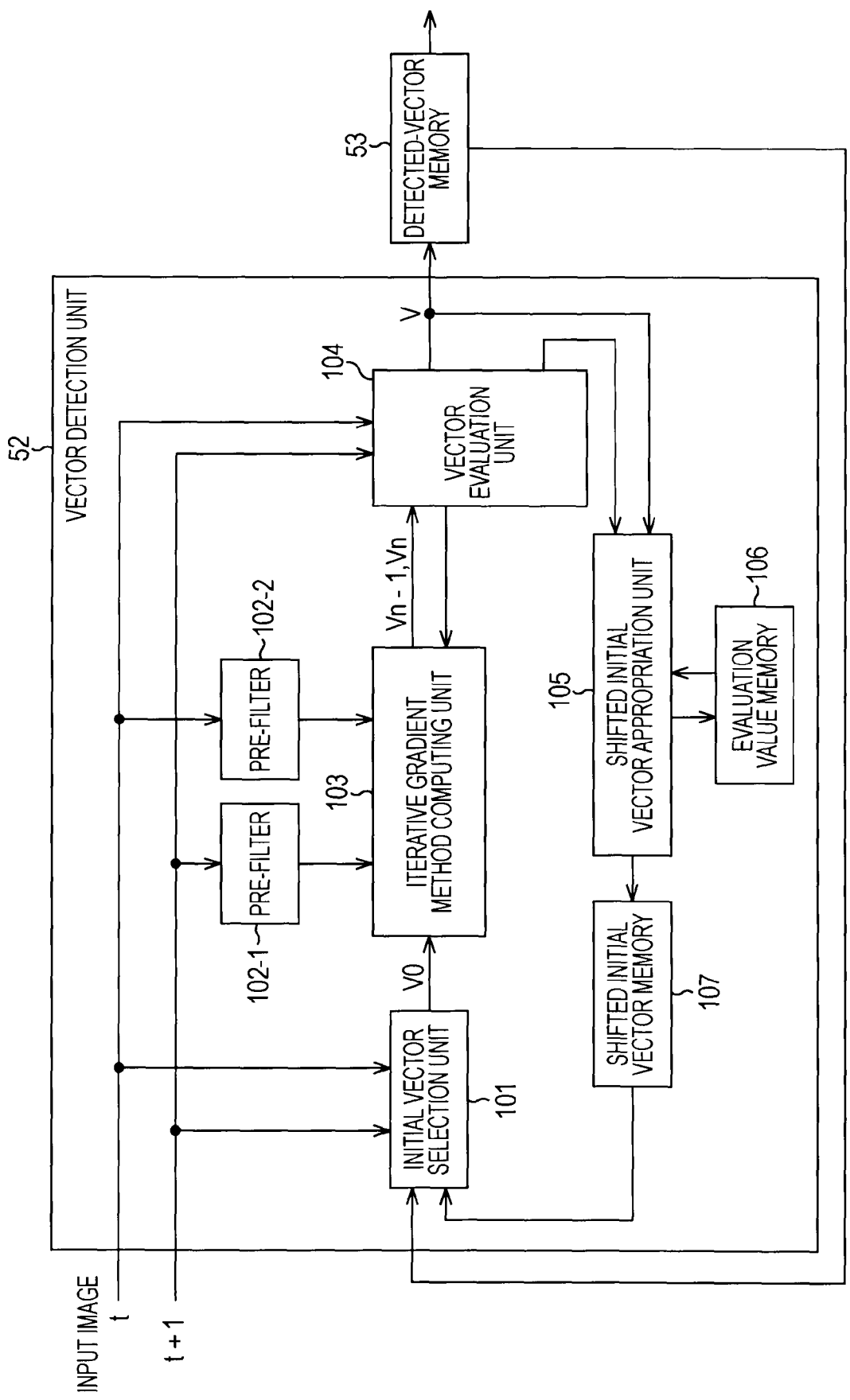
FIG. 17 is a block diagram illustrating the configuration of a vector detection unit shown in FIG. 2.

FIG. 17 is a block diagram illustrating the configuration of the vector detection unit 52. The vector detection unit 52 of which the configuration is shown in FIG. 17 uses an image frame t at point-in-time t to be input, and an image frame t+1 at point-in-time t+1 to detect a motion vector on the frame t, and stores the detected motion vector in the detected-vector memory 53. This processing for detecting a motion vector is executed for every predetermined block made up of multiple pixels.

An initial vector selection unit 101 outputs a motion vector with high reliability obtained from the detection results of the past motion vectors to an iterative gradient method computing unit 103 as an initial vector V0 serving as an initial value employed for the gradient method for every predetermined block. Specifically, the initial vector selection unit 101 selects the motion vectors of peripheral blocks obtained in the past stored in the detected-vector memory 53, and the shifted initial vector stored in a shifted initial vector memory 107 as candidate vectors for the initial vector. Subsequently, the initial vector selection unit 101, which includes the evaluation value computing unit 61B described above with reference to FIG. 14, causes the evaluation value computing unit 61B to obtain the evaluation values dfv of the candidate vectors using the frame t and frame t+1, selects a vector with the highest reliability from the candidate vectors based on the evaluation values dfv obtained by the evaluation value computing unit 61B, and outputs this as the initial vector V0. Note that the details of the configuration of the initial vector selection unit 101 will be described later with reference to FIG. 23.

Pre-filters 102-1 and 102-2 are configured of a low-pass filter and a Gaussian filter, each of which eliminates the noise components of the frame t and frame t+1 of an input image, and outputs the frame t and frame t+1 to the iterative gradient method computing unit 103.

The iterative gradient method computing unit 103 computes a motion vector Vn using the initial vector V0 input from the initial vector selection unit 101, and the frame t and frame t+1 input via the pre-filters 102-1 and 102-2 for every predetermined block with the gradient method. The iterative gradient method computing unit 103 outputs the initial vector V0, and the computed motion vector Vn to a vector evaluation unit 104. Also, the iterative gradient method computing unit 103 performs computation of the gradient method repeatedly based on the evaluation results of the motion vectors by the vector evaluation unit 104, thereby computing the motion vector Vn.

The vector evaluation unit 104 also includes the evaluation value computing unit 61B, causes the evaluation value computing unit 61B to obtain the vector Vn−1 (or initial vector V0) from the iterative gradient method computing unit 103, and the evaluation value dfv of the motion vector Vn, controls the iterative gradient method computing unit 103 to execute the computation of the gradient method repeatedly based on the evaluation value dfv obtained by the evaluation value computing unit 61B, and finally, selects a motion vector V with high reliability based on the evaluation value dfv, and stores the selected motion vector V in the detected-vector memory 53.

At this time, the vector evaluation unit 104 supplies not only the motion vector V but also the evaluation value dfv obtained as to the motion vector V thereof to a shifted initial vector allocation unit 105. Note that the details of the configurations of the iterative gradient method computing unit 103 and vector evaluation unit 104 will be described later with reference to FIG. 25.

Upon the motion vector V and the evaluation value dfv thereof being supplied from the vector evaluation unit 104, the shifted initial vector allocation unit 105 shifts a motion vector passing through a block of interest on the next frame to the block of interest, and sets this as a shifted initial vector. In other words, the shifted initial vector allocation unit 105 sets a motion vector having the same size and same direction as those of the motion vector V wherein a block of interest on the next frame of the same position as the terminal point block of the motion vector V is taken as a starting point, as a shifted initial vector. Subsequently, the shifted initial vector allocation unit 105 allocates the set shifted initial vector to the shifted initial vector memory 107 so as to be associated with the block of interest.

Specifically, the shifted initial vector allocation unit 105 stores the evaluation value dfv allocated as the shifted initial vector in the evaluation value memory 106 so as to be associated with the block of interest beforehand, and compares this with the evaluation value dfv of another motion vector V passing through the same block of interest (i.e., the block of the past frame of the same position as the block of interest is taken as a terminal point). Subsequently, the shifted initial vector allocation unit 105 shifts the motion vector V which has been determined as being high in reliability based on the evaluation value dfv to the block of interest, and allocates this to the shifted initial vector memory 107 as the shifted initial vector of the block of interest. Note that the details of the configuration of the shifted initial vector allocation unit 105 will be described later with reference to FIG. 21.

Next, description will be made regarding the principle of the gradient method employed by the vector detection unit 52. First, let us say that within a moving image, the pixel of a pixel represented with a coordinate (x, y, t) using a horizontal, vertical, and time axes is taken as g(x, y, t). Here, when a pixel of interest $(x_0, y_0, t_0)$ displaces by (dx, dy, dt) during minute time, upon the gradient of horizontal, vertical, and time axes (difference in difference) being represented with $gx(x_0, y_0, t_0)$, $gy(x_0, y_0, t_0)$, and $gt(x_0, y_0, t_0)$ respectively, the brightness value of the pixel after displacement is represented with the following Expression (7) using Taylor expansion approximation.

[Mathematical Expression 8]

$$g(x0+dx,y0+dy,t0+dt) \approx g(x0,y0,t0)+gx(x0,y0,t0)dx+gy(x0,y0,t0)dy+gt(x0,y0,t0)dt \quad (7)$$

Now, in the case of a certain pixel of interest within a moving image moving by horizontally vz, and vertically vy after one frame (hereafter, represented as (vx, vy)), the brightness value of the pixel thereof is represented with the following Expression (8).

[Mathematical Expression 9]

$$g(x0+vx,y0+vy,t0+1)=g(x0,y0,t0) \quad (8)$$

Upon Expression (7) being substituted for Expression (8), this is represented with the following Expression (9).

[Mathematical Expression 10]

$$gx(x0,y0,t0)vx+gy(x0,y0,t0)vy+gt(x0,y0,t0)=0 \quad (9)$$

Expression (9) is an expression made up of two variables of vx and vy, so the solution thereof cannot be obtained with an independent expression as to one pixel of interest. Therefore, as described next, a block which is a peripheral region of a pixel of interest is considered as one processing increment, and all of the pixels within a block (peripheral region) are assumed to perform the same movement (vx, vy), and the same expression is devised as to each pixel. Though the above-mentioned assumption is a premise, but the same number of expressions as the number of peripheral pixels is obtained as to the two variables. Accordingly, those expressions are converted into a simultaneous expression, thereby obtaining (vx, vy) such that the sum of squared differences of the motion compensation frames of all the pixels within a block becomes the minimum.

When the pixel (x, y, t) moves by (vx, vy) during one frame, difference d between motion compensation frames is represented with the following expression (10).

[Mathematical Expression 11]

$$d=g(x+vx,y+vy,t+1)-g(x,y,t)=\Delta x vx+\Delta y vy+\Delta t \quad (10)$$

In Expression (10), $\Delta x=gx(x, y, t)$ holds, which represents the gradient in the horizontal direction, $\Delta y=gy(x, y, t)$ holds, which represents the gradient in the vertical direction, and $\Delta t=gt(x, y, t)$ holds, which represents the gradient in the time direction. Upon those being employed, and the sum of squared differences between motion compensation frames being taken as E, this is represented with Expression (11).

[Mathematical Expression 12]

$$E=\Sigma d^2=\Sigma(\Delta x^2 vx^2+\Delta y^2 vy^2+2\Delta x \Delta y vxvy+2\Delta x \Delta t vx+2\Delta y\Delta t vy+\Delta t^2)=vx^2\Sigma\Delta x^2+vy^2\Sigma\Delta y^2+2vxvy\Sigma\Delta x\Delta y+2vx\Sigma\Delta x\Delta t+2vy\Sigma\Delta y\Delta t+\Sigma\Delta t^2 \quad (11)$$

Now, (vx, vy) wherein E becomes the minimum is when the partial differential value of each variable becomes zero, i.e., a condition of $\delta E/\delta vx=\delta E/\delta vy=0$ holds, and accordingly, the following Expression (12) and Expression (13) are derived from Expression (11).

[Mathematical Expression 13]

$$vx\Sigma\Delta x^2+vy\Sigma\Delta x\Delta y+\Sigma\Delta x\Delta t=0 \quad (12)$$

[Mathematical Expression 14]

$$vy\Sigma\Delta y^2+vx\Sigma\Delta x\Delta y+\Sigma\Delta y\Delta t=0 \quad (13)$$

(vx, vy) which is a motion to be obtained from those Expression (12) and Expression (13) can be obtained by computing the following Expression (14).

[Mathematical Expression 15]

$$vx = -\frac{(\sum \Delta y^2)(\sum \Delta t\Delta x) - (\sum \Delta x\Delta y)(\sum \Delta t\Delta y)}{(\sum \Delta x^2)(\sum \Delta y^2) - (\sum \Delta x\Delta y)^2}$$

$$vy = -\frac{(\sum \Delta x^2)(\sum \Delta t\Delta y) - (\sum \Delta x\Delta y)(\sum \Delta t\Delta x)}{(\sum \Delta x^2)(\sum \Delta y^2) - (\sum \Delta x\Delta y)^2} \quad (14)$$

Figure 18:
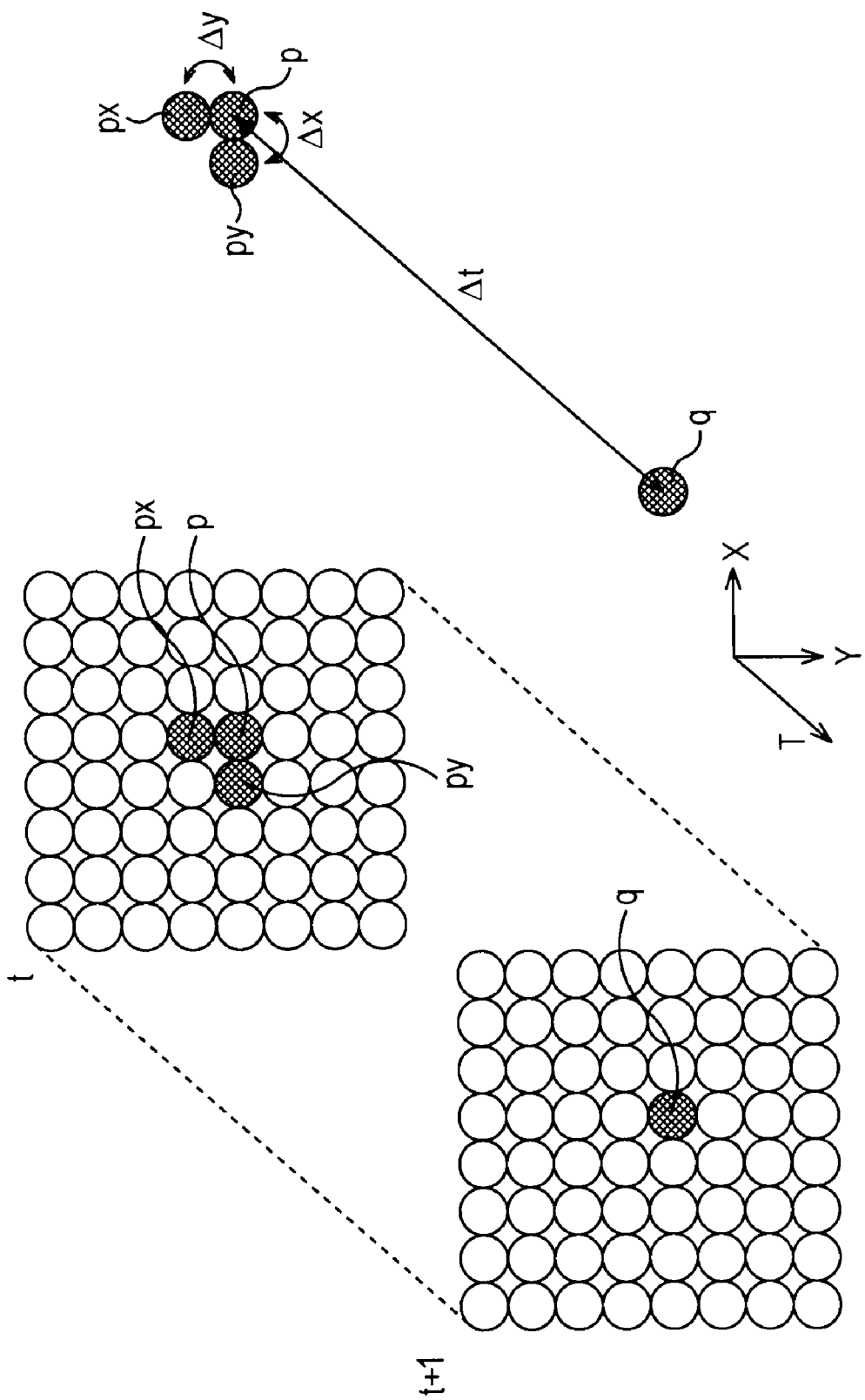
FIG. 18 is a diagram for describing the gradient method used at the vector detection unit.

Now, description will be made specifically with reference to FIG. 18. With the example in FIG. 18, an arrow X indicates the horizontal direction, and an arrow Y indicates the vertical direction. Also, an arrow T indicates the passage of time from a right-back frame t at point-in-time t to a left-front frame t+1 at point-in-time t+1 in the drawing. Note that with the example in FIG. 18, as for each frame, only a region of 8 pixels×8 pixels to be employed for the computation of the gradient method is illustrated as a peripheral region (block) of a pixel p of interest.

With the frame t, in the case of obtaining a motion vector V(vx, vy) of a pixel p of interest which is the 5th pixel from the upper left pixel, and the 5th pixel to the right using the above-mentioned gradient method, the motion vector V(vx, vy) can be obtained with an arrangement wherein the difference in difference (i.e., gradient) Δx and Δy of brightness between adjacent pixels px and py to be obtained regarding each of the x and y directions of the pixel p of interest, and the difference in difference (gradient) Δt of brightness in the time direction as to a pixel q positioned at the same phase as that of the pixel p of interest to be obtained with the frame t+1, are obtained regarding all of the pixels of the peripheral region (8 pixels×8 pixels) of the pixel p of interest, and the difference in difference of those are computed using Expression (14).

That is to say, the gradient method is a method wherein gradients Δx, Δy, and Δt are obtained between two frames, and the motion vector V(vx, vy) is statistically computed from the obtained Δx, Δy, and Δt using the sum of squared differences.

In general, with a motion vector detection method employing such a gradient method, a high precision result can be obtained as to a minute motion. Note however, in the case of attempting to obtain a motion within an actual moving image, we cannot say that this gradient method is practical since the motion quantity thereof is too great. In order to handle this, a method for iterating this gradient method multiple times can be considered. The motion quantity to be obtained at each computation is converged by executing the gradient method in an iterative manner, and accordingly, a correct motion can be obtained gradually.

Note however, it is not practical to simply iterate the gradient method from the perspective of calculation time, in the case of attempting to perform real time processing. Therefore, with the vector detection unit 52, an initial vector to be obtained based on the motion of a peripheral pixel in the past frame and that in the current frame is employed as an initial value, thereby reducing the iterative number of times of the gradient method. That is to say, a rough motion is computed by adding an offset from the pixel of interest serving as the starting point of a motion to the destination indicated with the initial vector beforehand, and computation employing the gradient method is performed from the position to which the offset is added, whereby fine adjustment including pixels and motion thereof can be performed. Thus, an accurate motion vector can be detected without increasing computation time.

Figure 19:
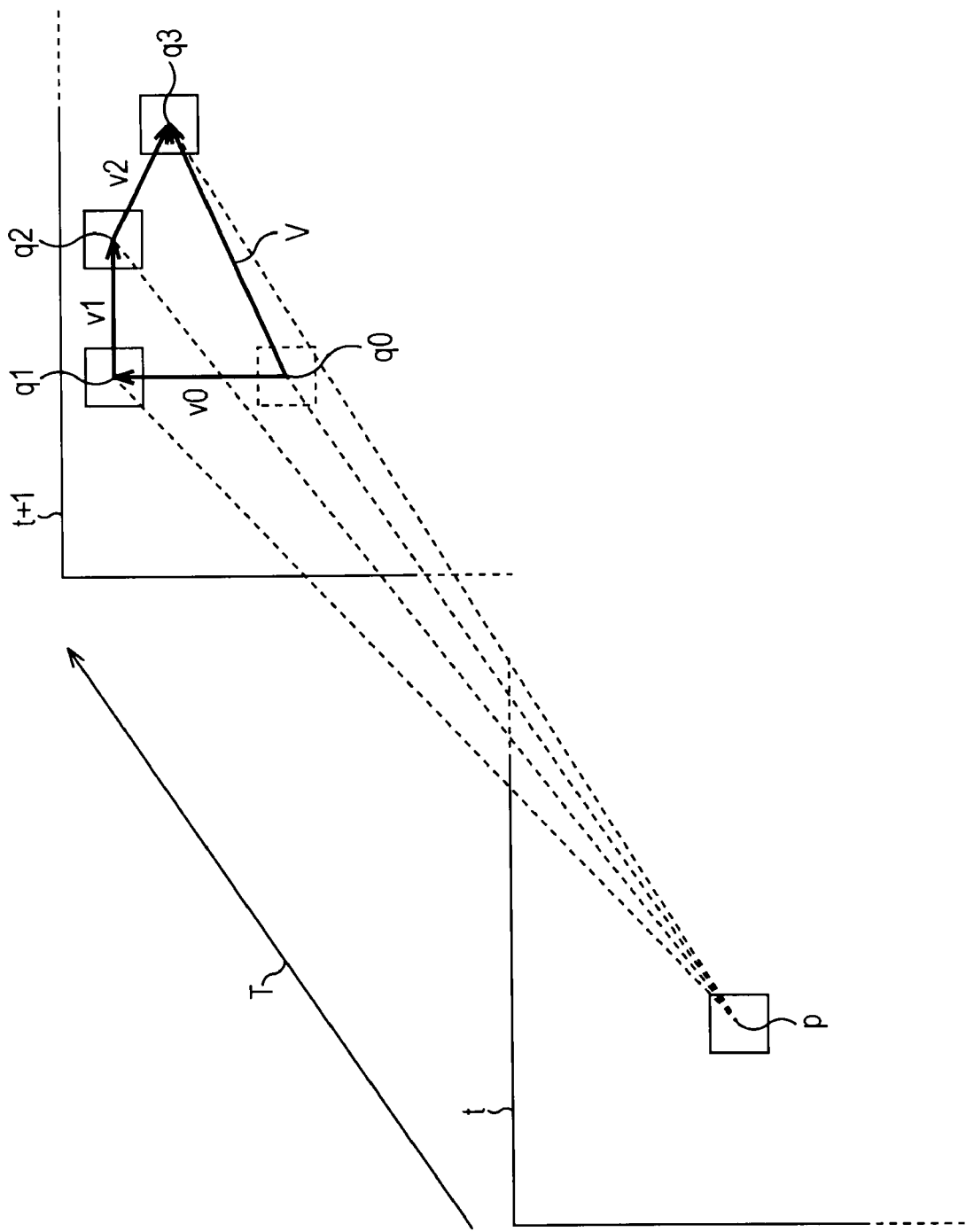
FIG. 19 is a diagram for describing the iterative gradient method using an initial vector.

FIG. 19 is a diagram specifically describing the iterative gradient method to be executed using an initial vector. With the example in FIG. 19, an arrow T in the drawing indicates the passage of time from a left-front frame t at point-in-time t to a right-back frame t+1 at point-in-time t+1. Note that a block with each of pixels p, q0, q1, q2, and q3 as the center represents the peripheral region (block) of the pixel thereof employed for the computation of the gradient method.

In the case of the example in FIG. 19, as to the pixel p of interest at the frame t, with the frame t+1, a first gradient computation is performed with not the pixel q0 positioned at the same phase of that in the pixel p of interest but the position (pixel) q1 computed by offsetting (moving) the initial vector v0 obtained beforehand, as a starting point, and as a result thereof, a motion vector v1 is obtained.

Next, a second gradient method computation is performed with the position (pixel) q2 computed by offsetting v0+v1 from the pixel q0 as a starting point, and as a result thereof, a motion vector v2 is obtained. Thus, finally, the motion vector V is obtained as Expression (15).

$$V = v0 + v1 + v2 \quad (15)$$

Thus, the computation of the iterative gradient method is executed using an initial vector, whereby a motion vector with high precision can be obtained while reducing computation time.

Figure 20:
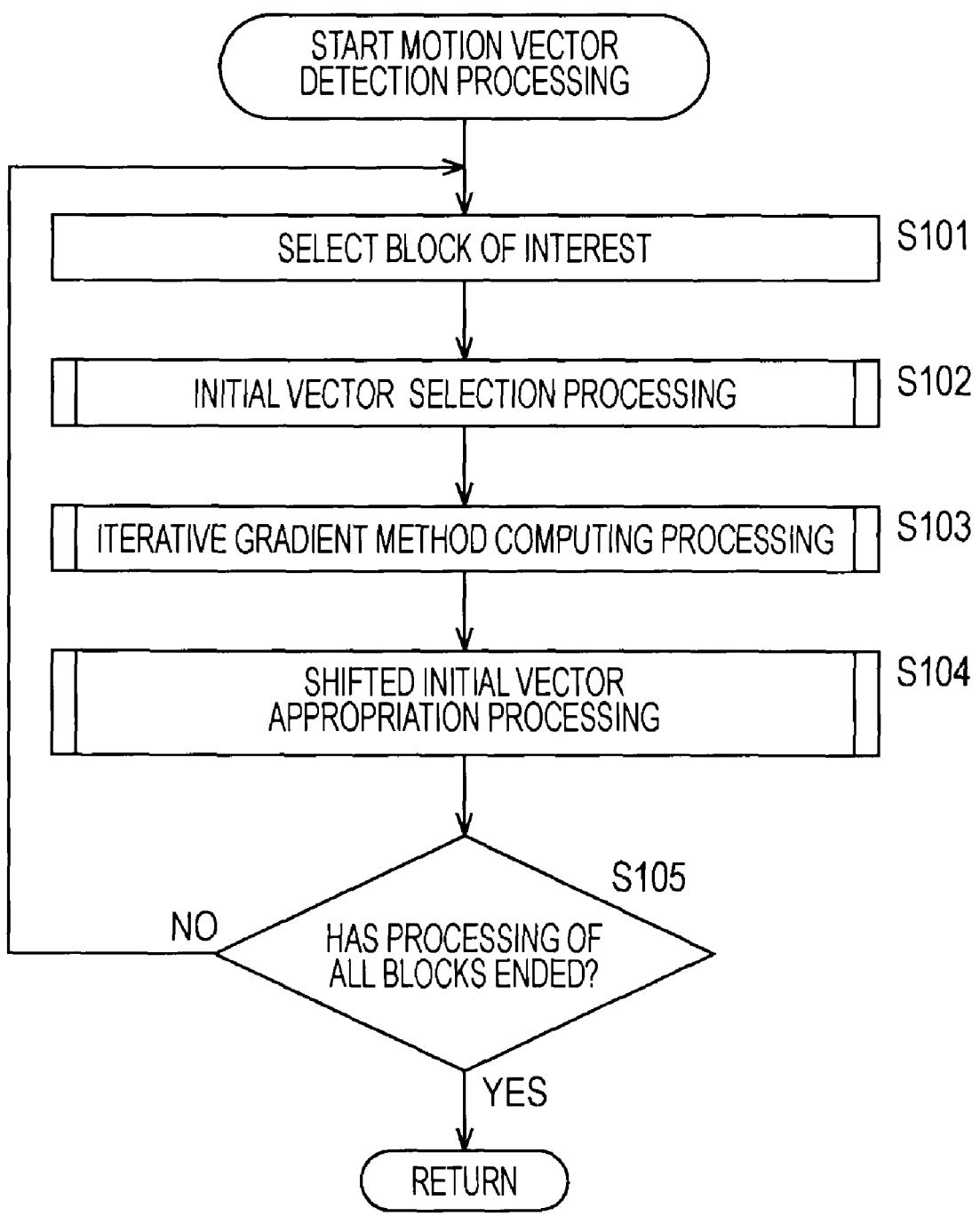
FIG. 20 is a flowchart for describing motion vector detection processing performed at step S82 in FIG. 16.

Next, description will be made regarding the details of the motion vector detection processing with reference to the flowchart in FIG. 20. An image frame t at point-in-time t and an image frame t+1 at point-in-time t+1 are input to the vector detection unit 52.

In step S101, the initial vector detection unit 101 selects a block to be processed on the frame t as a block of interest. Note that on the frame the processing is executed from the upper left block in order of raster scanning.

In step S102, the initial vector selection unit 101 executes initial vector selection processing. In step S102, the initial vector selection unit 101 selects a motion vector with high reliability from the detection results of the past motion vectors for every predetermined block, and outputs the selected motion vector to the iterative gradient method computing unit 103 as an initial vector V0 serving as an initial vale employed for the gradient method.

That is to say, the initial vector selection unit 101 selects the motion vector of a peripheral block obtained in the past gradient method computing evaluation processing (later-described step S103) and stored in the detected-vector memory 53, and the shifted initial vector stored in the shifted initial vector memory 107 in the past shifted initial vector allocation processing (later-described step S104) as candidate vectors of the initial vector. Subsequently, the initial vector selection unit 101 causes the evaluation value computing unit 61B to obtain the evaluation value dfv of a candidate vector using the frame t and frame t+1, selects a motion vector with high reliability based on the evaluation dfv obtained by the evaluation value computing unit 61B from the candidate vectors, and outputs the selected candidate vector as the initial vector V0. Note that the details of the initial vector selection processing in step S102 will be described later with reference to FIG. 24.

In step S103, the iterative gradient method computing unit 103 and vector evaluation unit 104 execute iterative gradient method computing evaluation processing (also referred to as iterative gradient method computing processing). Specifically, in step S103, the iterative gradient method computing unit 103 repeatedly performs the computation of the gradient method based on the motion vector evaluation results by the vector evaluation unit 104 using the initial vector V0 input from the initial vector selection unit 101, and the frame t and frame t+1 input via the pre-filters 102-1 and 102-2, thereby computing a motion vector Vn. Also, the vector evaluation unit 104 causes the evaluation value computing unit 61B to obtain the motion vector Vn−1 from the iterative gradient method computing unit 103, and the evaluation value dfv of the motion vector Vn, selects a motion vector with the highest reliability based on the evaluation value dfv obtained by the evaluation value computing unit 61B, and stores this in the detected-vector memory 53 as a motion vector V. At this time, the vector evaluation unit 104 supplies not only the motion vector V but also the evaluation value dfv obtained as to the motion vector V thereof to the shifted initial vector allocation unit 105. Note that the details of the iterative gradient method computing processing in step S103 will be described later with reference to FIG. 32.

In step S104, the shifted initial vector allocation unit 105 executes shifted initial vector allocation processing. Upon the motion vector V and the evaluation value dfv thereof being input from the vector evaluation unit 104, in step S104 the shifted initial vector allocation unit 105 shifts a motion vector passing through the block of interest on the next frame to the block of interest thereof, and sets this as a shifted initial vector. That is to say, in other words, a motion vector having the same size and same direction as those of the motion vector V wherein the block of interest on the next frame of the same position as the terminal point block of the motion vector V is taken as a starting point, is set as a shifted initial vector. Subsequently, the shifted initial vector allocation unit 105 allocates the set shifted initial vector to the shifted initial vector memory 107 so as to be associated with the block of interest.

Specifically, the shifted initial vector allocation unit 105 stores the evaluation value dfv allocated as the shifted initial vector in the evaluation value memory 106 so as to be associated with the block of interest beforehand, compares this with the evaluation value dfv of another motion vector V passing through the same block of interest (i.e., the block of the past frame of the same position as the block of interest is taken as a terminal point), shifts the motion vector V which has been determined as being high in reliability based on the evaluation value dfv to the block thereof, sets this as a shifted initial vector, and allocates this to the shifted initial vector memory 107 so as to be associated with the sifted block. Note that the details of the configuration of the shifted initial vector allocation unit 105 will be described later with reference to FIG. 22.

In step S105, the initial vector selection unit 101 determines whether or not with the frame t the processing of all of the blocks has been completed. In the event that determination is made in step S105 that the processing of all of the blocks has not been completed, the processing returns to step S101, and the processing thereafter is repeated. Also, In the event that determination is made in step S105 that with the frame t the processing of all of the blocks has been completed, i.e., in the event that determination is made that the motion vector V having been detected with all of the blocks on the frame t, the motion vector detection processing is ended.

As described above, an initial vector is selected from the motion vectors detected in the past, motion vectors are repeatedly computed based on the selected initial vector using the computation of the iterative gradient method, and a motion vector with high reliability (i.e., most accurate vector) based on the evaluation value dfv is detected from the computed motion vectors. Consequently, the motion vector V corresponding to all of the blocks on the frame t is stored in the detected-vector memory 53.

Next, description will be made regarding the details of the configuration of the shifted initial vector allocation unit 105.

Figure 21:
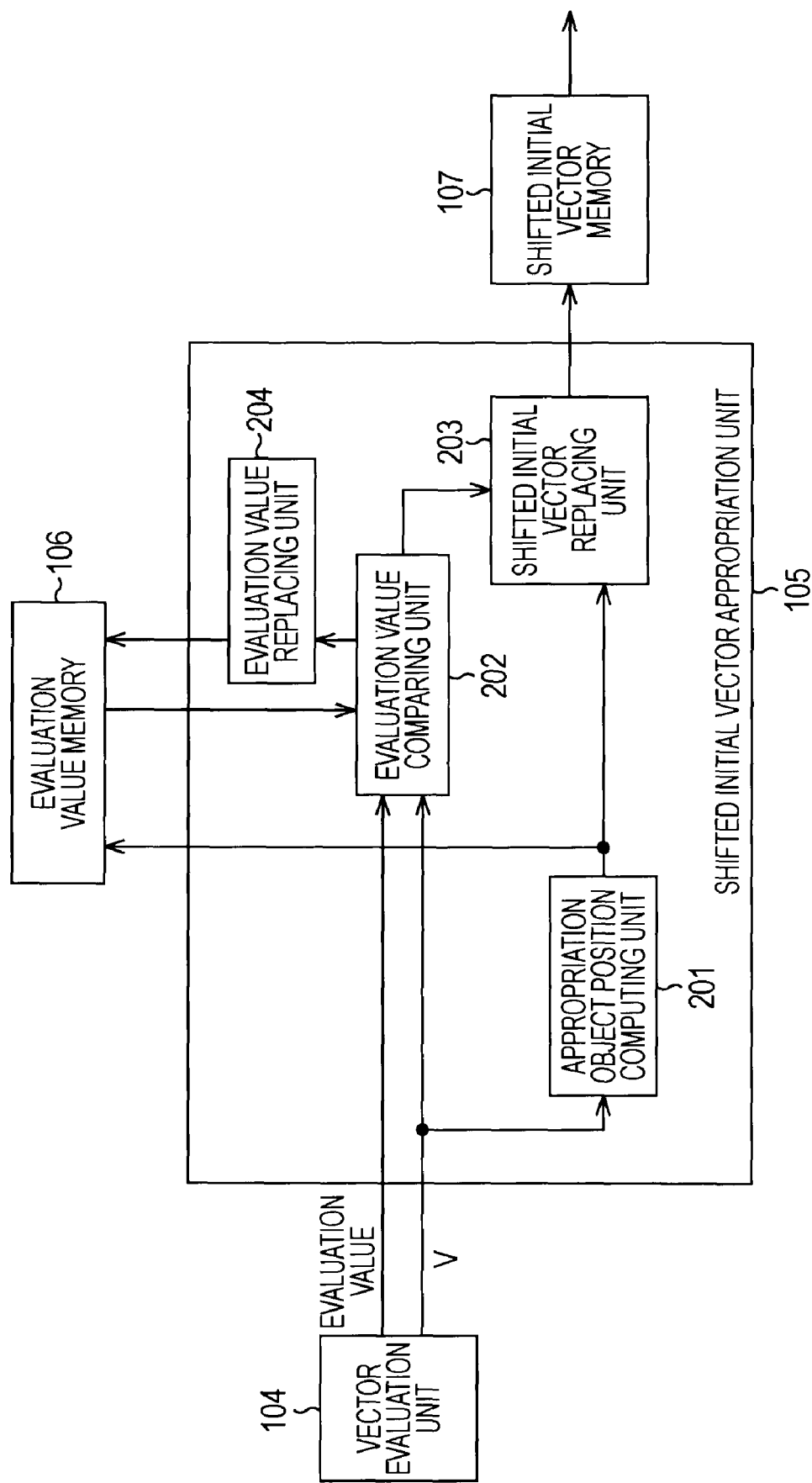
FIG. 21 is a block diagram illustrating the configuration of a shifted initial vector allocation unit shown in FIG. 17.

FIG. 21 is a block diagram illustrating the configuration of the shifted initial vector allocation unit 105. The shifted initial vector allocation unit 105 of which the configuration is shown in FIG. 21 sets a shifted initial vector serving as a candidate vector for the initial vector based on the motion vector V detected by the vector evaluation unit 104 with the previous (past) frame, and performs processing for allocating this to the shifted initial vector memory 107. The motion vector V detected by the vector evaluation unit 104, and the evaluation value dfv of the motion vector V thereof are input to the shifted initial vector allocation unit 105.

An allocation object position computing unit 201 computes the position of the block where the motion vector V detected by the vector variation unit 104 passes through on the frame at the next point-in-time (i.e., the same position of the block on the next frame as the position of the block of the terminal point of the motion vector V detected on the current frame), and supplies the computed block position to the evaluation value memory 106 and a shifted initial vector replacing unit 203.

Upon the motion vector V and the evaluation value dfv of the motion vector V thereof being input, an evaluation value comparing unit 202 reads out from the evaluation memory 106 the evaluation value dfv of the block position from the allocation object position computing unit 201. Subsequently, the evaluation value comparing unit 202 compares the evaluation value dfv read out from the evaluation value memory 106 and the evaluation value dfv of the motion vector V detected by the vector evaluation unit 104.

In the event of determining that the evaluation value dfv of the detected motion vector V is smaller (i.e., reliability is high), the evaluation value comparing unit 202 controls the shifted initial vector replacing unit 203 to rewrite the shifted initial vector at the block position supplied from the shifted initial vector allocation unit 105 using the motion vector V determined as being high in reliability based on the evaluation value dfv. Also, simultaneously therewith, the evaluation value comparing unit 202 controls an evaluation value replacing unit 204 to rewrite the evaluation value dfv at the block position selected by the allocation object position computing unit 201 using the evaluation value dfv of the motion vector V with the evaluation value memory 106.

The shifted initial vector replacing unit 203 rewrites the shifted initial vector at the block position supplied from the allocation object position computing unit 201 of the shifted initial vector memory 107 using the motion vector V supplied from the evaluation value comparing unit 202 (i.e., the motion vector having the same size and same direction as those of the motion vector V). The evaluation value replacing unit 204 rewrites the evaluation value dfv at the block position selected by the allocation object position computing unit 201 using the evaluation value dfv of the motion vector V under the control of the evaluation value comparing unit 202 at the evaluation value memory 106.

The evaluation value memory 106 stores the evaluation value dfv of the shifted initial candidate vector to be allocated to each block on the next frame for each block. The shifted initial vector memory 107 stores the motion vector with the smallest evaluation value dfv (i.e., most reliable motion vector) at each block on the next frame as a shifted initial vector so as to be associated with the block thereof.

Figure 22:
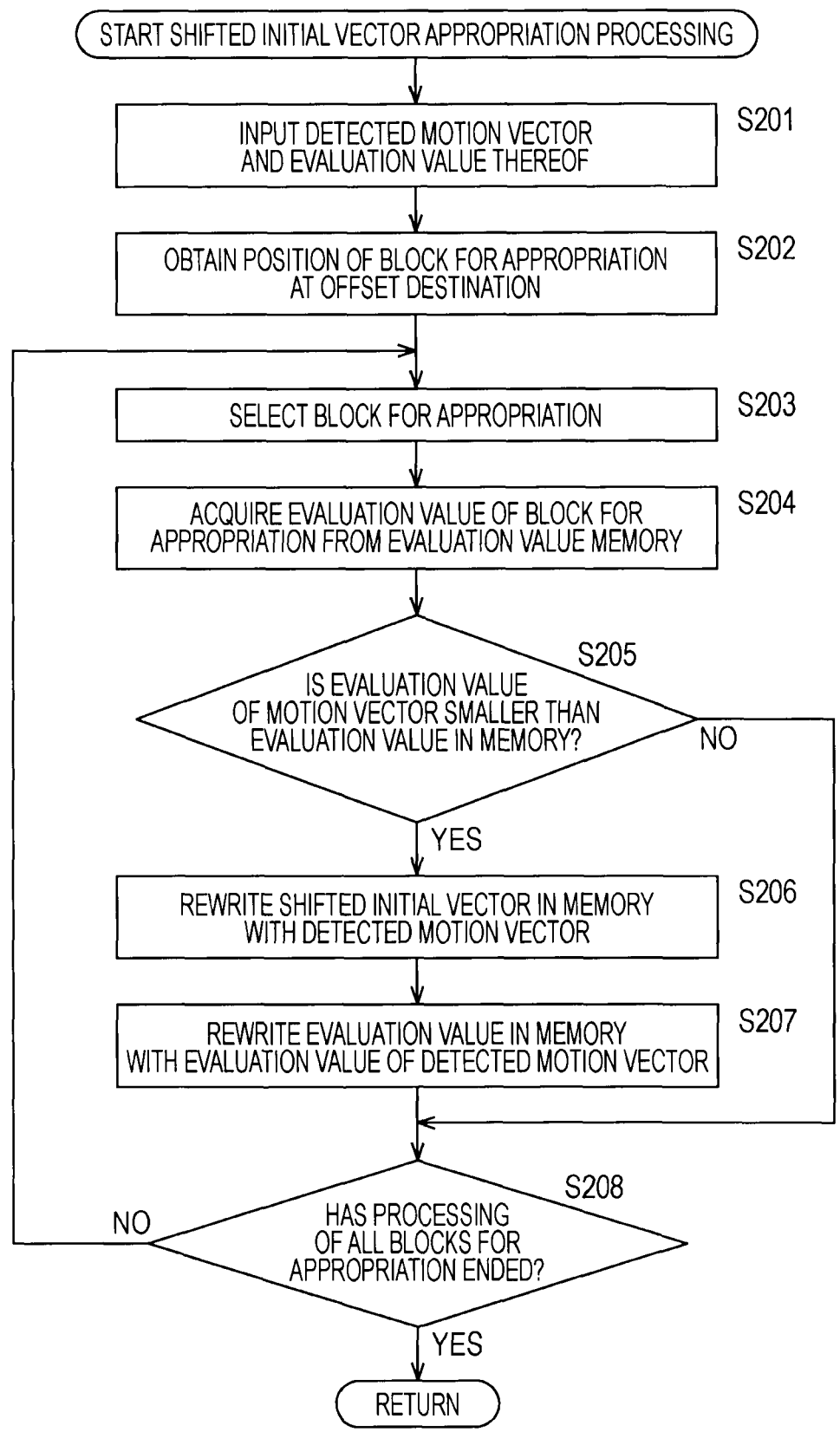
FIG. 22 is a flowchart for describing shifted initial vector allocation processing performed at step S104 in FIG. 20.

Next, description will be made regarding the details of the shifted initial vector allocation processing with reference to the flowchart in FIG. 22. Upon detecting the motion vector V of a block of interest on a frame t−1 at the previous stage, the vector evaluation value 104 supplies the detected motion vector V and the evaluation value dfv obtained as to the motion vector V thereof to the shifted initial vector allocation unit 105.

In step S201, the evaluation value comparing unit 202 inputs the motion vector V and the evaluation value dfv of the motion vector V thereof from the vector evaluation unit 104. Also, at this time, the allocation object position computing unit 201 also inputs the motion vector V. In step S202, the allocation object position computing unit 201 obtains the position of an allocation object block at the offset (motion compensation) destination on the frame t of the motion vector V. That is to say, the allocation object position computing unit 201 obtains the same position of the block on the frame t as the terminal point block of the motion vector V detected on the frame t−1.

In step S203, the allocation object position computing unit 201 selects, of the obtained allocation object blocks, one allocation object block, and supplies the position of the selected allocation object block to the evaluation value memory 106 and shifted initial vector replacing unit 203. Note that in step S203, of the allocation object blocks, selection is made from the upper left block in order on the frame t.

In step S204, the evaluation value comparing unit 202 acquires the evaluation value dfv of the allocation object block selected by the allocation object position computing unit 201 from the evaluation value memory 106, and in step S205 determines whether or not the evaluation value dfv of the motion vector V input in step S201 is smaller than the evaluation value dfv of the evaluation value memory 106 (i.e., the evaluation value dfv of the motion vector V is higher in reliability than the evaluation value dfv of the evaluation value memory 106). In the event that determination is made in step S205 that the evaluation value dfv of the motion vector V is smaller than the evaluation value dfv of the evaluation value memory 106, the processing proceeds to step S206.

In step S206, the evaluation value comparing unit 202 controls the shifted initial vector replacing unit 203 to rewrite the shifted initial vector of the allocation object block of the shifted initial vector memory 107 selected by the allocation object position computing unit 201 using the motion vector V (i.e., the motion vector having the same size and same direction as those of the motion vector V), and in step S207 controls the evaluation value replacing unit 204 to rewrite the evaluation value dfv of the allocation object block selected by the allocation object position computing unit 201 using the evaluation value dfv of the motion vector V.

Also, in the event that determination is made in step S205 that the evaluation value dfv of the motion vector V input in step S201 is not smaller than the evaluation value dfv stored in the evaluation value memory 106, the processing skips steps S206 and S207, and proceeds to step S208. That is to say, in this case, determination is made that the evaluation value dfv of the evaluation value memory 106 is higher in reliability than the evaluation value dfv of the motion vector V, so the values of the evaluation value memory 106 and shifted initial vector memory 107 are not rewritten.

In step S208, the allocation object position computing unit 201 determines whether or not the processing of all of the allocation object blocks of the motion vector V has been completed. In the event that determination is made in step S208 that the processing of all of the allocation object blocks of the motion vector V has not been completed, the processing returns to step S203, and the processing thereafter is repeated. Also, in the event that determination is made in step S208 that the processing of all of the allocation object blocks of the motion vector V has been completed, the shifted initial vector allocation processing is ended.

Note that with the initial processing, a shifted initial vector corresponding to the selected allocation object block has not been stored in the shifted initial vector memory 107. Accordingly, in the event that the evaluation value dfv of the shifted initial vector has not been stored in the corresponding allocation object block of the evaluation value memory 106, in step S204 the evaluation value dfv has not been acquired from the selected allocation object block, so let us say that in step S205 Yes is determined, and accordingly, the processing in steps S206 and S207 is executed.

As described above, an evaluation valued dfv is also employed in the case of allocating a shifted initial vector, so even in the event of an average brightness level changing between frames due to the movement of a light source, shadows traversing, or the like, the reliability of a vector can be correctly evaluated, and when detecting a motion vector using the computation of the gradient method, a more suitable initial vector candidate can be obtained.

Also, when obtaining a shifted initial vector, a block where a motion vector detected at the frame at the previous point-in-time passes through on the frame at the next point-in-time (i.e., the block on the frame t at the same position as the terminal point block of the motion vector V detected on the frame t−1) is obtained, the vector at the block of interest on the frame at the next point-in-time is allocated as a shifted initial vector, and further at that time, the evaluation value dfv to be computed at the time of obtaining the motion vector detected on the frame at the previous point-in-time is employed, so there is no need to obtain an evaluation value dfv again, and the computation quantity of the processing can be reduced as compared with the case of searching a motion vector passing through the block of interest from the motion vectors of all of the blocks on the frame at the previous point-in-time, whereby realization with hardware, which has been difficult to realize due to a huge computation amount, can be realized.

Next, description will be made regarding the details of the configuration of the initial vector selection unit 101.

Figure 23:
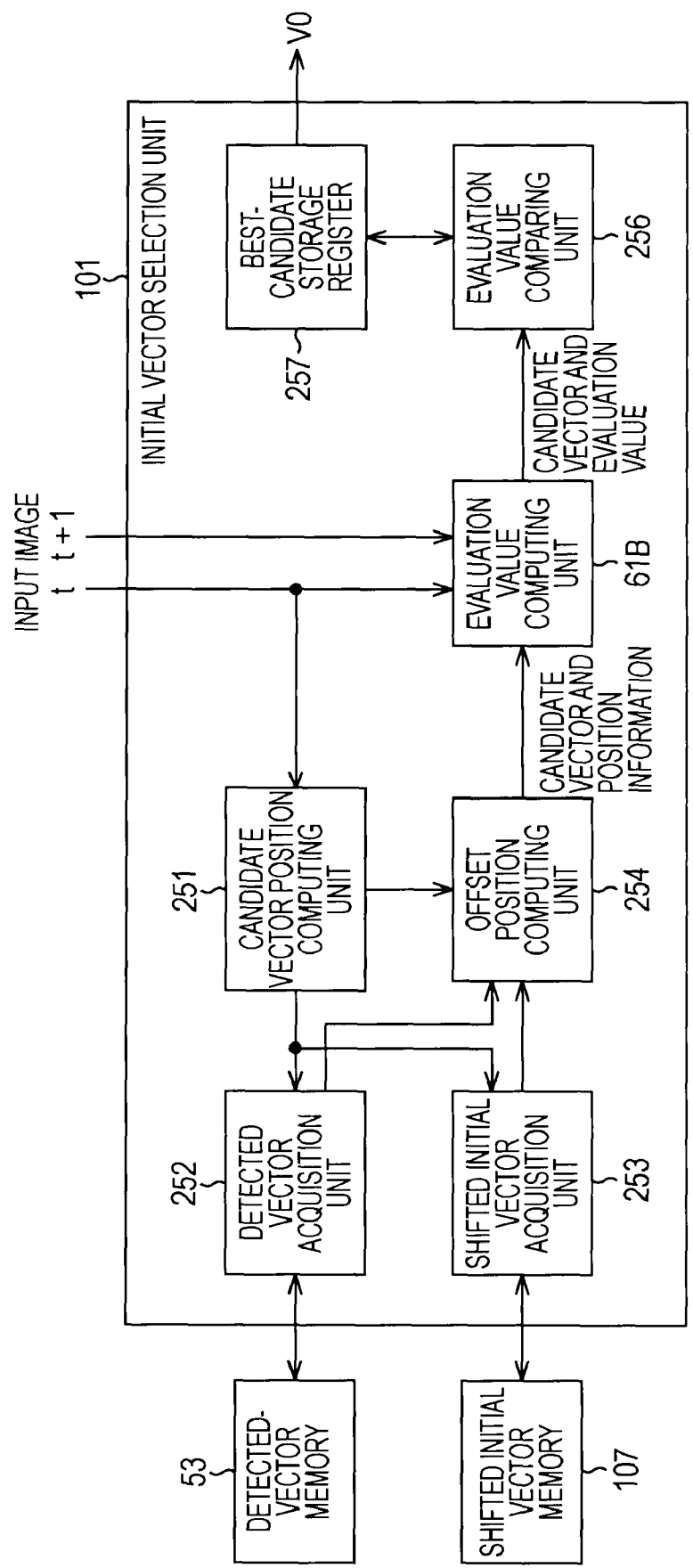
FIG. 23 is a block diagram illustrating the configuration of an initial vector selection unit shown in FIG. 17.

FIG. 23 is a block diagram illustrating the configuration of the initial vector selection unit 101. The initial vector selection unit 101 of which the configuration is shown in FIG. 23 performs processing for selecting a motion vector with high reliability as an initial vector from candidate vectors (hereafter, also referred to as initial candidate vectors) such as a motion vector detected on the previous (past) frame, and a shifted initial vector, and so forth. An image frame t at point-in-time t, and an image frame t+1 at point-in-time t+1 are input to the initial vector selection unit 101.

Upon the frame t being input, a candidate vector position computing unit 251 selects a block of interest to be processed on the frame t, obtains the position of a candidate block obtaining the initial candidate vector of the block of interest, and the type and priority order of a motion vector serving as an initial candidate vector from the peripheral region of the block of interest, and supplies the position information of a candidate block and the type information of an initial candidate vector to a detected vector acquisition unit 252 and a shifted initial vector acquisition unit 253 in order of the obtained priority order. Also, the candidate vector position computing unit 251 also supplies the position information of a candidate block to an offset position computing unit 254.

Note that with the signal processing device 1, the number of initial candidate vectors is set to a predetermined number based on the balance between the precision of an initial vector, and hardware capabilities beforehand, and further, the position of a candidate block, the type of initial candidate vector, and priority order are also set beforehand. Also, examples of the types of initial candidate vector include a shifted initial vector SV which is a motion vector wherein a motion vector passing through a predetermined block on the past frame is shifted to the predetermined block thereof (i.e., the motion vector with the same size and same direction as those of the motion vector V with the block on the next frame at the same position as the terminal point block of the a motion vector detected on the past frame), a motion vector detected on the past frame (hereafter, also referred to past vector PV), a motion vector detected at a block before the block of interest on the current frame (also referred to current vector CV), and 0 vector.

Accordingly, in the event that the predetermined type of initial candidate vector is the past vector or current vector, the candidate vector position computing unit 251 supplies the position information of a candidate block and the type information of an initial candidate vector to the detected vector acquisition unit 252, and in the event that the obtained type of initial candidate vector is a shifted initial vector, supplies the position information of a candidate block and the type information of an initial candidate vector to the shifted initial vector acquisition unit 253, and in the event that the obtained type of initial candidate vector is other than the above-mentioned types (e.g., in the event that the type of initial candidate vector is a 0 vector), sets a 0 vector, and supplies the 0 vector and the position information of a candidate block to the offset position computing unit 254.

The detected vector acquisition unit 252 acquires from the detected-vector memory 53 a motion vector corresponding to the position information of a candidate block and the type information of an initial candidate vector supplied from the candidate vector position computing unit 251, and outputs the obtained motion vector to the offset position computing unit 254 as an initial candidate vector.

The shifted initial vector acquisition unit 253 acquires from the shifted initial vector memory 107 a shifted initial vector corresponding to the position information of a candidate block, according to the position information of a candidate block and the type information of an initial candidate vector supplied from the candidate vector position computing unit 251, and outputs this to the offset position computing unit 254 as an initial candidate vector. Also, in the event that a shifted initial vector has not been allocated to the block position specified by the candidate vector position computing unit 251, the shifted initial vector acquisition unit 253 outputs a 0 vector to the offset position computing unit 254. Note that in the event that a shifted initial vector has not been allocated, a 0 vector may be stored in the shifted initial vector memory 107 beforehand.

Upon an initial candidate vector being input from the detected vector acquisition unit 252 or shifted initial vector acquisition unit 253 (or a 0 vector being input from the candidate vector position computing unit 251), the offset position computing unit 254 computes the block position of an offset destination wherein the block of interest of the frame t is offset (moved and compensated) to the frame t+1 as to each initial candidate vector, based on the position information of a candidate block supplied from the candidate vector position computing unit 251. Subsequently, the offset position computing unit 254 outputs the initial candidate vector, the position information of the candidate block, and the information of the offset destination block position to the above-mentioned evaluation value computing unit 61B with reference to FIG. 14.

Upon the initial candidate vector, the position information of the candidate block, and the information of the offset destination block position being input from the offset position computing unit 254, the evaluation value computing unit 61B obtains the evaluation value dfv of the initial candidate vector using the frame t and frame t+1. Subsequently, the evaluation value computing unit 61B outputs the initial candidate vector, and the obtained evaluation value dfv to the evaluation value computing unit 256.

The evaluation value comparing unit 256 compares the evaluation value dfv input by the evaluation value computing unit 61B, and the evaluation value dfv of the best candidate vector stored in a best-candidate storage register 257, and in the event that the evaluation value dfv input by the evaluation value computing unit 61B is smaller than the evaluation value dfv of the best candidate vector, i.e., the initial candidate vector is higher in reliability than the best candidate vector, the best candidate vector and the evaluation value dfv thereof of the best-candidate storage register 257 are replaced with the initial candidate vector which has been determined as being high in reliability, and the evaluation value dfv thereof. Finally, the evaluation value comparing unit 256 controls the best-candidate storage register 257 to output the best candidate vector, which has been determined as being the highest in reliability based on the evaluation value dfv from all of the candidate vectors, to the iterative gradient method computing unit 103 as an initial vector V0.

With the best-candidate storage register 257, the initial candidate vector of which the evaluation value dfv has been determined as being smaller (reliability is high) by the evaluation value comparing unit 256 is stored as the best candidate vector along with the evaluation value dfv thereof. Subsequently, the best-candidate storage register 257 outputs the best candidate vector which has been stored finally to the iterative gradient method computing unit 103 as an initial vector V0 under the control of the evaluation value comparing unit 256.

Figure 24:
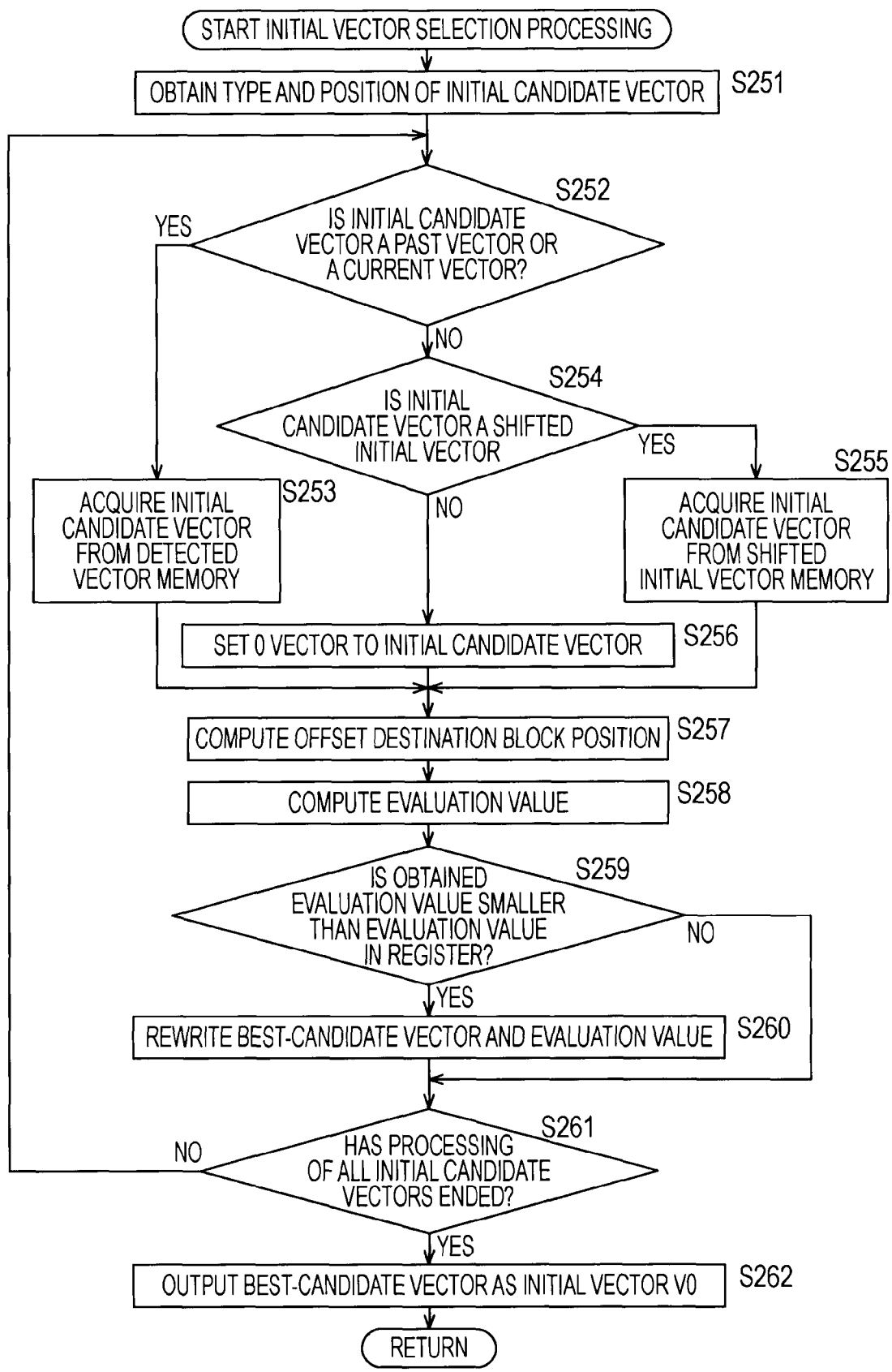
FIG. 24 is a flowchart for describing initial vector selection processing performed at step S102 in FIG. 20.

Next, description will be made regarding the details of the initial vector selection processing with reference to the flowchart in FIG. 24.

In step S251, the candidate vector position computing unit 251 obtains the position of a candidate block for obtaining an initial candidate vector of the block of interest which has been set beforehand, and the type and priority order of an initial candidate vector from the peripheral region of the selected block of interest, and in step S252 determines whether or not the type of initial candidate vector of a candidate block is the past vector or current vector in order of the obtained priority order. In the event that determination is made in step S252 that the type of initial candidate vector of a candidate block is the past vector or current vector, in step S253 the candidate vector position computing unit 251 supplies the position information of the candidate block and the type information of the initial candidate vector to the detected vector acquisition unit 252, causes the detected vector acquisition unit 252 to acquire a motion vector (past vector PV or current vector CV) corresponding to the position information of the candidate block, and the type information of the initial candidate vector from the detected-vector memory 53, and output the obtained motion vector to the offset position computing unit 254.

In the event that determination is made in step S252 that the type of initial candidate vector of a candidate block is not the past vector nor current vector, in step S254 the candidate vector position computing unit 251 determines whether or not the type of initial candidate vector of the candidate block is a shifted initial vector. In the event that determination is made in step S254 that the type of initial candidate vector of the candidate block is a shifted initial vector, in step S255 the candidate vector position computing unit 251 supplies the position information of the candidate block and the type information of the initial candidate vector to the shifted initial vector acquisition unit 253, causes the shifted initial vector acquisition unit 253 to acquire a shifted initial vector corresponding to the position information of the candidate block from the shifted initial vector memory 107, and output the obtained shifted initial vector to the offset position computing unit 254.

In the event that determination is made in step S254 that the type of initial candidate vector of the candidate block is not a shifted initial vector (i.e., in the event that determination is made that the type of initial candidate vector of the candidate block is a 0 vector), in step S256 the candidate vector position computing unit 251 sets a 0 vector to the initial candidate vector, and supplies the 0 vector and the position information of the candidate block to the offset position computing unit 254. Note that in steps S253 and S255 as well, the candidate vector position computing unit 251 supplies the position information of the candidate block to the offset position computing unit 254.

In step S257, upon inputting the initial candidate vector from the detected vector acquisition unit 252 or shifted initial vector acquisition unit 253, the offset position computing unit 254 computes the block position of an offset destination wherein the block of interest of the frame t is offset to the frame t+1 as to each initial candidate vector, based on the position information of the candidate block supplied from the candidate vector position computing unit 251. Subsequently, the offset position computing unit 254 outputs the initial candidate vector, the position information of the candidate block, and the information of the offset destination block position to the evaluation value computing unit 61B.

Upon inputting the initial candidate vector, the position information of the candidate block, and the information of the offset destination block position from the offset position computing unit 254, in step S258 the evaluation value computing unit 61B obtains the evaluation value dfv of the initial candidate vector using the frame t and frame t+1, and outputs the initial candidate vector and the obtained evaluation value dfv to the evaluation comparing unit 256.

In step S259, the evaluation value comparing unit 256 determines whether or not the evaluation value dfv obtained by the evaluation value computing unit 61B is smaller than the evaluation value dfv of the best candidate vector stored in the best-candidate storage register 257, and in the event that the evaluation value dfv obtained by the evaluation value computing unit 61B is smaller than the evaluation value dfv of the best candidate vector stored in the best-candidate storage register 257, i.e., the initial candidate vector is higher in reliability than the best candidate vector, in step S260 rewrites the best candidate vector of the best-candidate storage register 257 and the evaluation value dfv thereof using the initial candidate vector determined as being high in reliability and the evaluation value dfv thereof.

Also, in the event that the evaluation value dfv obtained by the evaluation value computing unit 61B is not smaller than the evaluation value dfv of the best candidate vector stored in the best-candidate storage register 257, the processing returns to step S252, and the processing thereafter is repeated.

In step S261, the candidate vector position computing unit 251 determines whether or not the processing of all of the initial candidate vectors (e.g., eight vectors) has been completed. In the event that determination is made in step S261 that the processing of all of the initial candidate vectors has not been completed, the processing returns to step S252, and the processing thereafter is repeated.

In the event that determination is made in step S261 that the processing of all of the initial candidate vectors has been completed, in step S262 the evaluation value comparing unit 256 controls the best-candidate storage register 257 to output the best candidate vector determined as being the highest in reliability based on the evaluation value dfv from all of the initial candidate vectors to the iterative gradient method computing unit 103. Thus, the initial vector selection processing is ended.

As described above, with the block of interest, the evaluation value dfv of multiple initial candidate vectors is obtained, and the initial candidate vector of which the evaluation value dfv is determined as being the smallest, i.e., reliability is determined as being the highest, is selected as an initial vector, whereby the initial vector most suitable for the detection of a motion vector at the subsequent stage can be provided, and consequently, the precision for the detection of a motion vector at the subsequent stage can be improved, even in the case of the average brightness level of a moving object changing greatly due to the movement of a light source or shadows traversing or the like.

Further, with between consecutive frames, the motion quantity of a moving object has a certain degree of consecutiveness, a shifted initial vector which is a motion vector passing through the block of interest from the previous frame is also obtained using an evaluation value dfv based on the change of the motion quantity being small, and sets this as a candidate of an initial vector, whereby motion detection with high precision can be performed as compared with a conventional case wherein with a peripheral block, only the motion vectors obtained in the past are taken as candidates of an initial vector. This is effective particularly at the boundaries of a moving object.

Next, description will be made regarding the details of the configurations of the iterative gradient method computing unit 103 and vector evaluation unit 104.

Figure 25:
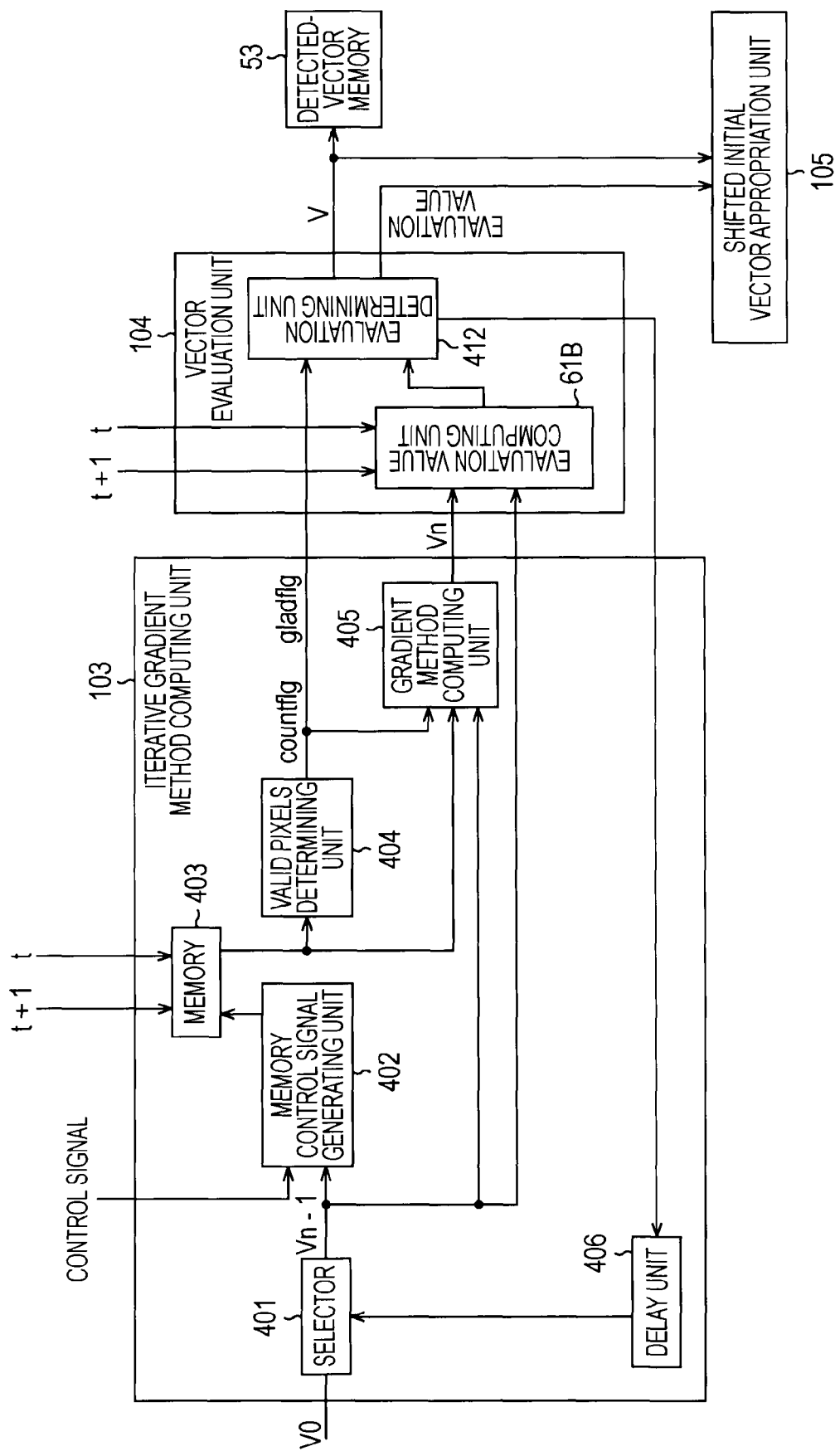
FIG. 25 is a block diagram illustrating the configuration of an iterative gradient method computing unit and vector evaluation unit shown in FIG. 17

FIG. 25 is a block diagram illustrating the configurations of the iterative gradient method computing unit 103 and vector evaluation unit 104. The iterative gradient method computing unit 103 and vector evaluation unit 104 of which the configurations are shown in FIG. 25 perform processing for detecting the best motion vector using an input image frame t at point-in-time t and image frame t+1 at point-in-time t+1.

This processing for detecting a motion vector is processing which is executed for every predetermined block made up of multiple pixels, and the iterative gradient method computing unit 103 and vector evaluation unit 104 repeatedly execute computation using the gradient method for every block, thereby outputting the best motion vector which is high in reliability based on an evaluation value dfv. That is to say, a motion vector is obtained for every detection object block serving as a detection object for the motion vector, but the computation of the gradient method when obtaining the motion vector of the detection object block thereof is executed with a computation block which is an object for the computation of the gradient method as an object.

The iterative gradient method computing unit 103 is configured of a selector 401, a memory control signal generating unit 402, memory 403, a valid pixels determining unit 404, a gradient method computing unit 405, and a delay unit 406.

The initial vector V0 from the initial vector selection unit 101 is input to the selector 401. The selector 401 selects the initial vector V0 from the initial vector selection unit 101 as a motion vector Vn−1 (hereafter, referred to as an offset vector) employed as the initial value of the computation of the gradient method, and outputs this to the memory control signal generating unit 402, gradient method computing unit 405, and vector evaluation unit 104.

Also, in the event that the motion vector V which is a result of the computation of the gradient method being executed by the gradient method computing unit 405 is input from the delay unit 406, the selector 401 selects the motion vector V computed by the gradient method computing unit 405 as the offset vector Vn−1, and outputs this to the memory control signal generating unit 402, gradient method computing unit 405, and vector evaluation unit 104.

A control signal for controlling the start timing of processing and position information is input to the memory control signal generating unit 402 from an unshown control unit of the signal processing unit 1. The memory control signal generating unit 402 causes the memory 403 to read out the pixel value of a pixel (brightness value) (hereafter, referred to an object pixel value) making up a computation block to be processed from the image frame t at point-in-time t and the image frame t+1 at point-in-time t+1 stored in the memory 403, and supply the read object pixel value to the valid pixels determining unit 404 and gradient method computing unit 405.

The image frame t at point-in-time t, and the image frame t+1 at point-in-time t+1 are input to the memory 403 via the pre-filters 102-1 and 102-2, and stored therein.

The valid pixels determining unit 404 computes, for example, the difference of the pixels of the computation blocks of the frame t and frame t+1 using the object pixel values supplied from the memory 403, determines whether or not with the computation blocks, the number of pixels valid for the computation of the gradient method is greater than a predetermined threshold based on the difference of the pixels thereof, and supplies a counter flag (countflg) corresponding to the determination result thereof to the gradient method computing unit 405 and vector evaluation unit 104.

Also, the valid pixels determining unit 404 obtains the gradient state of each of the horizontal direction and the vertical direction (i.e., whether or not there is a gradient) regarding the pixel determined as a valid pixel in the computation blocks, determines whether or not the ratio of pixels having a gradient only either in the horizontal direction or in the vertical direction (hereafter, also referred to as single-sided gradation pixels) is great, and supplies a gradient flag (gladflg) according to the determination result thereof to the gradient method computing unit 405 and vector evaluation unit 104.

The gradient method computing unit 405 executes the computation of the gradient method using the object pixel values supplied from the memory 403 based on the values of the counter flag and gradient flag supplied from the valid pixels determining unit 404, computes the motion vector Vn using the offset vector Vn−1 from the selector 401, and outputs the computed motion vector Vn to the vector evaluation unit 104. Note that at this time, with the gradient method computing unit 405, the computation of the gradient method (expression) to be employed is switched to either gradient method computing processing employing the least square sum of the above-mentioned Expression (14) (hereafter, also referred to integrated gradient method computing processing) or simple gradient method computing processing of later-described Expression (23) (hereafter, independent gradient method computing processing), and executed.

The motion vector V, which is a result computed by the gradient method computing unit 405, and evaluated by the vector evaluation unit 104, is input to the delay unit 406 from the vector evaluation unit 104. The delay unit 406 holds the motion vector V input from the vector evaluation unit 104 until the next processing cycle of the valid pixels determining unit 404 and gradient method computing unit 405, and outputs the motion vector V to the selector 401 at the next processing cycle.

The vector evaluation unit 104 is configured of the evaluation value computing unit 61B described above with reference to FIG. 14, and an evaluation value determining unit 412.

The image frame t at point-in-time t, and the image frame t+1 at point-in-time t+1 are input to the evaluation value computing unit 61B via the pre-filters 102-1 and 102-2, and a control signal for controlling position information is input from the unshown control unit of the signal processing unit 1 thereto.

The evaluation value computing unit 61B obtains the evaluation values dfv of the motion vector Vn computed by the gradient method computing unit 405, the offset vector Vn−1 from the selector 401, and a 0 vector using the frame t, frame t+1, and position information under the control of the evaluation value determining unit 412. Subsequently, the evaluation value computing unit 61B outputs the respective vectors, and the obtained evaluation value dfv to the evaluation value determining unit 412.

The evaluation value determining unit 412 compares the evaluation values dfv computed by the evaluation value computing unit 61B based on the counter flag and gradient flag supplied from the valid pixels determining unit 404, whereby the evaluation value dfv with high reliability is selected, and the motion vector V is obtained.

Also, the evaluation value determining unit 412 determines whether to repeat the gradient method computing processing based on the counter flag and gradient flag supplied from the valid pixels determining unit 404, and in the event that determination is made to repeat the gradient method computing processing, outputs the obtained motion vector V to the delay unit 406. In the event of not repeating the gradient method computing processing, the evaluation value determining unit 412 stores the obtained motion vector V in the detected-vector memory 53. At this time, the evaluation value determining unit 412 supplies the motion vector V, and the evaluation value dfv obtained as to the motion vector V thereof to the shifted initial vector allocation unit 105.

Figure 26:
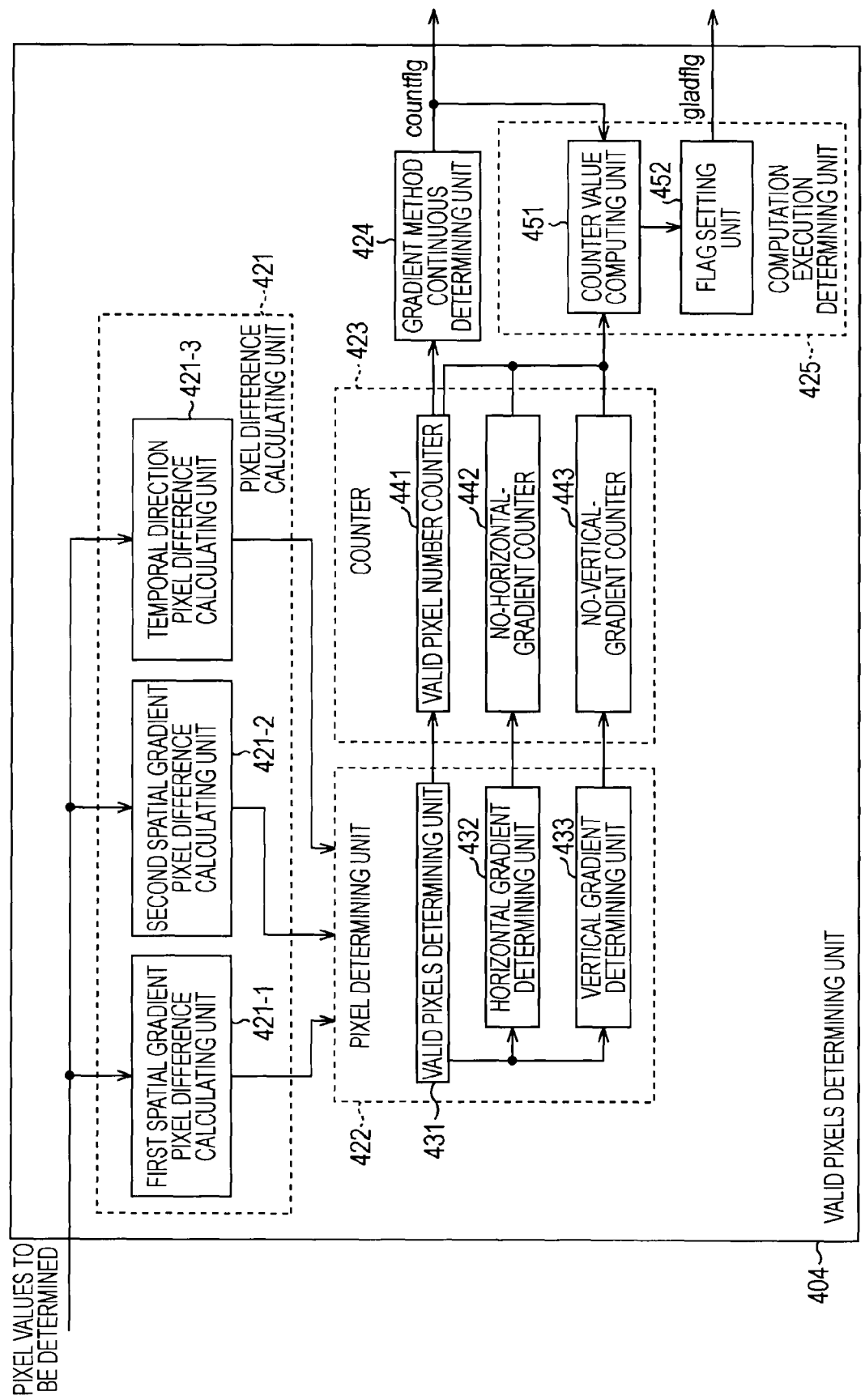
FIG. 26 is a block diagram illustrating the configuration of a valid pixels determining unit shown in FIG. 25.

FIG. 26 is a block diagram illustrating the detailed configuration of the valid pixels determining unit 404. With the example in FIG. 26, the valid pixels determining unit 404 is configured of a pixel difference calculating unit 421, a pixel determining unit 422, a counter 423, a gradient method continuous determining unit 424, and a computation execution determining unit 425.

The pixel difference calculating unit 421 is configured of a first spatial gradient pixel difference calculating unit 421-1, a second spatial gradient pixel difference calculating unit 421-2, and a temporal direction pixel difference calculating unit 421-3.

The first spatial gradient pixel difference calculating unit 421-1 calculates the pixel difference $\Delta x$ in the horizontal direction and the pixel difference $\Delta y$ in the vertical direction of a pixel within the computation block at the frame t+1 using the pixel values of the pixels within the computation block at the frame t+1, of the object pixel values supplied from the memory 403, and outputs the calculated pixel difference $\Delta x$ in the horizontal direction and the calculated pixel difference $\Delta y$ in the vertical direction of the pixel within the computation block at the frame t+1 to the pixel determining unit 422.

The second spatial gradient pixel difference calculating unit 421-2 calculates the pixel difference $\Delta x$ in the horizontal direction and the pixel difference $\Delta y$ in the vertical direction of a pixel within the computation block at the frame t using the pixel values of the pixels within the computation block at the frame t, of the object pixel values supplied from the memory 403, and outputs the calculated pixel difference $\Delta x$ in the horizontal direction and the calculated pixel difference $\Delta y$ in the vertical direction of the pixel within the computation block at the frame t to the pixel determining unit 422.

The temporal direction pixel difference calculating unit 421-3 calculates the pixel difference $\Delta t$ in the temporal direction of a pixel within the computation block at the frame t using the object pixel values supplied from the memory 403 (i.e., the pixel values of the pixels within the computation blocks of the frame t and frame t+1), and outputs the calculated pixel difference $\Delta t$ in the temporal direction of the pixel within the computation block at the frame t to the pixel determining unit 422.

The pixel determining unit 422 is configured of a valid pixels determining unit 431, a horizontal gradient determining unit 432, and a vertical gradient determining unit 433. The counter 423 is configured of a valid pixel number counter 441, a no-horizontal-gradient counter 442, and a no-vertical-gradient counter 443.

The valid pixels determining unit 431 performs predetermined logical operations using the pixel difference $\Delta x$ in the horizontal direction and the pixel difference $\Delta y$ in the vertical direction of a pixel within the computation block at the frame t+1 from the first spatial gradient pixel difference calculating unit 421-1, the pixel difference $\Delta x$ in the horizontal direction and the pixel difference $\Delta y$ in the vertical direction of a pixel within the computation block at the frame t from the second spatial gradient pixel difference calculating unit 421-2, and the pixel difference $\Delta t$ in the temporal direction of a pixel within the computation block between the frame t and frame t+1 from the temporal direction pixel difference calculating unit 421-3. Note that the details of the predetermined logical operations will be described later with reference to FIG. 29.

The valid pixels determining unit 431 determines based on the predetermined logical operations thereof whether or not a pixel within the computation block is valid for detection of a motion vector (i.e., the computation of the gradient method computing unit 405 at the subsequent stage), and in the event that determination is made that the pixel is valid for detection of a motion vector, increments the value of the valid pixel number counter 441 (the number of valid pixels) by one, and controls the horizontal gradient determining unit 432 and vertical gradient determining unit 433 to obtain the gradient state of each of the horizontal direction and vertical direction regarding the valid pixel determined as being valid for detection of a motion vector.

The horizontal gradient determining unit 432 obtains the gradient state of the horizontal direction of the valid pixel under the control of the valid pixels determining unit 431, determines whether or not there is a gradient in the horizontal direction of the valid pixel, and in the event that determination is made that there is no gradient of the horizontal direction of the valid pixel, increments the value of the no-horizontal-gradient counter 442 (the number of pixels having no horizontal gradient) by one.

The vertical gradient determining unit 433 obtains the gradient state of the vertical direction of the valid pixel under the control of the valid pixels determining unit 431, determines whether or not there is a gradient in the vertical direction of the valid pixel, and in the event that determination is made that there is no gradient of the vertical direction of the valid pixel, increments the no-vertical-gradient counter 443 (the number of pixels having no vertical gradient) by one.

The valid pixel number counter 441 stores the number of valid pixels determined as being valid for detection of a motion vector by the valid pixels determining unit 431 for each computation block. The no-horizontal-gradient counter 442 stores the number of valid pixels determined as having no gradient in the horizontal direction by the no-horizontal-gradient counter 442 for each computation block. The no-horizontal-gradient counter 443 stores the number of valid pixels determined as having no gradient in the vertical direction by the no-vertical-gradient counter 443 for each computation block.

The gradient method continuous determining unit 424 determines with reference to the valid pixel number counter 441 whether or not the number of pixels valid for the computation of the gradient method within the computation block is greater than a predetermined threshold α. In the event of determining that the number of pixels valid for the computation of the gradient method within the computation block is greater than a predetermined threshold α, the gradient method continuous determining unit 424 outputs the counter flag for executing the computation of the gradient method (countflg=1) to the computation execution determining unit 425, gradient method computing unit 405, and vector evaluation unit 104, and in the event of determining that the number of pixels valid for the computation of the gradient method within the computation block is smaller than a predetermined threshold α, outputs the counter flag for canceling the computation of the gradient method (countflg=0) to the computation execution determining unit 425, gradient method computing unit 405, and vector evaluation unit 104.

The computation execution determining unit 425 is configured of a counter value computing unit 451, and a flag setting unit 452.

When the value of the counter flag from the gradient method continuous determining unit 424 is 1, the counter value computing unit 451 acquires the number of valid pixels, the number of pixels having no gradient in the horizontal direction, and the number of pixels having no gradient in the vertical direction from the counter 423 (valid pixel number counter 441, no-horizontal-gradient counter 442, and no-horizontal-gradient counter 443), computes the ratio between the number of valid pixels within the computation block and pixels having a single-sided gradation of the valid pixels (i.e., pixels having a gradient either in the horizontal direction or in the vertical direction), and controls the value of the gradient flag (gladflg) set by the flag setting unit 452 according to the computation result.

The flag setting unit 452 sets the value of the gradient flag under the control of the counter value computing unit 451, and outputs the gradient flag to the gradient method computing unit 452 and evaluation value determining unit 412. Description will be made later regarding the value of the gradient flag with reference to FIG. 31.

Figure 27:
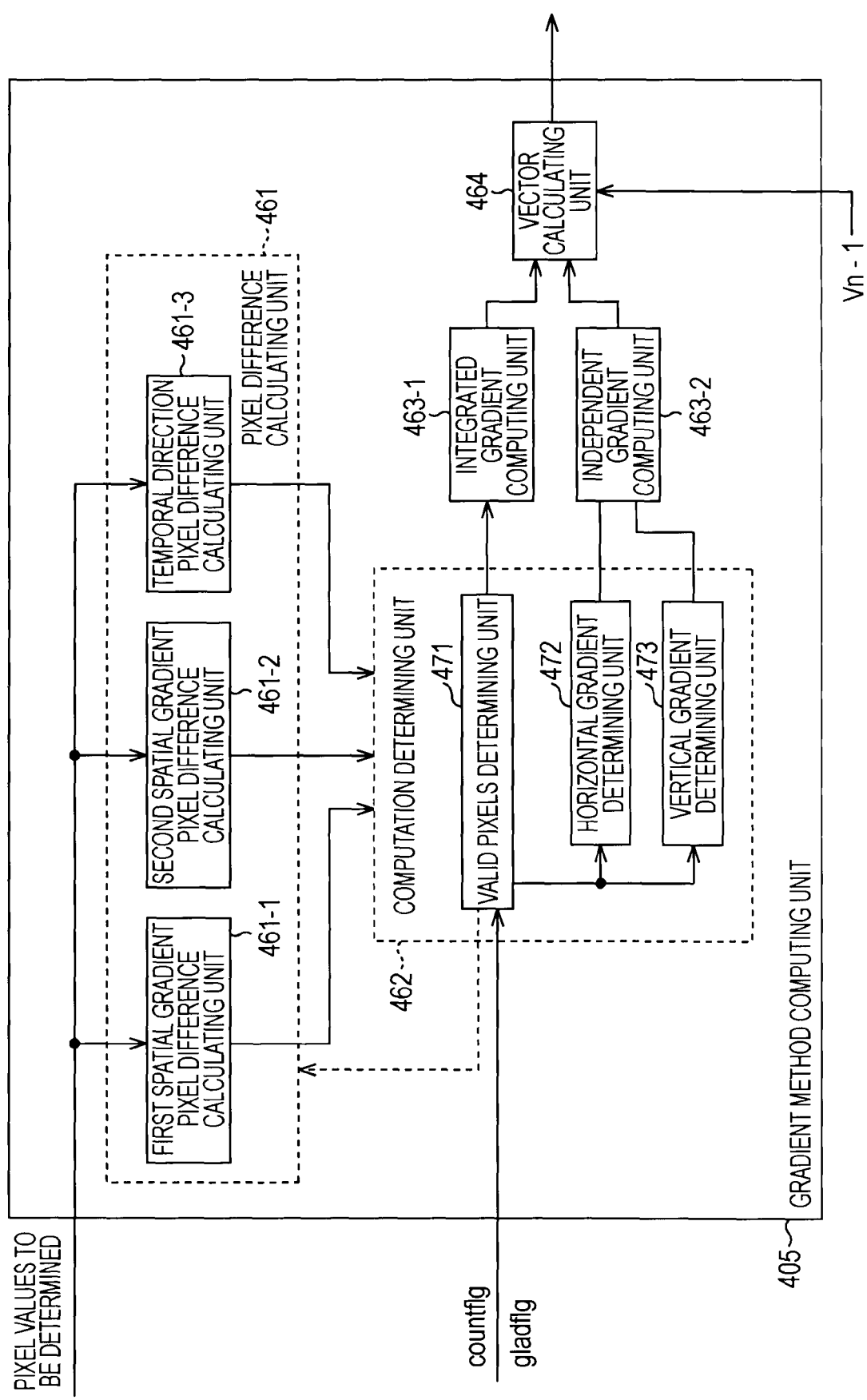
FIG. 27 is a block diagram illustrating the configuration of a gradient method computing unit shown in FIG. 25.

FIG. 27 is a block diagram illustrating the detailed configuration of the gradient method computing unit 405. With the example in FIG. 27, the gradient method computing unit 405 is configured of a pixel difference calculating unit 461, a computation determining unit 462, an integrated gradient computing unit 463-1, an independent gradient computing unit 463-2, and a vector calculating unit 464.

The pixel difference calculating unit 461 is configured of a first spatial gradient pixel difference calculating unit 461-1, a second spatial gradient pixel difference calculating unit 461-2, and a temporal direction pixel difference calculating unit 461-3, and calculates the difference between pixels to be processed under the control of the computation determining unit 462.

The first spatial gradient pixel difference calculating unit 461-1 has the same configuration as the first spatial gradient pixel difference calculating unit 421-1, and of the object pixel values supplied from the memory 403, calculates the pixel difference Δx in the horizontal direction and the pixel difference Δy in the vertical direction of a pixel within the computation block at the frame t+1 using the pixel values of the pixels within the computation block at the frame t+1, and outputs the calculated pixel difference Δx in the horizontal direction and the calculated pixel difference Δy in the vertical direction of a pixel within the computation block at the frame t+1 to the computation determining unit 462.

The second spatial gradient pixel difference calculating unit 461-2 has the same configuration as the second spatial gradient pixel difference calculating unit 421-2, and of the object pixel values supplied from the memory 403, calculates the pixel difference Δx in the horizontal direction and the pixel difference Δy in the vertical direction of a pixel within the computation block at the frame t using the pixel values of the pixels within the computation block at the frame t, and outputs the calculated pixel difference Δx in the horizontal direction and the calculated pixel difference Δy in the vertical direction of a pixel within the computation block at the frame t to the computation determining unit 462.

The temporal direction pixel difference calculating unit 461-3 has the same configuration as the temporal direction pixel difference calculating unit 421-3, calculates the pixel difference Δt in the temporal direction of a pixel within the computation block at the frame t using the object pixel values supplied from the memory 403 (i.e., the pixel values of the pixels within the computation blocks of the frame t and frame t+1), and outputs the calculated pixel difference Δt in the temporal direction of the pixel within the computation block at the frame t to the computation determining unit 462.

The computation determining unit 462 is configured of a valid pixels determining unit 471, a horizontal gradient determining unit 472, and a vertical gradient determining unit 473. The valid pixels determining unit 471 controls the execution/prohibition of execution of the gradient computing unit 405 based on the counter flag (countflg) supplied from the gradient method continuous determining unit 424.

Also, the valid pixels determining unit 471 controls the execution/prohibition of execution of pixel difference calculation processing of the first spatial gradient pixel difference calculating unit 461-1, second spatial gradient pixel difference calculating unit 461-2, and temporal direction pixel difference calculating unit 461-3, and determines whether gradient method computation processing is performed at either the integrated gradient computing unit 463-1 or independent gradient computing unit 463-2, based on the value of the gradient flag (gladflg) supplied from the computation execution determining unit 425.

In the event of determining that the gradient method computation processing is performed at the integrated gradient computing unit 463-1 based on the value of the gradient flag, the valid pixels determining unit 471 performs the same predetermined logical operations as the valid pixels determining unit 431 using the pixel difference $\Delta x$ in the horizontal direction and the pixel difference $\Delta y$ in the vertical direction of a pixel within the computation block at the frame t+1 from the first spatial gradient pixel difference calculating unit 461-1, the pixel difference $\Delta x$ in the horizontal direction and the pixel difference $\Delta y$ in the vertical direction of a pixel within the computation block at the frame t from the second spatial gradient pixel difference calculating unit 461-2, and the pixel difference $\Delta t$ in the temporal direction of a pixel within the computation block between the frame t+1 and frame t from the temporal direction pixel difference calculating unit 461-3, determines whether or not a pixel within the computation blocks is valid for the detection of a motion vector based on predetermined logical operations, and supplies the gradient (pixel difference) of the valid pixel determined as be valid for the detection of a motion vector to the integrated gradient computing unit 463-1, and causes the integrated gradient computing unit 463-1 to execute integrated gradient computing processing.

In the event of determining that the gradient method computation processing is performed at the independent gradient computing unit 463-2 based on the value of the gradient flag, the valid pixels determining unit 471 controls at least one of the horizontal gradient determining unit 472 and vertical gradient determining unit 473 to obtain the gradient state of each of the horizontal direction and the vertical direction regarding the valid pixel determined as a pixel within the computation block being valid for the detection of a motion vector based on predetermined logical operations.

Under the control of the valid pixels determining unit 471, the horizontal gradient determining unit 472 obtains the gradient state in the horizontal direction of the valid pixel, determines whether the valid pixel has a gradient in the horizontal direction, and of the valid pixels, supplies only the gradient of the pixel having a gradient in the horizontal direction (pixel difference) to the independent gradient computing unit 463-2, and causes the independent gradient computing unit 463-2 to execute independent gradient computing processing as to the horizontal direction.

Under the control of the valid pixels determining unit 471, the vertical gradient determining unit 473 obtains the gradient state in the vertical direction of the valid pixel, determines whether the valid pixel has a gradient in the vertical direction, and of the valid pixels, supplies only the gradient of the pixel having a gradient in the vertical direction (pixel difference) to the independent gradient computing unit 463-2, and causes the independent gradient computing unit 463-2 to execute independent gradient computing processing as to the vertical direction.

The integrated gradient computing unit 463-1 executes integrated gradient computing processing under the control of the valid pixels determining unit 471. That is to say, the integrated gradient computing unit 463-1 integrates the gradient of the valid pixel supplied by the valid pixels determining unit 471 (the pixel difference $\Delta t$ in the temporal direction, pixel difference $\Delta x$ in the horizontal direction, and pixel difference $\Delta y$ in the vertical direction), obtains a motion vector vn using the above-mentioned least square sum of Expression (14), and outputs the obtained motion vector vn to the vector calculating unit 464.

The independent gradient computing unit 463-2 executes independent gradient computing processing in the horizontal direction under the control of the horizontal gradient determining unit 472. That is to say, the independent gradient computing unit 463-2 integrates the gradient of a pixel having a gradient in the horizontal direction, of the valid pixel supplied by the horizontal gradient determining unit 472 (the pixel difference $\Delta t$ in the temporal direction, pixel difference $\Delta x$ in the horizontal direction, and pixel difference $\Delta y$ in the vertical direction), obtains the horizontal direction components of a motion vector vn using Expression (23) serving as a simple expression which will be describe later, instead of Expression (14), and outputs the obtained horizontal direction components of the motion vector vn to the vector calculating unit 464.

Also, the independent gradient computing unit 463-2 executes independent gradient computing processing in the horizontal direction under the control of the vertical gradient determining unit 473. That is to say, the independent gradient computing unit 463-2 integrates the gradient of the pixel value of a pixel having a gradient in the vertical direction, of the valid pixel supplied by the vertical gradient determining unit 473 (the pixel difference $\Delta t$ in the temporal direction, pixel difference $\Delta x$ in the horizontal direction, and pixel difference $\Delta y$ in the vertical direction), obtains the vertical direction components of a motion vector vn using Expression (23) serving as a simple expression which will be describe later, instead of Expression (14), and outputs the obtained vertical direction components of the motion vector vn to the vector calculating unit 464.

The vector calculating unit 464 adds the offset vector Vn−1 from the selector 401 to the motion vector vn from the integrated gradient computing unit 463-1, and the motion vector vn from the independent gradient computing unit 463-2 to calculate a motion vector Vn, and outputs the calculated motion vector Vn to the vector evaluation unit 104.

Figure 28:
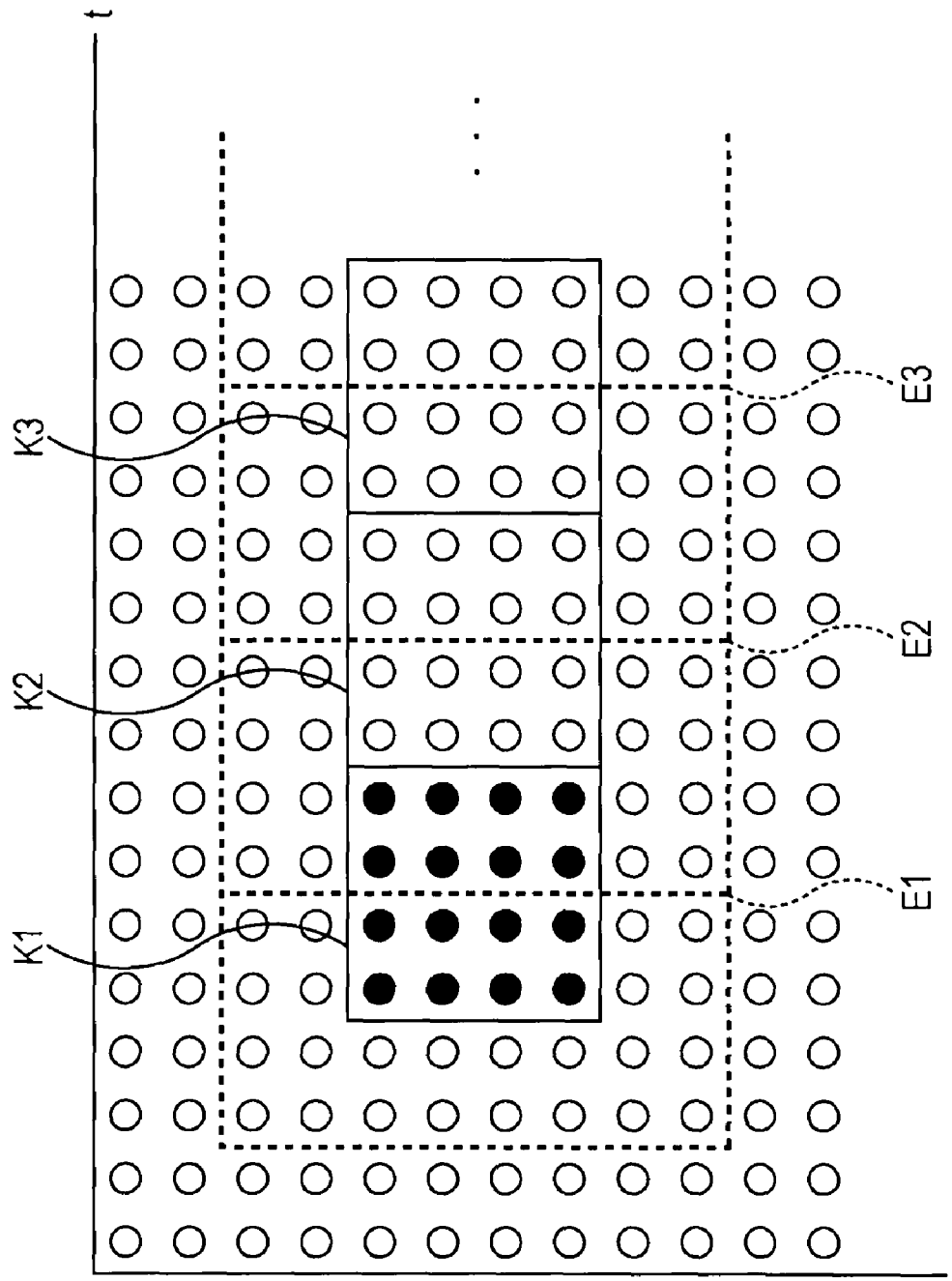
FIG. 28 is a diagram for describing motion vector detection blocks and computation blocks.

FIG. 28 illustrates another example of a detection object block serving as a motion vector detection object, and another example of a computation block serving as a gradient method computation object corresponding to the detection object block thereof. Note that with the example in FIG. 28, a frame t is shown, and circles on the frame t represent pixels.

In the case of the example in FIG. 28, detection object blocks K1 through K3 made up of 4 pixels×4 pixels, and computation blocks E1 through E3 each made up of 8 pixels×8 pixels with each of the detection object blocks K1 trough K3 as the center are illustrated on the frame t. Note that each of the computation blocks E1 through E3 is overlapped with the adjacent computation block by a half of pixels making up each computation block.

With the vector detection unit 52, the detection of a motion vector is executed in raster scanning order from the upper left detection object block on the frame. Accordingly, on the frame t, the detection object block K1, detection object block K2, and detection object block K3 become a motion vector detection object block in that order. In response to this, the computation block of the gradient method becomes the computation block E1, computation block E2, and computation block E3. That is to say, in the case of the detection object blocks and computation blocks of the example in FIG. 28, each of the computation blocks E1 through E3 is overlapped with the adjacent computation block by a half of pixels making up a computation block.

Note that description will be made below regarding the processing of the iterative gradient method computing unit 103 and vector evaluation unit 104 in FIG. 25 using the detection object blocks and computation blocks thus configured, the present invention is not restricted to the detection object blocks and computation blocks thus configured, so the detection object blocks are not restricted to four pixels, and for example, may be configured of one pixel, or may be configured of other multiple number of pixels. Also, with the example in FIG. 28, the number of pixels differs between the detection object blocks and computation blocks, but the detection object blocks and computation blocks may be configured of the same number of pixels. That is to say, the computation blocks may be configured so as to serve as the detection object blocks without any change.

Next, description of the valid pixel determining method of the valid pixels determining unit 404 will be described with reference to FIG. 29. In the example shown in FIG. 29, the arrow T indicates the direction of transition of time, from the frame t at the point-in-time t at the near left in the drawing to the frame t+1 at the point-in-time t+1 at the far right.

In the frame t, a detection block Kt (solid dots in the drawing) made of 4 pixels×4 pixels, from which a motion vector is to be detected, and a computation block Et, made of 8 pixels×8 pixels centered on the detection block Kt (surrounding the detection block), are shown. On the other hand, in the frame t+1, a detection block Kt+1 (solid dots in the drawing) made of 4 pixels×4 pixels corresponding to the detection block Kt, and a computation block Et+1 made of 8 pixels×8 pixels, corresponding to the computation block Et, are shown. Note that the block of dotted lines shown in the frame t+1 represents a block of the same phase as the detection block Kt, and the computation block Et-1 at a position shifted (moved) from the dotted line block by an amount equivalent to the initial vector to which the motion vector V(Vx, Vy) has been set on the frame t+1 is the object of gradient method computation.

Now, with the temporal-direction pixel difference (frame difference) between the pixel p1 in the computation block Et in the frame t and the pixel p2 at the same position in the computation block Et+1 in the frame t+1 as Δt, and the image box at this time as w, the horizontal-pixel difference Δx1, the vertical-direction pixel difference Δy1, and the temporal-direction pixel difference Δt, of the pixel p1 of the computation block Et, can be obtained by Expression (16) through Expression (18).

[Mathematical Expression 16]

$$\Delta x1 = Yt(k+1) - Yt(k) \tag{16}$$

[Mathematical Expression 17]

$$\Delta y1 = Yt(k+w) - Yt(k) \tag{17}$$

[Mathematical Expression 18]

$$\Delta t = Yt+1(k) - Yt(k) \tag{18}$$

Note that Yt+1 represents the pixel value at the point-in-time t+1, Yt represents the pixel value at the point-in-time t, and k+1 and k represent the address (position). Also, the horizontal-pixel difference Δx2 and the vertical-direction pixel difference Δy2 of the pixel p2 of the computation block Et+1 corresponding to the pixel p1 can be obtained in the same way.

The valid pixels determining unit 404 performs logical operations using these values, and performs valid pixel determination based on the results thereof. That is to say, the valid pixels determining unit 431 of the valid pixels determining unit 404 determines whether or not a pixel in the computation block Et is a valid pixel for motion vector detection, by obtaining whether or not one of the following three Conditional Expressions (19) through (21) are satisfied (that is to say, Expression (22) is satisfied).

[Mathematical Expression 19]

$$\Delta x1 \neq 0 \,\&\&\, \Delta x2 \neq 0 \,\&\&$$

$$|\Delta x1| > th1 \cdot |\Delta y1| \,\&\&\, |\Delta t/\Delta x1 - \Delta t/\Delta x2| < th2 \tag{19}$$

[Mathematical Expression 20]

$$\Delta y1 \neq 0 \,\&\&\, \Delta y2 \neq 0 \,\&\&$$

$$|\Delta y1| > th1 \cdot |\Delta x1| \,\&\&\, |\Delta t/\Delta y1 - \Delta t/\Delta y2| < th2 \tag{20}$$

[Mathematical Expression 21]

$$\Delta x1 \neq 0 \,\&\&\, \Delta x2 \neq 0 \,\&\&\, \Delta y1 \neq 0 \,\&\&\, \Delta y2 \neq 0 \,\&\&$$

$$|\Delta t/\Delta x1 - \Delta t/\Delta x2| < th2 \,\&\&$$

$$|\Delta t/\Delta y1 - \Delta t/\Delta y2| < th2 \tag{21}$$

$$\text{Expression (19)} \| \text{Expression (20)} \| \text{Expression (21)} \tag{22}$$

Here, || represents logical sum, && represents logical product, · represents multiplication, and th1 and th2 each represent predetermined threshold values. Note that th1 is, for example, 1, 1.5, or 2, and th2 is, for example, 4.

Accordingly, in Expression (19), Δx1≠0 && Δx2≠0 means that the horizontal gradient of pixel p1 and pixel p2 is not flat (there is gradient in the horizontal direction). |Δx1|>th1·|Δy1| means that the horizontal gradient is greater than the vertical gradient by a certain degree, and accordingly is more dominant. |Δt/Δx1−Δt/Δx2|<th2 means that the motion in the horizontal direction (when normalized) according to the gradient method is smaller than a predetermined threshold value th2, i.e., that there is similarity in motion in the horizontal direction. Accordingly, Expression (19) represents the conditions taking interest in the horizontal direction, and pixels satisfying all of these are determined to have similarity in motion in the horizontal direction, and are determined to be valid in the gradient method performed downstream.

Also, in Expression (20), Δy1≠0 && Δy2≠0 means that the vertical gradient is not flat (there is gradient in the vertical direction). |Δy1|>th1·|Δx1| means that the vertical gradient is greater than the horizontal gradient by a certain degree, and accordingly is more dominant. |Δt/Δy1−Δt/Δy2|<th2 means that there is similarity in the motion in the vertical direction (when normalized). Accordingly, Expression (20) represents the conditions taking interest in the vertical direction, and pixels satisfying all of these are determined to have similarity in motion in the vertical direction, and are determined to be valid in the gradient method performed downstream.

In the same way, in Expression (21), $\Delta x1 \neq 0$ && $\Delta x2 \neq 0$ && $\Delta y1 \neq 0$ && $\Delta y2 \neq 0$ means that the vertical and horizontal gradient is not flat (there is gradient in the vertical and horizontal directions). $|\Delta t/\Delta x1 - \Delta t/\Delta x2| < th2$ && $|\Delta t/\Delta y1 - \Delta t/\Delta y2| < th2$ means that the motion in the vertical direction and the horizontal direction (when normalized) according to the gradient method have similarity. Accordingly, Expression (21) represents the conditions taking interest in both the horizontal and vertical directions (hereafter also referred to as oblique direction or vertical and horizontal directions) for those which do not satisfy Expression (19) or Expression (20) (hereafter called horizontal/vertical interest conditions), and pixels satisfying all of these are determined to have similarity in motion in the horizontal and vertical directions, and are determined to be valid in the gradient method performed downstream.

Figure 29:
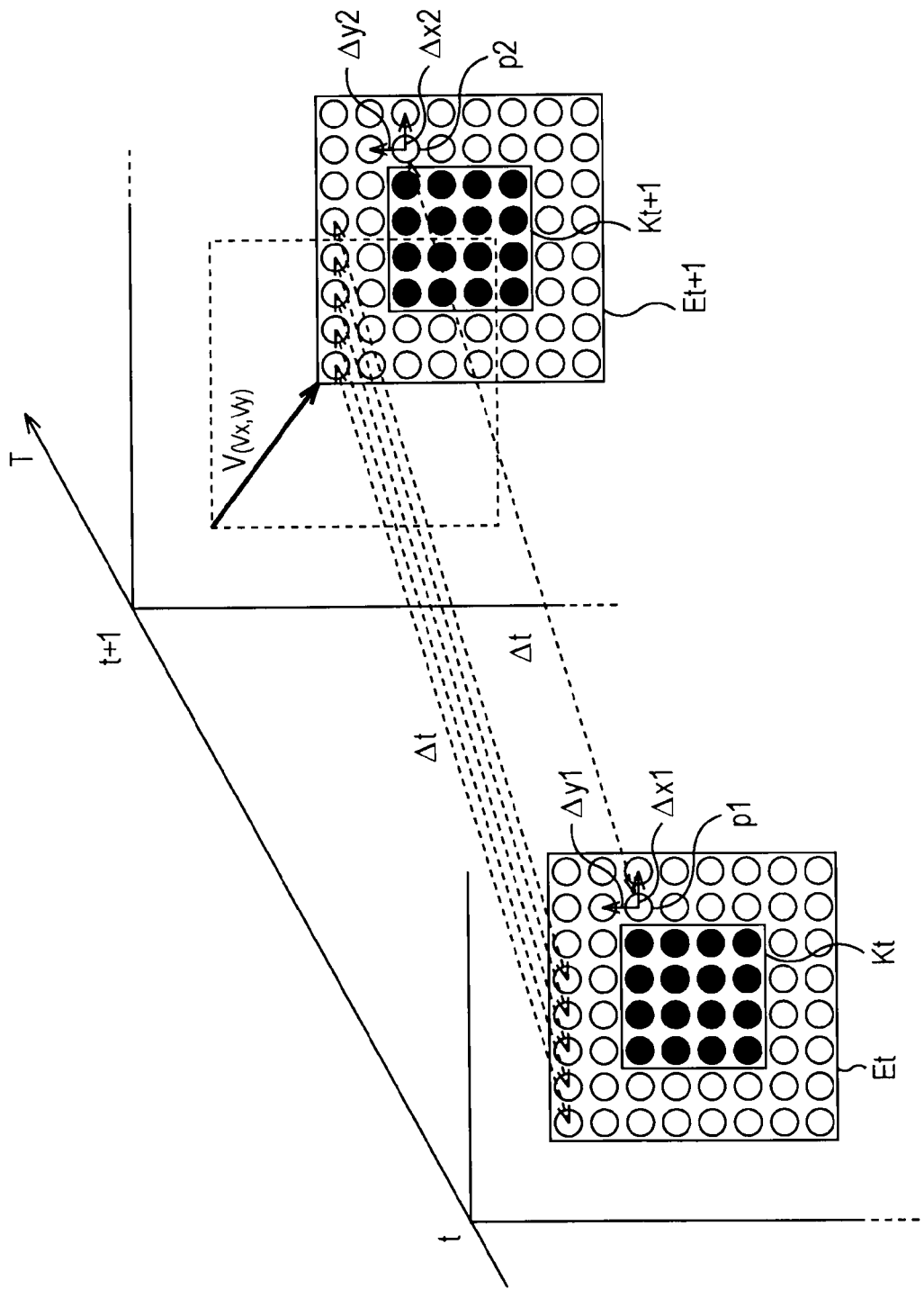
FIG. 29 is a diagram for describing the valid pixel determination method.

Note that the logical operations for determining valid pixels is not restricted to the example shown in FIG. 29 as long as pixel differences are used. Also, determining valid pixels is not restricted to determination based on the above-described pixel differences; for example, a pixel may be determined to be valid in the event that determination is made regarding whether or not the pixel difference (frame difference) $\Delta t$ in the temporal direction between the pixel p1 in computation block Et in frame t and pixel p2 at the same position in computation block Et+1 in frame t+1 is smaller than a predetermined value, and determination is made that this is smaller.

Figure 30:
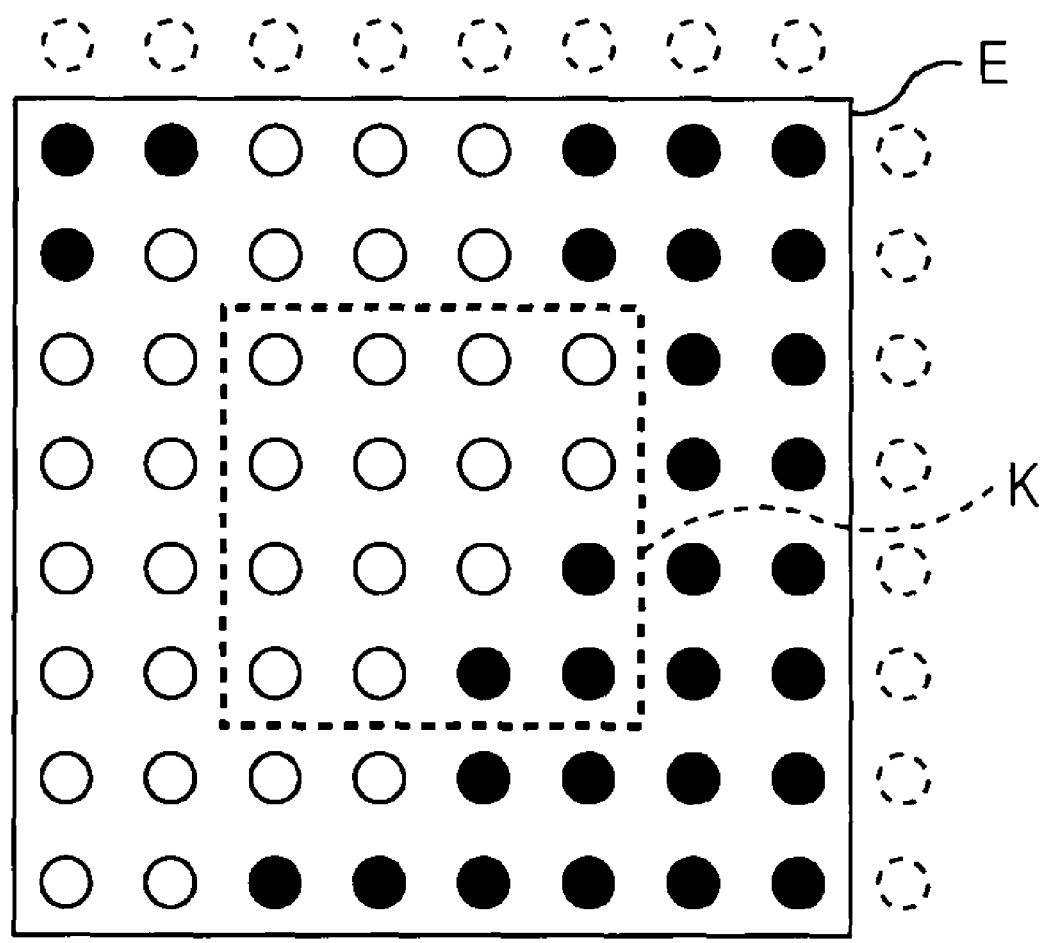
FIG. 30 is a diagram for describing the configuration of valid pixels in a computation block.

FIG. 30 illustrates a pixel configuration example in a computation block. In the example shown in FIG. 30, in a computation block E configured of 8 pixels×8 pixels (64 pixels) centered on a detection block K configured of 4 pixels×4 pixels, pixels which satisfy the above-described Expression (22) and have been determined to be valid pixels (white circles in the drawing), and pixels which do not satisfy the above-described Expression (22) and have not been taken as the object of gradient method computation (solid dots in the drawing) are shown.

Accordingly, the valid pixels determining unit 404 uses Expression (22) to determine whether each of the pixels in the computation block Et has similarity in movement in any of the horizontal direction, vertical direction, or oblique direction. The valid pixels determining unit 404 then determines whether or not the number of pixels having similarity in movement in any of the horizontal direction, vertical direction, or oblique direction, i.e., pixels determined to be valid pixels is 50% (greater than 32 pixels of the total 64 pixels), and in the event that the pixels determined to be valid pixels are 50% or less, determines that computation at the computation block is unstable and performs processing to quit computation, for example. Note that the threshold value for the valid pixel number counter has been described as 50%, but of course may be another value.

Accordingly, pixels which have little similarity and have different movement can be prevented from being mixed in, so stable gradient method computation can be performed. Consequently, the likelihood of the motion vector obtained by the gradient method computation improves, and precision of motion vector detection improves.

On the other hand, in the event that the pixels determined to be valid pixels is greater than 50%, the gradient method computing unit 405 further uses Expression (22) to determine whether each of the pixels in the computation block Et has similarity in movement in any of the horizontal direction, vertical direction, or oblique direction, and eliminates pixels determined to not have similarity in movement in any of the horizontal direction, vertical direction, or oblique direction, from the object of gradient method computation, thereby performing gradient method computation using only pixels in the computation block E which have been determined to be valid pixels (34 pixels).

Thus, gradient method computation is executed only with pixels having similarity in movement in any of the horizontal direction, vertical direction, or oblique direction, so different movement can be prevented from being mixed in, stable gradient method computation can be performed, and consequently, likely motion vectors can be detected.

Note that in the above-described valid pixel determination method, gradient method computation is performed without differentiating between normal regions where horizontal direction and vertical direction gradient exists (hereafter referred to as normal gradient regions) and regions where only horizontal direction or vertical direction gradient exists (hereafter referred to as one-sided gradient regions). Accordingly, there may be cases in actual practice wherein the detection precision of motion vectors in the one-sided gradient region in particular deteriorates markedly.

Figure 31:
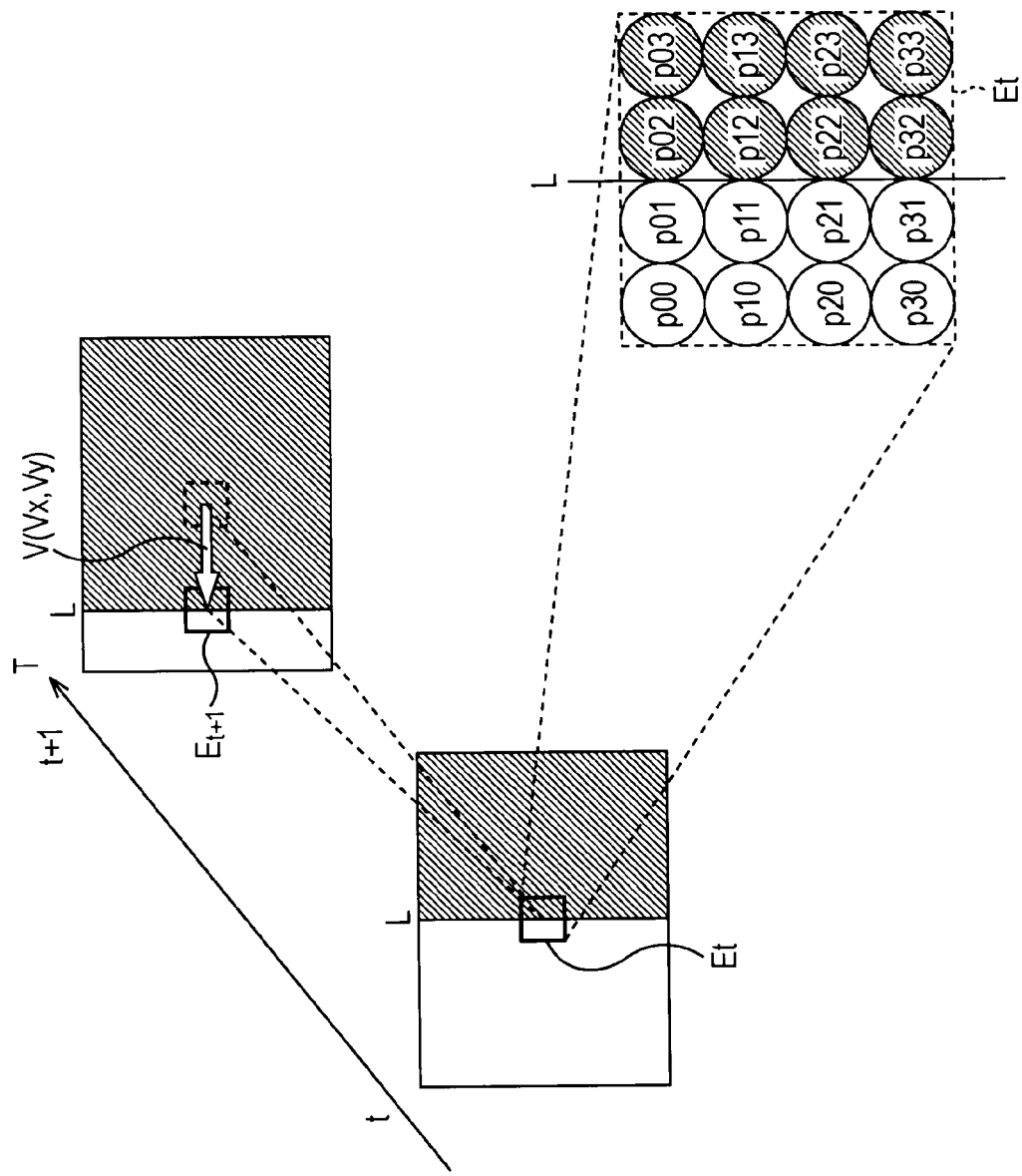
FIG. 31 is a diagram for describing a one-sided gradient region.

Next, one-sided gradient regions will be described with reference to FIG. 31. In the example shown in FIG. 31, the arrow T indicates the direction of transition of time, from the frame t at the point-in-time t at the near left in the drawing to the frame t+1 at the point-in-time t+1 at the far right.

The line L on the frame t and frame t+1 indicates the boundary between a region made up of pixels with a brightness value e (white region) and a region made up of pixels with a brightness value f which is different from the brightness value e (hatched region).

A computation block Et configured of 4 pixels×4 pixels which are the object of motion vector detection is shown on the line L of the frame t. Note that the block for detection is omitted from the example shown in FIG. 31. On the other hand, a computation block Et+1 configured of 4 pixels×4 pixels corresponding to the computation block Et is shown in the frame t+1. Also, the dotted line block in frame t+1 represents a block of the same phase as the computation block Et, with the motion vector V(Vx, Vy) detected by repeating gradient method computation from the dotted line block and finally using the computation block Et+1 as the object of gradient method computation.

In this frame t, as shown enlarged to the right, the two left rows of pixels of the computation block Et (pixel p00, pixel p10, pixel p20, and pixel p30, and pixel p01, pixel p11, pixel p21, and pixel p31) are all of the same brightness value e, and the two right rows of pixels of the computation block Et (pixel p02, pixel p12, pixel p22, and pixel p32, and pixel p03, pixel p13, pixel p23, and pixel p33) are all of the same brightness value f.

That is to say, in the computation block Et, there is no gradient between pixels within the same region, such as between pixel p01 and pixel p00, and between pixel p01 and pixel p11, or between pixel p02 and pixel p03, or between pixel p02 and pixel p12, but there is gradient between pixel p01 and pixel p02, between pixel p11 and pixel p12, between pixel p21 and pixel p22, and between pixel p31 and pixel p32.

That is to say, here is only horizontal-direction gradient within the computation block Et in frame t, but no vertical-direction gradient, so with the gradient method principle, horizontal-direction motion can be detected for the motion vector V in frame t+1, but not vertical-direction motion.

Now, with the one-sided gradient region computation block Et configured thus, in the event of applying only the above-described valid pixel determination method, pixels at the boundary portion (pixel p01, pixel p1, pixel p21, pixel p31, pixel p02, pixel p12, pixel p22, and pixel p32) are determined to be valid pixels by satisfying the Expression (19) taking interest in the horizontal direction as described above.

However, if gradient method computation is actually performed using Expression (14) in computation blocks which include a great number of pixels having gradient only in the horizontal direction, this may result in a vertical-direction motion vector which should not be detected (i.e., erroneous motion vector) being detected.

That is to say, even though there is a possibility that a motion vector detected using a block above or below the computation block Et+1 on the line L in the frame t+1 as the object of computation is an optimal motion vector, the motion vector V(Vx, Vy) may be evaluated and detected as the optimal motion vector by repeating gradient method computation from the dotted line block and finally using the computation block Et+1 as the object of gradient method computation in the frame t+1.

Accordingly, following valid pixel determining processing, the valid pixels determining unit 404 further performs gradient method execution determination based on the gradient state of the horizontal and vertical directions for each pixel, and based on the determination results thereof causes the gradient method computing unit 405 to switch to one or the other of the integrated gradient method computation using Expression (14) or independent gradient method computation using the following Expression (23) which is a simplification of Expression (14) so as to detect the motion vector.

[Mathematical Expression 22]

$$vx = -\frac{\sum \text{sign}(\Delta x)\Delta t}{\sum |\Delta x|} \quad (23)$$

$$vy = -\frac{\sum \text{sign}(\Delta y)\Delta t}{\sum |\Delta y|}$$

Independent gradient method computation using this Expression (23) is performed such that, in the event of obtaining the horizontal-direction component of the motion vector, the vertical gradient of pixels to be computed is not used, and in the event of obtaining the vertical-direction component of the motion vector, the horizontal gradient of pixels to be computed is not used. That is to say, motion can be detected using the gradient for each direction component, so likely motion vectors can be obtained in one-sided gradient regions having only horizontal gradient or vertical gradient, whereby the precision of detection of motion vectors can be improved.

Also, the computing load of this independent gradient method computation is smaller as compared with that of the integrated gradient method computation in Expression (14), facilitating hardware implementation.

Next, the gradient method execution determination performed following the valid pixel determination will be described.

The valid pixels determining unit 404 subjects pixels in the computation block which have been determined to be valid pixels by the above-described valid pixel determining processing further to determination of whether or not there is horizontal-direction gradient and whether or not there is vertical-direction gradient, obtains the number of valid pixels obtained by the valid pixel determining processing (cnt_t), the number of pixels with no gradient in the horizontal direction (ngcnt_x), and the number of pixels with no gradient in the vertical direction (ngcnt_y), and performs gradient method execution determining processing using the following Expression (24) through Expression (26) using these values.

[Mathematical Expression 23]

$$cnt\_t - ngcnt\_x - ngcnt\_y \geq pxl\_a \cdot th3 \quad (24)$$

[Mathematical Expression 24]

$$cnt\_t - ngcnt\_x \geq pxl\_a \cdot th3 \quad (25)$$

[Mathematical Expression 25]

$$cnt\_t - ngcnt\_y \geq pxl\_a \cdot th3 \quad (26)$$

Here, pxl_a represents the entire number of pixels in the computation block, · represents multiplication, and th3 represents a predetermined threshold value which is smaller than 1.

First, in the event that determination is made that the Expression (24) is satisfied, it can be conceived that the state is such that valid pixels having horizontal direction and vertical direction gradient (having normal gradient) suitably exist. Accordingly, the valid pixels determining unit 404 sets the gradient flag (gladflg=4), and causes the gradient method computing unit 405 to execute the integrated gradient method computation using Expression (14).

Correspondingly, in the event that the gradient flag (gladflg=4), the gradient method computing unit 405 executes integrated gradient method computation using the Expression (14) with the valid pixels as the object of gradient method computation.

Note that in the event that gradient flag (gladflg=4) the vector evaluation unit 104 compares the evaluation value dfv of the motion vector obtained as a result of the integrated gradient method computation with that of the offset vector, evaluates that which has been determined to have the smaller evaluation value dfv as being that with the higher reliability, and corrects (changes) the motion vector according to the evaluation results. Also, only in the event that the reliability of the motion vector obtained as a result of the integrated gradient method computation is high, and also determination is made that the number of times of iteration has not reached the maximum number of times, does the vector evaluation unit 104 determine to repeat iterative gradient method computation processing.

In the event that determination is made that Expression (24) is not satisfied but Expression (25) and Expression (26) are satisfied, it can be conceived that a considerable number of valid pixels having no gradient in either the horizontal direction or vertical direction exist. Accordingly, the valid pixels determining unit 404 sets the gradient flag (gladflg=0), causes the gradient method computing unit 405 to execute the independent gradient method computation using Expression (23) for each of the horizontal and vertical directions, and takes the computation results thereof. The gradient method computation for each direction component that is performed here only uses valid pixels having gradient in the corresponding direction.

Correspondingly, in the event that gradient flag (gladflg=0), the gradient method computing unit 405 executes horizontal-direction independent gradient method computation using Expression (23) with valid pixels having horizontal gradient as the object of the gradient method computation, and also executes vertical-direction independent gradient method computation using Expression (23) with valid pixels having vertical gradient as the object of the gradient method computation.

In the event that Expression (24) is not satisfied and only Expression (25) is satisfied, it can be conceived that a considerable number of valid pixels having no gradient in the vertical direction exist. Accordingly, the valid pixels determining unit 404 sets the gradient flag (gladflg=1), does not cause the gradient method computing unit 405 to execute computation regarding vertical direction motion but takes this as no motion (0 vector) and causes the gradient method computing unit 405 to execute the independent gradient method computation using Expression (23) for only the horizontal direction. The gradient method computation that is performed here only uses valid pixels having gradient in the horizontal direction.

Correspondingly, in the event that gradient flag (gladflg=1), the gradient method computing unit 405 executes horizontal-direction independent gradient method computation using Expression (23) with valid pixels having horizontal gradient as the object of the gradient method computation.

In the event that Expression (24) is not satisfied and only Expression (26) is satisfied, it can be conceived that a considerable number of valid pixels having no gradient in the horizontal direction exist. Accordingly, the valid pixels determining unit 404 sets the gradient flag (gladflg=2), does not cause the gradient method computing unit 405 to execute computation regarding horizontal direction motion but takes this as no motion (0 vector) and causes the gradient method computing unit 405 to execute the independent gradient method computation using Expression (23) for only the vertical direction. The gradient method computation that is performed here only uses valid pixels having gradient in the vertical direction.

Correspondingly, in the event that gradient flag (gladflg=2), the gradient method computing unit 405 executes vertical-direction independent gradient method computation using Expression (23) with valid pixels having vertical gradient as the object of the gradient method computation.

Note that in the event that gradient flag (gladflg=0, 1, or 2), the vector evaluation unit 104 compares the evaluation value dfv of the motion vector obtained as a result of the independent gradient method computation with that of the 0 vector, evaluates that which has been determined to have the smaller evaluation value dfv as being that with the higher reliability, and corrects (changes) the motion vector according to the evaluation results. Further, in this case, the vector evaluation unit 104 does not repeat iterative gradient method computation processing.

In the event that determination is made that Expression (24) through Expression (26) are not satisfied, it can be conceived that there are few pixels determined to be valid within the computation block, and that performing gradient method computation is difficult. Accordingly, the valid pixels determining unit 404 sets the gradient flag (gladflg=3), and does not cause the gradient method computing unit 405 to perform computation but sets this as no motion (0 vector).

Conversely, in the event that gradient flag (gladflg=0), the gradient method computing unit 405 does not execute gradient method computation, and the vector evaluation unit 104 does not compare the evaluation values dfv, and iterative gradient method computation processing is not repeated.

As described above, gradient method execution determining processing is performed using Expression (24) through Expression (26), and the gradient method computation is switched over according to the determination results thereof, so likely motion vectors can be detected even with one-sided gradient regions, and the detection precision of motion vectors can be improved. Also, with independent gradient method computation, motion vectors for that direction component are obtained using only valid pixels having gradient in the relevant direction, and motion vectors with direction components having pixels with no gradient are taken as 0 vectors, whereby likely motion vectors can be obtained.

Further, in accordance with the results of the gradient method execution determining processing, not only control of gradient method computation but also vector evaluation and changing of motion vectors corresponding to the evaluation, and iteration determination of gradient method computation is performed, so reduction of computing load, and further improvement of vector detection precision, are enabled.

Next, an example of iterative gradient method computation processing will be described with reference to the flowchart shown in FIG. 32. An initial vector V0 is input to the selector 401 in the preceding stage.

In step S301, the selector 401 selects the offset vector Vn−1 and outputs the selected offset vector Vn−1 to the memory control signal generating unit 402, gradient method computing unit 405, and evaluation value computing unit 61B.

In the event that the initial vector V0 is input from the initial vector selection unit 101, the selector 401 selects the input initial vector V0 as the selected offset vector Vn−1, and in the event that a motion vector V obtained as the result of being computed by the gradient method computing unit 405 and evaluated by the evaluation determining unit 412 is input from the delay unit 406, the selector 401 selects the motion vector V as the offset vector Vn−1.

The memory control signal generating unit 402 receives input of control signals for controlling the processing starting timing and position information from an unshown control unit of the signal processing device 1, and the offset vector from the selector 401. In step S302, the memory control signal generating unit 402 reads out values of pixels in the computation blocks to be processed, from the image frame t at point-in-time t and the image frame t+1 at point-in-time t+1 stored in the memory 403, in accordance with the control signals and the offset vector Vn−1 from the selector 401, and supplies the values of the pixels to be processed that have been read out to the valid pixels determining unit 404 and gradient method computing unit 405.

Upon receiving input of pixels to be processed that are supplied from the memory 403, the valid pixels determining unit 404 executes valid pixel determining processing in step S303. This valid pixel determining processing will be described later with reference to FIG. 33 in detail.

The pixel difference of the computation blocks in frame t and frame t+1 is calculated using the values of pixels to be processed that are supplied from the memory 403 in the valid pixel determining processing in step S303, whereby the number of valid pixels in the computation block that are valid for gradient method computation is counted by the valid pixel number counter 441. Also, the gradient state in the horizontal direction and vertical direction is obtained for valid pixels which have been determined to be valid pixels in the computation block, and the number of pixels having no horizontal gradient and the number of pixels having no vertical gradient are respectively counted in the no-horizontal-gradient counter 442 and no-vertical-gradient counter 443.

In step S304, the gradient method continuous determining unit 424 determines whether or not the value stored in the valid pixel number counter 441 (the number of valid pixels) is greater than a predetermined threshold value $\alpha$. In the event that determination is made in step S304 that the number of valid pixels is greater than a predetermined threshold value $\alpha$, the gradient method continuous determining unit 424 outputs a counter flag (countflg=1) for causing gradient method computation to the computation execution determining unit 425, gradient method computing unit 405, and vector evaluation unit 104, and the processing advances to step S305.

Upon the counter flag (countflg=1) being input from the gradient method continuous determining unit 424, the computation execution determining unit 425 executes the gradient method execution determining processing in step S305. This gradient method execution determining processing will be described later in detail with reference to FIG. 35.

With the gradient method execution determining processing of step S305, the number of valid pixels of the valid pixel number counter 441, the number of pixels with no horizontal gradient of the no-horizontal-gradient counter 442, and the number of pixels with no vertical gradient of the no-vertical-gradient counter 443, are referred to, determination is made regarding whether or not the number of valid pixels with one-sided gradient is great, and according to the determination results thereof, a gradient flag (gladflg) for switching the gradient method computing processing performed by the gradient method computing unit 405 to one of the integrated gradient method computation processing and independent gradient method computation processing is set, the set gradient flag is output to the gradient method computing unit 405 and the evaluation determining unit 412, and the processing advances to step S306.

On the other hand, upon a counter flag (countflg=1) being input from the gradient method continuous determining unit 424, and a gradient flag being input from the computation execution determining unit 425, the gradient method computing unit 405 executes gradient method computation processing in step S306. This gradient method computation will be described later in detail with reference to FIG. 36.

With the gradient method computation processing performed in step S306, in accordance with a gradient flag from the computation execution determining unit 425, at least one of integrated gradient method computing processing using valid pixels, and independent gradient method computing processing in the horizontal direction using valid pixels having gradient in the horizontal direction or independent gradient method computing processing in the vertical direction using valid pixels having gradient in the vertical direction, is executed, a motion vector Vn is obtained, the obtained motion vector Vn is output to the vector evaluation unit 104, and the processing advances to step S307.

In step S307, the vector evaluation unit 104 executes vector evaluation processing. This vector evaluation processing will be described later in detail with reference to FIG. 39.

With the vector evaluation processing in step S307, the motion vector Vn, offset vector Vn−1, and 0 vector evaluation values dfv are obtained from the gradient computing unit 405 according to the gradient flag, the evaluation values dfv of the motion vector Vn and offset vector Vn−1 or 0 vector are compared by the computation execution determining unit 425 according to the gradient flag, and a motion vector V is obtained according to the comparison results. For example, in the event that the evaluation values dfv of the motion vector Vn and offset vector Vn−1 are compared, and the reliability of the evaluation value of the motion vector Vn is deemed to be higher, the motion vector Vn is taken as the motion vector V, and the number of times of iteration for the gradient method computation is incremented by 1.

In step S308, the vector evaluation unit 104 determines whether or not to iterate the gradient method computation, based on the gradient flag from the computation execution determining unit 425 and the number of times of iteration of the gradient method computation.

That is to say, in the event that the gradient flag is a flag for executing integrated gradient method computing processing (i.e., gradient flag (gladflg=4), and the number of times of iteration of the gradient method computation has not reached the maximum number of iterations that has been set (e.g., twice), in step S308 the vector evaluation unit 104 determines to perform iteration of gradient method computation, and outputs the obtained motion vector V is output to the delay unit 406.

The delay unit 406 holds the motion vector V input from the vector evaluation unit 104 until the next processing cycle of the valid pixels determining unit 404 and the gradient method computing unit 405, and at the next processing cycle, outputs the motion vector V to the selector 401. Thus, the flow returns to step S301, and subsequent processing is repeated.

Also, in the event that the gradient flag is other than a flag for executing integrated gradient method computing processing, or the number of times of iteration of the gradient method computation has reached the maximum number of iterations that has been set (e.g., twice), in step S308 the vector evaluation unit 104 determines not to perform iteration of gradient method computation, i.e., to end the gradient method computation. In step S310, the vector evaluation unit 104 stores the obtained motion vector V in the detected-vector memory 53 corresponding to the block for detection, and ends the iterative gradient method computing processing. Note that at this time, the motion vector V and the evaluation value dfv thereof are output to the shifted initial vector allocation unit 105 as well.

On the other hand, in the event that determination is made in step S304 that the number of valid pixels is smaller than the predetermined threshold value α, the gradient method continuous determining unit 424 outputs a counter flag (countflg=0) for quitting gradient method computation to the computation execution determining unit 425, gradient method computing unit 405, and evaluation determining unit 412, and the flow advances to step S309.

In the event that the value of the counter flag from the gradient method continuous determining unit 424 is 0, the computation execution determining unit 425 and gradient method computing unit 405 do not execute the gradient method computation, the evaluation value determining unit 412 sets a 0 vector as the motion vector V in step S309 and stores the motion vector V in the detected-vector memory 53 corresponding to the block for detection in step S310. Note that at this time also, the motion vector V which is a 0 vector and the evaluation value dfv thereof are output to the shifted initial vector allocation unit 105 as well.

Thus, the iterative gradient method computing processing ends, shifted initial vector allocation processing is executed by the shifted initial vector allocation unit 105 using the motion vector V and the evaluation value dfv thereof, with the motion vector V stored in the detected-vector memory 53 being used by the vector allocating unit 54 downstream.

Thus, the arrangement has been made so as to perform not only valid pixel determination but also to determine whether or not there is gradient in each direction in the valid pixels, to switch the gradient method computation method according to the percentage of pixels in the valid pixels with single-sided gradation, and to take as the object of vector evaluation and perform determination of iteration of the gradient method and so forth, whereby a likely motion vector can be detected not only with normal gradient regions but also one-sided gradient regions, and also excessive computing load is alleviated.

Also, the arrangement has been made such that at the vector evaluation unit 104, the evaluation values dfv of the motion vector Vn, offset vector Vn−1, and 0 vector are obtained, and the motion vector with the smallest evaluation value dfv, i.e., with the highest reliability, is selected according to the percentage of pixels in the valid pixels with single-sided gradation, so even in cases wherein the average brightness level of an object having movement greatly changes due to moving of a light source or passage of shadows or the like, an optimal motion vector can be allocated in the latter vector allocation, and consequently, the precision of the latter vector allocation also can be improved.

Next, the valid pixel determining processing in step S303 of FIG. 32 will be described with reference to the flowchart in FIG. 33.

Upon inputting an object pixel value of the computation block supplied from the memory 403, the pixel difference calculating unit 421 of the valid pixels determining unit 404 controls the various units of the pixel determining unit 422 (valid pixels determining unit 431, horizontal gradient determining unit 432, and vertical gradient determining unit 433) and resets the values of the various counters (valid pixel number counter 441, no-horizontal-gradient counter 442, and no-vertical-gradient counter 443).

Figure 34:
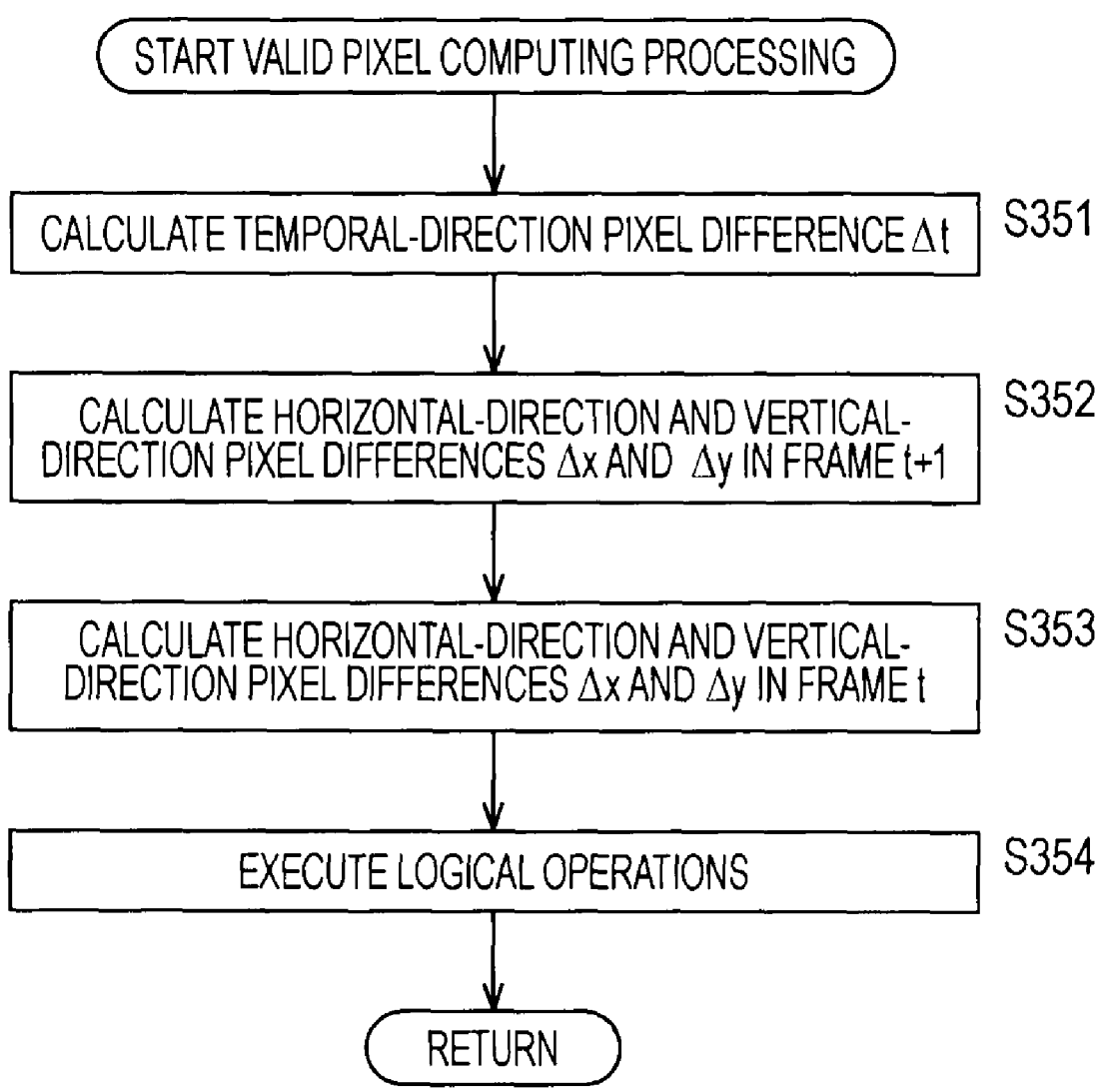
FIG. 34 is a flowchart for describing the valid pixel computing processing performed in step S323 in FIG. 33.

Each unit of the pixel difference calculating unit 421 (first spatial gradient pixel difference calculating unit 421-1, second spatial gradient pixel difference calculating unit 421-2, and temporal direction pixel difference calculating unit 421-3) selects one pixel from the computation block in step S322, and executes valid pixel computing processing in step S323. This valid pixel computing processing will be described with reference to the flowchart in FIG. 34.

The temporal direction pixel difference calculating unit 421-3 calculates the pixel difference Δt in the temporal direction between the frame t+1 and frame t of the selected pixel within the computation block, and outputs the calculated pixel difference Δt in the temporal direction between the frame t+1 and frame t to the pixel determining unit 422 in step S351.

The first spatial gradient pixel difference calculating unit 421-1 calculates the pixel difference Δx in the horizontal direction and the pixel difference Δy in the vertical direction on the frame t+1 of the selected pixel within the computation block, and outputs the calculated pixel difference Δx in the horizontal direction and pixel difference Δy in the vertical direction on the frame t+1 to the pixel determining unit 422 in step S352.

The second spatial gradient pixel difference calculating unit 421-2 calculates the pixel difference Δx in the horizontal direction and the pixel difference Δy in the vertical direction on the frame t of the selected pixel within the computation block, and outputs the calculated pixel difference Δx in the horizontal direction and pixel difference Δy in the vertical direction on the frame t to the pixel determining unit 422 in step S353.

In step S354, the valid pixels determining unit 431 of the pixel determining unit 422 employs the pixel difference Δx in the horizontal direction and the pixel difference Δy in the vertical direction on the frame t+1 of the pixel selected from the first spatial gradient pixel difference calculating unit 421-1, the pixel difference Δx in the horizontal direction and the pixel difference Δy in the vertical direction on the frame t of the pixel selected from the second spatial gradient pixel difference calculating unit 421-2, and the pixel difference Δt in the temporal direction between the frame t+1 and the frame t of the pixel selected from the temporal direction pixel difference calculating unit 421-3, to perform logical calculation of an Expression (19) which is a condition of interest of the horizontal direction, an Expression (20) which is a condition of interest of the vertical direction, and an Expression (21) which is a condition of interest in the horizontal and vertical directions. Following this, the flow is returned to step S323 in FIG. 33, and is advanced to step S324.

In step S324, the valid pixels determining unit 431 determines whether or not the selected pixel is an valid pixel or not, based on the logical sum of the above-described three expressions, (i.e. obtains Expression (22), and whether or not Expression (22) is true or not). Accordingly, in the case that one of the above-described Expression (19) through Expression (21) is satisfied, the valid pixels determining unit 431 determines in step S324 that the pixel thereof is an valid pixel, and in step S325 adds 1 to the number of valid pixels in the valid pixel number counter 441.

Under the control of the valid pixels determining unit 431, the horizontal gradient determining unit 432 obtains the status of gradient in the horizontal direction of the pixel determined to be an valid pixel by the valid pixels determining unit 431, and determines whether or not there is a gradient in the horizontal direction of the valid pixel in step S326, and in the case determination is made that there is no gradient in the horizontal direction of the valid pixel, 1 is added to the number of pixels having no horizontal gradient in the no-horizontal-gradient counter 442 in step S327. In the case that determination is made in step S326 that there is a gradient in the horizontal direction of the valid pixel, the processing skips step S327, and is advanced to step S328.

Under the control of the valid pixels determining unit 431, the vertical gradient determining unit 433 obtains the status of gradient in the vertical direction of the pixel determined to be an valid pixel by the valid pixels determining unit 431, and determines whether or not there is a gradient in the vertical direction of the valid pixel in step S328, and in the case determination is made that there is no gradient in the vertical direction of the valid pixel, 1 is added to the number of pixels having no vertical gradient in the no-vertical-gradient counter 443 in step S329. In the case that determination is made in step S328 that there is a gradient in the vertical direction of the valid pixel, the processing skips step S329, and is advanced to step S330.

In step S330, the pixel difference calculating unit 421 determines whether or not the processing of all pixels within the computation block has ended. In the case determination is made in step S330 that processing of all of the pixels within the computation block has ended, the valid pixel determining processing is ended, and the flow is returned to step S303 in FIG. 32 and is advanced to step S304.

In the case that determination is made step S324 that none of the above-described Expression (19) through Expression (21) have been satisfied and that the selected pixel is not an valid pixel, or in the case that determination is made in step S330 that processing for all of the pixels within the computation block has not ended, the flow is returned to step S322, and the processing thereafter is repeated.

Thus, the number of valid pixels determined to be valid within the computation block is stored in the valid pixel number counter 441, the number of pixels within the valid pixels determined to not have a horizontal gradient is stored in the no-horizontal-gradient counter 442, and the number of pixels within the valid pixels determined to not have a vertical gradient is stored in the no-vertical-gradient counter 443.

Figure 35:
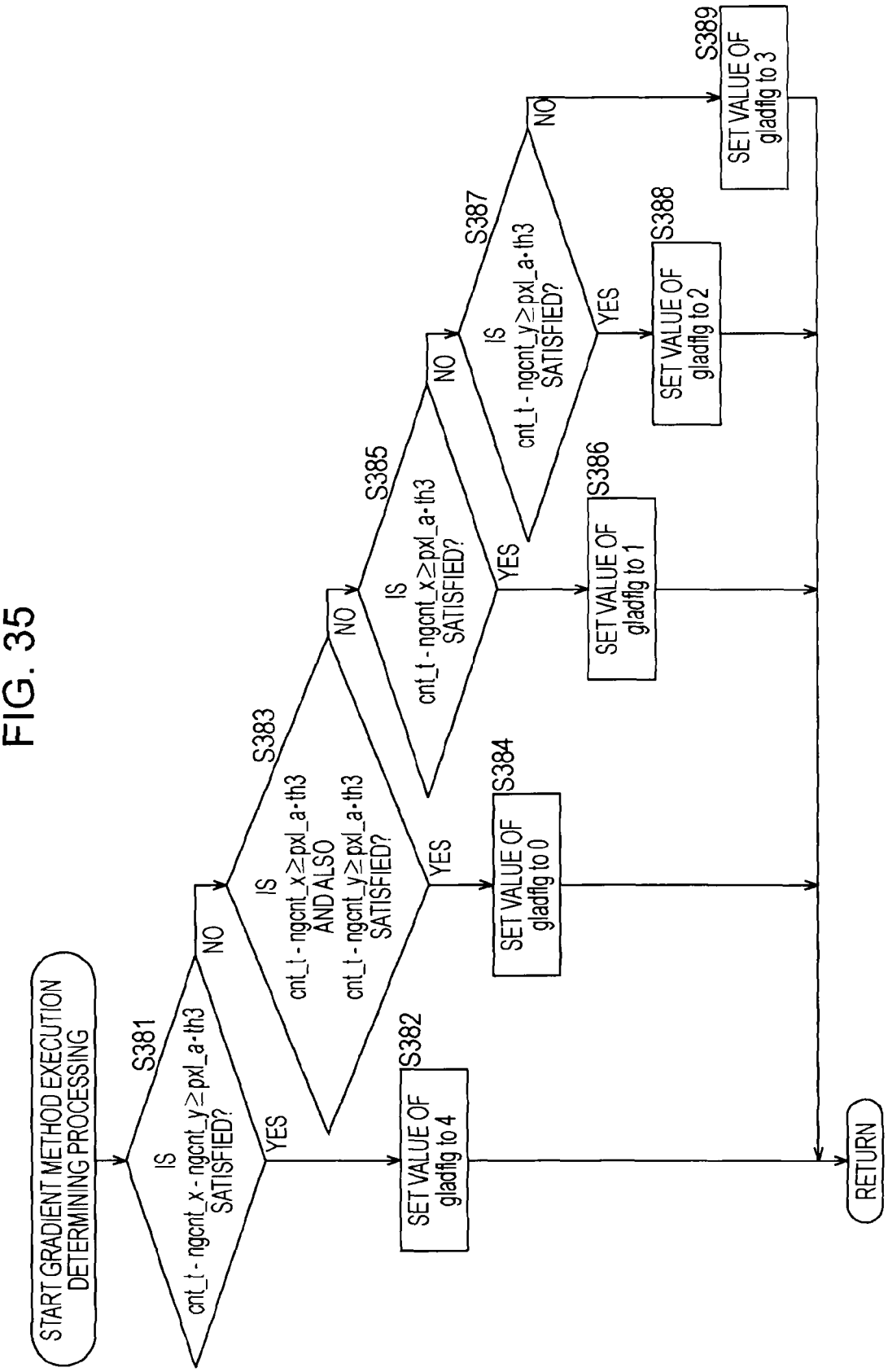
FIG. 35 is a flowchart for describing the gradient method execution determining processing performed in step S305 in FIG. 32.

Next, the gradient method execution determining processing in step S305 in FIG. 32 will be described in detail with reference to the flowchart in FIG. 35. The gradient method execution determining processing in FIG. 35 is processing which is executed by the computation execution determining unit 425, based on each counter wherein the numbers of pixels are stored as described above with reference to FIG. 34.

The counter value computing unit 451 of the computation execution determining unit 425 obtains the number of valid pixels (cnt_t) from the valid pixel number counter 441, the number of pixels with no gradient in the horizontal direction (ngcnt_x) from the no-horizontal-gradient counter 442, and the number of pixels with no gradient in the vertical direction (ngcnt_y) from the no-vertical-gradient counter 443, and determines in step S381 whether or not Expression (24) is satisfied.

In the case determination is made in step S381 that Expression (24) is satisfied, we can say that pixels having gradient in the horizontal direction and vertical direction exist adequately among the valid pixels. Accordingly, in step S382, the flag setting unit 452 sets the value of the gradient flag to "4" which performs integrated gradient method computing processing employing Expression (14), outputs the gradient flag (gladflg=4) to the gradient method computing unit 405 and the evaluation determining unit 412, and ends the gradient method execution determining processing. The flow is then returned to step S305 in FIG. 32, and is advanced to step S306, whereby gradient method computing processing according to the gradient flag (gladflg=4) is executed.

In the case determination is made in step S381 that Expression (24) is not satisfied, the counter value computing unit 451 determines in step S383 whether or not the Expression (25) and Expression (26) are satisfied. In the case determination is made in step S383 that Expression (25) and Expression (26) are satisfied, we can say that a considerable number of pixels without gradient in one of the horizontal direction or vertical direction are included among the valid pixels. Accordingly, in step S384, the flag setting unit 452 sets the gradient flag value to "0" which performs independent gradient method computing processing employing Expression (23) for each of the horizontal and vertical directions, outputs the gradient flag (gladflg=0) to the gradient method computing unit 405 and evaluation determining unit 412, and ends the gradient method execution determining processing. The flow is then returned to step S305 in FIG. 32, and is advanced to step S306, whereby gradient method computing processing according to the gradient flag (gladflg=0) is executed.

In the case determination is made in step S383 that Expression (25) and Expression (26) are not satisfied, the counter value computing unit 451 determines in step S385 whether or not Expression (25) is satisfied. In the case determination is made in step S385 that Expression (25) is satisfied, we can say that there is a large number of pixels with no gradient in the vertical direction among the valid pixels. Accordingly, in step S386 the flag setting unit 452 sets the gradient flag value to "1" which performs independent gradient method computing processing employing Expression (23) as to the horizontal direction, outputs the gradient flag (gladflg=1) to the gradient method computing unit 405 and evaluation determining unit 412, and ends the gradient method execution determining processing. The flow is then returned to step S305 in FIG. 32, and is advanced to step S306, whereby gradient method computing processing according to the gradient flag (gladflg=1) is executed.

In the case determination is made in step S385 that Expression (25) is not satisfied, the counter value computing unit 451 determines in step S387 whether or not Expression (26) is satisfied. In the case determination is made in step S387 that Expression (26) is satisfied, we can say that there is a large number of pixels with no gradient in the horizontal direction among the valid pixels. Accordingly, in step S388 the flag setting unit 452 sets the gradient flag value to "2" which performs independent gradient method computing processing employing Expression (23) as to the vertical direction, outputs the gradient flag (gladflg=2) to the gradient method computing unit 405 and evaluation determining unit 412, and ends the gradient method execution determining processing. The flow is then returned to step S305 in FIG. 32, and is advanced to step S306, whereby gradient method computing processing according to the gradient flag (gladflg=2) is executed.

In the event determination is made in step S387 that Expression (26) is not satisfied, we can say that there are few pixels determined to be valid. Accordingly, in step S389 the flag setting unit 452 sets the gradient flag value to "3" which inhibits gradient method computing processing, outputs the gradient flag (gladflg=3) to the gradient method computing unit 405 and evaluation determining unit 412, and ends the gradient method execution determining processing. The flow is then returned to step S305 in FIG. 32, and is advanced to step S306, whereby gradient method computing processing according to the gradient flag (gladflg=3) is executed.

Thus, the gradient flag in accordance with the gradient status of the computation block (i.e. number of valid pixels, number of pixels without horizontal gradient among the valid pixels, number of pixels without vertical gradient among the valid pixels) is output to the gradient method computing unit 405 and evaluation determining unit 412.

Next, the gradient method computing processing in step S306 in FIG. 32, which is executed by the gradient method computing unit 405, will be described in detail with reference to the flowchart in FIG. 36.

The counter flag (countflg=1) from the gradient method continuous determining unit 424 and the gradient flag from the flag setting unit 452 are input in the valid pixels determining unit 471 of the computation determining unit 462. In the case that the counter flag is 1, the valid pixels determining unit 471 starts the gradient method computing processing in FIG. 36.

The valid pixels determining unit 471 determines in step S401 whether or not the gradient flag value is 3, and if determination is made that the gradient flag value is not 3, determination is made in step S402 whether or not the gradient flag value is 4.

In the case that determination is made in step S402 that the gradient flag value is 4, the valid pixels determining unit 471 controls the various units of the gradient method computing unit 405 to execute integrated gradient method computing processing in step S403. The integrated gradient method computing processing will be described later with reference to the flowchart in FIG. 37.

With the integrated gradient method computing processing in step S403, the valid pixels become objects of gradient method computing, wherein the pixel difference Δx in the horizontal direction, the pixel difference Δy in the vertical direction, and the pixel difference Δt in the temporal direction of the valid pixels are integrated, and a motion vector vn is obtained by using the Sum of Least Squares of the Expression (14) and the integrated gradient and is output to the vector calculating unit 464.

In step S404, the vector calculating unit 464 adds the motion vector vn obtained with the integrated gradient computing unit 463-1 to the offset vector Vn−1 from the selector 401, and outputs the motion vector Vn wherein the motion vector vn has been added to the offset vector Vn−1 to the vector evaluation unit 104.

Figure 32:
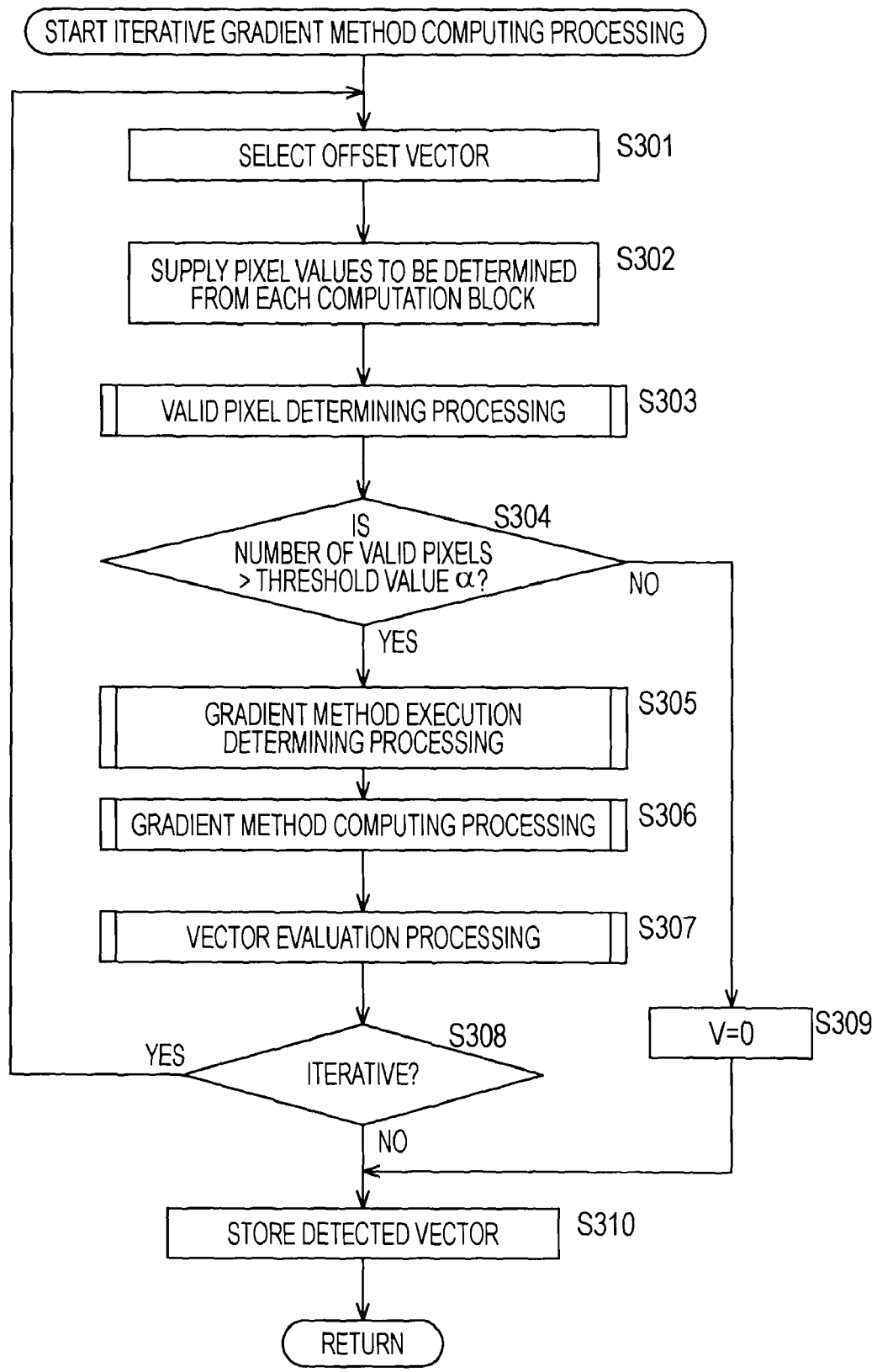
FIG. 32 is a flowchart for describing the iterative gradient computing processing performed in step S103 in FIG. 20.
Figure 33:
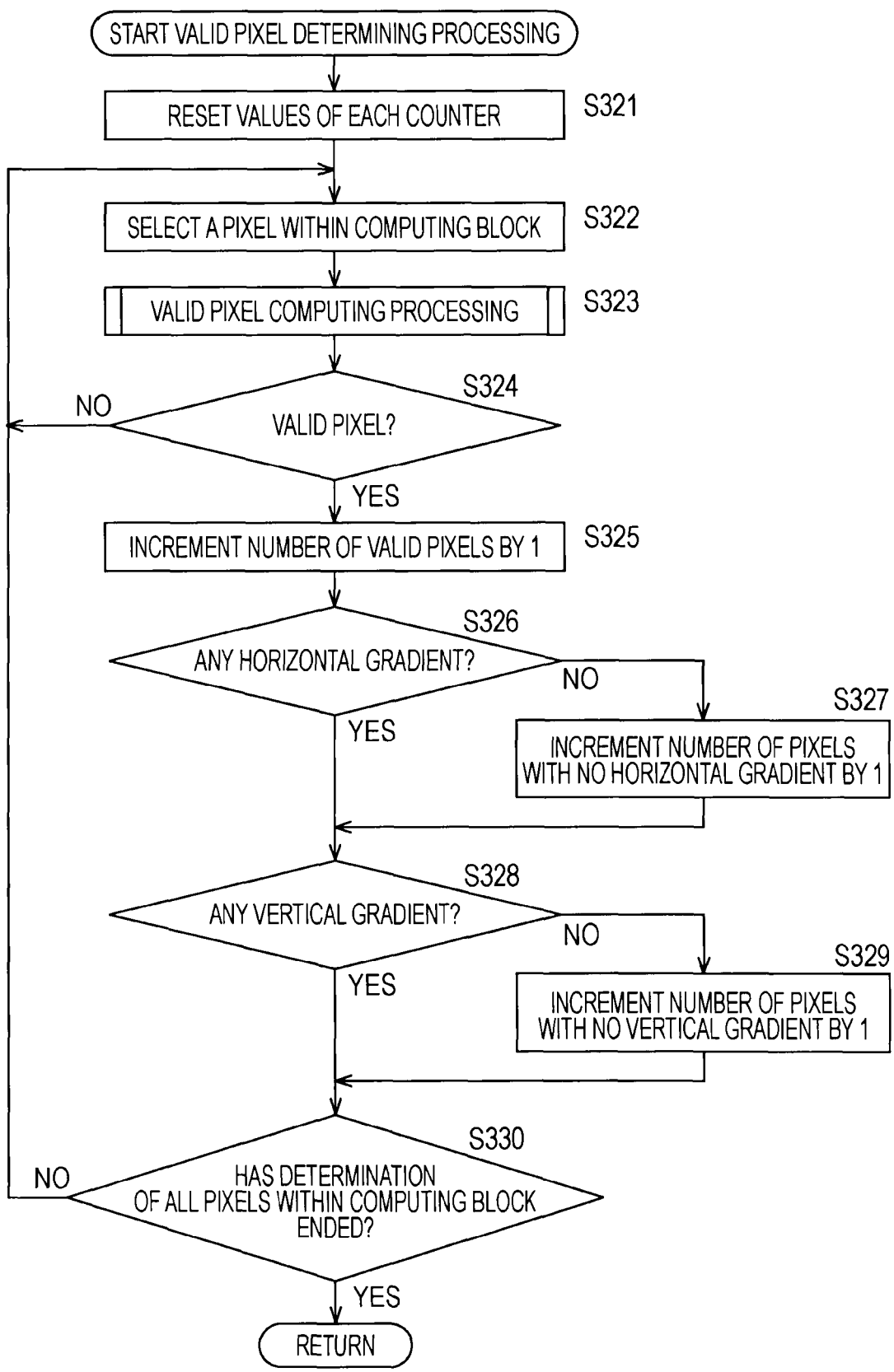
FIG. 33 is a flowchart for describing the valid pixel determining processing performed in step S303 in FIG. 32.

In step S404, the motion vector Vn which is calculated with the vector calculating unit 464 is output to the vector evaluation unit 104 whereby the gradient method computing processing is ended, and the flow is returned to step S306 in FIG. 32 and is advanced to step S307.

Also, in the case determination is made in step S402 that the gradient flag value is not 4, the valid pixels determining unit 471 determines in step S405 whether or not the gradient flag value is 2. In the case determination is made in step S405 that the gradient flag value is 2, we can say that there are many pixels with no gradient in the horizontal direction among the valid pixels, so the flow skips step S406, and is advanced to step S407.

That is to say, in this case, using valid pixels other than pixels with no gradient in the horizontal direction to find the horizontal direction component of the motion vector will not be accurate, so the independent gradient method computing processing in the horizontal direction is not executed.

In the case determination is made in step S405 that the gradient flag value is not 2 (i.e. the gradient flag value is 0 or 1), the valid pixels determining unit 471 controls the horizontal gradient determining unit 472 in step S406, and executes independent gradient method computing processing in the horizontal direction. The independent gradient method computing processing in the horizontal direction will be described later with reference to FIG. 38.

With the independent gradient method computing processing in the horizontal direction in step S406, the pixels having a gradient in the horizontal direction among the valid pixels become objects of gradient method computing, wherein the pixel difference Δx in the horizontal direction and the pixel difference Δt in the temporal direction of the pixels having a gradient in the horizontal direction are integrated among the valid pixels, horizontal direction components of the motion vector vn are obtained by using the integrated gradient and Expression (23), are output to the vector calculating unit 464, and the flow is advanced to step S407.

In step S407, the valid pixels determining unit 471 determines whether or not the gradient flag value is 1. In the case determination is made in step S407 that the gradient flag value is 1, we can say that there are many pixels with no gradient in the vertical direction included among the valid pixels, so the flow skips step S408, and is advanced to step S409.

That is to say, in this case, using valid pixels other than pixels with no gradient in the vertical direction to find the vertical direction component of the motion vector will not be accurate, so the independent gradient method computing processing in the vertical direction is not executed.

In the case determination is made in step S407 that the gradient flag value is not 1 (i.e. the gradient flag value is 0 or 2), the valid pixels determining unit 471 controls the vertical gradient determining unit 473 in step S408, and executes independent gradient method computing processing in the vertical direction. Note that the independent gradient method computing processing in the vertical direction differs from the independent gradient method computing processing in the horizontal direction in step S406 only with respect to the object direction, and the basic processing thereof is the same, so the independent gradient method computing processing will by described in summary later with reference to FIG. 38.

With the independent gradient method computing processing in the vertical direction in step S408, the pixels having a gradient in the vertical direction among the valid pixels become objects of gradient method computing, wherein the pixel difference Δy in the vertical direction and the pixel difference Δt in the temporal direction of the pixels having a gradient in the vertical direction among the valid pixels are integrated, vertical direction components of the motion vector vn are obtained by using the integrated gradient and Expression (23), are output to the vector calculating unit 464, and the flow is advanced to step S409.

At least one of the horizontal direction component and vertical component of the motion vector vn is input into the vector calculating unit 464 from the independent gradient computing unit 463-2. In step S409, the vector calculating unit 464 adds the object direction component (at least one of the horizontal direction component and vertical component) of the offset vector Vn−1 from the selector 401 and the object direction component of the motion vector vn obtained by the independent gradient computing unit 463-2, and output the resulting motion vector Vn to the vector evaluation unit 104.

Note that at this time, of the direction components of the motion vector vn, the direction component not input by the independent gradient computing unit 463-2 is calculated as a 0 vector. That is to say, in the case that the gradient flag value is 2, the vertical direction component of the motion vector vn is not obtained by the independent gradient computing unit 463-2, so the vector calculating unit 464 causes the vertical direction component of the motion vector vn to be 0 vector, and in the case that the gradient flag value is 1, the horizontal direction component of the motion vector vn is not obtained by the independent gradient computing unit 463-2, so the vector calculating unit 464 causes the horizontal direction component of the motion vector vn to be 0 vector.

In step S409, the motion vector Vn calculated with the vector calculating unit 464 is output to the vector evaluation unit 104, the gradient method computing processing is ended, and the flow is returned to step S306 in FIG. 32 and is advanced to step S307.

On the other hand, in the case determination is made in step S401 that the gradient flag value is 3, in step S410 the valid pixels determining unit 471 inhibits computing of the gradient method computing unit 405, and ends the gradient method computing processing.

As described above, in the case there are few one-sided gradient pixels among the valid pixels, a motion vector is obtained with integrated gradient method computing by employing valid pixels, and in the case there are many one-sided gradient pixels among the valid pixels, a motion vector is obtained with independent gradient method computing by employing only pixels with a gradient in a certain direction among the valid pixels.

Thus, even in a case wherein there are many one-sided gradient pixels in the computation block, a motion vector can be obtained where at least the gradient is accurate for the certain direction components. Accordingly, even for an one-sided gradient region, the detection precision of motion vectors is improved.

Also, simplified independent gradient method computing is performed as to the one-sided gradient region, so the load of computing can be suppressed.

Next, the integrated gradient method computing processing of step S403 in FIG. 36 will be described in detail, with reference to the flowchart in FIG. 37.

The object pixel value of the computation block supplied from the memory 403 is input into the pixel difference calculating unit 461 of the gradient method computing unit 405. Under the control of the valid pixels determining unit 471, each unit of the pixel difference calculating unit 461 (the first spatial gradient pixel difference calculating unit 461-1, second spatial gradient pixel difference calculating unit 461-2, and temporal direction pixel difference calculating unit 461-3) selects one pixel from the computation block in step S421, advances the flow to step S422, and executes the valid pixel computing processing. The valid pixel computing processing is basically similar processing to the valid pixel computing processing described above with reference to FIG. 34, so the description thereof will be omitted.

With the valid pixel computing processing in step S422, the pixel difference Δx in the horizontal direction and the pixel difference Δy in the vertical direction on a frame t+1 of a selected pixel, the pixel difference Δx in the horizontal direction and the pixel difference Δy in the vertical direction on a frame t, and the pixel difference Δt in the temporal direction between the frame t+1 and frame t are obtained, and employing these, logical operations of Expression (19) through Expression (21) is performed.

In step S423, based on the logical sum of the above-mentioned three Expressions (i.e. obtains Expression (22), and whether or not Expression (22) is true) the valid pixels determining unit 471 determines whether or not the selected pixel is a valid pixel. In the case determination is made in step S423 that the selected pixel is not a valid pixel, the processing is returned to step S421, and the processing thereafter is repeated.

In the case determination is made in step S423 that the selected pixel is a valid pixel, the valid pixels determining unit 471 takes the pixel thereof as the object of gradient method computing, whereby the pixel difference Δx in the horizontal direction, the pixel difference Δy in the vertical direction, and the pixel difference Δt in the temporal direction of the pixel thereof is supplied to the integrated gradient computing unit 463-1, controls the integrated gradient computing unit 463-1 in step S424 to integrate the supplied gradients (pixel differences).

The valid pixels determining unit 471 determines in step S425 whether or not the processing for all the pixels within the computation block has ended. In the case determination is made in step S425 that not all processing for the pixels in the computation block has ended, the flow is returned to step S421, and the processing thereafter is repeated.

In the case determination is made in step S425 that the processing for all the pixels within the computation block has ended, in step S426 the valid pixels determining unit 471 controls the integrated gradient computing unit 463-1, and employing the integrated gradients, calculates the motion vector vn.

That is to say, in step S424 the integrated gradient computing unit 463-1 integrates the pixel difference Δt in the temporal direction, the pixel difference Δx in the horizontal direction, and the pixel difference Δy in the vertical direction of the valid pixel supplied by the computation determining unit 425, and in the case that determination is made in step S425 that processing for all of the pixels within the computation block is ended, a motion vector vn is obtained in step S426 by using the Sum of Least Squares of the Expression (14) and the integrated gradient, and the obtained motion vector vn is output to the vector calculating unit 464. Following this, the processing is returned to step S403 in FIG. 36 and is advanced to step S404.

Thus, only gradients of valid pixels from the computation block are integrated, whereby integrated gradient method computing processing is executed. Thus, erroneous motion vectors are suppressed from being detected as to the computation block.

Figure 38:
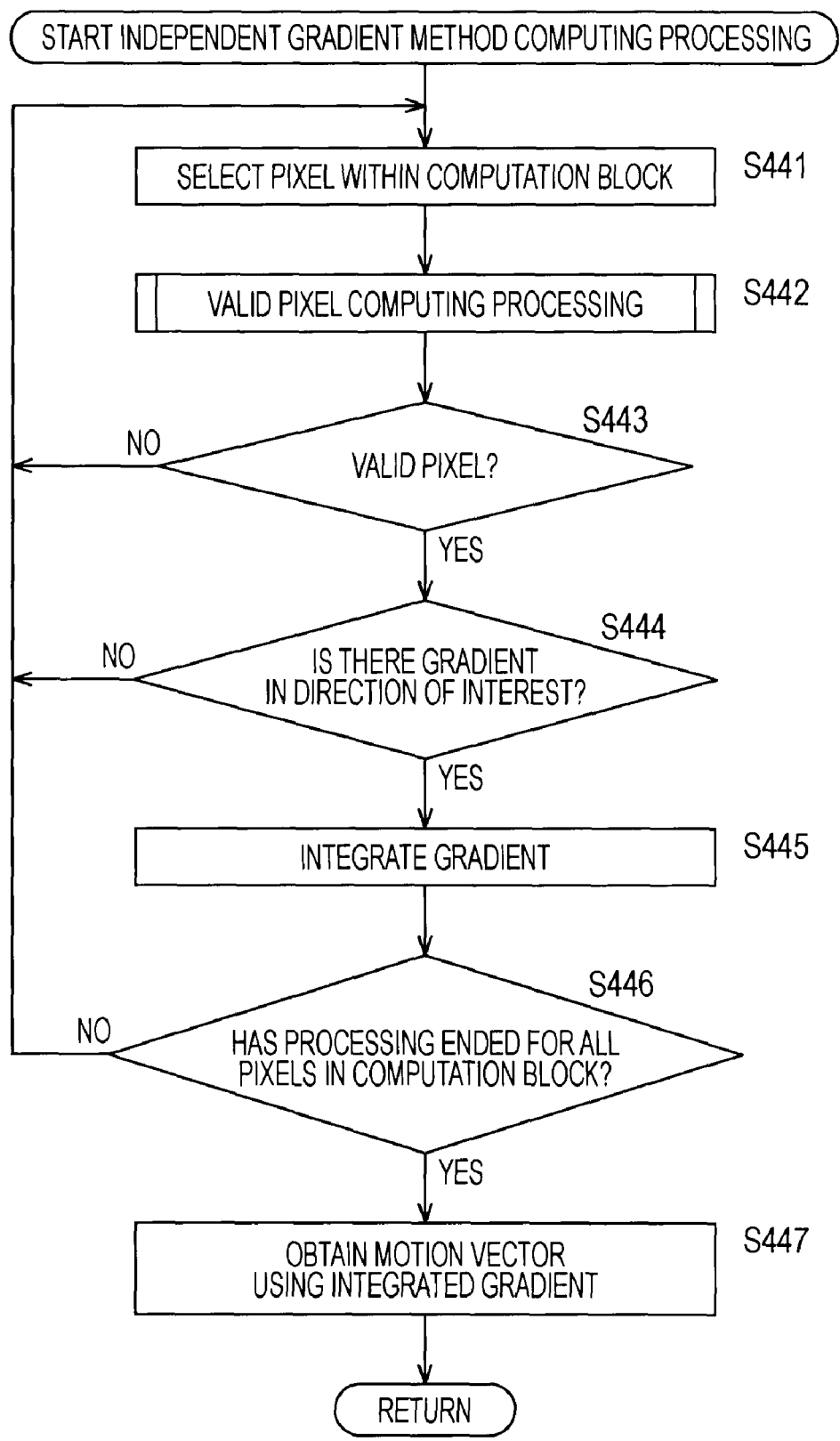
FIG. 38 is a flowchart for describing independent gradient method computing processing performed in step S406 in FIG. 36.

Next, the independent gradient method computing processing in steps S406 and S408 will be described in detail with reference to the flowchart in FIG. 38. Note the in FIG. 38 the case of the horizontal direction is described, but in the case of the vertical direction also, only the direction component to be subjected differs, and the processing is basically similar to the case of the horizontal direction.

The object pixel value of the computation block supplied from the memory 403 is input into the pixel difference calculating unit 461 of the gradient method computing unit 405.

Under control of the valid pixels determining unit 471, the various units of the pixel difference calculating unit 461 select one pixel from within the computation block in step S441, the flow is advanced to step S442, and valid pixel computing processing is executed. The valid pixel computing processing also is basically similar processing to the valid pixel computing processing described above with reference to FIG. 34, so the description thereof will be omitted.

With the valid pixel computing processing in step S422, the pixel difference Δx in the horizontal direction and the pixel difference Δy in the vertical direction on a frame t+1 of a selected pixel, the pixel difference Δx in the horizontal direction and the pixel difference Δy in the vertical direction on a frame t, and the pixel difference Δt in the temporal direction between the frame t+1 and frame t are obtained, and employing these, logical operations of Expression (19) through Expression (21) is performed.

In step S443, based on the logical sum of the above-mentioned three Expressions (i.e. obtains Expression (22), and whether or not Expression (22) is true) the valid pixels determining unit 471 determines whether or not the selected pixel is a valid pixel. In the case determination is made in step S443 that the selected pixel is not a valid pixel, the processing is returned to step S441, and the processing thereafter is repeated.

In the case determination is made in step S443 that the selected pixel is a valid pixel, in step S444 the valid pixels determining unit 471 controls the horizontal gradient determining unit 472 to determine whether or not there is any gradient in the object direction (in the present case, the horizontal direction) of the valid pixel. In the case determination is made in step S444 that there is no gradient in the object direction (in the present case, the horizontal direction) of the valid pixel, the flow is returned to step S441, and the processing thereafter is repeated.

That is to say, the valid pixel determining and one-sided gradient determining as to the next pixel in the computation block are repeated.

In the case that the horizontal gradient determining unit 472 determines that there is a gradient in the horizontal direction of the valid pixel, the pixel thereof is taken as the object of gradient method computing, whereby the pixel difference Δx in the horizontal direction and the pixel difference Δt in the temporal direction of the pixel thereof are supplied to the independent gradient computing unit 463-2, and the horizontal gradient determining unit 472 controls the independent gradient computing unit 463-2 in step S445 to integrate the supplied gradients (pixel differences).

The valid pixels determining unit 471 determines in step S446 whether or not the processing for all of the pixels within the computation block has ended. In the case determination is made in step S446 that processing for all of the pixels within the computation block has not ended, the flow is returned to step S441, and the processing thereafter is repeated.

In the case determination is made in step S446 that processing for all of the pixels within the computation block has ended, in step S447 the valid pixels determining unit 471 controls the independent gradient computing unit 463-2, and employing the integrated gradient, calculates the motion vector vn in the object direction.

That is to say, in step S445 the independent gradient computing unit 463-2 integrates the pixel difference Δt in the temporal direction and the pixel difference Δx in the horizontal direction of the valid pixel having a gradient in the horizontal direction supplied from the horizontal gradient determining unit 472, and in the event determination is made in step S446 that processing for all of the pixels within the computation block has ended, the object direction (horizontal direction) component of the motion vector vn is obtained in step S447 employing the integrated gradient and Expression (23), and the obtained horizontal direction component of the motion vector vn is output to the vector calculating unit 464. Following this, the flow is returned to step S406 in FIG. 36, and is advanced to step S407.

Thus, of the valid pixels in the computation block, only the gradients of the pixels having a gradient in the object direction are integrated, and gradient method computing processing in the object direction is executed. Thus, even if the computation block is included in the one-sided gradient region, an object direction component from an erroneous motion vector is suppressed from being detected as to the computation block.

Next, the vector evaluation processing in step S307 in FIG. 32 is described with reference to the flowchart in FIG. 39.

Figure 39:
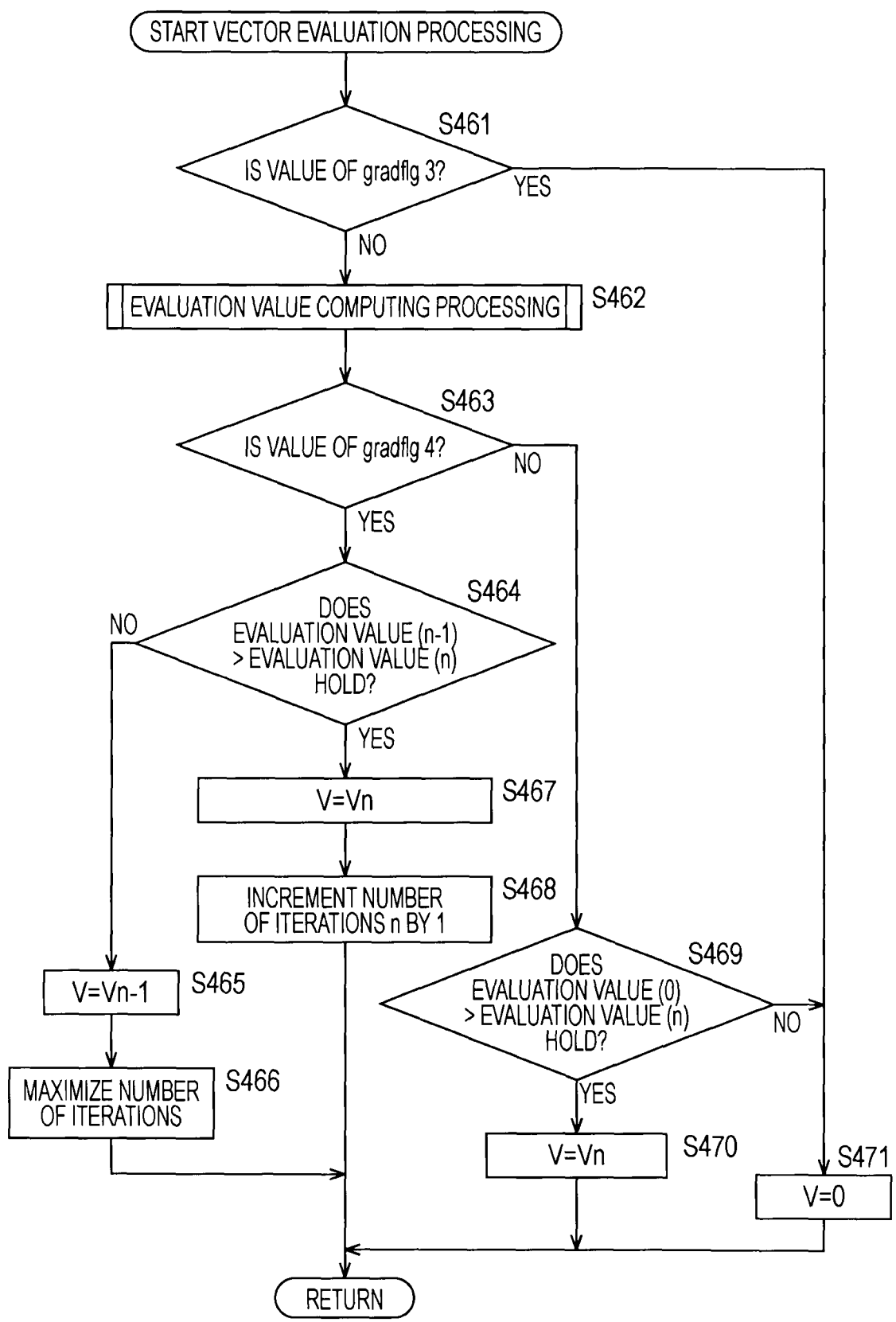
FIG. 39 is a flowchart for describing vector evaluation processing performed in step S307 in FIG. 32.

Upon the gradient flag from the flag setting unit 452 being input into the evaluation value determining unit 412, the vector evaluation processing in FIG. 39 is started. The evaluation value determining unit 412 determines in step S461 whether or not the gradient flag value is 3, and in the case determination is made that the gradient flag value is not 3 (i.e. in the case determination is made that gradient method computing is executed), the evaluation value determining unit 412 controls the evaluation value computing unit 61B in step S462 to execute evaluation value computing processing for the offset vector Vn−1, motion vector Vn, and 0 vector. The evaluation value computing processing is performed basically similar to the evaluation value computing processing described above with reference to FIG. 15, so the description thereof will be omitted.

With the evaluation value computing processing in step S462, the evaluation values dfv of the offset vector Vn−1 from the selector 401, the motion vector Vn computed by the integrated gradient computing unit 463-1 or independent gradient computing unit 463-2 and calculated by the vector calculating unit 464, and the 0 vector, are computed.

The evaluation value determining unit 412 determines in step S463 whether or not the gradient flag value is 4, and in the case determination is made that the gradient flag value is 4 (i.e. in the case that the motion vector Vn is computed by the integrated gradient computing unit 463-1), determination is made in step S464 whether or not the evaluation value dfv (n) of the motion vector Vn calculated with the vector calculating unit 464 is smaller than the evaluation value dfv (n−1) of the offset vector Vn−1.

In the case determination is made in step S464 that the evaluation value dfv (n−1) is smaller than the evaluation value dfv (n) (reliability of the offset vector Vn−1 is greater), the evaluation value determining unit 412 determines the offset vector Vn−1 to be the motion vector V in step S465. That is to say, the motion vector V is not the motion vector Vn calculated by the vector calculating unit 464, but rather is modified (corrected) to the offset vector Vn−1. The evaluation value determining unit 412 sets the number of iterations of the gradient method computing to the maximum value, in step S466, thereby ending the vector evaluation processing.

That is to say, in step S466, even if the motion vector V is employed which has been the offset vector Vn−1 and the gradient method computing is repeated, the result is the same, so the number of iterations are set to the maximum value so that the gradient method computing is not repeated.

Also, in the case that determination is made in step S464 that the evaluation value dfv (n) is smaller than the evaluation value dfv (n−1) (reliability of the motion vector Vn calculated with the vector calculating unit 464 is greater), the evaluation value determining unit 412 determines in step S467 the motion vector Vn which is calculated with the vector calculating unit 464 as it is to be the motion vector V, and in step S468 adds 1 to the number of iterations of the gradient method computation, thereby ending the vector evaluation processing.

On the other hand, in the case determination is made in step S463 that the gradient flag value is not 4 (i.e. in the case of the motion vector Vn which is computed with the independent gradient computing unit 463-2), determination is made in step S469 whether or not the evaluation value dfv (n) of the motion vector Vn calculated with the vector calculating unit 464 is smaller than the evaluation value dfv (0) of the 0 vector.

In the case determination is made in step S469 that the evaluation value dfv (n) is smaller than the evaluation value dfv (0) (reliability of the motion vector Vn calculated with the vector calculating unit 464 is greater), the evaluation value determining unit 412 determines in step S470 the motion vector Vn which is calculated with the vector calculating unit 464 as it is to be the motion vector V, thereby ending the vector evaluation processing.

Also, in the case determination is made in step S469 that the evaluation value dfv (0) is smaller than the evaluation value dfv (n) (reliability of the 0 vector is greater), the evaluation value determining unit 412 determines in step S471 the 0 vector to be the motion vector V, thereby ending the vector evaluation processing. That is to say, in step S471, the motion vector V is not the motion vector Vn which is calculated with the vector calculating unit 464, but rather is modified (corrected) to the 0 vector.

On the other hand, in the case determination is made in step S461 that the gradient flag value is 3, this is a case wherein determination is made that there are few valid pixels in the computation block, so in step S472 the 0 vector is determined to be the motion vector V, i.e. the motion vector V is not the motion vector Vn which is calculated with the vector calculating unit 464, but rather is modified (corrected) to the 0 vector, whereby the vector evaluation processing is ended.

Thus, based on the gradient flag value, the comparison object with the vector evaluation is switched, the motion vector is evaluated, and according to the evaluation results the motion vector is modified (corrected), whereby a motion vector with good precision according to the gradient state in the computation block can be detected.

Note that in the above descriptions, after the valid pixels are determined, the horizontal gradient and vertical gradient are determined to obtain the gradient state within the valid pixels (i.e. the ratio of pixels having only horizontal gradient or vertical gradient), and performing gradient method execution determining based thereupon, but as will be described below, obtaining the ratio of pixels having only horizontal gradient or vertical gradient by employing the Expression (19) through Expression (21) which are conditional expressions to determine the valid pixels, and performing gradient method execution determining based thereupon can be arranged as well.

Figure 40:
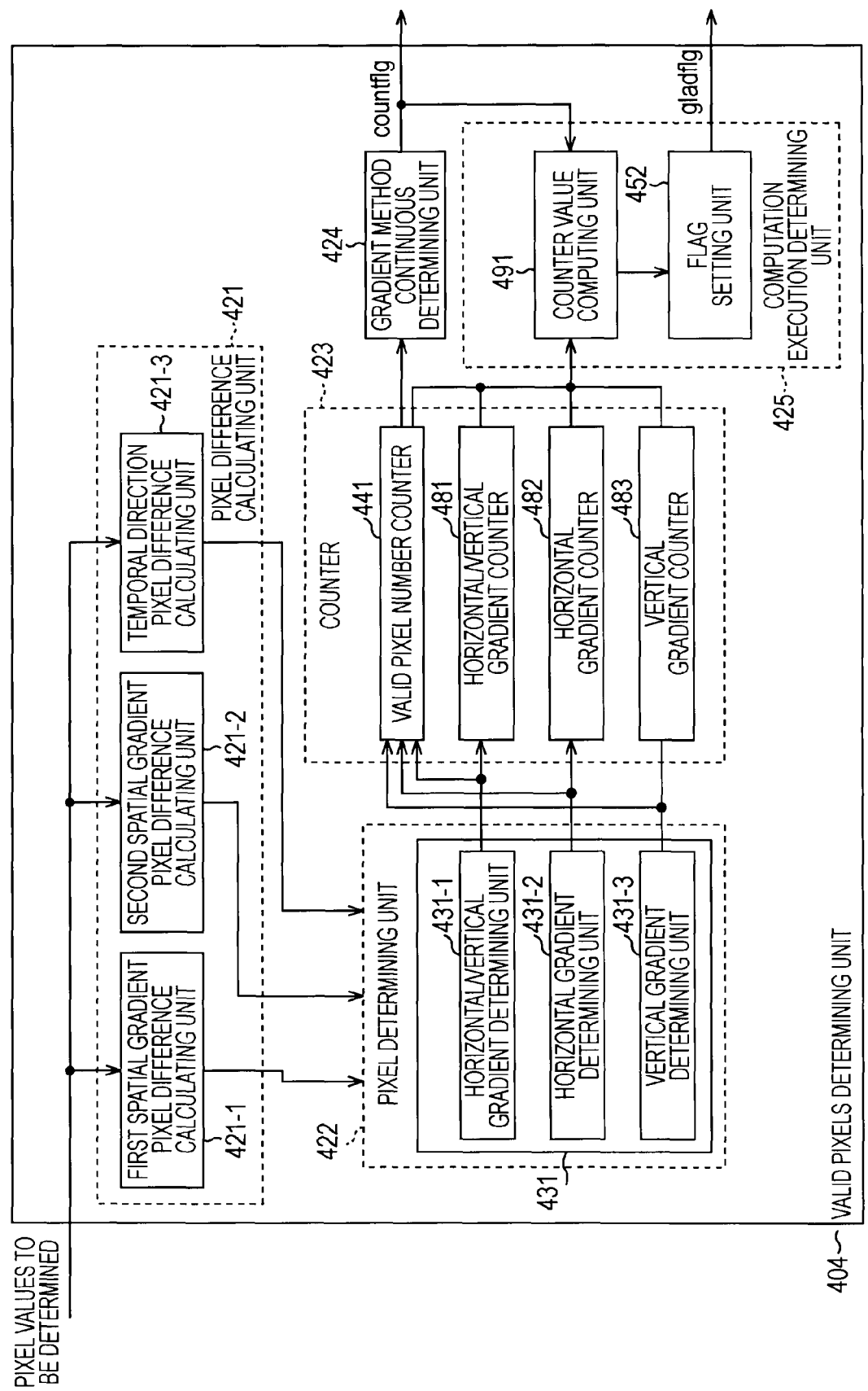
FIG. 40 is a block diagram illustrating another configuration of the pixel determining unit, counter, and computation execution determining unit shown in FIG. 26.

FIG. 40 is a block diagram illustrating another configuration example of the pixel determining unit, counter, and computation execution determining unit shown in FIG. 26.

The pixel determining unit 422 in the example in FIG. 40 holds a commonality with the pixel determining unit 422 in FIG. 26 in having a valid pixels determining unit 431, but differs from the pixel determining unit 422 in FIG. 26 in that the horizontal gradient determining unit 432 and vertical gradient determining unit 433 are removed. Note that with the example in FIG. 40, the valid pixels determining unit 431 is further configured with a horizontal/vertical gradient determining unit 431-1, a horizontal gradient determining unit 431-2, and a vertical gradient determining unit 431-3.

The horizontal/vertical gradient determining unit 431-1 employs Expression (21) to determine whether or not the pixels within the computation block satisfy the horizontal/vertical condition of interest, and in the case determination is made that the pixels within the computation block satisfy the horizontal/vertical condition of interest, i.e. determination is made that there is a horizontal gradient and vertical gradient (hereafter called horizontal/vertical gradient) since there is a gradient in the vertical direction and the horizontal direction, and there are similarities in the movement in the horizontal and vertical directions, so while 1 is added to the value (the number of pixels having horizontal gradient and vertical gradient) of the horizontal/vertical gradient counter 481, 1 is added to the value of the valid pixel number counter 441.

The horizontal gradient determining unit 431-2 employs Expression (19) to determine whether or not the pixels within the computation block satisfy the horizontal condition of interest, and in the case determination is made that the pixels within the computation block satisfy the horizontal condition of interest, i.e. determination is made that there is a horizontal gradient since the horizontal gradient is somewhat greater than the vertical gradient, is more dominant, and there is similarity to the movement in the horizontal direction, so while 1 is added to the value (the number of pixels having horizontal gradient) of the horizontal gradient counter 482, 1 is added to the value of the valid pixel number counter 441.

The vertical gradient determining unit 431-3 employs Expression (20) to determine whether or not the pixels within the computation block satisfy the vertical condition of interest, and in the case determination is made that the pixels within the computation block satisfy the vertical condition of interest, i.e. determination is made that there is a vertical gradient since the vertical gradient is somewhat greater than the horizontal gradient, is more dominant, and there is similarity to the movement in the vertical direction, so while 1 is added to the value (the number of pixels having vertical gradient) of the vertical gradient counter 483, 1 is added to the value of the valid pixel number counter 441.

The counter 423 in the example in FIG. 40 holds a commonality with the counter 423 in FIG. 26 in having a valid pixel counter 441, but differs from the counter 423 in FIG. 26 in that the no-horizontal-gradient counter 442 and no-vertical-gradient counter 443 are removed, and in that a horizontal/vertical gradient counter 481, horizontal gradient counter 482, and vertical gradient counter 483 are added.

The horizontal/vertical gradient counter 481 stores the number of pixels (valid pixels) determined to have horizontal gradient and vertical gradient (hereafter also called horizontal/vertical gradient) by the horizontal/vertical gradient determining unit 431-1. The horizontal gradient counter 482 stores the number of pixels (valid pixels) determined to have horizontal gradient by the horizontal gradient determining unit 431-2 for each computation block. The vertical gradient counter 483 stores the number of pixels (valid pixels) determined to have vertical gradient by the vertical gradient determining unit 431-3 for each computation block.

The computation execution determining unit 425 in the example in FIG. 40 holds a commonality with the computation execution determining unit 425 in FIG. 29 in having a flag setting unit 452, but differs from the computation execution determining unit 425 in FIG. 26 in that a counter value computing unit 491 has been added instead of the counter value computing unit 451.

When the value of a counter flag from the gradient method continuous determining unit 424 is 1, the counter value computing unit 491 obtains the number of valid pixels (cnt_t), the number of pixels having gradient in the horizontal direction and vertical direction (cnt_xy), the number of pixels having gradient in the horizontal direction (cnt_x), and the number of pixels having gradient in the vertical direction (cnt_y) from the counter 423 (the valid pixel number counter 441, horizontal/vertical gradient counter 481, horizontal gradient counter 482, and vertical gradient counter 483), computes the ratio of the valid pixels in the computation block and the one-sided gradient pixels from the valid pixels, and controls the gradient flag value which the flag setting unit 452 sets in accordance with the ratio computation results.

That is to say, the counter value computing unit 491 employs the following Expression (27) through Expression (30) which employs the number of valid pixels (cnt_t), the number of pixels having gradient in the horizontal/vertical directions (cnt_xy), the number of pixels having gradient in the horizontal direction (cnt_x), and the number of pixels having gradient in the vertical direction (cnt_y), to perform gradient method execution determining processing.

[Mathematical Expression 26]

$$cnt\_t \geq pxl\_a \cdot th4 \quad (27)$$

[Mathematical Expression 27]

$$\frac{cnt\_xy}{cnt\_t} \geq pxl\_a \cdot th5 \quad (28)$$

[Mathematical Expression 28]

$$\frac{cnt\_x}{cnt\_t} \geq pxl\_a \cdot th6 \quad (29)$$

[Mathematical Expression 29]

$$\frac{cnt\_y}{cnt\_t} \geq pxl\_a \cdot th7 \quad (30)$$

Here, pxl_a represents the number of all pixels within the computation block, the · denotes multiplication, and th4 through th7 each represent a predetermined threshold value which are each different but less than 1. Note that th4>th5, th6, th7.

First, in the case determination is made that Expression (27) is not satisfied, or satisfied Expression (27) but does not satisfy Expression (28) through Expression (30), we can say that there are few pixels determined to be valid within the computation block, whereby this is in a state difficult to perform gradient method computing. Thus, the counter value computing unit 491 appends a gradient flag (gladflg=3), does not cause the gradient method computing unit 405 to perform computation, but causes this to be no-motion (0 vector).

In the case determination is made that Expression (27) is satisfied, and further, Expression (28) is satisfied, we can say that this is a state wherein pixels having gradient in the horizontal direction and vertical direction (has normal gradient) exist adequately among the valid pixels. Thus, the counter value computing unit 491 sets the gradient flag (gladflg=4), and causes the gradient method computing unit 405 to execute integrated gradient method computing employing the Expression (14).

In the case determination is made that Expression (27) is satisfied, Expression (28) is not satisfied, but Expression (29) is satisfied, we can say that there are many pixels with no gradient in the vertical direction included among the valid pixels. Thus, the counter value computing unit 491 appends a gradient flag (gladflg=2), does not cause the gradient method computing unit 405 to perform computation relating to movement in the vertical direction, but causes this to be no-motion (0 vector), but executes gradient method computing employing the Expression (23) only as to the movement in the horizontal direction. Note that for the gradient method computation at this time, only valid pixels having a gradient in the horizontal direction are used.

In the case determination is made that Expression (27) is satisfied, Expression (28) and Expression (29) are not satisfied, but Expression (30) is satisfied, we can say that there are many pixels with no gradient in the horizontal direction included among the valid pixels. Thus, the counter value computing unit 491 appends a gradient flag (gladflg=1), does not cause the gradient method computing unit 405 to perform computation relating to movement in the horizontal direction, but causes this to be no-motion (0 vector), but executes gradient method computing employing the Expression (23) only as to the movement in the vertical direction. Note that for the gradient method computation at this time, only valid pixels having a gradient in the vertical direction are used.

Figure 41:
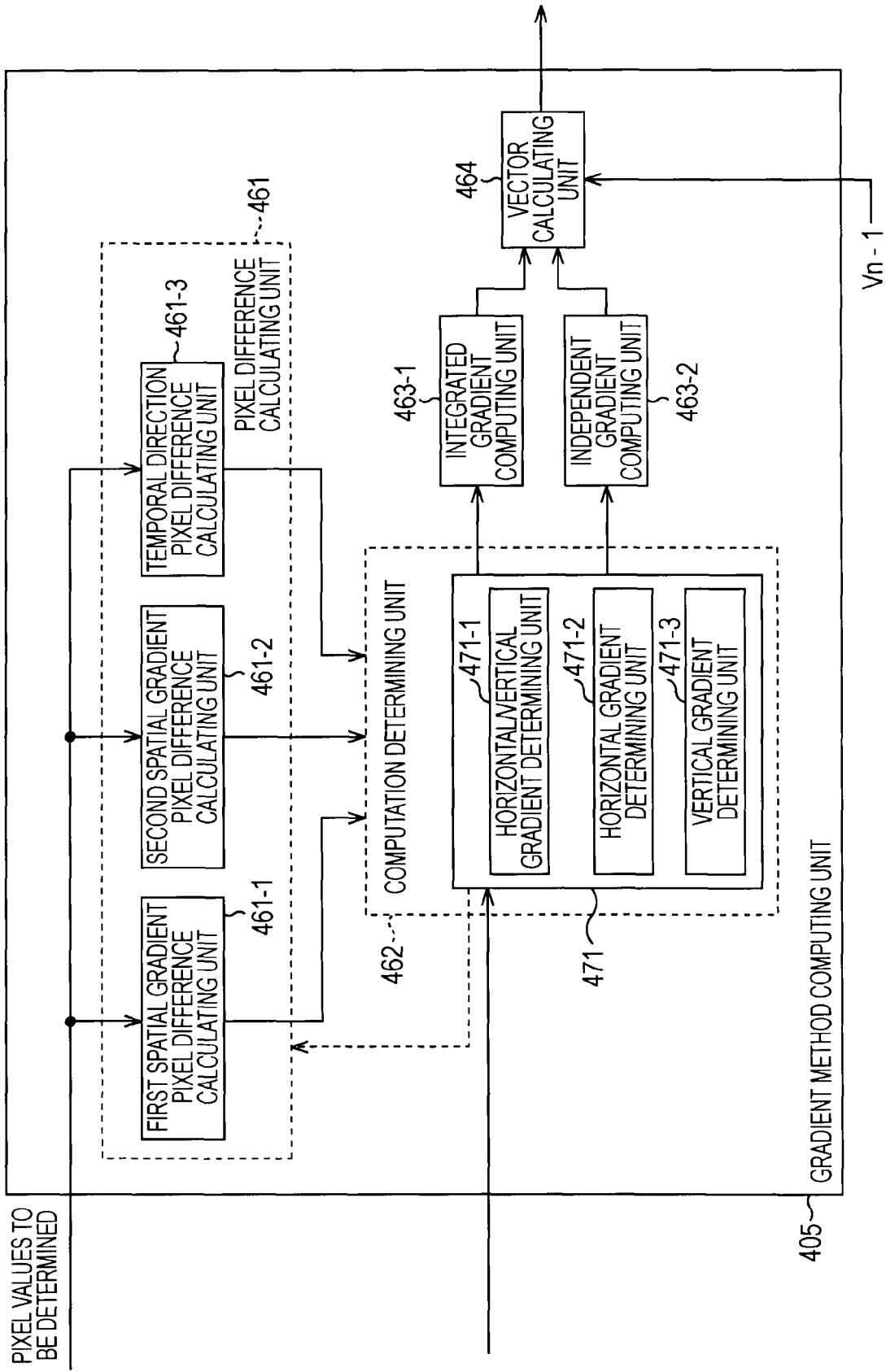
FIG. 41 is a block diagram illustrating another configuration of the computation determining unit in FIG. 27.

FIG. 41 is a diagram illustrating another configuration example of the computation determining unit of the gradient method computing unit corresponding to the valid pixels determining unit in FIG. 40.

That is to say, the computation determining unit 462 holds a commonality with the computation determining unit 462 in FIG. 27 in having a valid pixels determining unit 471, but differs from the computation determining unit 462 in FIG. 27 in that the horizontal gradient determining unit 472 and vertical gradient determining unit 473 are removed. Note that with the example in FIG. 41, the valid pixels determining unit 471 is further configured with a horizontal/vertical gradient determining unit 471-1, a horizontal gradient determining unit 471-2, and a vertical gradient determining unit 471-3.

The horizontal/vertical gradient determining unit 471-1, horizontal gradient determining unit 471-2, and vertical gradient determining unit 471-3 each determine the method for gradient method computation processing based on the value of the gradient flag.

That is to say, in the case determination is made to perform gradient method computing processing with the integrated gradient computing unit 463-1 based on the gradient flag value, the horizontal/vertical gradient determining unit 471-1 determines whether or not the pixels within the computation block satisfy the horizontal/vertical condition of interest by employing Expression (21), and supplies the gradient (pixel difference) of the pixels determined to have satisfied the horizontal/vertical condition of interest to the integrated gradient computing unit 463-1.

In the case determination is made to perform gradient method computing processing with the independent gradient computing unit 463-2 based on the gradient flag value, the horizontal/vertical gradient determining unit 471-1 determines whether or not the pixels within the computation block satisfy the horizontal/vertical condition of interest by employing Expression (21), and supplies the gradient (pixel difference) of the pixels determined to have satisfied the horizontal/vertical condition of interest to the independent gradient computing unit 463-2.

That is to say, in the case determination is made to perform gradient method computing processing with the integrated gradient computing unit 463-1 based on the gradient flag value, the horizontal gradient determining unit 471-2 determines whether or not the pixels within the computation block satisfy the horizontal condition of interest by employing Expression (19), and supplies the gradient (pixel difference) of the pixels determined to have satisfied the horizontal condition of interest to the integrated gradient computing unit 463-1.

In the case determination is made to perform gradient method computing processing as to the horizontal direction with the independent gradient computing unit 463-2 based on the gradient flag value, the horizontal gradient determining unit 471-2 determines whether or not the pixels within the computation block satisfy the horizontal condition of interest by employing Expression (19), and supplies the gradient (pixel difference) of the pixels of the pixels determined to have satisfied the horizontal condition of interest to the independent gradient computing unit 463-2. That is to say, in the case determination is made to perform gradient method computing processing as to the vertical direction, the gradient (pixel difference) determined to have satisfied the horizontal condition of interest with the horizontal gradient determining unit 471-2 is not supplied to the independent gradient computing unit 463-2.

That is to say, in the case determination is made to perform gradient method computing processing with the integrated gradient computing unit 463-1 based on the gradient flag value, the vertical gradient determining unit 471-3 determines whether or not the pixels within the computation block satisfy the vertical condition of interest by employing Expression (20), and supplies the gradient (pixel difference) of the pixels determined to have satisfied the vertical condition of interest to the integrated gradient computing unit 463-1.

In the case determination is made to perform gradient method computing processing as to the vertical direction with the independent gradient computing unit 463-2 based on the gradient flag value, the vertical gradient determining unit 471-3 determines whether or not the pixels within the computation block satisfy the vertical condition of interest by employing Expression (20), and supplies the gradient (pixel difference) of the pixels determined to have satisfied the vertical condition of interest to the independent gradient computing unit 463-2. That is to say, in the case determination is made to perform gradient method computing processing as to the horizontal direction, the gradient (pixel difference) of the pixels determined to have satisfied the vertical condition of interest with the vertical gradient determining unit 471-3 is not supplied to the independent gradient computing unit 463-2.

Corresponding thereto, the integrated gradient computing unit 463-1 performs integrated gradient method computing employing the gradient of the pixels determined to satisfy the conditional expressions (i.e. valid pixels) by each of the horizontal/vertical gradient determining unit 471-1, horizontal gradient determining unit 472-1, and vertical gradient determining unit 471-3.

The independent gradient computing unit 463-2 performs independent gradient method computing in the horizontal direction by employing the gradient of the pixels determined to satisfy the conditional expressions (i.e. pixels having horizontal gradient among the valid pixels) by each of the horizontal/vertical gradient determining unit 471-1 and the horizontal gradient determining unit 471-2, and performs independent gradient method computing in the vertical direction by employing the gradient of the pixels determined to satisfy the conditional expressions (i.e. pixels having vertical gradient among the valid pixels) by each of the horizontal/vertical gradient determining unit 471-1 and the vertical gradient determining unit 471-3.

Figure 42:
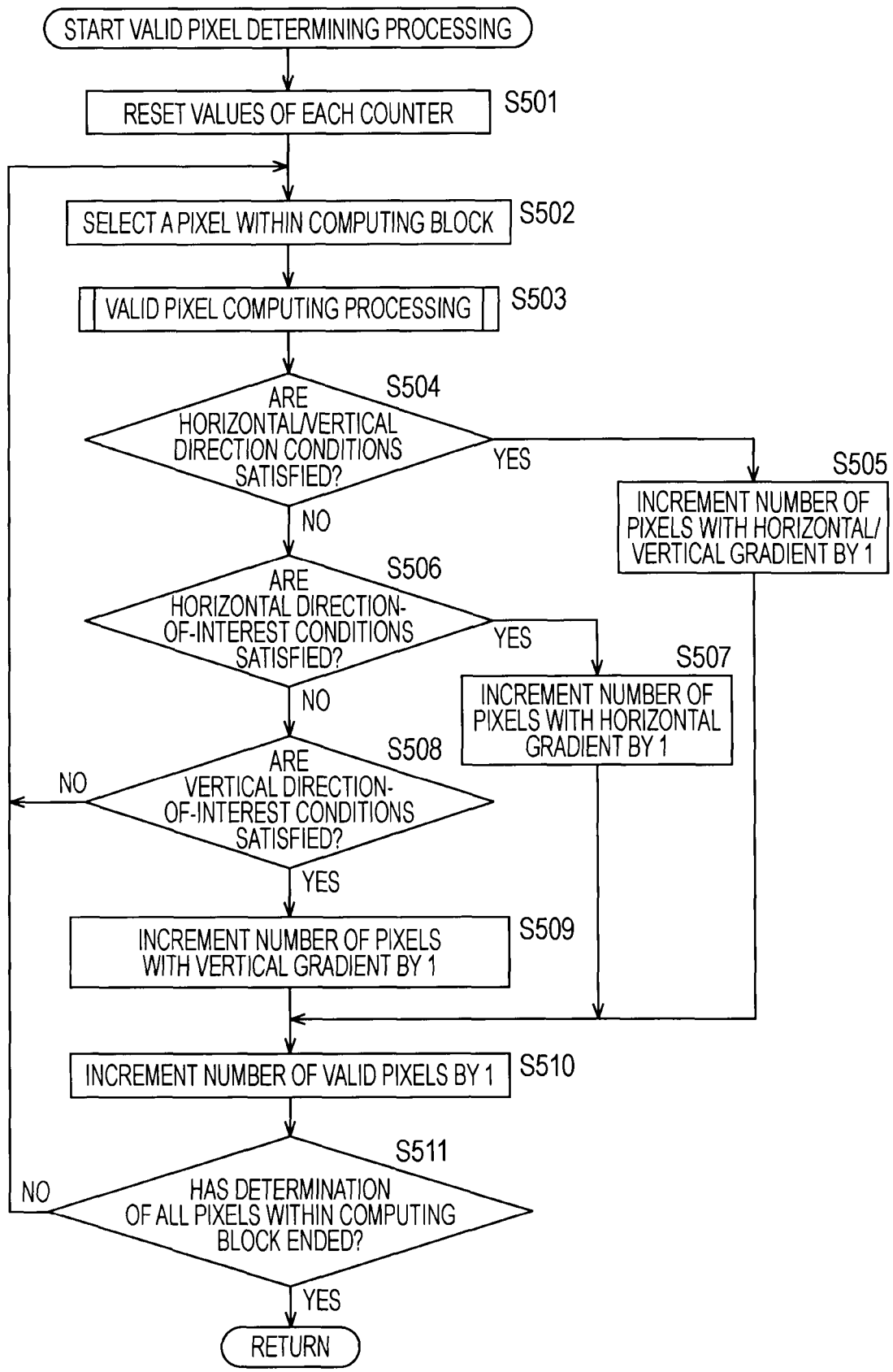
FIG. 42 is a flowchart for describing another example of the valid pixel determining processing performed in step S303 in FIG. 32.

Next, the valid pixel determining processing performed by the valid pixels determining unit 404 in FIG. 40 will be described with reference to the flowchart in FIG. 42. Note that FIG. 42 is another example of the valid pixel determining processing described above with reference to FIG. 33, which is performed in step S303 in FIG. 32, and the processing in steps S501 through S503 and S511 in FIG. 42 perform basically the same processing as the processing in steps S321 through S323 and S330 in FIG. 33, so the detailed description thereof will be omitted.

Upon inputting the object pixel value of the computation block supplied from the memory 403, the pixel difference calculating unit 421 controls the valid pixels determining unit 431 in step S501 to reset the value of each counter (the valid pixel number counter 441, horizontal/vertical gradient counter 481, horizontal gradient counter 482, and vertical gradient counter 483).

Each unit of the pixel difference calculating unit 421 (the first spatial gradient pixel difference calculating unit 421-1, second spatial gradient pixel difference calculating unit 421-2, and temporal direction pixel difference calculating unit 421-3) selects one pixel from within the computation block in step S502, the flow is advanced to step S503, and valid pixel computing processing is executed. The valid pixel computing processing here is described above with reference to FIG. 34 so the description thereof will be omitted.

The pixel difference Δx in the horizontal direction and pixel difference Δy in the vertical direction of the frame t+1 of the selected pixel, the pixel difference Δx in the horizontal direction and pixel difference Δy in the vertical direction of the frame t, and the pixel difference Δt in the temporal direction between the frame t+1 and the frame t are calculated with the valid pixel computing processing in step S503, and employing these, logical operations is performed for the Expression (19) which is a condition of interest in the horizontal direction by the horizontal gradient determining unit 431-2, for the Expression (20) which is a condition of interest in the vertical direction by the vertical gradient determining unit 431-3, and for the Expression (21) which is a condition of interest in the horizontal/vertical directions by the horizontal/vertical gradient determining unit 431-1. After this, the flow is returned to step S503 in FIG. 42 and is advanced to step S504.

In step S504, the horizontal/vertical determining unit 431-1 determines whether or not the selected pixel satisfies the condition of interest in the horizontal/vertical directions (Expression (21)), and in the case determination is made that the selected pixel satisfies the condition of interest in the horizontal/vertical directions, 1 is added to the number of pixels having horizontal/vertical gradient in the horizontal/vertical gradient counter 481 in step S505, and in step S510, 1 is added to the number of valid pixels in the valid pixel number counter 441.

In the case determination is made in step S504 that the condition of interest in the horizontal/vertical directions is not satisfied, the horizontal gradient determining unit 431-2 determines in step S506 whether or not the selected pixel satisfies the horizontal condition of interest (Expression (19)), and in the case determination is made that the selected pixel satisfies the horizontal condition of interest, 1 is added to the number of pixels having horizontal gradient in the horizontal gradient counter 482 in step S507, and in step S510, 1 is added to the number of valid pixels in the valid pixel number counter 441.

In the case determination is made in step S506 that the condition of interest in the horizontal direction is not satisfied, the vertical gradient determining unit 431-3 determines in step S508 whether or not the selected pixel satisfies the vertical condition of interest (Expression (20)), and in the case determination is made that the selected pixel satisfies the vertical condition of interest, 1 is added to the number of pixels having vertical gradient in the vertical gradient counter 483 in step S509, and in step S510, 1 is added to the number of valid pixels in the valid pixel number counter 441.

After the number of valid pixels is increased by 1 in step S510, the flow is advanced to step S511, and the pixel difference calculating unit 421 determines whether or not the processing for all of the pixels within the computation block has ended. In the case determination is made in step S510 that the processing for all of the pixels within the computation block has ended, the valid pixel number determining processing is ended, whereby the flow is returned to step S303 in FIG. 32 and is advanced to step S304.

In the case determination is made in step S508 that the selected pixel does not satisfy the condition of interest in the horizontal direction (i.e. in the case determination is made that none of the expressions Expression (19) through Expression (21) described above are satisfied, and that the selected pixel is not a valid pixel), or in the case determination is made in step S511 that the processing for all of the pixels within the computation block has not ended, the flow is returned to step S502, and the processing thereafter is repeated.

Thus, the number of valid pixels determined to be valid within the computation block is stored in the valid pixel number counter 441, the number of valid pixels determined to have horizontal/vertical gradient among the valid pixels (more specifically, have gradient in the vertical direction and horizontal direction, and have similarity of movement in the horizontal and vertical directions) is stored in the horizontal/vertical gradient counter 481, the number of pixels determined to have horizontal gradient among the valid pixels (more specifically, the horizontal gradient is somewhat greater than the vertical gradient, is more dominant, and has similarity of movement in the horizontal direction) is stored in the horizontal gradient counter 482, and the number of pixels determined to have vertical gradient among the valid pixels (more specifically, the vertical gradient is somewhat greater than the horizontal gradient, is more dominant, and has similarity of movement in the vertical direction) is stored in the vertical gradient counter 483.

Figure 43:
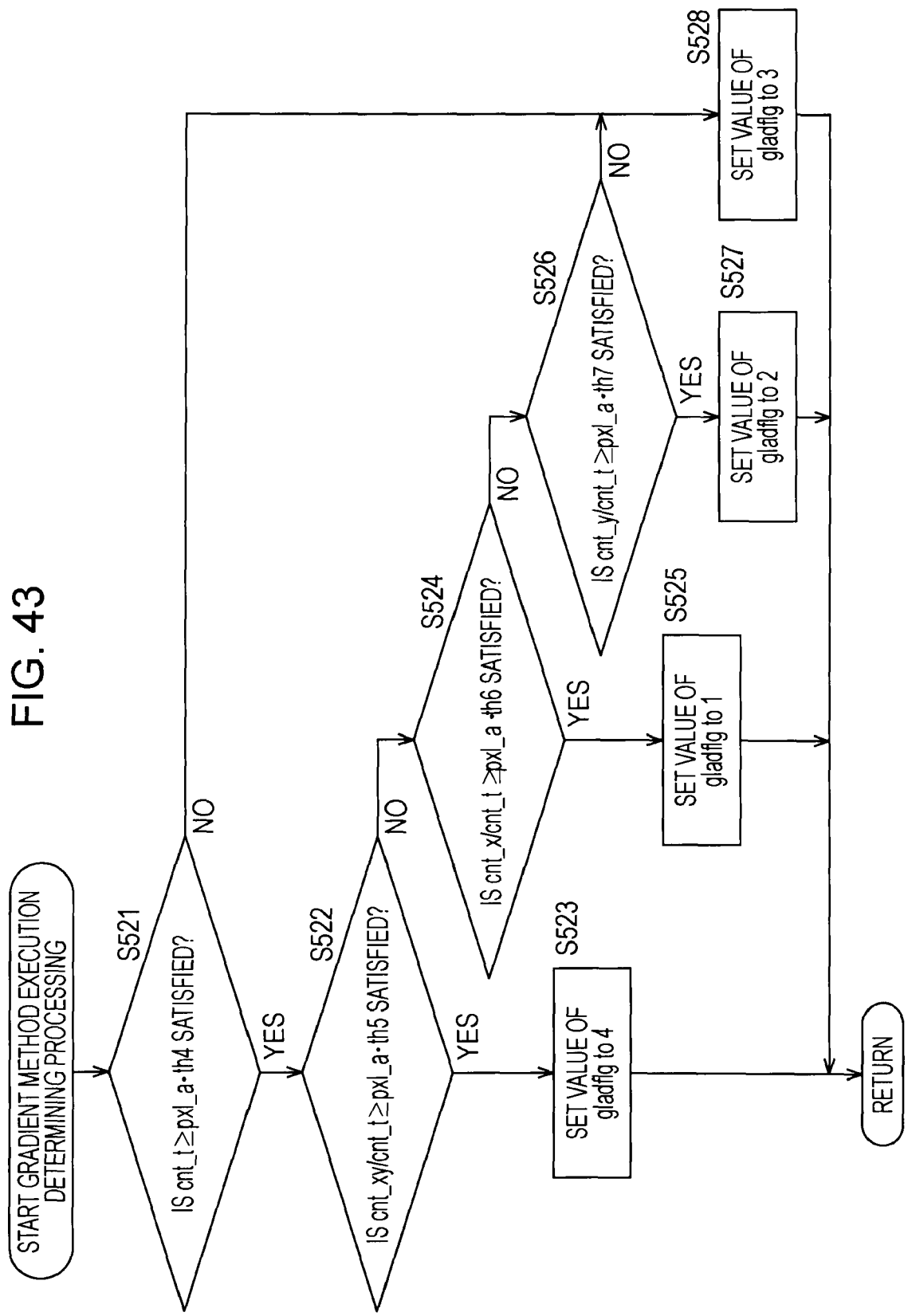
FIG. 43 is a flowchart for describing another example of the gradient method execution determining processing performed in step S305 in FIG. 32.

The gradient method execution determining processing in step S305 in FIG. 32 will be described in detail with reference to the flowchart in FIG. 43. The gradient method execution determining processing is another example of gradient method execution determining processing described above with reference to FIG. 35, and is a process executed by the computation execution determining unit 425 in FIG. 40, based on each counter wherein the pixel numbers are stored as described above.

The counter value computing unit 491 in FIG. 40 obtains the number of valid pixels (cnt_t) from the valid pixel number counter 441, the number of pixels determined to have horizontal/vertical gradient among the valid pixels (cnt_xy) from the horizontal/vertical gradient counter 481, the number of pixels determined to have horizontal gradient among the valid pixels (cnt_x) from the horizontal gradient counter 482, and the pixels determines to have vertical gradient among the valid pixels (ngcnt_y) from the vertical gradient counter 483, and determines in step S521 whether or not the Expression (27) is satisfied.

In the case determination is made in step S521 that Expression (27) is satisfied, we can say that valid pixels adequately exist within the computation block, and the counter value computing unit 491 determines in step S522 whether or not the Expression (28) is satisfied.

In the case determination is made in step S522 that Expression (28) is satisfied, we can say that this is in a state wherein valid pixels having a gradient in the horizontal direction and vertical direction (having normal gradient) adequately exist. Accordingly, with the assumption that the horizontal direction and vertical direction are reliable, the flag setting unit 452 sets the gradient flag value to "4" which performs integrated gradient method computing processing employing the Expression (14) in step S523, outputs the gradient flag (gladflg=4) to the gradient method computing unit 405 and evaluation determining unit 412, and ends the gradient method execution determining process. The flow is then returned to step S305 in FIG. 32 and is advanced to step S306, wherein gradient method computing processing is executed in accordance with the gradient flag (gladflg=4).

In the case determination is made in step S522 that Expression (28) is not satisfied, the counter value computing unit 491 determines in step S524 whether or not Expression (29) is satisfied. In the case determination is made in step S524 that Expression (29) is satisfied, we can say that many pixels having no gradient in the vertical direction are included in the valid pixels. Accordingly, with the assumption that the horizontal direction is reliable, the flag setting unit 452 sets the gradient flag value to "1" which performs independent gradient method computing processing employing the Expression (23) as to the horizontal direction in step S525, outputs the gradient flag (gladflg=1) to the gradient method computing unit 405 and evaluation determining unit 412, and ends the gradient method execution determining processing. The flow is then returned to step S305 in FIG. 32 and is advanced to step S306, whereby gradient method computing processing is executed in accordance with the gradient flag (gladflg=1).

In the case determination is made in step S524 that Expression (29) is not satisfied, the counter value computing unit 451 determines in step S526 whether or not Expression (30) is satisfied. In the case determination is made in step S524 that Expression (30) is satisfied, we can say that many pixels having no gradient in the horizontal direction are included in the valid pixels. Accordingly, with the assumption that the vertical direction is reliable, the flag setting unit 452 sets the gradient flag value to "2" which performs independent gradient method computing processing employing the Expression (23) as to the vertical direction in step S527, outputs the gradient flag (gladflg=2) to the gradient method computing unit 405 and evaluation determining unit 412, and ends the gradient method execution determining processing. The flow is then returned to step S305 in FIG. 32 and is advanced to step S306, whereby gradient method computing processing is executed in accordance with the gradient flag (gladflg=2).

In the case determination is made in step S521 that Expression (27) is not satisfied, or in the case determination is made in step S526 that Expression (30) is not satisfied, we can say that there are few pixels determined to be valid within the computation block. Accordingly, in step S528 the flag setting unit 452 sets the gradient flag value to "3" which inhibits gradient method computing processing, outputs the gradient flag (gladflg=3) to the gradient method computing unit 405 and evaluation determining unit 412, and ends the gradient method execution determining processing. The flow is then returned to step S305 in FIG. 32 and is advanced to step S306, whereby gradient method computing processing is executed in accordance with the gradient flag (gladflg=3).

Thus, a gradient flag according to the gradient state of the computation block (i.e. the number of valid pixels, the number of pixels having horizontal/vertical gradient among the valid pixels, the number of pixels having horizontal gradient, and number of pixels having vertical gradient among the valid pixels) is output to the gradient method computing unit 405 and evaluation determining unit 412.

Thus, with the valid pixels determining unit 404 in FIG. 40, the ratio of pixels having only horizontal gradient or vertical gradient is obtained by using the Expression (19) through Expression (21) which are conditional expressions to determine valid pixels, and gradient method execution determining is performed based thereupon, so there is no need to obtain horizontal gradient or vertical gradient again. Accordingly, compared to the case of the valid pixels determining unit 404 in FIG. 26 described above, the computing load can be reduced.

Next, of the processing performed by the gradient method computing unit 405 in FIG. 41, details of the independent gradient method computing processing will be described with reference to the flowchart in FIG. 44. Note that the gradient method computing processing performed by the gradient method computing unit 405 in FIG. 41 has basically the same processing as the gradient method computing processing performed by the gradient method computing unit 405 in FIG. 27 described above with reference to FIG. 36 except for the independent gradient method computing processing in steps S406 and S408, so the description thereof will be omitted.

Figure 36:
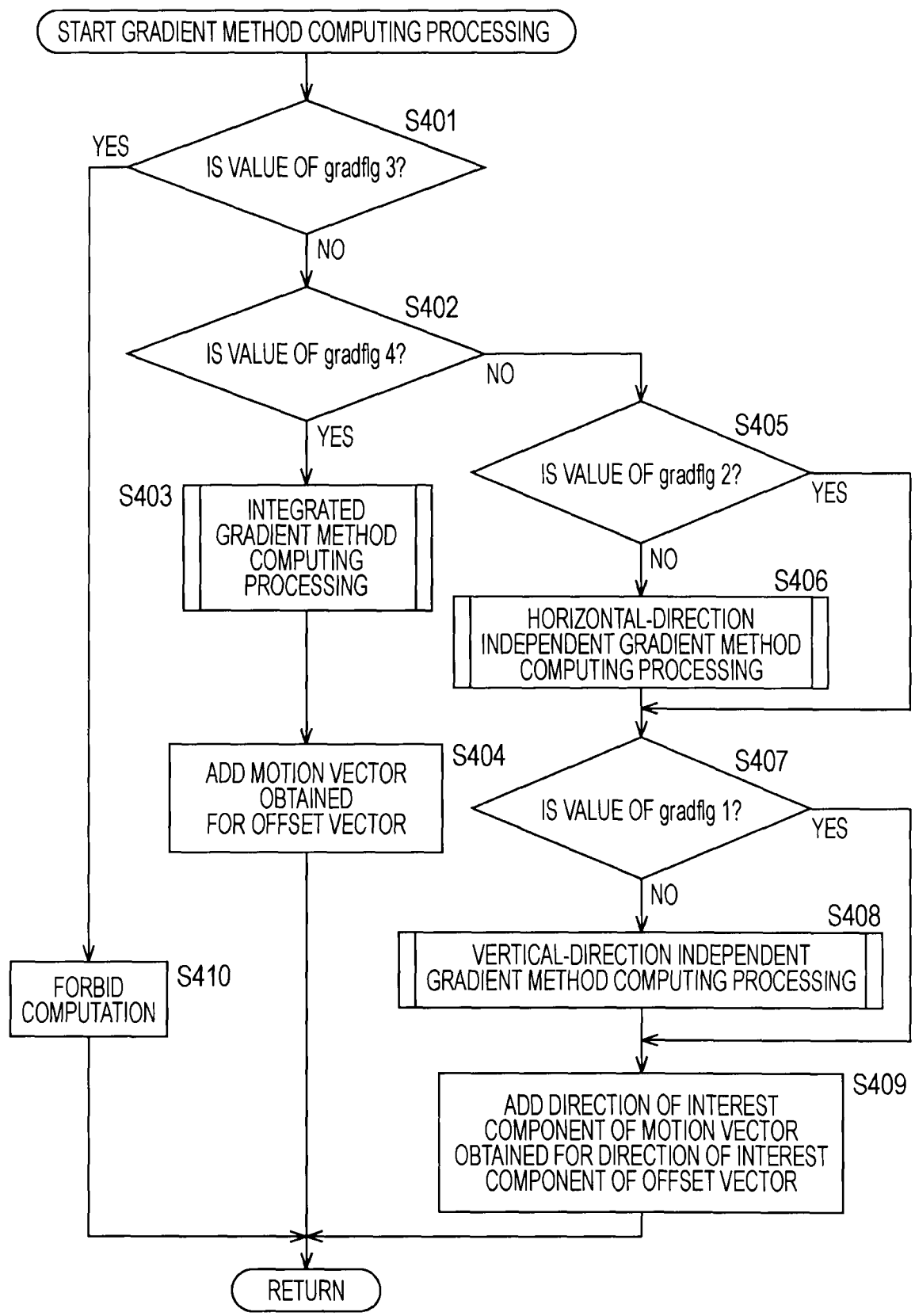
FIG. 36 is a flowchart for describing the gradient method computing processing performed in step S306 in FIG. 32.
Figure 44:
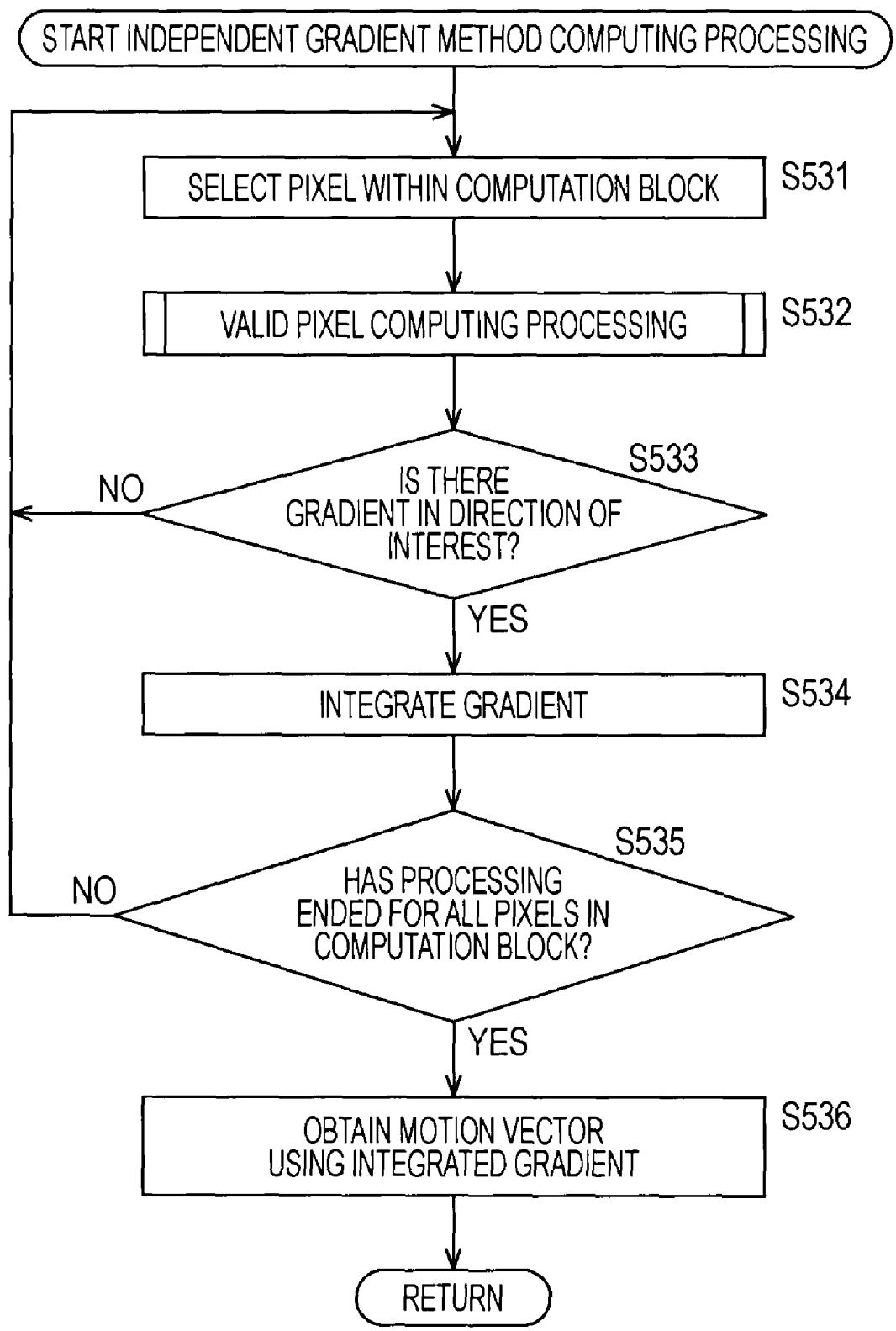
FIG. 44 is a flowchart for describing another example of the independent gradient method execution determining processing performed in step S406 in FIG. 36.

That is to say, FIG. 44 is another example of the independent gradient method computing processing described above with reference to FIG. 38 which is performed in step S406 or S408 in FIG. 36, and the processing in steps S531, S532, and S534 through S536 in FIG. 44 are basically the same as the processing in steps S441, S442, and S445 through S447 in FIG. 38, so the detailed description thereof will be omitted. Also, the case of the horizontal direction is described in FIG. 44 as well, but even in the case of the vertical direction, only the object direction component differs, and the processing is basically the same as the case of the horizontal direction.

Under control of the valid pixels determining unit 471, each unit of the pixel difference calculating unit 461 in FIG. 41 selects one pixel within the computation block in step S531, and the flow is advanced to step S532, whereby valid pixel computing processing is executed. The valid pixel computing processing is basically the same as the valid pixel computing processing described above with reference to FIG. 34 so the description thereof will be omitted.

The pixel difference $\Delta x$ in the horizontal direction and pixel difference $\Delta y$ in the vertical direction of the frame t+1 of the selected pixel, the pixel difference $\Delta x$ in the horizontal direction and pixel difference $\Delta y$ in the vertical direction of the frame t, and the pixel difference $\Delta t$ in the temporal direction between the frame t+1 and the frame t are obtained with the valid pixel computing processing in step S532, and employing these, logical operations is performed for the Expression (19) which is a condition of interest in the horizontal direction by the horizontal gradient determining unit 471-2, for the Expression (20) which is a condition of interest in the vertical direction by the vertical gradient determining unit 471-3, and for the Expression (21) which is a condition of interest in the horizontal/vertical directions by the horizontal/vertical gradient determining unit 471-1. After this, the flow is returned to step S532 in FIG. 44 and is advanced to step S533.

In step S533, the horizontal/vertical gradient determining unit 471-1 and horizontal gradient determining unit 471-2 determine whether or not the selected pixel has gradient in the object direction (in the present case, the horizontal direction). That is to say, the horizontal/vertical gradient determining unit 471-1 determines whether or not the selected pixel satisfies the condition of interest in the horizontal/vertical directions (Expression (21)), the horizontal gradient determining unit 471-2 determines whether or not the selected pixel satisfies the condition of interest in the horizontal direction (Expression (19)), and in the case determination is made that the selected pixel satisfies the condition of interest in the horizontal/vertical directions by the horizontal/vertical gradient determining unit 471-1, or in the case determination is made that the selected pixel satisfies the horizontal condition of interest by the horizontal gradient determining unit 471-2, the selected pixel is determined to have gradient in the horizontal direction, whereby the flow is advance to step S534.

Also, in step S533, in the case that determination is made that the selected pixel does not satisfy the condition of interest in the horizontal/vertical direction by the horizontal/vertical determining unit 471-1, and in the case that determination is made that the selected pixel does not satisfy the horizontal condition of interest by the horizontal gradient determining unit 471-2, the selected pixel is determined to have no gradient in the horizontal direction, whereby the flow is returned to step S531, and the processing thereafter is repeated.

Note that in the case of the vertical direction, in the case that the selected pixel is determined to have satisfied the condition of interest in the horizontal/vertical direction by the horizontal/vertical determining unit 431-1, or in the case that the selected pixels is determined to have satisfied the vertical condition of interest by the vertical gradient determining unit 431-3, the selected pixels is determined to have gradient in the vertical direction.

The horizontal/vertical gradient determining unit 471-1 or the horizontal gradient determining unit 471-2 selects the pixel determined in step S533 to have horizontal gradient to as an object for gradient method computation, supplies the pixel difference Δx in the horizontal direction and the pixel difference Δt in the temporal direction of the pixel thereof to the independent gradient computing unit 463-2, and in step S534 controls the independent gradient computing unit 463-2 to integrate the supplied gradient (pixel difference).

The horizontal/vertical gradient determining unit 471-1 determines in step S535 whether or not the processing for all of the pixels within the computation block has ended. In the case determination is made in step S535 that the processing for all of the pixels within the computation block has not yet ended, the flow is returned to step S441, and the processing thereafter is repeated.

In the case determination is made in step S535 that the processing for all of the pixels within the computation block has ended, the horizontal/vertical gradient determining unit 471-1 controls the independent gradient computing unit 463-2 in step S536, and using the integrated gradient, calculates the horizontal direction component of the motion vector vn.

The independent gradient computing unit 463-2 uses the integrated gradient and Expression (23) in step S536 to obtain the object direction (horizontal direction) component of the motion vector vn, and outputs the horizontal direction component of the obtained motion vector vn to the vector calculating unit 464. After this, the flow is returned to step S406 in FIG. 36, and is advanced to step S407.

Figure 37:
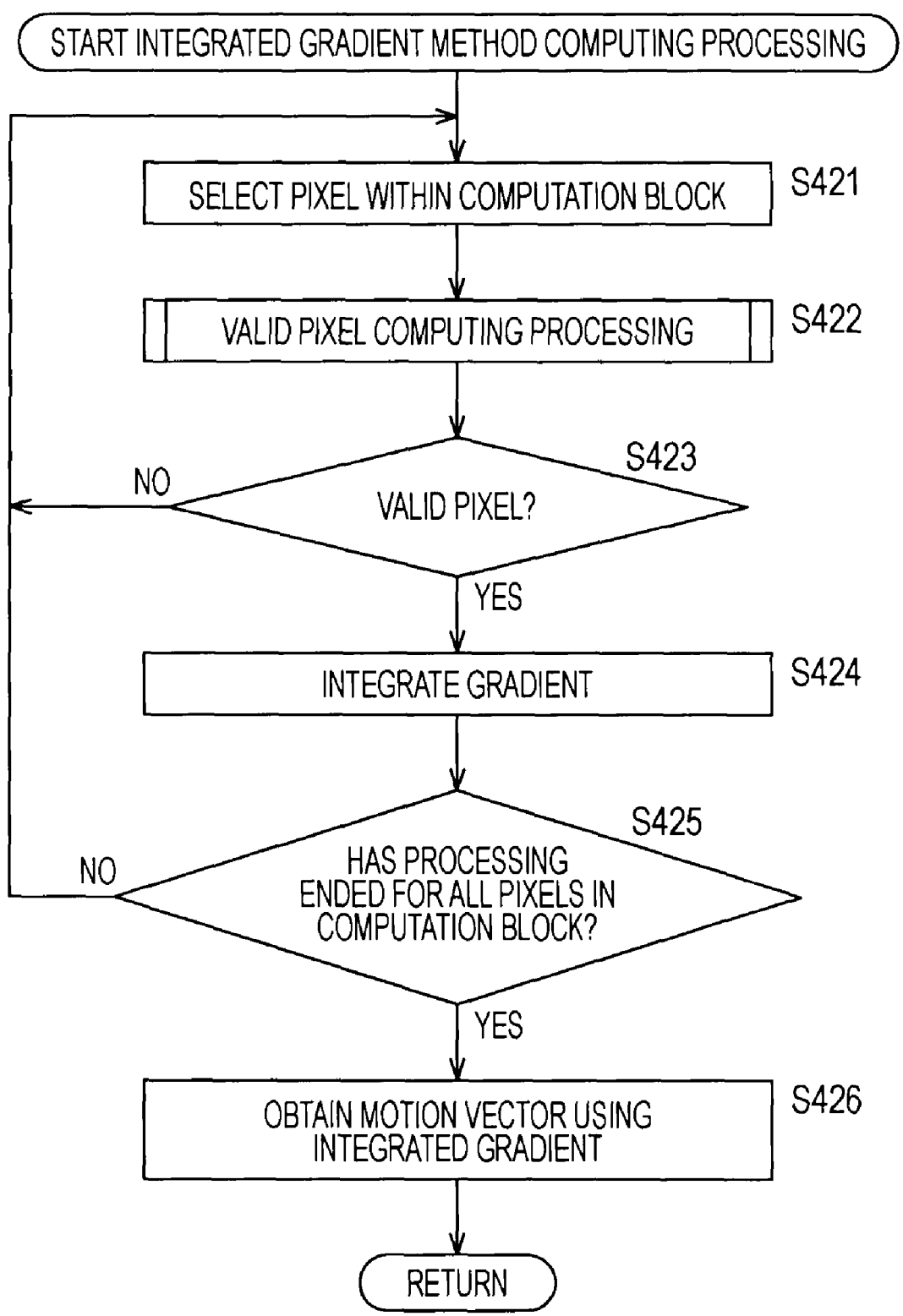
FIG. 37 is a flowchart for describing integrated gradient method computing processing performed in step S403 in FIG. 36.

Thus, with the gradient method computing unit 405 in FIG. 41 also, similar to the case of the gradient method computing unit 405 in FIG. 37, of the valid pixels in the computation block only the gradient of the pixels having gradient in an object direction is integrated, and gradient method computing processing is executed in the object direction. Thus, even if the computation block is a one-sided gradient region, the object direction component of an erroneous motion vector is suppressed from being detected as to the computation block.

Thus, an arrangement is made for not only determining the valid pixels in the computation block, but for determining pixels of a one-sided gradient wherein only either the horizontal gradient or vertical gradient exist in the valid pixels, and based on the ratio of one-sided gradient pixels within the valid pixels, the gradient method computation can be switched, or the vector for evaluation can be switched, so as to perform iterative determining, so the detection precision of the motion vector, particularly in the one-sided gradient region, can be improved more than in a case of only determining valid pixels.

Next, another configuration example of the vector detection unit 52 in FIG. 17 will be described with reference to FIG. 45.

As described above, the motion vector V obtained with the vector detection unit 52 in FIG. 17, is stored as a motion vector used for allocation processing (hereafter also called detection vector) at a later stage to the detected-vector memory 53, and is also used as an initial candidate vector (candidate vector of an initial vector) by the initial vector selection unit 101. Conversely, with the vector detection unit 52 in FIG. 45, an arrangement is made so as to separately store the detection vector used for vector allocation processing at a later stage and the initial candidate vector used with the initial vector selection processing.

Figure 45:
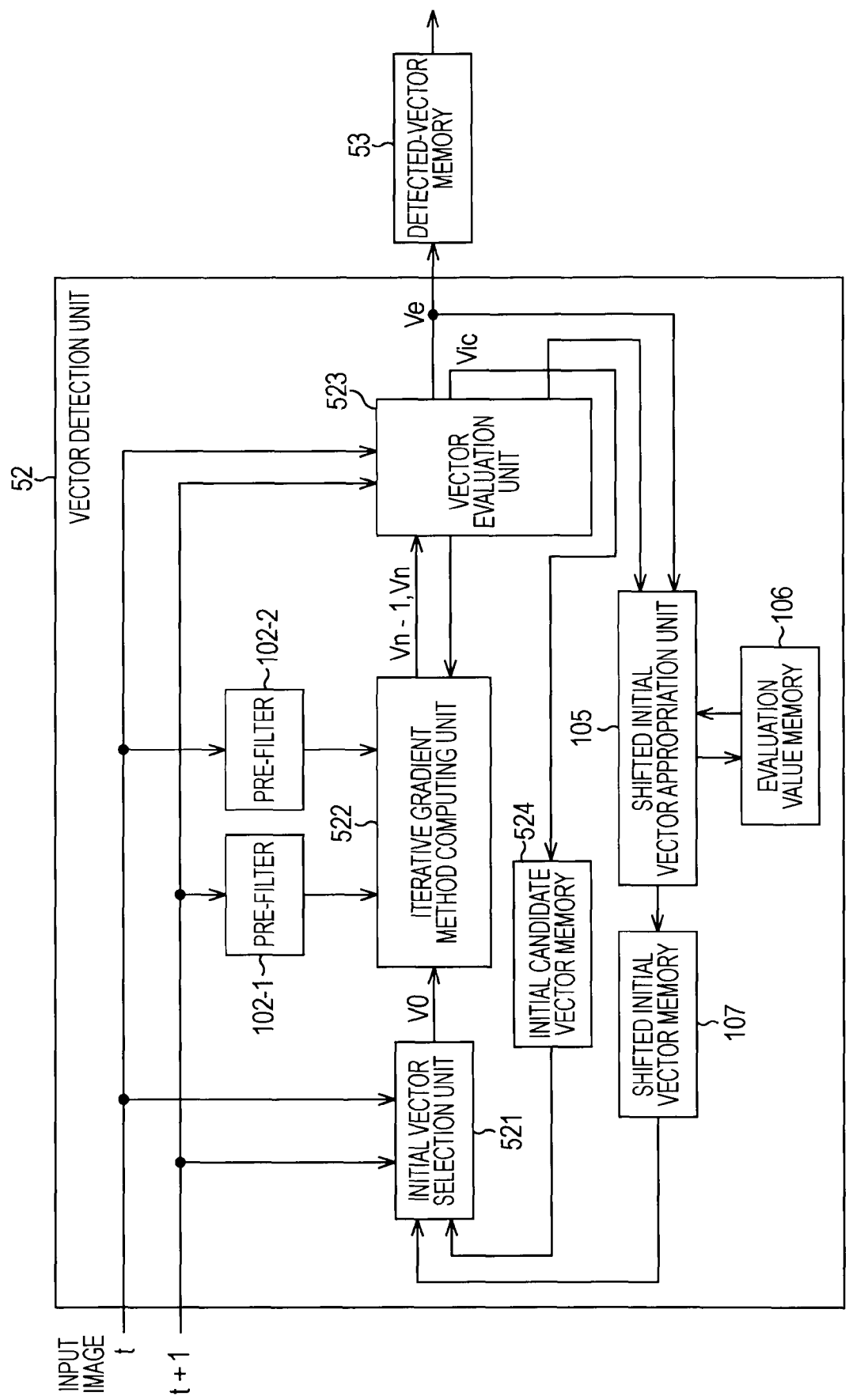
FIG. 45 is a block diagram illustrating another configuration of the vector detection unit shown in FIG. 2.

The vector detection unit 52 in FIG. 45 has a commonality with the vector detection unit 52 in FIG. 17 in having pre-filters 102-1 and 102-2, a shifted initial vector allocation unit 105, evaluation value memory 106, and shifted initial vector memory 107, but differs from the vector detection unit 52 in FIG. 17 in that the initial vector selection unit 101 is replaced by an initial vector selection unit 521, the iterative gradient method computing unit 103 is replaced by an iterative gradient method computing unit 522, the vector evaluation unit 104 is replaced by the vector evaluation unit 523, and the initial candidate vector memory 524 is added.

Note that the initial vector selection unit 521 obtaining the motion vector of the block periphery obtained in the past, not from the detected-vector memory 53, but from the initial candidate vector memory 524, is the only difference, and the configuration thereof is basically the same as the vector selection unit 101 in FIG. 17 so detailed description will be omitted.

In the example in FIG. 45, the iterative gradient method computing unit 522 is configured similarly to the iterative gradient method computing unit 103 in FIG. 17, and calculates a motion vector Vn with a gradient method for each predetermined block, employing the initial vector V0 which is input from the initial vector selection unit 101, and the frame t and frame t+1 which are input via the pre-filters 102-1 and 102-2. At this time, the iterative gradient method computing unit 522 compares the number of valid pixels employed as objects of gradient method, not only with a predetermined threshold value α, but also with a predetermined threshold value β (β<α), and supplies a counter flag (countflg) in accordance with the comparison results thereof to the vector evaluation unit 523.

Also, similar to the iterative gradient method computing unit 103, the iterative gradient method computing unit 522 outputs the initial vector V0 and the calculated motion vector Vn to the vector evaluation unit 523, repeatedly performs computation of the gradient method based on the evaluation results of the motion vector by the vector evaluation unit 104, and calculates the motion vector Vn. Note that the details of the iterative gradient method computing unit 522 will be described later along with the details of the vector evaluation unit 523, with reference to FIG. 46.

Similar to the vector evaluation unit 104 in FIG. 17, the vector evaluation unit 523 has an evaluation value computing unit 61B, and causes the evaluation value computing unit 61B to obtain the motion vector Vn−1 (or initial vector V0) from the iterative gradient method computing unit 103 and the evaluation value dfv of the motion vector Vn, and based on the evaluation value dfv obtained by the evaluation value computing unit 61B, controls the iterative gradient method computing unit 522 to repeatedly execute the gradient method computation, and finally select that which has high reliability which is based on the evaluation value dfv.

At this time, the vector evaluation unit 523 obtains a detection vector Ve to be used in allocation processing at a later stage and an initial candidate vector Vic to be used in the event of initial vector selection with the initial vector selection unit 521, according to the evaluation value dfv of each vector and the counter flag from the iterative gradient method computing unit 522, from a motion vector Vn−1 (or initial vector V0), motion vector Vn, or 0 vector from the iterative gradient method computing unit 522. The vector evaluation unit 523 stores the obtained detection vector V3 in a detected-vector memory 53, and stores the initial candidate vector Vic in an initial candidate vector memory 524.

The initial candidate vector Vic obtained by the vector evaluation unit 523 is stored in the initial candidate vector memory 524, corresponding to the detecting object block.

Figure 46:
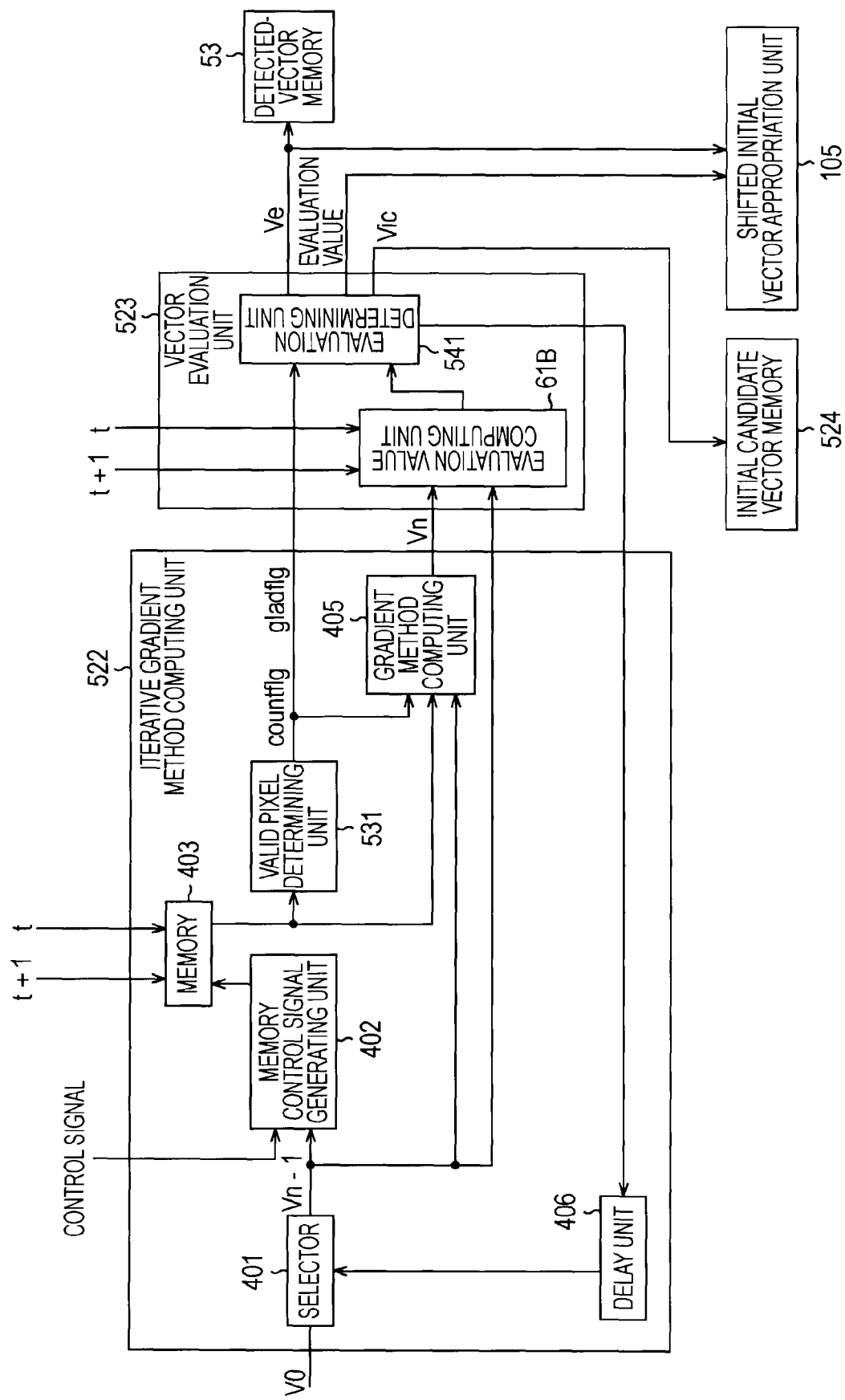
FIG. 46 is a block diagram illustrating the configuration of the iterative gradient method computing unit and vector evaluation unit shown in FIG. 45.

FIG. 46 is a block diagram illustrating the configuration of the iterative gradient method computing unit 522 and vector evaluation unit 523.

The iterative gradient method computing unit 522 in FIG. 46 has a commonality with the iterative gradient method computing unit 103 in FIG. 25 in having a selector 401, memory control signal generating unit 402, memory 403, gradient method computing unit 405, and delay unit 406, but differs from the iterative gradient method computing unit 103 in FIG. 25 in that the valid pixels determining unit 404 is replaced by the valid pixels determining unit 531.

That is to say, similar to the valid pixels determining unit 404, by computing the pixel difference of the computation block for frame t and frame t+1, for example, using the object pixel value supplied from the memory 403, the valid pixels determining unit 531 determines whether or not the number of valid pixels for gradient method computation within the computation block is greater than a predetermined threshold value, and supplies a counter flag (countflg) in accordance with the determining results thereof to the gradient method computing unit 405 and vector evaluation unit 523.

At this time, for the determining of the number of valid pixels for gradient method computation by the valid pixels determining unit 531, two types of threshold values are used, which are the predetermined threshold value α and predetermined threshold value β, where α>β.

In the case determination is made that the number of pixels valid for gradient method computation in the computation block is greater than a predetermined threshold value α, the valid pixels determining unit 531 supplies the counter flag (countflg=1) to the gradient method computing unit 405 and vector evaluation unit 523, and in the case determination is made that the number of pixels valid for gradient method computation in the computation block is less than a predetermined threshold value α, and greater than a predetermined threshold value β, the valid pixels determining unit 531 supplies the counter flag (countflg=10) to the gradient method computing unit 405 and vector evaluation unit 523, and in the case determination is made that the number of pixels valid for gradient method computation in the computation block is less than a predetermined threshold value β, the valid pixels determining unit 531 supplies the counter flag (countflg=0) to the gradient method computing unit 405 and vector evaluation unit 523.

Also, similar to the valid pixels determining unit 404, the valid pixels determining unit 531 obtains the gradient state of each of the horizontal direction and vertical direction for the pixels determined to be valid pixels in the computation block, determines whether or not there is a greater ratio of pixels having a gradient only in either the horizontal direction or vertical direction, and supplies the gradient flag (gladflg) according to the determining results thereof to the gradient method computing unit 405 and vector evaluation unit 523.

The vector evaluation unit 523 in FIG. 46 has a commonality with the vector evaluation unit 104 in FIG. 25 in having an evaluation value computing unit 61B, but differs from the vector evaluation unit 104 in FIG. 25 in that the evaluation determining unit 541 has replaced the evaluation determining unit 412.

The evaluation value determining unit 523 determines whether or not the gradient method computing processing is iterated, based on the counter flag and gradient flag supplied from the valid pixels determining unit 531, and obtains each of the detection vector Ve and initial candidate vector Vic.

That is to say, the evaluation value determining unit 523 selects and modifies that which has greater reliability by comparing the evaluation value dfv which is computed by the evaluation value computing unit 61B, obtains the motion vector V, as necessary, and in the case the counter flag (countflg=1) is supplied from the valid pixels determining unit 531 (i.e. in the case the number of valid pixels is greater than the predetermined threshold value α), determination is made whether or not to iterate the gradient method computing processing, and in the case determination is made to perform iteration, the obtained motion vector V is output to the delay unit 406.

Also, in the case of not performing iteration to the gradient method computing processing, the evaluation value determining unit 523 stores the obtained motion vector V or 0 vector as the detection vector Ve in the detected-vector memory 53, and as the initial candidate vector Vic in the initial candidate vector memory 524, according to the counter flag value.

Specifically, in the case the counter flag (countflg=10) is supplied from the valid pixels determining unit 531 (i.e. in the case the number of valid pixels is less than the predetermined threshold value α and greater than the predetermined threshold value β), the evaluation value determining unit 523 stores the 0 vector as the detection vector Ve in the detected-vector memory 53, while storing the obtained motion vector V as the initial candidate vector Vic in the initial candidate vector memory 524.

In the case the counter flag (countflg=0) is supplied from the valid pixels determining unit 531 (i.e. in the case the number of valid pixels is less than the predetermined threshold value β), the evaluation value determining unit 523 stores the 0 vector as the detection vector Ve in the detected-vector memory 53, and as the initial candidate vector Vic in the initial candidate vector memory 524.

That is to say, with the valid pixels determining unit 531, determination is made whether or not to drop the detection vector Ve to a 0 vector, with the predetermined threshold value α as to the ratio of valid pixel numbers. Accordingly, in the case that the predetermined threshold value α is approximately the same as the threshold value with the valid pixels determining unit 404 in FIG. 25, the accuracy of the detection vector Ve with the vector allocating unit 54 at a later stage is approximately the same as in the case in FIG. 25.

Further, with the valid pixels determining unit 531, determination is made at this time whether or not to drop the initial candidate vector Vic to a 0 vector, with the predetermined threshold value β (<predetermined threshold value α). For example, in the case the number of valid pixels is greater than the predetermined threshold value β, the initial candidate vector Vic is compared to the detection vector Ve, whereby if the accuracy of the detecting processing results is low, some vector value can be held which is low but not a 0 vector.

Thus, with the vector detecting processing with another surrounding block, in the case the Vic is employed as an initial candidate vector, the ratio of 0 vector in a candidate vector group is lower than in the case of dropping to 0 vector in the case that the number of valid pixels in the valid pixels determining unit 404 in FIG. 25 is less than the predetermined threshold value α, and the variation of the vector value in a candidate vector group increases. As a result, with the valid pixels determining unit 531 in FIG. 46, the possibility of a vector existing which is near the true motion amount in the candidate vector is greater than in the case of the valid pixels determining unit 404 in FIG. 25, and compared to the case of the valid pixels determining unit 404 in FIG. 25, the accuracy of the initial vector can be improved.

Figure 47:
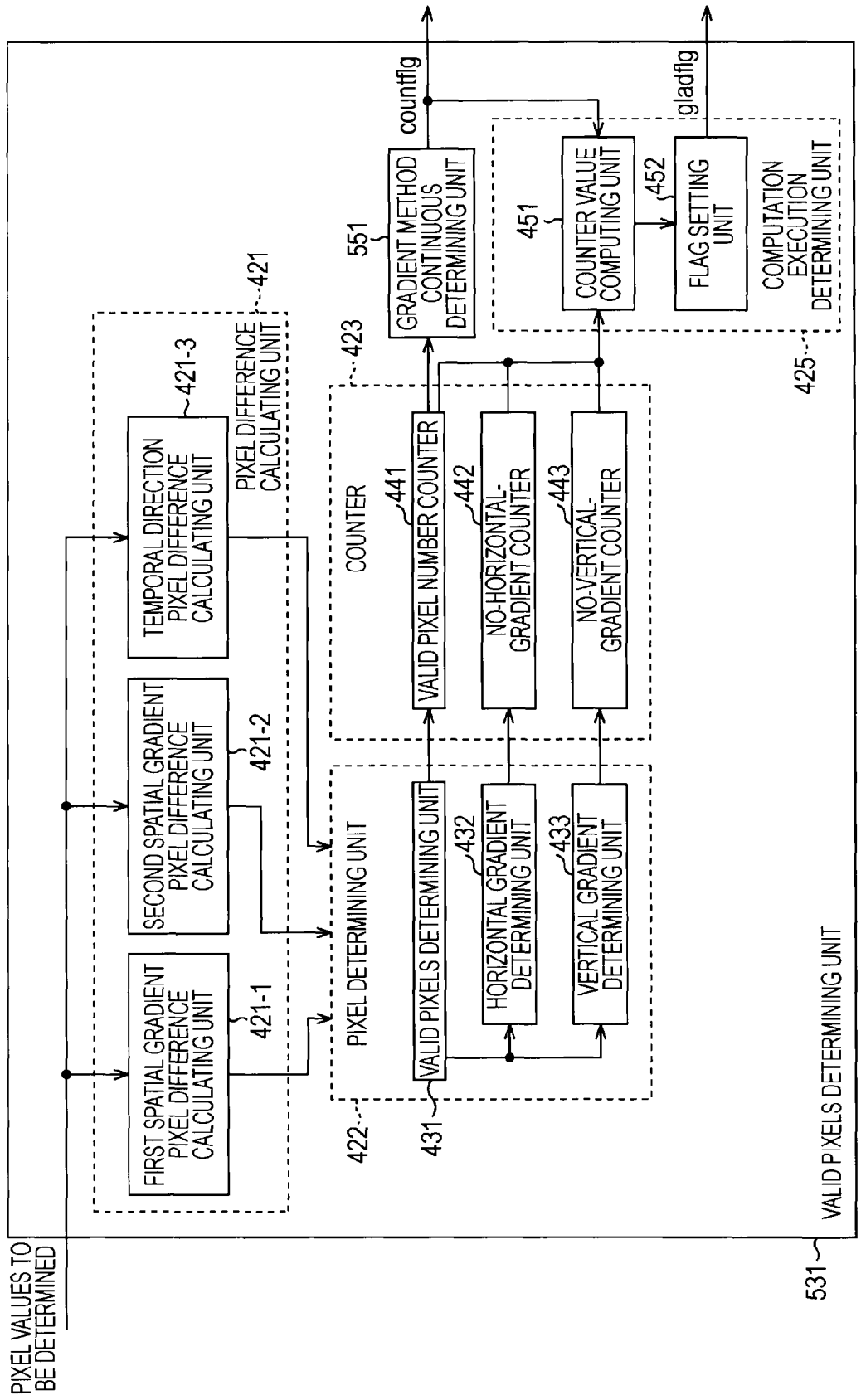
FIG. 47 is a block diagram illustrating the configuration of the valid pixels determining unit shown in FIG. 46.

FIG. 47 is a block diagram illustrating a detailed configuration example of the valid pixels determining unit 531.

The valid pixels determining unit 531 in FIG. 47 has a commonality with the valid pixels determining unit 404 in FIG. 26 in having a pixel difference calculating unit 421, pixel determining unit 422, counter 423, and computation execution determining unit 425, and differs from the valid pixels determining unit 404 in FIG. 26 in that the gradient method continuous determining unit 424 is replaced by a gradient method continuous determining unit 551.

That is to say, the gradient method continuous determining unit 551 determines whether or not the number of pixels valid for the gradient method computation in the computation block is greater than the predetermined threshold value α, and further determines whether or not the number of pixels valid for gradient method computation in the computation block is greater than the predetermined threshold value β with reference to the valid pixel number counter 441.

In the case determination is made that the number of pixels valid for gradient method computation in the computation block is greater than the predetermined threshold value α, the gradient method continuous determining unit 551 executes gradient method computing, and supplies the counter flag (countflg=1) for determining the detection vector Ve and the initial vector Vic as to be the motion vector V obtained by the gradient method computation to the computation execution determining unit 425, gradient method computing unit 405, and vector evaluation unit 523.

Also, in the case determination is made that the number of pixels valid for gradient method computation in the computation block is less than the predetermined threshold value α and greater than the predetermined threshold value β, the gradient method continuous determining unit 551 executes gradient method computing, but determines the detection vector Ve to be 0 vector, and supplies the counter flag (countflg=10) determining the initial candidate vector Vic to be the motion vector V obtained with the gradient method computing to the gradient method computing unit 405 and vector evaluation unit 523.

Further, in the case determination is made that the number of pixels valid for gradient method computation in the computation block is less than the predetermined threshold value β, the gradient method continuous determining unit 551 stops the gradient method computing, and supplies the counter flag (countflg=0) determining the detection vector Ve and the initial candidate vector Vic to be 0 vectors to the gradient method computing unit 405 and vector evaluation unit 523.

Next, a comparison will be described between the case of the vector detection unit 52 in FIG. 17 which employs the detecting vector as the initial candidate vector, and the case of the vector detection unit 52 in FIG. 45 which employs separate detection vectors for the detection vector and the initial candidate vector as needed, with reference to FIG. 48 through FIG. 62.

With the example in FIG. 48 through FIG. 62, the frame t at a point-in-time t and frame t+1 at point-in-time t+1 for two 24P signals are illustrated, and the arrow T shows the direction of passage of time from the upper frame t at point-in-time t in the diagram to the lower frame t+1 at point-in-time t+1. Also, the divider shown on the frame t shows a barrier for each block, wherein blocks A0 through A2 are shown from the left of the diagram on the frame t, and blocks B-3 through B-1 corresponding to unshown blocks on the frame t, and blocks B0 through B2 corresponding to the blocks A0 through A2, are shown on the frame t+1 from the left of the diagram. That is to say, on the frame t and frame t+1, the blocks are shown corresponding to the blocks with the same numbers.

Also, with FIG. 48 through FIG. 50, FIG. 56, FIG. 57, FIG. 60, and FIG. 62, an interpolation frame F1 at point-in-time t+0.4 and an interpolation frame F2 at point-in-time t+0.8 are shown between the frame t and frame t+1 for example, which are generated based on the detected motion vectors.

Figure 48:
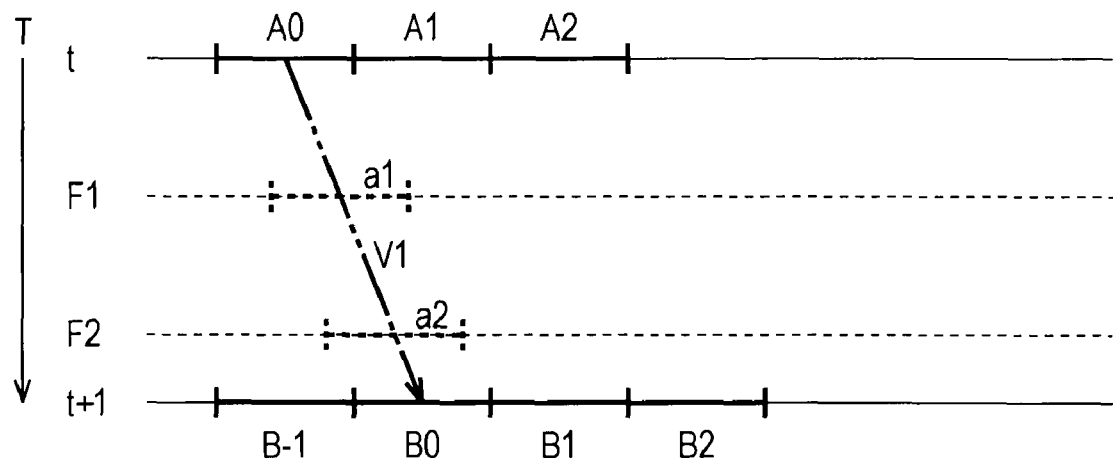
FIG. 48 is a diagram for describing an interpolated frame generated using a motion vector detected by the vector detection unit shown in FIG. 17.

With the example in FIG. 48, an example of an interpolation frame generated in the case that a motion vector is correctly detected by the vector detection unit 52 in FIG. 17. That is to say, a true motion vector V1 is correctly detected as the motion between the blocks (block A0 and block B0) corresponding to between the frame t and frame t+1, thus the image blocks a1 and a2 on the interpolation frame F1 and interpolation frame F2 are correctly generated.

Figure 49:
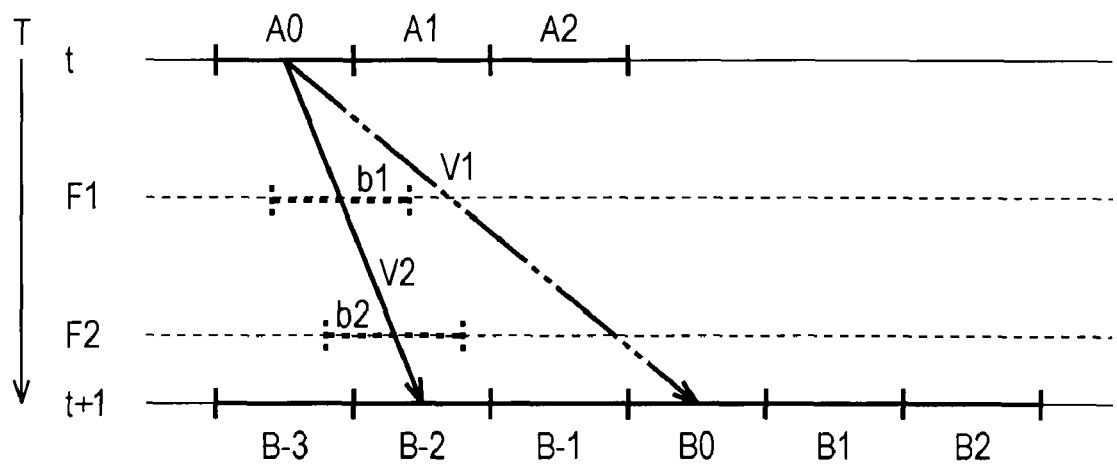
FIG. 49 is a diagram for describing an interpolated frame generated using a motion vector detected by the vector detection unit shown in FIG. 17.

However, as shown in the example in FIG. 49, the motion vector V1 is not necessarily constantly obtained correctly. For example, if the number of valid pixels employed for gradient method computing is small as a result of valid pixels determining executed by the vector detection unit 52 in FIG. 17, as a result of computing with a computation block having a small number of valid pixels, the obtained motion vector V2 is greatly diverted from the true motion vector V1 (i.e. the motion vector V1 correctly detected between the corresponding block A0 and block B0), whereby the blocks at both ends of the motion vector V2 (block A0 and block B-2) are not corresponding blocks. Accordingly, the image blocks b1 and b2 on the interpolation frame F1 and interpolation frame F2 which are generated by employing this motion vector V2 often exhibit breakdown.

Conversely, with the detecting unit 52 in FIG. 17, as described above with reference to FIG. 32, in the case that the number of valid pixels is at or less than a predetermined threshold, the detecting results become a 0 vector S0. That is to say, since the number of valid pixels is small, the motion vector V2 is greatly diverted from the true motion vector V1, so as shown in the example in FIG. 50, the motion vector V2 which is the detection result becomes a 0 vector S0. Thus, the breakdown in the image blocks c1 and c2 on the interpolation frame F1 and interpolation frame F2 which are generated employing the 0 vector S0 can be suppressed to roughly the same amount as the interpolating processing in the case of having no motion compensation, whereby the comparatively stable image blocks c1 and c2 are generated.

On the other hand, the initial vector serving as an initial offset with the iterative gradient method is selected from the detecting results of the surrounding blocks (including time-space), as described above with reference to FIG. 23.

Figure 51:
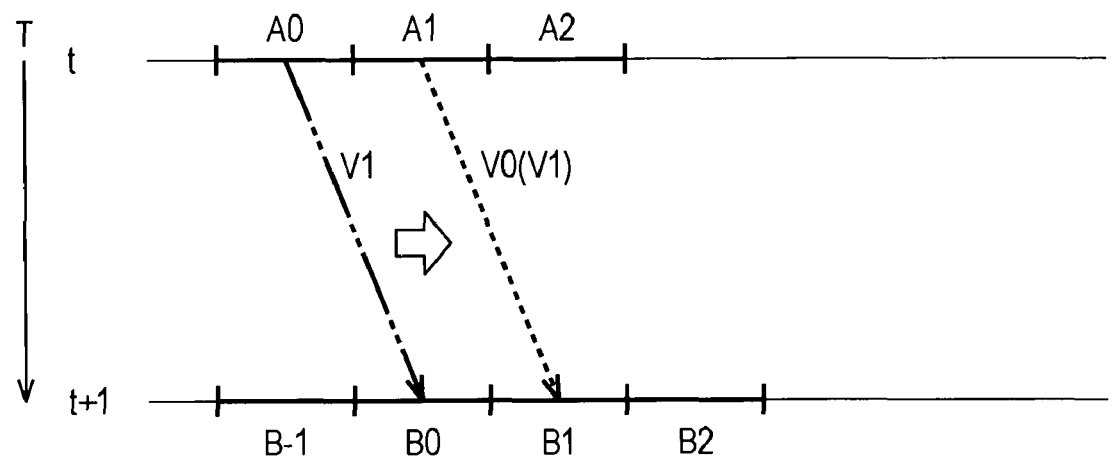
FIG. 51 is a diagram for describing the initial vector selection method with the vector detection unit shown in FIG. 17.

In the case that a true motion vector V1 is correctly detected as the motion between the blocks (block A0 and block B0) corresponding to between the frame t and frame t+1 (the case in FIG. 48), as shown in the example in FIG. 51, with the detection object block A1, there may be the case wherein the true motion vector V1 correctly detected with the block A0 which is the block adjacent on the left is selected as the initial vector V0. That is to say, employing the detection results of a surrounding block as an initial vector has the advantages of having a higher probability of being included in the same object as the detection object block, and since the motion quantity relativity is higher, if the motion vector is correct, motion propagation effect between blocks is obtained, resulting in faster convergence of motion detecting processing.

Figure 50:
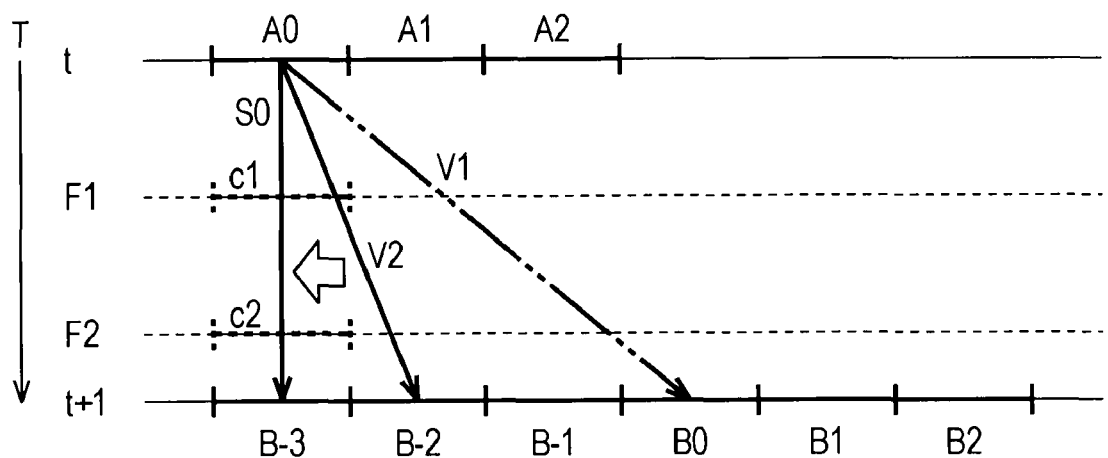
FIG. 50 is a diagram for describing an interpolated frame generated using a motion vector detected by the vector detection unit shown in FIG. 17.
Figure 52:
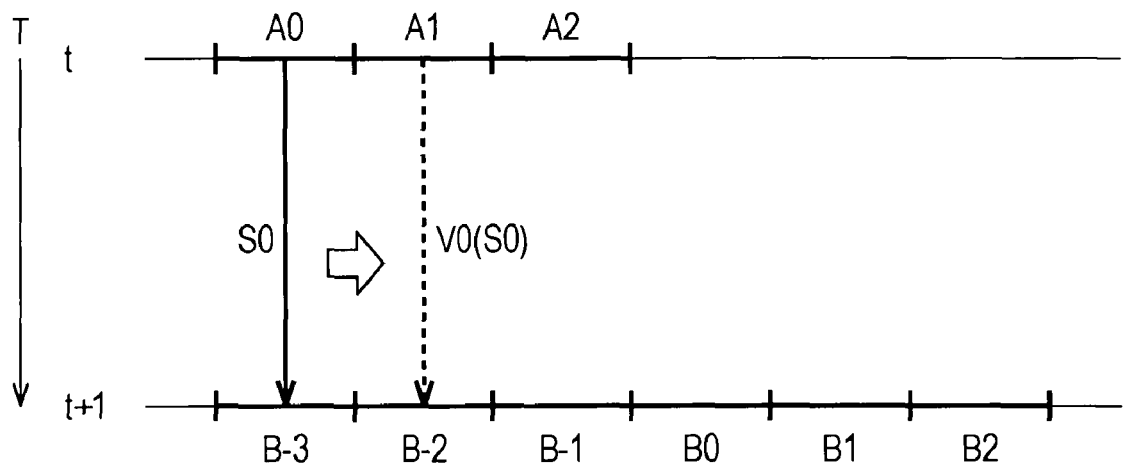
FIG. 52 is a diagram for describing the initial vector selection method with the vector detection unit shown in FIG. 17.

However, as with the case in FIG. 50 described above, in the case that the surrounding blocks have no accurate motion vector V2 from the detecting results, and have many 0 vectors S0, with the block A1 which is a detection object, a 0 vector S0 (the motion vector detected in the block A0 which is the block adjacent on the left) is readily selected as the initial vector V0, as shown in the example in FIG. 52.

Figure 53:
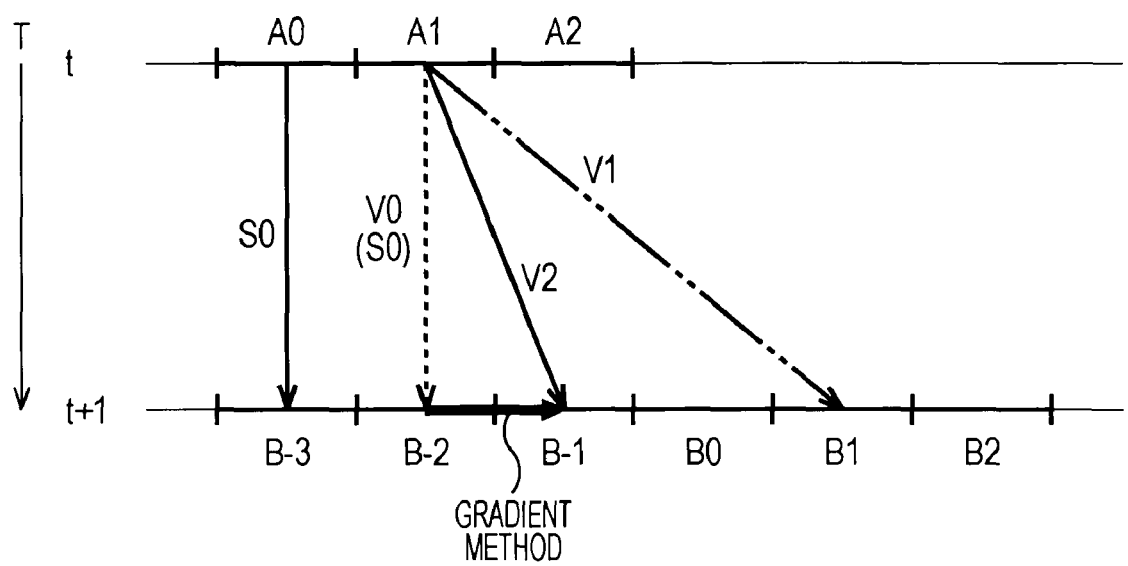
FIG. 53 is a diagram for describing the initial vector selection method with the vector detection unit shown in FIG. 17.
Figure 54:
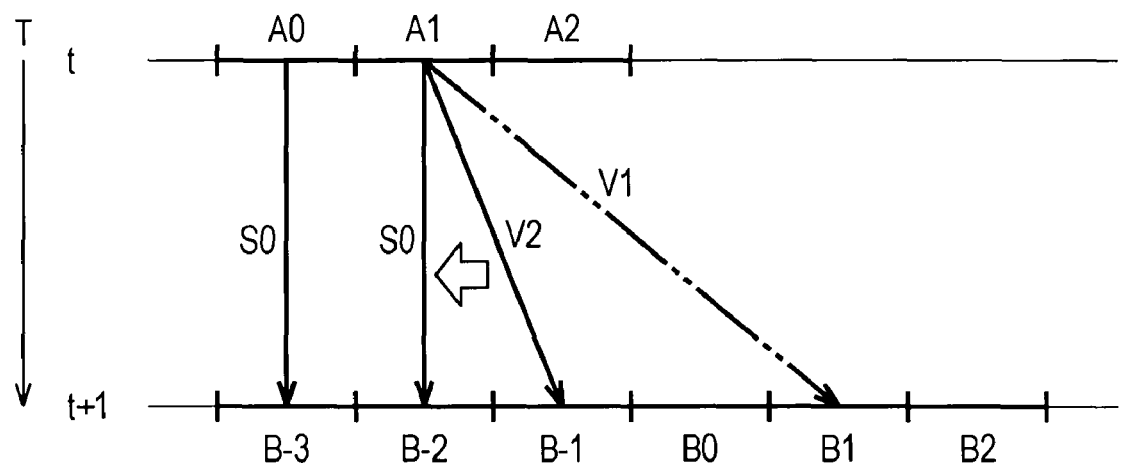
FIG. 54 is a diagram for describing the initial vector selection method with the vector detection unit shown in FIG. 17.

At this time, even if gradient method computing is performed by employing the initial vector V0 (0 vector S0) in the detection object block A1, the number of valid pixels by the valid pixel determining readily becomes smaller than the predetermined threshold value α in the computation block of block A1, and as shown in the example in FIG. 53, the motion vector V2 of the detection result is greatly diverted from the true motion vector V1, and consequently, as shown in the example in FIG. 54, the detection results often become 0 vector with the detection object block A1 also.

Figure 55:
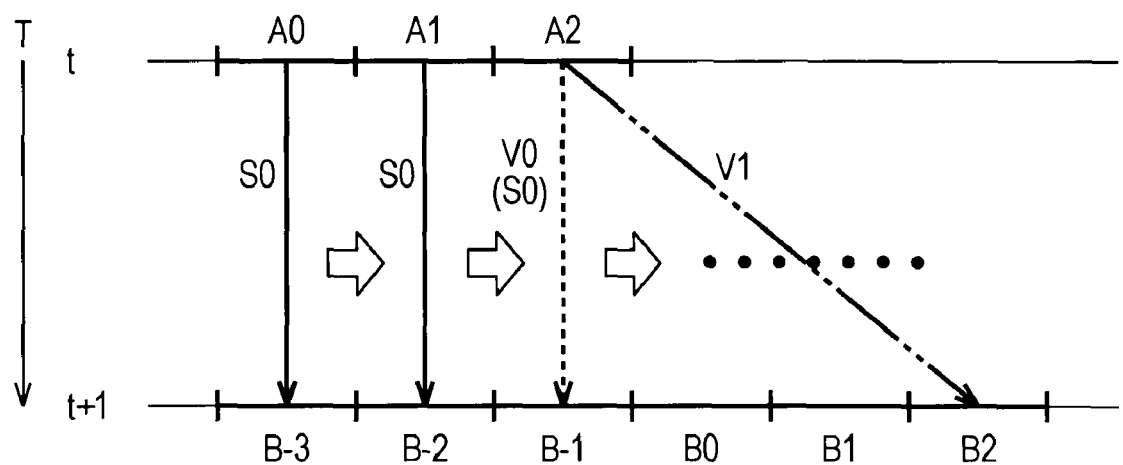
FIG. 55 is a diagram for describing the initial vector selection method with the vector detection unit shown in FIG. 17.
Figure 56:
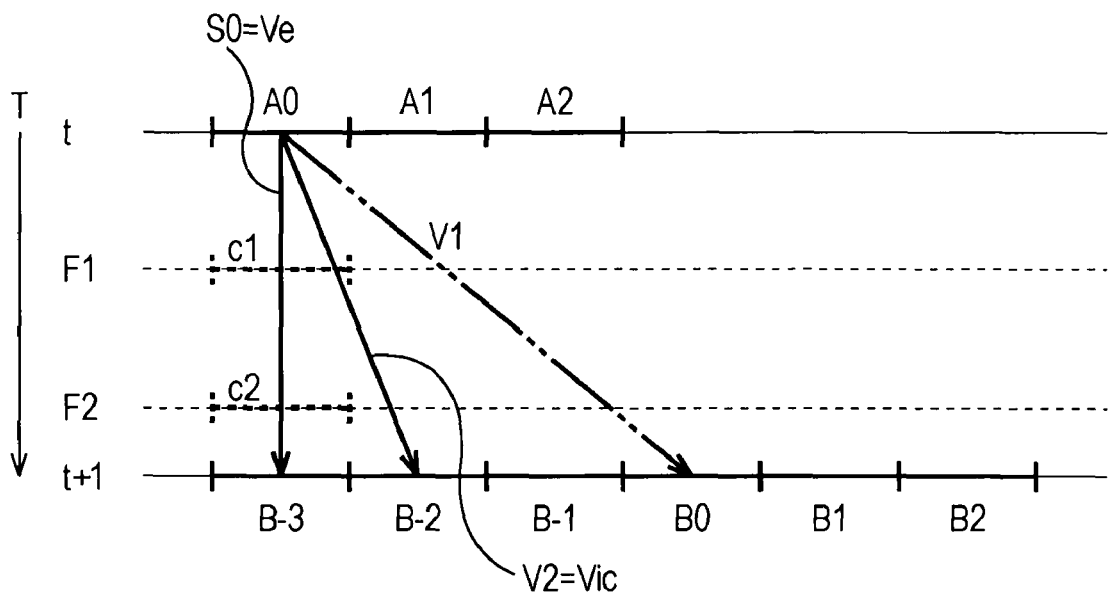
FIG. 56 is a diagram for describing an interpolated frame generated using a motion vector detected with the vector detection unit shown in FIG. 45.

In such a case, further, even if the detection object becomes the next block A2, there is a high probability of similarity to the example in FIG. 54 (i.e. the detection result becomes 0 vector S0), and consequently, as shown in the example in FIG. 55, the 0 vectors S0 are consecutively propagated, whereby convergence of the motion detecting processing (i.e. nearing the true motion vector V1) is delayed.

Thus, with the vector detection unit 52 in FIG. 17 which uses the same vector for a detecting vector to be subjected to allocation at a later stage, and an initial candidate vector serving as a candidate for initial vector selection, in the case that the number of valid pixels of the detection object computation block is at or small than the predetermined threshold value, causing the detecting vector to be 0 vector has the advantage of suppressing breakdown of the image block on the interpolation frame, as described above with reference to FIG. 50, but since the initial candidate vector also becomes 0 vector, convergence of the motion detecting processing is delayed. That is to say, in the case that the number of valid pixels is at or smaller than a predetermined threshold value, as shown in the vector detection unit 52 in FIG. 17, if the detection vector and the initial candidate vector become 0 vectors, this results in decreased quality.

Thus, with the vector detection unit 52 in FIG. 45, in order to suppress decreased quality, valid pixel determining is performed employing two threshold values, and according to the results of the valid pixel determining, the detected motion vector can be switched according to use thereof (whether to be used for allocation processing at a later stage or whether to be used within the vector detection unit 52).

That is to say, in the event of comparing the number of valid pixels in the computation block of a detection object block and the predetermined threshold value α, a new threshold value β (where β<α) which is slightly lower than the predetermined threshold value α is set, and when the number of valid pixels is less than the predetermined threshold value α, rather than immediately setting the motion vector to 0 vector, if the number of valid pixels is less than the predetermined threshold value α, determination is made as to whether the number of valid pixels is greater than the predetermined threshold value β. In the case that the number of valid pixels is smaller than the predetermined threshold value α and greater than the predetermined threshold value β, then as shown in the example in FIG. 56, the detection vector Ve which is employed for allocating processing at a later stage becomes 0 vector S0, but the initial candidate vector Vic becomes the motion vector V2 which is the detection result detected with the gradient method computation.

Figure 57:
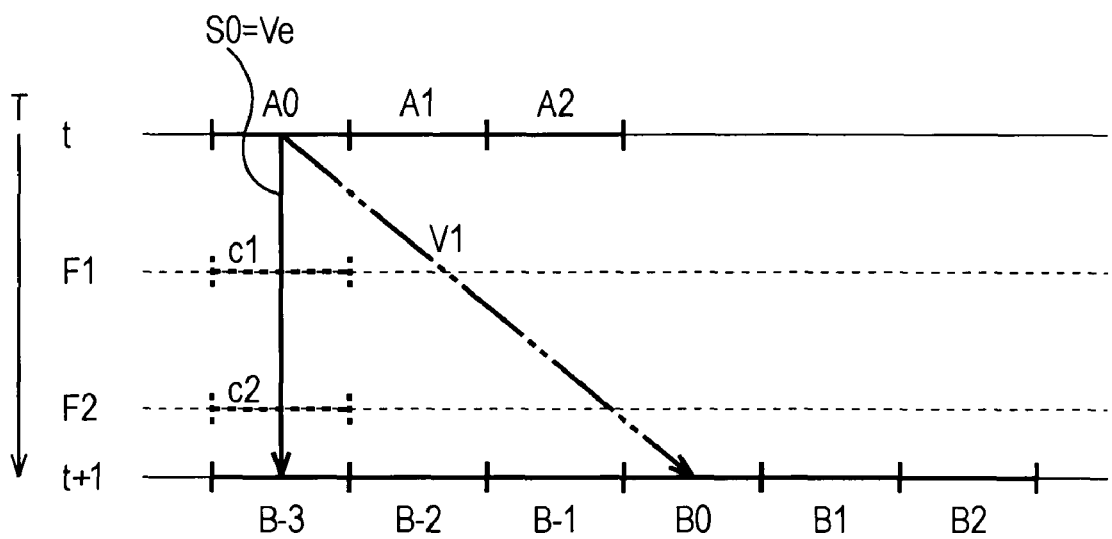
FIG. 57 is a diagram for describing an interpolated frame generated using a motion vector detected with the vector detection unit shown in FIG. 45.

To specifically describe, by causing the 0 vector S0 to be the detection vector Ve employed for allocation processing at a later stage, for example as shown in the example in FIG. 57, similar to the case of the example in FIG. 50, breakdown of the image blocks c1 and c2 on the interpolation frame F1 and interpolation frame F2 which are generated employing the 0 vector S0 can be suppressed roughly the same amount as the interpolation processing in the case of having no motion compensation, and consequently, comparatively stable image blocks c1 and c2 can be generated.

Figure 58:
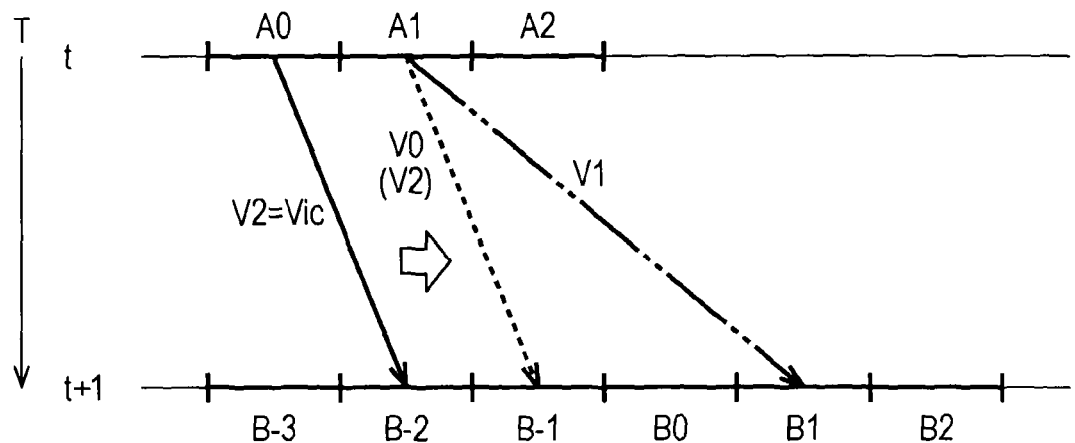
FIG. 58 is a diagram for describing the initial vector selection method with the vector detection unit shown in FIG. 45.

On the other hand, by causing the motion vector V2 which is the detection result detected with gradient method computing to be the initial candidate vector Vic, as shown in the example in FIG. 58, in the case that the initial candidate vector Vic (V2) is set to the initial vector V0 in the next detecting object block A1, the initial vector V0 becomes nearer to the true motion vector V1 than in the case wherein the 0 vector S0 is set to the initial vector V0 (the case in FIG. 52).

Figure 59:
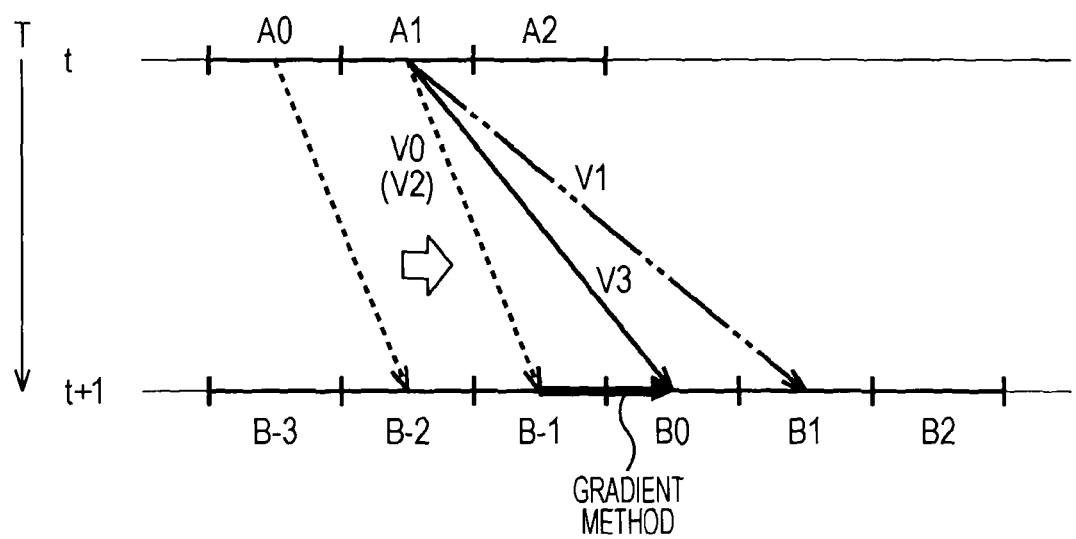
FIG. 59 is a diagram for describing the initial vector selection method with the vector detection unit shown in FIG. 45.

Also, at this time, as shown in the example in FIG. 59, the motion vector V3 obtained by performing gradient method computation employing the initial vector V0 (motion vector V2) with the detecting object block A1 has a higher probability of becoming nearer the true motion vector V1 than does the initial vector V0.

Further, with the motion detecting processing with the detecting object block A1, even in the case that the number of valid pixels is small, and a true motion vector V1 cannot be obtained, the detection vector Ve employed for allocating processing at a later stage is modified to 0 vector S0, and the motion vector v3 which is a detection result detected with the gradient method computation is set to the initial candidate vector Vic.

Figure 60:
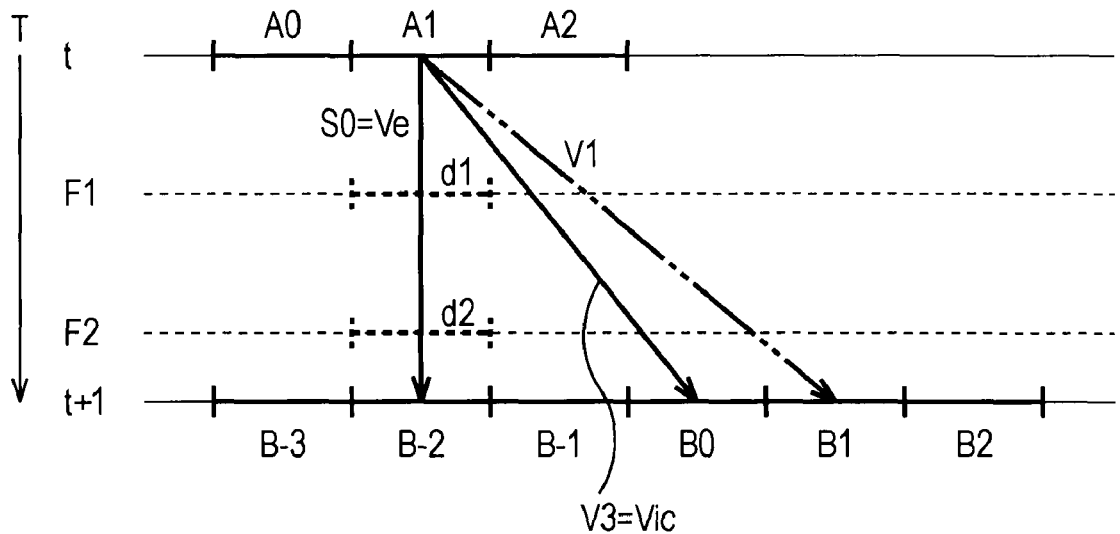
FIG. 60 is a diagram for describing an interpolated frame generated using a motion vector detected with the vector detection unit shown in FIG. 45.

By modifying the detection vector Ve employed for allocating processing at a later stage to a 0 vector S0, as shown in the example in FIG. 60, the breakdown in the image blocks d1 and d2 on the interpolation frame F1 and interpolation frame F2 can be suppressed roughly the same amount as with the interpolation processing in the case of having no motion compensation, and consequently, comparatively stable image blocks d1 and d2 are generated.

Figure 61:
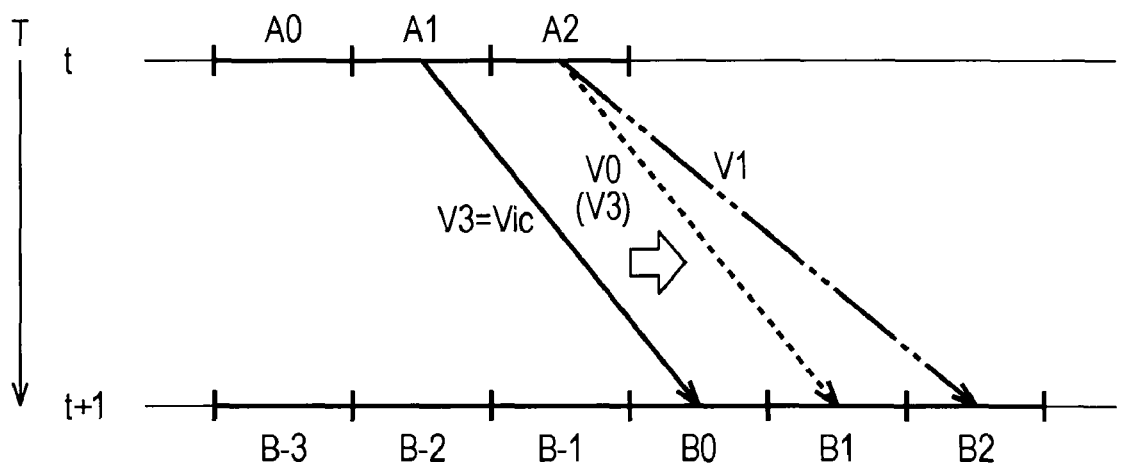
FIG. 61 is a diagram for describing the initial vector selection method with the vector detection unit shown in FIG. 45.

On the other hand, by causing the motion vector V3 which is a detection result detected with the gradient method computation to be the initial candidate vector Vic, as shown in the example in FIG. 61, in the case that the initial candidate vector Vic (V3) is set to the initial vector V0 with the next detecting object block A2, as with the case in the example in FIG. 52, the initial vector V0 (V3) becomes nearer the true motion vector V1 than the case wherein the 0 vector S0 is set to the initial vector V0.

Figure 62:
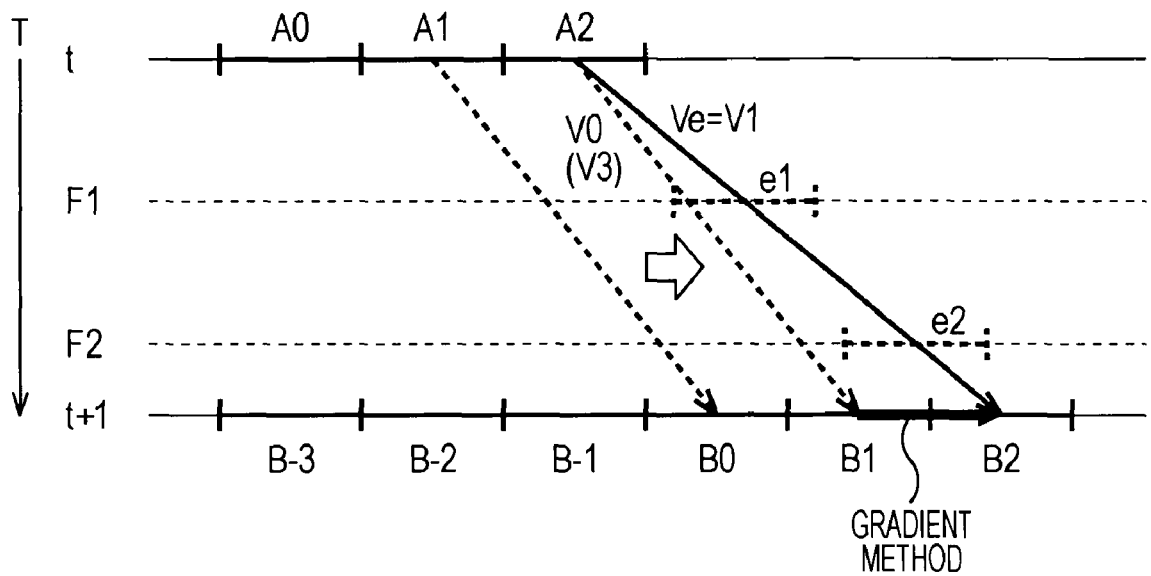
FIG. 62 is a diagram for describing an interpolated frame generated using a motion vector detected with the vector detection unit shown in FIG. 45.

Consequently, as shown in the example in FIG. 62, with determining of the valid pixel number in the detecting object block A2, the number of valid pixels in the computation block of block A2 is greater than the predetermined threshold value α, the reliability of the gradient method computing results is improved, and the probability is increased of detecting a true motion vector V1 by performing gradient method computing employing the initial vector V0 (motion vector V3) in the detecting object block A2.

Thus, a true motion vector V1 is correctly detected as the motion between the blocks (block A2 and block B2) corresponding to between the frame t and frame t+1, whereby the image blocks e1 and e2 on the interpolation frame F1 and interpolation frame F2 are correctly generated.

Thus, in the case that the valid pixels with the computation block of the detecting object block are less than the predetermined threshold value α, and greater than the predetermined threshold value β, only the detecting vector is set to 0 vector, and the initial candidate vector is set to a motion vector obtained by computation, so that with the vector detecting processing of the other surrounding blocks, when the Vic is employed as an initial candidate vector, the ratio of 0 vectors in a candidate vector group becomes less than when vectors are dropped to 0 vectors in the valid pixels determining unit 404 in FIG. 25, and the variation of vector values in a candidate vector group increases.

Consequently, in the case of the valid pixels determining unit 531 in FIG. 46, the probability that a vector near the true motion amount exists within the candidate vectors becomes higher than in the case of the valid pixels determining unit 404 in FIG. 25, and the accuracy of the initial vector is improved compared to the case of the valid pixels determining unit 404 in FIG. 25.

Thus, convergence speed of the vector detecting processing by the gradient method computation can be improved while maintaining the accuracy of the detection vector employed for the allocating processing at a later stage to roughly the same amount as has been the case.

Next, an example of the iterative gradient method computation processing of the vector detection unit 52 in FIG. 45 will be described with reference to the flowchart in FIG. 63. Note that the steps S551 through S558 in FIG. 63 perform similar processing as the steps S301 through S308 in FIG. 32, so detailed description thereof will be omitted as appropriate.

the selector 401 selects an offset vector Vn−1 in step S551, and outputs the selected offset vector Vn−1 to the memory control signal generating unit 402, gradient method computing unit 405, and evaluation value computing unit 61B.

In step S552, the memory control signal generating unit 402 reads an object pixel value of the computation block serving as a processing object from the image frame t at point-in-time t and the image frame t+1 at point-in-time t+1 which are stored in the memory 403, according to the control signal from an unshown control unit in the signal processing device 1 and the offset vector Vn−1 from the selector 401, and supplies the read object pixel value to the valid pixels determining unit 531 and gradient method computing unit 405.

Upon inputting the object pixel value supplied from the memory 403, the valid pixels determining unit 531 executes the valid pixel determining processing in step S553. The valid pixel determining processing is processing similar to the valid pixel determining processing described above with reference to FIG. 33, and the description thereof will be repetitive so will be omitted.

With the valid pixel determining processing in step S553, the number of pixels valid for gradient method computation in the computation block is counted in the valid pixel number counter 441, by the pixel difference of the computation block of the frame t and frame t+1 being computed employing the object pixel value supplied from the memory 403. Also, with regard to pixels which have been determined as being valid pixels in the computation processing, the gradient states in the horizontal direction and the vertical direction are obtained, and the number of pixels with no horizontal gradient and the number of pixels with no vertical gradient are counted by the no-horizontal-gradient counter 442 and no-vertical-gradient counter 443, respectively.

The gradient method continuous determining unit 551 of the valid pixels determining unit 531 determines in step S554 whether or not the value (number of valid pixels) stored in the valid pixel number counter 441 is greater than the predetermined threshold value α. In the case determination is made in step S554 that the number of valid pixels is greater than the threshold value α, the gradient method continuous determining unit 551 executes gradient method computing for the computation execution determining unit 425, gradient method computing unit 405, and evaluation determining unit 541, and a counter flag (countflg=1) to determine the motion vector V wherein the detection vector Ve and initial candidate vector Vic are obtained with gradient method computing is output, and the flow is advanced to step S555.

Upon inputting the counter flag (countflag=1) from the gradient method continuous determining unit 551, the computation execution determining unit 425 executes gradient method execution determining processing in step S555. The gradient method execution determining processing is similar to the processing in the gradient method execution determining processing described above with reference to FIG. 35, and the description thereof will be repetitive so will be omitted.

With the gradient method execution determining processing in step S555, the number of valid pixels in the valid pixel number counter 441, the number of pixels having no horizontal gradient in the no-horizontal-gradient counter 442, and the number of pixels having no vertical gradient in the no-vertical-gradient counter 443 are referenced, determination is made whether or not the number of pixels in a one-sided gradient in the valid pixels is a large number, and according to the determination results thereof, a gradient flag (gladflg) for switching the gradient method computing processing performed by the gradient method computing unit 405 is set from the integrated gradient method computing processing and independent gradient method computing processing, the set gradient flag is output to the gradient method computing unit 405 and evaluating determining unit 541, whereby the flow is advanced to step S556.

Upon the counter flag (countflg=1) being input from the gradient method continuous determining unit 551 and the gradient flag being input from the computation execution determining unit 425, the gradient method computing unit 405 executes gradient method computing processing in step S556. The gradient method computing processing is processing similar to the gradient method computing processing described above with reference to FIG. 36, and the description thereof will be repetitive so will be omitted.

With the gradient method computing processing in step S556, according to the gradient flag from the computation execution determining unit 425, at least one of integrated gradient method computing processing employing the valid pixels, or independent gradient method computing processing in the horizontal direction using pixels having gradient in the horizontal direction and independent gradient method computing processing in the vertical direction using pixels having gradient in the vertical direction from the valid pixels, is executed, the motion vector Vn is obtained, and the obtained motion vector Vn is output to the vector evaluation unit 523, and the flow is advanced to step S557.

The vector evaluation unit 523 executes vector evaluation processing in step S557. The vector evaluation processing is processing similar to the vector evaluation processing described above with reference to FIG. 39, and the description thereof will be repetitive so will be omitted.

With the vector evaluation processing in step S557, the evaluation values dfv of the motion vector Vn, offset vector Vn−1, and 0 vector are obtained from the gradient method computing unit 405, and based on the gradient flag from the computation execution determining unit 425 the evaluation values dfv of the motion vector Vn and the offset vector Vn−1 or 0 vector are compared, and modified according to comparison results, and the motion vector V is obtained. For example, in the case that the evaluation value dfv of the motion vector Vn and the offset vector Vn−1 are compared, and the reliability is deemed to be higher for the evaluation value dfv of the motion vector Vn, the motion vector Vn is set as the motion vector V, and the number of iterations for the gradient method computation is increased by 1 count.

In step S558, the evaluation determining unit 541 determines whether or not to iterate the gradient computation based on the number of iterations of the gradient flag and gradient method computing from the computation execution determining unit 425. That is to say, in the case that the gradient flag is a flag (gladflg=4) to execute integrated gradient method computing processing, and the number of iterations of gradient method computing has not reached the maximum number of set iterations (for example, twice), the evaluation determining unit 541 determines in step S558 to iterate the gradient method computation, and outputs the obtained motion vector V to the delay unit 406.

The delay unit 406 holds the motion vector V input from the evaluation determining unit 541 until the next processing cycle of the valid pixels determining unit 531 and gradient method computing unit 405, and at the next processing cycle outputs the motion vector V to the selector 401. Thus, the flow is advanced to step S551, and the processing thereafter is repeated.

Also, in the case that the gradient flag is other than a flag to execute integrated gradient method computing processing, or the number of iterations of gradient method computing has reached the maximum number of set iterations (for example, twice), the evaluation determining unit 541 determines in step S558 to not iterate the gradient method computation (i.e. to end the gradient method computation), and in step S565 corresponds the obtained motion vector V to the detecting object block and stores this as a detection vector Ve in the detected-vector memory 53, and stores this as an initial candidate vector Vic in the initial candidate vector memory 524. Note that at this time, the detection vector Ve and the evaluation value dfv thereof are output to the shifted initial vector allocation unit 105 also.

On the other hand, in the case determination is made in step S554 that the number of valid pixels is less than the predetermined threshold value α, the gradient method continuous determining unit 551 determines whether or not the number of valid pixels is greater than the predetermined threshold value β. In the case determination is made in step S559 that the number of valid pixels are greater than the predetermined threshold value β, the gradient method continuous determining unit 551 executes gradient method computation, but determines the detection vector Ve to be 0 vector, and a counter flag (countflg=10) wherein the initial candidate vector Vic which is determined to be the motion vector V obtained by gradient method computing is output to the gradient method computing unit 405 and evaluation determining unit 541, and the flow is advanced to step S560.

Upon the counter flag (countflg=10) being input from the gradient method continuous determining unit 551, the computation execution determining unit 425 executes the gradient method execution determining processing in step S560. The gradient method execution determining processing here has similar processing as the gradient method execution determining processing in step S555 described above, so the description thereof would be redundant and accordingly will be omitted.

With the gradient method execution determining processing in step S560, the number of valid pixels in the valid pixel number counter 441, the number of pixels having no horizontal gradient in the no-horizontal-gradient counter 442, and the number of pixels having no vertical gradient in the no-vertical-gradient counter 443 are referenced, determination is made whether or not the number of pixels with one-sided gradient among the valid pixels is great, and according to the determining results thereof, a gradient flag (gladflg) is set for switching the gradient method computing processing performed by the gradient method computing unit 405 between the integrated gradient method computing processing and independent gradient method computing processing, whereby the set gradient flag is output to the gradient method computing unit 405 and evaluation determining unit 541, and the flow is advanced to step S561.

Upon the counter flag (countflg=10) being input from the gradient method continuous determining unit 551, when the gradient flag is input from the computation execution determining unit 425, the gradient method computing unit 405 executes gradient method computing processing in step S561. The gradient method computing processing has similar processing as the gradient method computing processing in step S556 described above, so the description thereof would be redundant and accordingly will be omitted.

With the gradient method execution computing processing in step S561, according to the gradient flag from the computation execution determining unit 425, at least one of integrated gradient method computing processing employing the valid pixels, or independent gradient method computing processing in the horizontal direction using pixels having gradient in the horizontal direction and independent gradient method computing processing in the vertical direction using pixels having gradient in the vertical direction from the valid pixels, is executed, the motion vector Vn is obtained, and the obtained motion vector Vn is output to the vector evaluation unit 523, and the flow is advanced to step S562.

The vector evaluation unit 523 executes vector evaluation processing in step S562. The vector evaluation processing is processing similar to the vector evaluation processing in step S559 described above, and the description thereof will be repetitive so will be omitted.

With the vector evaluation processing in step S562, the evaluation values dfv of the motion vector Vn, offset vector Vn−1, and 0 vector are obtained from the gradient method computing unit 405, and based on the gradient flag from the computation execution determining unit 425 the evaluation values dfv of the motion vector Vn and the offset vector Vn−1 or 0 vector are compared, and modified according to comparison results, and the motion vector V is obtained. Note that in this case (in the case that the number of valid pixels is less than the predetermined threshold value α), the motion vector Vn is a result of computing with valid pixels less than the predetermined threshold value α, and quality thereof is not expected to be as high as the result of computing with valid pixel more than the predetermined threshold value α, so iteration thereof is not executed.

The evaluation determining unit 541 determines the detection vector Ve only to be 0 vector in step S563, based on the counter flag (countflg=10), stores the 0 vector as a detection vector Ve in the detected-vector memory 53 corresponding to the detecting object block in step S565, and stores the obtained motion vector V as the initial candidate vector Vic in the initial candidate vector memory 524 corresponding to the detecting object block. Note that at this time, the detection vector Ve and the evaluation value dfv thereof is also output to the shifted initial vector allocation unit 105.

On the other hand, in the case determination is made in step S554 that the number of valid pixels is less than the predetermined threshold value β, the gradient method computing is stopped with the gradient method continuous determining unit 551, and the counter flag (countflg=0) which determines the detection vector Ve and initial candidate vector Vic to be 0 vectors is output to the gradient method computing unit 405 and evaluation determining unit 541, and the flow is advanced to step S564.

Conversely, in the case that the value of the counter flag from the gradient method continuous determining unit 551 is 0, the computation execution determining unit 425 and gradient method computing unit 405 do not execute gradient method computing.

In step S564, the evaluation value determining unit 541 determines the detection vector Ve and initial candidate vector Vic to be 0 vectors, based on the counter flag (countflg=0), and in step S565 stores the 0 vector as the detection vector Ve in the detected-vector memory 53 corresponding to the detecting object block, and stores the 0 vector as the initial candidate vector Vic in the initial candidate vector memory 524. Note that at this time, the detection vector Ve and the evaluation value dfv thereof are also output to the shifted initial vector allocation unit 105.

Thus, the ratio of the number of valid pixels within the computation block is determined not only by the predetermined threshold value α, but also with the threshold value β which is less than the predetermined threshold value α, and in the case that the number of valid pixels within the computation block is less than the predetermined threshold value α, but greater than the threshold value β, the gradient method computing is not stopped, whereby the gradient method computing result is set to the initial candidate vector, and the 0 vector is set to the detecting vector, so convergence speed of the vector detecting processing by the gradient method computing can be improved while maintaining the accuracy of the detecting vector which is employed with allocation processing at a later stage to be roughly the same as it has been.

Further, in the case that the number of valid pixels within the computation block is less than the predetermined threshold value α, but greater than the threshold value β, even if the gradient method computing is performed, iteration is not performed so the computing load is suppressed.

Note that with the above description, an example is described to determine the predetermined threshold value α before the threshold value β, but the threshold value β may be comparatively determined first.

Next, another example of iterative gradient method computing processing with the vector detection unit shown in FIG. 45 will be described with reference to the flowcharts in FIG. 64 and FIG. 65.

Figure 64:
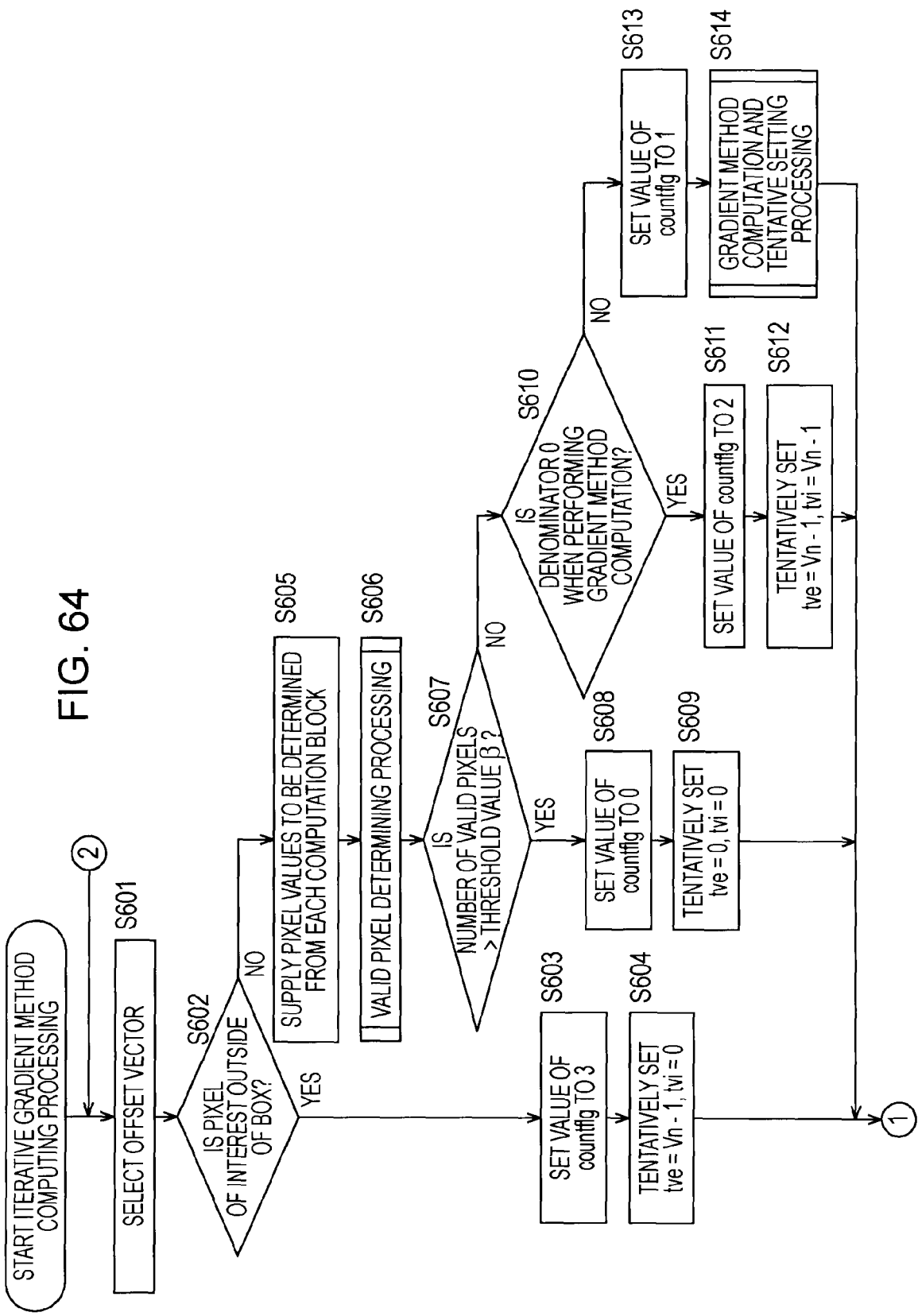
FIG. 64 is a flowchart for describing yet another example of iterative gradient method computing processing performed in step S103 in FIG. 20.

With the example shown in FIG. 64, processing is illustrated wherein, in the event that determination is made that the number of valid pixels is greater than the predetermined threshold value β which is lower than the predetermined threshold value α, both the integrated gradient method computation and independent gradient method computation is performed, and detection vector Ve and initial candidate vector Vic are determined at the evaluation determining unit 541 based on the values of the counter flag and the gradient flag.

Note that in the following, a vector obtained by integrated gradient method computation will be described as integrated computation result vector gv, a vector obtained by independent gradient method computation as independent computation result vector sgv, a vector tentatively set as a detection vector Ve as a tentative detection vector tve, and a vector tentatively set as an initial candidate vector Vic as a tentative initial candidate vector tvi.

In step S601, the selector 401 selects the offset vector Vn−1 and outputs the selected offset vector Vn−1 to the memory control signal generating unit 402, gradient method computing unit 405, and evaluation value computing unit 61B.

In accordance with input of control signals from an unshown control unit of the signal processing device 1, and the offset vector Vn−1 from the selector 401, the memory control signal generating unit 402 effects reading of values f pixels to be processed of the computation blocks to preprocessed from an image frame t at a point-in-time t and an image frame t+1 at point-in-time t+1, stored in the memory 403. At this time, in step S602 the memory control signal generating unit 402 determines whether or not the pixels to be processed of the computation block in frame t+1 are outside of the box.

In the event that determination is made that the pixels of interest of the computation block in frame t+1 are outside of the box, in step S603 the gradient method continuous determining unit 551 sets the value of the counter flag to 3, and outputs the counter flag (countflg=3) to the computation execution determining unit 425, gradient method computing unit 405, and evaluation determining unit 541.

In response to this, in the event that the value of the counter flag from the gradient method continuous determining unit 424 is 3, the computation execution determining unit 425 and gradient method computing unit 405 do not perform their processing.

In step S604, based on the counter flag (countflg=3), the evaluation determining unit 541 tentatively sets the offset vector Vn−1 as a tentative detection vector tve (i.e., horizontal direction component of tentative detection vector: tve.x=Vn−1.x, vertical direction component of tentative detection vector: tve.y=Vn−1.y), and tentatively sets a 0 vector as a tentative initial candidate vector tvi (i.e., horizontal direction component of tentative initial candidate vector: tvi.x=0.0, vertical direction component of tentative initial candidate vector: tvi.y=0.0). After setting the tentative detection vector tve and tentative initial candidate vector tvi, the flow proceeds to step S615 in FIG. 65.

In the event that determination is made that the pixels of interest of the computation block in frame t+1 are not outside of the box, in step S606 the memory control signal generating unit 402 supplies the values of the pixels of interest of the computation block read out from the memory 403 to the valid pixels determining unit 531 and the gradient method computing unit 405.

Upon inputting the pixels of interest supplied from the memory 403, in step s606 the valid pixels determining unit executes valid pixel determining processing. This valid pixel determining processing is the same processing as the valid pixel determining processing described above with reference to FIG. 33, so description thereof would be redundant and accordingly will be omitted.

With the valid pixel determining processing performed in step S553, pixel difference between the computation blocks in frame t and frame t+1 is computed using the pixels of interest supplied from the memory 4103, whereby in the computation block the number of pixels valid for gradient method computation is counted at the valid pixel number counter 441. Also, with regard to pixels determined to be valid pixels in the computation block, the gradient states of the horizontal direction and vertical direction are each obtained, and the number of pixels with no horizontal gradient and the number of pixels with no vertical gradient are respectively counted by the no-horizontal-gradient counter 442 and the no-vertical-gradient counter 443.

In step S607, the gradient method continuous determining unit 551 determines whether or not the value stored in the valid pixel number counter 441 (the number of valid pixels) is smaller than the predetermined threshold value β. In the event that determination is made in step S607 that the number of valid pixels is smaller than the predetermined threshold value β, the gradient method continuous determining unit 551 sets the value of the counter flag to 0 in step S608, and outputs a counter flag (countflg=0) for quitting gradient method computation to the computation execution determining unit 425, gradient method computing unit 405, and evaluation determining unit 541.

In response to this, in the event that the value of the counter flag from the gradient method continuous determining unit 424 is 0, the computation execution determining unit 425 and gradient method computing unit 405 do not perform the respective processing thereof.

In step S609, based on the counter flag (countflg=0), the evaluation value determining unit 541 tentatively sets a 0 vector as a tentative detection vector tve (i.e., horizontal direction component of tentative detection vector: tve.x=0.0, vertical direction component of tentative detection vector: tve.y=0.0), and tentatively sets a 0 vector as a tentative initial candidate vector tvi (i.e., horizontal direction component of tentative initial candidate vector: tvi.x=0.0, vertical direction component of tentative initial candidate vector: tvi.y=0.0). After setting the tentative detection vector tve and tentative initial candidate vector tvi, the flow proceeds to step S615 in FIG. 65.

In the event that determination is made in step S607 that the number of valid pixels is greater than the predetermined threshold value β, in step S610 the gradient method continuous determining unit 551 determines whether or not the denominator of the Expression (14) used for integrated gradient method computation is 0. In the event that all of the valid pixels do not have horizontal gradient or in the event that all of the valid pixels do not have horizontal gradient, the denominator of Expression (14) employed for integrated gradient method computation will be 0. Accordingly, in this case, in addition to the valid pixel number counter 441, the gradient method continuous determining unit 551 makes reference to the no-horizontal-gradient counter 442 and the no-vertical-gradient counter 443, and determines whether or not the denominator of the Expression (14) used for integrated gradient method computation is 0 by determining whether or not the value of the valid pixel number counter 441 and the value of the no-horizontal-gradient counter 442 are the same, and whether or not the value of the valid pixel number counter 441 and the value of the no-vertical-gradient counter 443 are the same.

In the event that determination is made in step S610 that the value of the valid pixel number counter 441 and the value of the no-horizontal-gradient counter 442 or the value of the no-vertical-gradient counter 443 are the same, determination is made that the denominator of the Expression (14) used for integrated gradient method computation is 0, whereupon in step S611 the gradient method continuous determining unit 551 sets the value of the counter flag to 2, and outputs the counter flag (countflg=2) for quitting the gradient method computation to the computation execution determining unit 425, gradient method computing unit 405, and evaluation determining unit 541.

In response to this, in the event that the value of the counter flag from the gradient method continuous determining unit 424 is 2, the computation execution determining unit 425 and gradient method computing unit 405 do not perform their processing.

In step S612, based on the counter flag (countflg=2), the evaluation determining unit 541 tentatively sets the offset vector Vn−1 as a tentative detection vector tve (i.e., horizontal direction component of tentative detection vector: tve.x=Vn−1.x, vertical direction component of tentative detection vector: tve.y=Vn−1.y), and tentatively sets the offset vector Vn−1 as a tentative initial candidate vector tvi (i.e., horizontal direction component of tentative initial candidate vector: tvi.x=Vn−1.x, vertical direction component of tentative initial candidate vector: tvi.y=Vn−1.y). After setting the tentative detection vector tve and tentative initial candidate vector tvi, the flow proceeds to step S615 in FIG. 65.

In the event that determination is made in step S610 that the value of the valid pixel number counter 441 and the value of the no-horizontal-gradient counter 442 or the value of the no-vertical-gradient counter 443 are not the same, determination is made that the denominator of the Expression (14) used for integrated gradient method computation is not 0, whereupon in step S613 the gradient method continuous determining unit 551 sets the value of the counter flag to 1, and outputs the counter flag (countflg=1) for executing gradient method computation to the gradient method computing unit 405 and evaluation determining unit 541.

Figure 66:
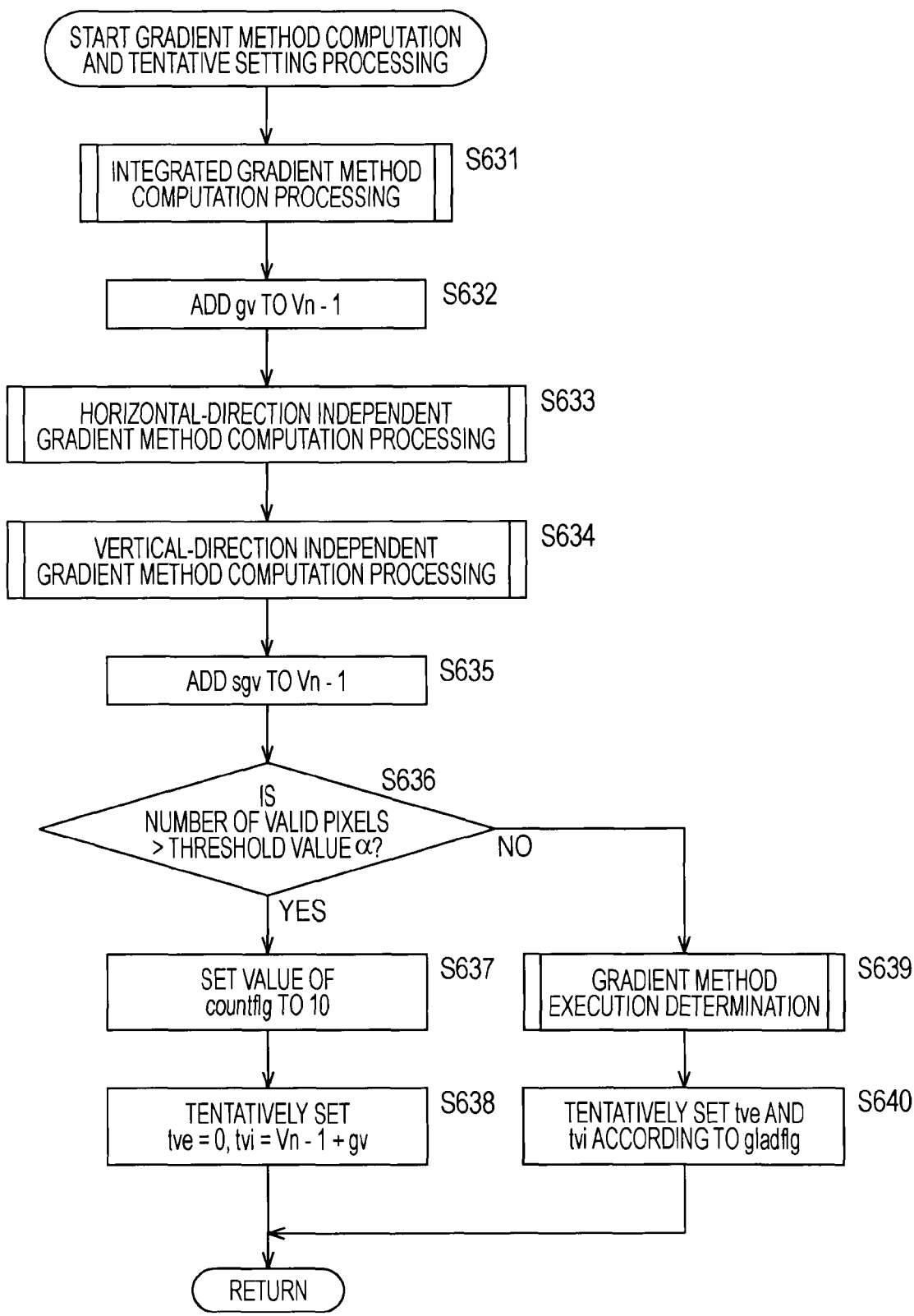
FIG. 66 is a flowchart for describing an example of gradient method computing and tentative setting processing performed in step S614 in FIG. 64.

In response to this, in step S614 gradient method computing unit 405 and evaluation determining unit 541 execute gradient method computation and tentative setting processing. This gradient method computation and tentative setting processing will be described with reference to the flowchart in FIG. 66.

Upon counter flag (countflg=1) being input from the gradient method continuous determining unit 551, the valid pixels determining unit 471 controls the units of the gradient method computing unit 405 in step S631 to execute integrated gradient method computing processing. This integrated gradient method computing processing has been described with reference to the flowchart in FIG. 37, so description thereof will be omitted.

With the integrated gradient method computing processing in step S631, the valid pixels are taken the object of gradient method computation, with the horizontal direction pixel difference Δx of the valid pixels, the vertical direction pixel difference Δy of the valid pixels, and the temporal direction pixel difference Δt of the valid pixels being integrated, and an integrated computation result vector gv being obtained using the least-square-sum of the integrated gradient and the Expression (14), which is output to the vector calculating unit 464.

In step S632, the vector calculating unit 464 adds the integrated computation result vector gv obtained by the integrated gradient computing unit 463-1 to the offset vector Vn−1 from the selector 401, and outputs to the vector evaluation unit 104.

Also, in step S633 the valid pixels determining unit 471 controls the units of the gradient method computing unit 405 to execute horizontal-direction independent gradient method computing processing. This horizontal-direction independent gradient method computing processing has been described with reference to the flowchart in FIG. 38, so description thereof will be omitted.

With the horizontal-direction independent gradient method computing processing in step S633, the valid pixels with horizontal-direction gradient are taken as the object of gradient method computation, with the horizontal direction pixel difference Δx of the valid pixels and the temporal direction pixel difference Δt of the valid pixels being integrated, and a horizontal direction component (sgv.x) of the independent computation result vector sgv being obtained using the integrated gradient and Expression (23) which is output to the vector calculating unit 464.

In step S634 the valid pixels determining unit 471 controls the units of the gradient method computing unit 405 to execute vertical-direction independent gradient method computing processing. This vertical-direction independent gradient method computing processing has been described with reference to the flowchart in FIG. 38, so description thereof will be omitted.

With the vertical-direction independent gradient method computing processing in step S634, the valid pixels with vertical-direction gradient are taken as the object of gradient method computation, with the vertical direction pixel difference Δy of the valid pixels and the temporal direction pixel difference Δt of the valid pixels being integrated, and a vertical direction component (sgv.y) of the independent computation result vector sgv being obtained using the integrated gradient and Expression (23) which is output to the vector calculating unit 464.

The vector calculating unit 464 inputs at least one of the horizontal component and vertical competent of the independent computation result vector sgv from the independent gradient computing unit 463-2. In step S635, the vector calculating unit 464 adds the corresponding direction component (at least one of the horizontal component and vertical competent) of the offset vector Vn−1 from the selector 401, and the corresponding direction component of the independent computation result vector sgv obtained by the independent gradient computing unit 463-2, and outputs this to the vector evaluation unit 104.

Note that at this time, of the directional components of the independent computation result vector sgv, the directional component not input from the independent gradient computing unit 463-2 is set to a 0 vector.

In step S636, the gradient method continuous determining unit 551 determines whether or not the number of valid pixels is smaller than the predetermined threshold α. In the event that determination is made in step S636 that the number of valid pixels is smaller than the predetermined threshold α, in step S637 the value of the counter flag is set to 10, and a counter flag (countflg=10) wherein a value obtained by adding the integrated computation result vector gv to the offset vector Vn−1 is taken as the initial candidate vector (i.e., tvi=Vn−1+gv) is output to the evaluation determining unit 541.

In step S638, based on the counter flag (countflg=10), the evaluation determining unit 541 tentatively sets a 0 vector as a tentative detection vector tve (i.e., horizontal direction component of tentative detection vector: tve.x=0.0, vertical direction component of tentative detection vector: tve.y=0.0), and tentatively sets the value obtained by adding the integrated computation result vector gv to the offset vector Vn−1 as a tentative initial candidate vector tvi (i.e., horizontal direction component of tentative initial candidate vector: tvi.x=Vn−1.x+gv.x, vertical direction component of tentative initial candidate vector: tvi.y=Vn−1.y+gv.y). After setting the tentative detection vector tve and tentative initial candidate vector tvi, the flow proceeds to step S615 in FIG. 65.

In the event that determination is made in step S636 that the number of valid pixels is greater than the predetermined threshold α, a counter flag of which the value has been set to 1 (countflg=1) is output to the computation execution determining unit 425, and in step S639 the computation execution determining unit 425 executes the gradient method execution determining processing. This gradient method execution determining processing is the same processing as the gradient method execution determining processing described above with reference to FIG. 35, and since description thereof would be redundant, description will be omitted.

With the gradient method execution determining processing of step S339, the number of valid pixels of the valid pixel number counter 441, the number of pixels with no horizontal gradient of the no-horizontal-gradient counter 442, and the number of pixels with no vertical gradient of the no-vertical-gradient counter 443, are referred to, determination is made regarding whether or not the number of valid pixels with one-sided gradient is great, and according to the determination results thereof, a gradient flag (gladflg) for switching the gradient method computation which the gradient method computing unit 405 performs is set from the integrated gradient method computing processing and independent gradient method computing processing, the set gradient flag is output to the gradient method computing unit 405 and the evaluation determining unit 541, and the processing advances to step S640.

In step S640, based on the values of the counter flag (countflg=1) and gradient flag, the evaluation determining unit 541 tentatively sets the tentative detection vector tve and tentative initial candidate vector tvi.

That is to say, in the event that the value of the gradient flag is 1, the horizontal direction is assumed to be reliable, so the horizontal direction component of the tentatively set detection vector: tve.x=Vn−1.x+sgv.x, and the vertical direction component of the tentatively set detection vector: tve.y=0.0 are tentatively set, thereby tentatively setting the horizontal direction component of the tentatively set initial candidate vector: tvi.x=Vn−1.x+sgv.x and the vertical direction component of the tentatively set initial candidate vector: tvi.y=0.0.

In the event that the value of the gradient flag is 2, the vertical direction is assumed to be reliable, so the horizontal direction component of the tentatively set detection vector: tve.x=0.0, and the vertical direction component of the tentatively set detection vector: tve.y=Vn−1.y+sgv.y are tentatively set, thereby tentatively setting the horizontal direction component of the tentatively set initial candidate vector: tvi.x=0.0 and the vertical direction component of the tentatively set initial candidate vector: tvi.y=Vn−1.y+sgv.y.

In the event that the value of the gradient flag is 3, neither the horizontal nor vertical direction is assumed to be reliable, so the horizontal direction component of the tentatively set detection vector: tve.x=0.0, and the vertical direction component of the tentatively set detection vector: tve.y=0.0 are tentatively set, thereby tentatively setting the horizontal direction component of the tentatively set initial candidate vector: tvi.x=0.0 and the vertical direction component of the tentatively set initial candidate vector: tvi.y=0.0.

In the event that the value of the gradient flag is 4, both the horizontal and vertical directions are assumed to be reliable with few one-sided gradient pixels, so the horizontal direction component of the tentatively set detection vector: tve.x=Vn−1.x+sv.x, and the vertical direction component of the tentatively set detection vector: tve.y=Vn−1.y+sv.y are tentatively set, thereby tentatively setting the horizontal direction component of the tentatively set initial candidate vector:

tvi.x=Vn−1.x +sv.x and the vertical direction component of the tentatively set initial candidate vector: tvi.y=Vn−1.y+ sv.y. In this case alone, the number of times of iteration is incremented by 1.

In the event that the value of the gradient flag is 0, both the horizontal and vertical directions are assumed to be somewhat reliable though there are some one-sided gradient pixels, so the horizontal direction component of the tentatively set detection vector: tve.x=Vn−1.x+sgv.x, and the vertical direction component of the tentatively set detection vector: tve.y=Vn−1.y+sgv.y are tentatively set, thereby tentatively setting the horizontal direction component of the tentatively set initial candidate vector: tvi.x=Vn−1.x+sgv.x and the vertical direction component of the tentatively set initial candidate vector: tvi.y=Vn−1.y+sgv.y.

Figure 65:
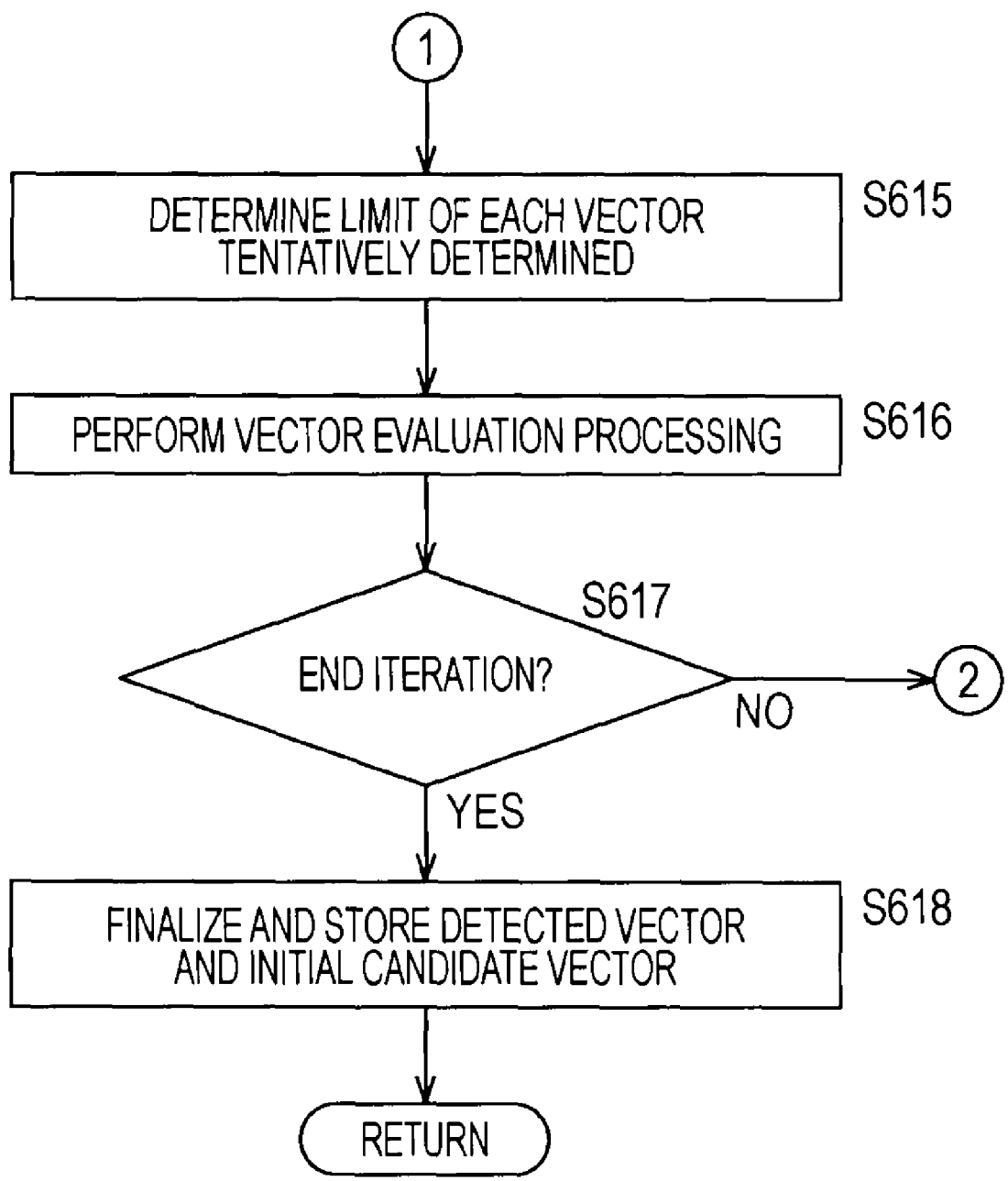
FIG. 65 is a flowchart for describing yet another example of iterative gradient method computing processing performed in step S103 in FIG. 20.

Following setting of the tentative detection vector tve and tentative initial candidate vector tvi in step S640, the processing advances to step S615 in FIG. 65.

In step S615, the evaluation determining unit 541 determines the limit of the tentatively set vectors (the tentative detection vector tve and tentative initial candidate vector tvi). In the event that determination is made that the values of the vectors have not exceeded a predetermined vector value, the tentatively set vectors are left as they are, but in the event that determination is made that the vectors have exceeded a predetermined vector value, the tentatively set vectors are set to 0 vectors.

In step S616, the evaluation determining unit 541 performs vector evaluation processing of the tentative detection vector tve and tentative initial candidate vector tvi based on the counter flag value and gradient flag value.

That is to say, in accordance with the counter flag value and gradient flag value, the evaluation determining unit 541 computes the evaluation values of the offset vector Vn−1, 0 vector, tentative detection vector tve, and tentative initial candidate vector tvi, compares the evaluation value dfv of the tentative detection vector tve and the evaluation value dfv of the offset vector Vn−1 or the evaluation value dfv of the 0 vector, with the evaluation value dfv of the tentative initial candidate vector tvi and the evaluation value dfv of the offset vector Vn−1 or the evaluation value dfv of the 0 vector, and updates (changes) the tentative detection vector tve and tentative initial candidate vector tvi with vectors having a small evaluation value dfv (i.e., high reliability).

In step S617, the evaluation determining unit 541 determines whether or not iteration of the gradient method computation is to end, based on the counter flag value, gradient flag value, and number of times of iteration. In the event that the counter flag value is 1, the gradient flag value is 4, and the number of times of iteration stipulated is not exceeded, determination is made for iteration in step S617, and the flow returns to step S601 in FIG. 64, and the subsequent processing is repeated.

That is to say, at this time, the evaluation determining unit 541 supplies the tentative detection vector tve updated by the vector evaluation results in step S616 to the delay unit 406.

In the event that determination is made in step S617 to end iteration, in step S618 the evaluation determining unit 541 determines the detection vector Ve to be the tentative detection vector tve, stores the determined detection vector Ve in the detected-vector memory 53 in a manner correlated with the block for detection, determines the initial candidate vector Vic to be the tentative initial candidate vector tvi, and stores the determined initial candidate vector Vic in the initial candidate vector memory 524 in a manner correlated with the block for detection.

Processing performed in the above-described steps S616 and S617 will be described with reference to FIG. 67.

FIG. 67 illustrates the object of comparison of vector evaluation for each value of the flags, and iteration determination results. Note that a gradient flag is set only in the event that the value of the counter flag is "1".

In the event that the value of the counter flag is "0", a gradient flag is not set, so comparison in the vector evaluation in step S616 is "none", and iteration determination in step S617 is determined to be "no".

In the event that the value of the counter flag is "1", and the gradient flag is "1", the object of comparison in the vector evaluation in step S616 is "0 vector", and iteration determination in step S617 is determined to be "no".

In the event that the value of the counter flag is "1", and the gradient flag is "2", the object of comparison in the vector evaluation in step S616 is "0 vector", and iteration determination in step S617 is determined to be "no".

In the event that the value of the counter flag is "1" and the gradient flag is "3", the object of comparison in the vector evaluation in step S616 is "0 vector", and iteration determination in step S617 is determined to be "no".

In the event that the value of the counter flag is "1", and the gradient flag is "4", the object of comparison in the vector evaluation in step S616 is "offset vector (Vn−1)", and iteration determination in step S617 is determined to be "depending on comparison results". That is to say, if the predetermined number of times of iteration is not fulfilled, a vector corresponding to the comparison results is iterated as an offset vector.

In the event that the value of the counter flag is "2", a gradient flag is not set, and the object of comparison in the vector evaluation in step S616 is "offset vector (Vn−1)", and iteration determination in step S617 is determined to be "no" since the offset vector is the same as the tentative detection vector tve.

In the event that the value of the counter flag is "3", a gradient flag is not set, and the object of comparison in the vector evaluation in step S616 is "offset vector (Vn−1)", and iteration determination in step S617 is determined to be "no" since the offset vector is the same as the tentative detection vector tve.

In the event that the value of the counter flag is "10", a gradient flag is not set, comparison in the vector evaluation in step S616 is "none", and iteration determination in step S617 is determined to be "no".

Note that in the example in FIG. 67, though not illustrated in the drawing regarding cases wherein the counter flag value is "1" and the gradient flag is "0", the object of comparison with vector evaluation in step S616 is "0 vector" in the same way as with cases wherein the gradient flag is "1, 2, 3", and iteration determination in step S617 is determined to be "no".

As described above, an arrangement may be made wherein, if necessary, both integrated gradient method computation and independent gradient method computation are performed, a detection vector and initial candidate vector are each tentatively set based on the counter flag, and the detection vector and initial candidate vector are each ultimately determined based on the counter flag and gradient flag.

Note that with the vector detection unit 52 in FIG. 45 described above, the initial candidate vector memory 524 is additionally provided to the configuration separately from the detected-vector memory 53, in order to hold the detected vector and initial candidate vector as separate vectors. Accordingly, the memory capacity of the vector detection unit 52 in FIG. 45 is twice that of the vector detection unit 52 in FIG. 17. Now, a configuration example will be described with reference to FIG. 68 wherein the detected vector and initial candidate vector are held as separate vectors, without initial candidate vector memory 524 being additionally provided.

Figure 68:
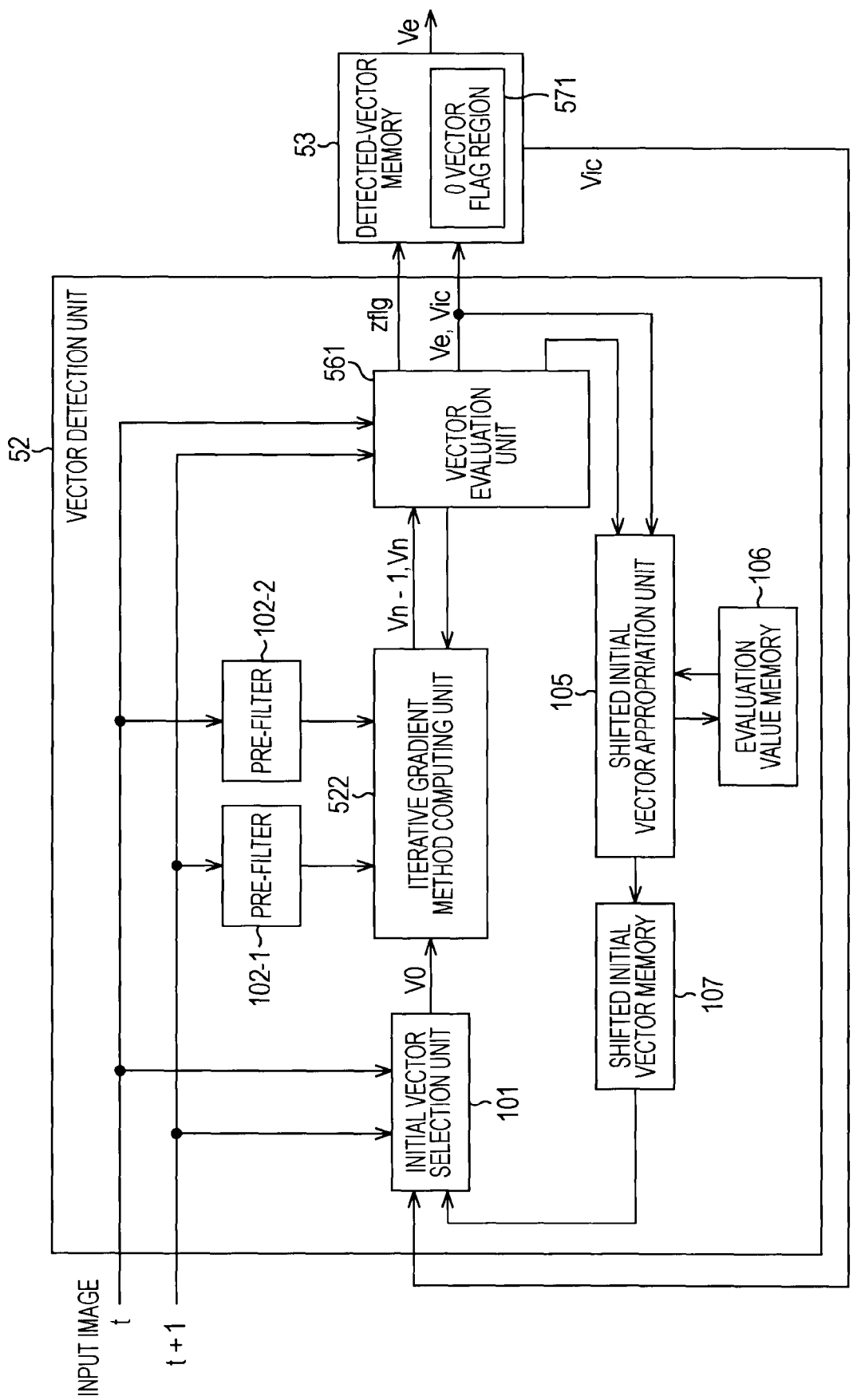
FIG. 68 is a block diagram illustrating yet another configuration of the vector detection unit shown in FIG. 2.

FIG. 68 is a block diagram illustrating another configuration example of the vector detection unit 52 in FIG. 45.

The vector detection unit 52 in FIG. 68 has a commonality with the vector detection unit 52 in FIG. 17 in having prefilters 102-1 and 102-2, a shifted initial vector allocation unit 105, evaluation value memory 106, shifted initial vector memory 107, and iterative gradient method computing unit 522, but differs from the vector detection unit 52 in FIG. 17 in that the initial vector selection unit 521 is replaced by the initial vector selection unit 101 in FIG. 17, the vector evaluation unit 523 is replaced by a vector evaluation unit 561, and the initial candidate vector memory 524 is deleted.

Also, the detected-vector memory 53 shown in FIG. 68 includes a 0 vector flag region 571 where a 1-bit 0 vector flag (zflg) is written for one block for detection by the vector evaluation unit 561.

The vector evaluation unit 561 has the evaluation value computing unit 61B, with the evaluation value computing unit 61B obtaining the evaluation values dfv of the motion vector Vn−1 (or initial vector V0) from the iterative gradient method computing unit 522 and motion vector Vn, whereby the iterative gradient method computing unit 522 is controlled based on the evaluation values dfv obtained by the evaluation value computing unit 61B, gradient method computation is repeatedly executed, and finally, one with high reliability is selected based on the evaluation values dfv.

At this time, as with the case of the vector evaluation unit 523 in FIG. 45, the vector evaluation unit 561 obtains, from the motion vector Vn−1 (or initial vector V0) from the iterative gradient method computing unit 522, motion vector Vn, and 0 vector, a detection vector Ve used later for allocation processing, and initial candidate vector Vic used at the time of selecting an initial vector at the initial vector selection unit 101, corresponding to the counter flag from the iterative gradient method computing unit 522 and the evaluation values dfv of each vector.

In accordance with the counter flag from the iterative gradient method computing unit 522, in the event that the detection vector Ve and initial candidate vector Vic are the same, the vector evaluation unit 561 sets the 0 vector flag to 0, stores the detection vector Ve in the detected-vector memory 53, and writes the 0 vector flag (sflg)=0 to the 0 vector flag region 571.

In accordance with the counter flag from the iterative gradient method computing unit 522, in the event that the detection vector Ve and initial candidate vector Vic are not the same (i.e., in the event that the detection vector Ve is a 0 vector), the vector evaluation unit 561 sets the 0 vector flag to 1, stores the initial candidate vector Vic in the detected-vector memory 53, and writes the 0 vector flag (sflg)=1 to the 0 vector flag region 571.

Correspondingly, the vector allocating unit 54 downstream reads the detection vector from the detected-vector memory 53 based on the 0 vector flag. That is to say, in the event that the 0 vector flag is 0, the vector allocating unit 54 reads the detection vector from the position of the block corresponding to the detected-vector memory 53, but in the event that the 0 vector flag is 1, the vector allocating unit 54 does not read a detection vector from the position of the block corresponding to the detected-vector memory 53 but rather sets a 0 vector as the detection vector.

On the other hand, the initial vector selection unit 101 reads the initial candidate vector out from the position of the corresponding block of the detected-vector memory 53 in the same way as with the detected-vector memory 53 in FIG. 17.

That is to say, the 0 vector flag can be said to be a flag necessary for the vector allocating unit 54 to read out the detection vector.

Figure 69:
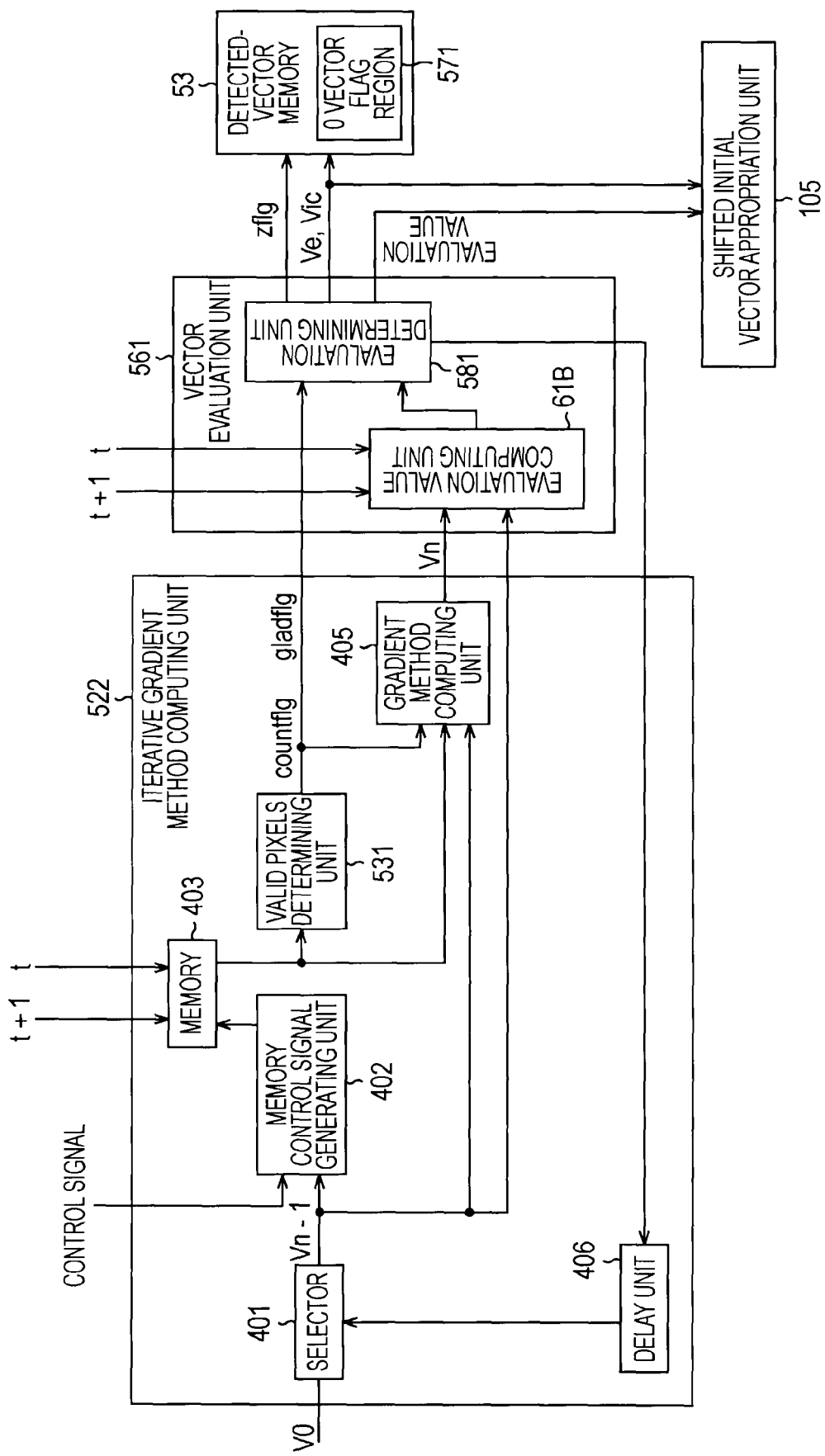
FIG. 69 is a diagram illustrating the configuration of the iterative gradient method computing unit and vector evaluation unit shown in FIG. 68.

FIG. 69 is a block diagram illustrating the configuration of the iterative gradient method computing unit 522 and vector evaluation unit 561.

The iterative gradient method computing unit 522 shown in FIG. 69 is of the same configuration as that of the iterative gradient method computing unit 522 in FIG. 46. That is to say, in the event that the valid pixels determining unit 531 of the iterative gradient method computing unit 522 determines that the number of pixels valid for gradient method computation in the computation block is greater than the predetermined threshold value α, the counter flag (countflg=1) is supplied to the gradient method computing unit 405 and the vector evaluation unit 561, and in the event that determination is made that the number of pixels valid for gradient method computation in the computation block is smaller than the predetermined threshold value α but greater than the predetermined threshold β, the counter flag (countflg=10) is supplied to the gradient method computing unit 405 and the vector evaluation unit 561, and in the event that determination is made that the number of pixels valid for gradient method computation in the computation block is smaller than the predetermined threshold β, the counter flag (countflg=0) is supplied to the gradient method computing unit 405 and the vector evaluation unit 561.

The vector evaluation unit 561 in FIG. 69 has commonality with the vector evaluation unit 523 in FIG. 46 regarding the point of having the evaluation value computing unit 61B, but differs from the vector evaluation unit 523 in FIG. 46 in that the evaluation determining unit 541 has been replaced with an evaluation determining unit 581.

The evaluation determining unit 581 determines whether or not to perform iteration of gradient method computing processing, and obtains each of the detection vector Ve and initial candidate vector Vic, based on the counter flag and gradient flag supplied from the valid pixels determining unit 531.

That is to say, the evaluation determining unit 581 compares the evaluation values dfv computed by the evaluation value computing unit 61B as necessary, thereby selecting those with high reliability, and obtaining the motion vector V.

Also, in the event that the counter flag (countflg=1) is supplied from the valid pixels determining unit 531, the evaluation determining unit 581 determines whether or not to perform iteration of gradient method computing processing, and in the event of determining to perform iteration, outputs the obtained motion vector V to the delay unit 406. In the event of determining not to perform iteration, the evaluation determining unit 581 stores the obtained motion vector V in the detected-vector memory 53 as the detection vector Ve or initial candidate vector Vic, in accordance with the value of the counter flag, and also stores a 0 vector flag.

That is to say, in the event that the value of the counter flag from the valid pixels determining unit 531 is 1 (in the event that the number of valid pixels is greater than the predetermined threshold value α), the detection vector Ve and initial candidate vector Vic are the same vector. Also, in the event that the value of the counter flag from the valid pixels determining unit 531 is 0 (in the event that the number of valid pixels is smaller than the predetermined threshold value β), the detection vector Ve and initial candidate vector Vic are the same vector (i.e., 0 vector).

On the other hand, in the event that the value of the counter flag from the valid pixels determining unit 531 is 10 (in the event that the number of valid pixels is smaller than the predetermined threshold value α but greater than the predetermined threshold value β), the detection vector Ve is a 0 vector, and is a different vector from the initial candidate vector Vic.

Accordingly, in the event that the value of the counter flag from the valid pixels determining unit 531 is 1, the evaluation value determining unit 581 sets the value of the 0 vector flag to 0 and stores the detection vector Ve such that both the initial vector selection unit 101 and the vector allocating unit 54 use the vector stored in the detected-vector memory 53, at which time the 0 vector flag (zflg) is also written to the 0 vector flag region 571.

Also, in the event that the value of the counter flag from the valid pixels determining unit 531 is 0 as well, the evaluation value determining unit 581 sets the value of the 0 vector flag to 0 and stores the detection vector Ve (=0 vector) such that both the initial vector selection unit 101 and the vector allocating unit 54 use the vector stored in the detected-vector memory 53, at which time the 0 vector flag (zflg) is also written to the 0 vector flag region 571.

Further, in the event that the value of the counter flag from the valid pixels determining unit 531 is 10, the evaluation value determining unit 581 sets the value of the 0 vector flag to 1 and stores the initial candidate vector Vic (=0 vector) such that only the initial vector selection unit 101 can use the vector stored in the detected-vector memory 53, and the vector allocation unit 54 use the 0 vector, at which time the 0 vector flag (zflg=1) is also written to the 0 vector flag region 571.

Thus, even with an arrangement having no memory for the initial candidate vector Vic (the initial candidate vector memory 524 in FIG. 45), advantages the same as having memory for the initial candidate vector Vic can be had simply by expanding the region for the 0 vector flag in the detected-vector memory 53 by one bit per block.

Figure 70:
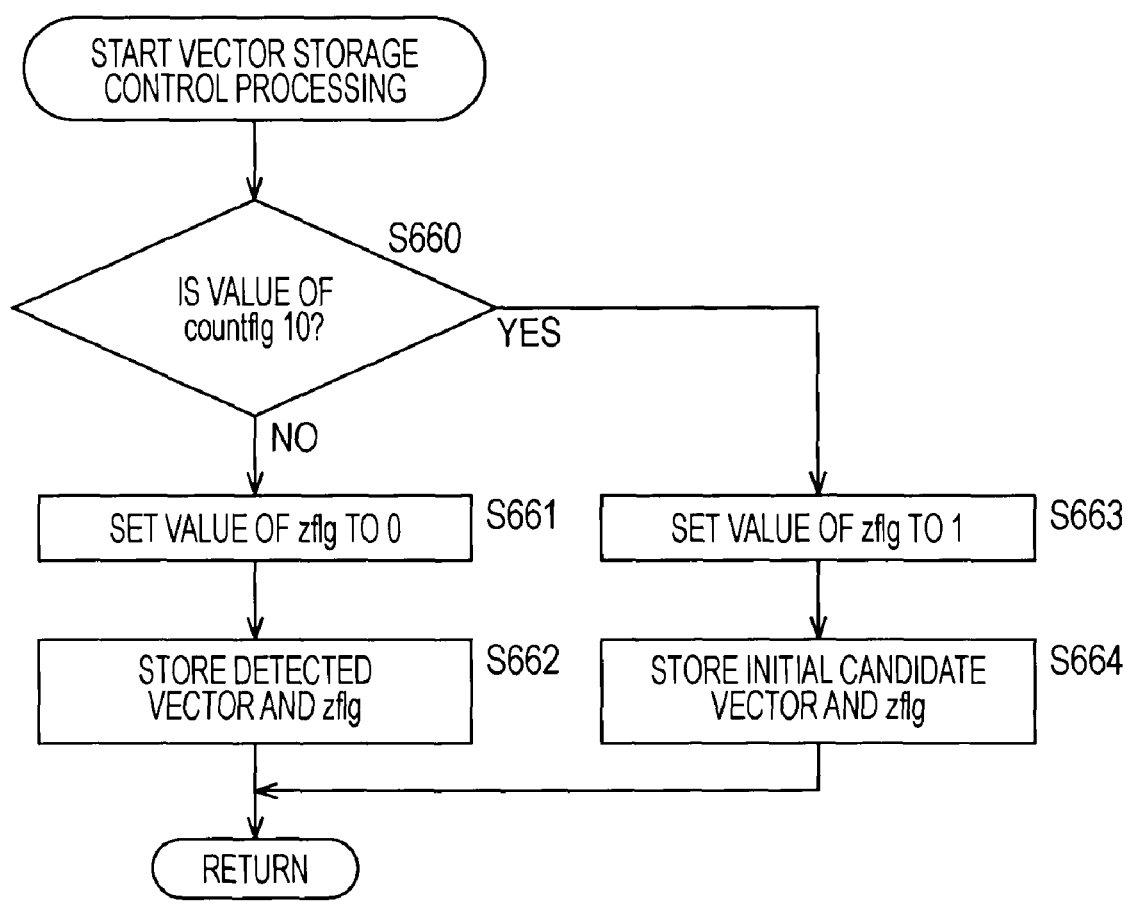
FIG. 70 is a flowchart for describing another example of vector storage control performed in step S565 in FIG. 63.

Next, the vector storage control processing of the evaluation determining unit 581 shown in FIG. 69 will be described with reference to the flowchart in FIG. 70. Note that FIG. 70 is another example of processing for storing the detection vector and initial candidate vector in step S565 of FIG. 63. That is to say, the gradient method computation of the vector detection unit 52 shown in FIG. 68 only differs regarding the storage control processing of the detection vector and initial candidate vector by the evaluation determining unit 581 in step S565, and other processing is basically the same processing as the gradient method computation performed by the vector detection unit 52 shown in FIG. 45 described above with reference to FIG. 63, so description thereof will be omitted.

In step S660, the evaluation determining unit 581 determines whether or not the value of the counter flag from the valid pixels determining unit 531 is 10.

Figure 63:
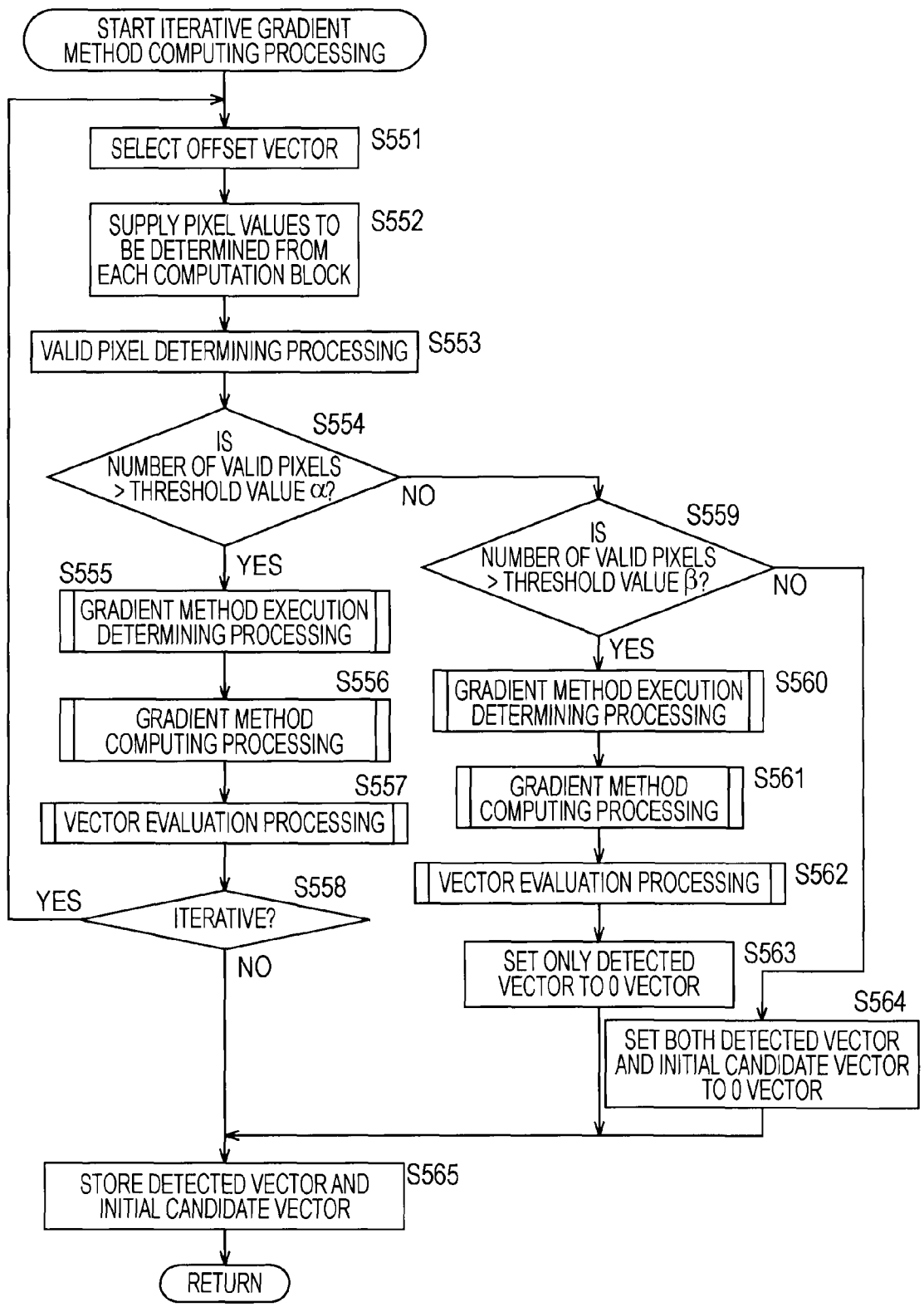
FIG. 63 is a flowchart for describing another example of iterative gradient method computing processing performed in step S103 in FIG. 20.

In step S660, in the event that determination is made that the value of the counter flag is not 10 (i.e., is either 0 or 1), the evaluation determining unit 581 sets the value of the 0 vector flag to 0 in step S661, and in step S662 takes the motion vector v obtained in step S557 in FIG. 63 as the detection vector Ve, so as to be stored in the detected-vector memory 63 along with the 0 vector flag (zflg=0).

That is to say, the detection vector Ve is stored correlated with the block for detection, and the 0 vector flag (zflg=0) is stored in the 0 vector flag region 571 which has been expanded by one bit, correlated to the block for detection.

Corresponding to this, the initial vector selection unit 101 reads out the initial candidate vector from the corresponding position of the block in the detected-vector memory 53, and the latter vector allocation unit 54 reads out the detection vector from the corresponding position of the block in the detected-vector memory 53 in accordance with the 0 vector flag (zflg=0).

On the other hand, in step S660, in the event that determination is made that the value of the counter flag is 10, in step S663 the evaluation determining unit 581 sets the value of the 0 vector flag to 1, and in step S664 stores the motion vector V obtained in step S557 in FIG. 63 in the detected-vector memory 63 as the initial candidate vector Vic, along with the 0 vector flag (zflg=1).

That is to say, the initial candidate vector Vic is stored correlated with the block for detection, and the 0 vector flag (zflg=1) is stored in the 0 vector flag region 571 which has been expanded by one bit, correlated to the block for detection.

Corresponding to this, the initial vector selection unit 101 reads out the initial candidate vector from the corresponding position of the block in the detected-vector memory 53, and the latter vector allocation unit 54 does not read out the detection vector from the corresponding position of the block in the detected-vector memory 53, in accordance with the 0 vector flag (zflg=1), but takes the 0 vector as a detection vector.

As described above, even with an arrangement having no memory for the initial candidate vector Vic (the initial candidate vector memory 524 in FIG. 45), advantages the same as having memory for the initial candidate vector Vic can be had simply by expanding the region for the 0 vector flag in the detected-vector memory 53 by one bit per block.

That is to say, the ratio of the number of valid pixels within the computation block is determined using not only the predetermined threshold value α but also the predetermined threshold value β which is smaller than the predetermined threshold value α, and in the event that the number of valid pixels within the computation block is smaller than the predetermined threshold value α but is greater than the predetermined threshold value β, the gradient method computation results are taken as the initial candidate vector without quitting the gradient method computation, and the 0 vector is taken as the detection vector, so the convergence speed of the vector detection processing by gradient method computation can be improved while maintaining the precision of the detection vector used in the latter allocation processing around the same as that of the conventional.

Next, the detailed configuration of the vector allocation unit 54 will be described.

Figure 71:
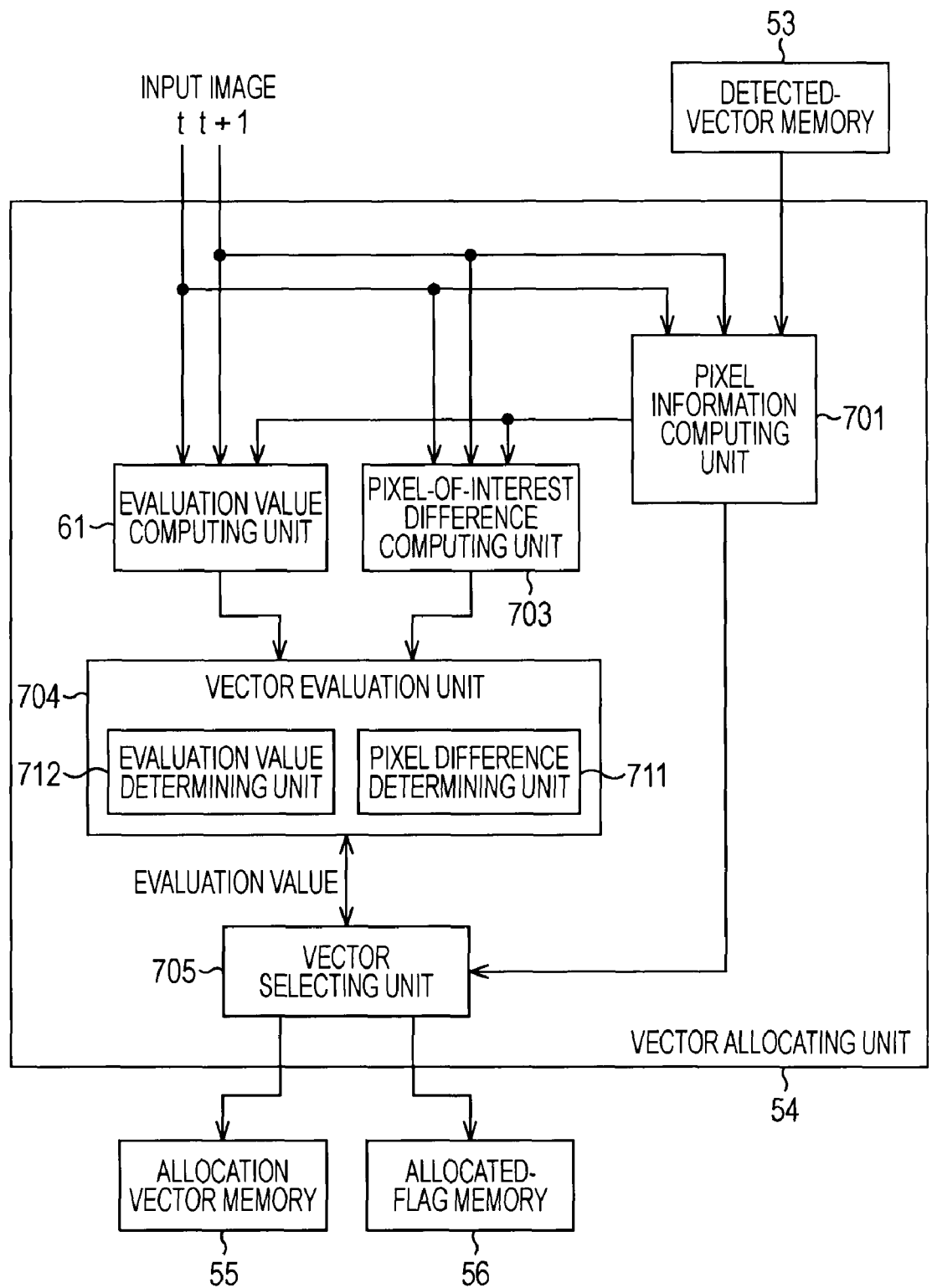
FIG. 71 is a block diagram illustrating the configuration of the vector allocation unit shown in FIG. 2.

FIG. 71 is a diagram illustrating the configuration of the vector allocation unit 54. The vector allocation unit of which the configuration is shown in FIG. 71 performs processing to allocate a motion vector, detected in the frame t, to a pixel in an interpolation frame of interpolated 60P signals in allocated-vector memory 55, using the image frame t at a point-in-time t in 24P signals, and image frame t+1 at point-in-time t+1.

In the example shown in FIG. 71, the image frame t at point-in-time t and the image frame t+1 at point-in-time t+1 are input to a pixel information computing unit 701, the evaluation value computing unit 61 desired above with reference to FIG. 6, and a pixel of interest difference computing unit 703.

The pixel information computing unit 701 sequentially acquires motion vectors detected at pixels in the frame t in the detected-vector memory 53, in raster scanner order from the pixel at the upper left, extends the acquired motion vectors in the direction of the frame t+1 at the next point-in-time, and calculates an intersection of the extended motion vector and interpolation frame. The pixel information computing unit 701 then sets a pixel to which to allocate the motion vector in the interpolation frame (hereafter referred to as pixel of allocation), based on the intersection of the motion vector and interpolation frame that has been calculated, and outputs information of the motion vector and position of the pixel for allocation, to a vector selection unit 705. Also, the pixel information computing unit 701 calculates a position P on the frame t and a position Q on the frame t+1, correlated by the pixel for allocation and the motion vector, and outputs the calculated position information on the frame t and the frame t+1 to the evaluation value computing unit 61 and the pixel of interest difference computing unit 703.

Upon receiving input from the pixel information computing unit 701 of the position information on the frame t and frame t+1 correlated by the pixel for allocation and the motion vector, the evaluation value computing unit 61 sets certain DFD computation ranges (m×n) centered on each of the position P and position Q, and determines whether or not the DFD computation ranges are within the image box, in order to compute an evaluation value DFD of the position P of the frame t and the position Q of the frame t+1. In the event of determining that the DFD computation ranges are within the image box, the evaluation value computing unit 61 performs computation using the DFD computation ranges, thereby obtaining an evaluation value DFD of the pixel of allocation as to the motion vector, and outputs the obtained evaluation value DFD to a vector evaluation unit 704.

Upon inputting the position information on the frame t and frame t+1 correlated by the pixel for allocation and the motion vector, from the pixel information computing unit 701, the pixel of interest difference computing unit 703 uses the position P of the frame t and the position Q of the frame t+1 to obtain an absolute value of brightness difference as to the pixel for allocation, and outputs the obtained absolute value of brightness difference to the vector evaluation unit 704.

The vector evaluation unit 704 is configured of a pixel difference determining unit 711 and an evaluation value determining unit 712. The pixel difference determining unit 711 determines whether or not the absolute value of brightness difference as to the pixel for allocation input from the pixel of interest difference computing unit 703 is smaller than a predetermined threshold value. In the event that the absolute value of brightness difference as to the pixel for allocation input from the pixel of interest difference computing unit 703 has been determined by the pixel difference determining unit 711 to be smaller than the predetermined threshold value, the evaluation value determining unit 712 determines whether or not the evaluation value DFD of the pixel for allocation that has been input from the evaluation value computing unit 61 is smaller than the minimum evaluation value of the DFD table which the vector selection unit 705 has. In the event that the evaluation value determining unit 712 determines that the evaluation value DFD of the pixel for allocation is smaller than the minimum evaluation value of the DFD table, determination is made that the reliability of the motion vector to which the pixel for allocation corresponds, and the evaluation value DFD of the pixel for allocation is output to the vector selection unit 705.

The vector selection unit 705 has a DFD table for holding the minimum evaluation value for each pixel in the interpolation frame, and holds an evaluation value DFD0 for a case of allocating a 0 vector to each pixel in the interpolation frame, as the minimum evaluation value for each pixel in the interpolation frame, beforehand in the DFD table. Upon taking input of the evaluation value DFD of the pixel for allocation from the vector evaluation unit 704, the vector selection unit 705 rewrites the flag of the allocated-flag memory 56 to 1 (true), based on the information of the position of the pixel for allocation from the pixel information computing unit 701, and rewrites the minimum evaluation value of the DFD table of the pixel for allocation to the evaluation value DFD of the pixel for allocation. Also, the vector selection unit 705 allocates the motion vector from the pixel information computing unit 701 to the pixel for allocation in the allocated-vector memory 55, based on information of the position of the pixel for allocation from the pixel information computing unit 701.

While the example in FIG. 71 describes a case of the detected-vector memory 53 in FIG. 17 and FIG. 45, at the time of acquiring a motion vector from the detected-vector memory 53 in the example in FIG. 68, the pixel information computing unit 701 acquires a motion vector detected at a pixel in the frame t (detection vector), or a 0 vector, according to the value of the 0 vector flag written corresponding to the pixel in the frame t.

Next, the sub-pixel precision of motion vectors will be described.

With the DFD evaluation computation represented by the above-described Expression (1), the phase p+v in the frame t+1 in which the pixel position p in the frame t is shifted by the amount of the vector v, actually often does not match the pixel position in the frame t+1 in 24p signals, and the brightness value in this case is not defined. Accordingly, in order to perform computation of the evaluation value DFD as to a motion vector v having sub-pixel precision, a brightness value in a sub-pixel phase must be generated with one method or another.

Corresponding to this, there is a method wherein the brightness value of the pixel closest to the phase p+v in the frame t+1 to which the pixel position p of the frame t has been shifted by the amount of the vector v without change. However, with this method, the sub-pixel component of the motion vector to be evaluated is rounded off, meaning that the sub-pixel component of the motion vector is discarded, and that the reliability of the evaluation value DFD obtained thereby is lower.

Figure 72:
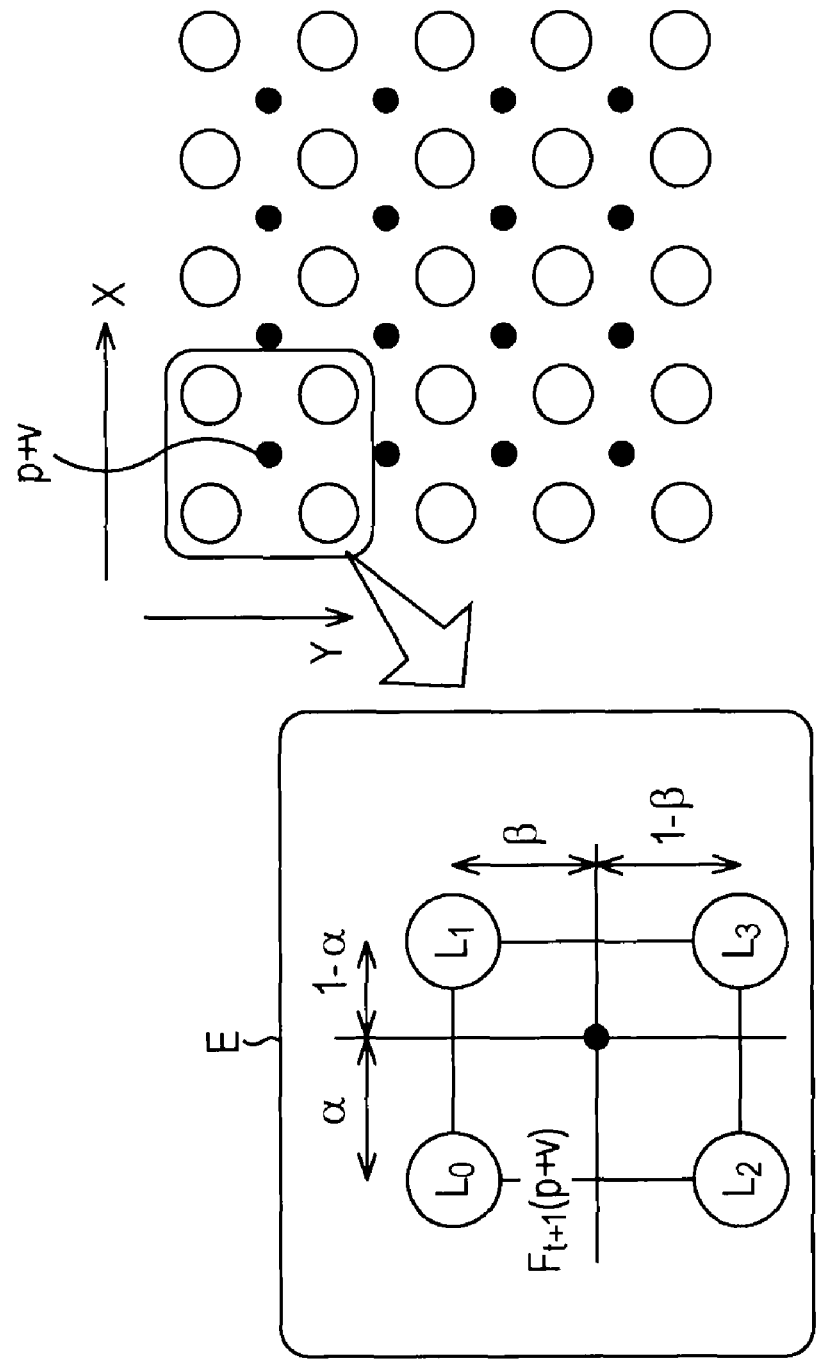
FIG. 72 is a diagram for describing the concept of four-point interpolation processing according to the present invention.

Accordingly, with the present invention, four-point interpolation using the brightness values of the surrounding four pixels is used. FIG. 72 is a diagram illustrating the concept of the four-point interpolation according to the present invention. In FIG. 72, the arrow X represents the horizontal direction in the frame t+1, and the arrow Y represents the vertical direction in the frame t+1. In this frame t+1, the white circles represent the pixel positions in the frame t+1, and the black dots represent sub-pixel (granular) positions. Also, the block dot p+v at the uppermost left in the frame t+1 and the four surrounding pixels are shown larger in a window E. In the window E, the alphabet letters in the white circles represent the brightness values of the four surrounding pixels.

If we say that the block dot p+v at the uppermost left in the frame t+1 is the p+v at the position to which the pixel position p in the frame t has been shifted by the amount of the vector v, the brightness value $F_{t+1}(p+v)$ of the phase p+v can be obtained as the sum of the reciprocal ratio of the distances of the four surrounding pixels, using the sub-pixel component α of the horizontal direction of the phase p+v and the sub-pixel component β of the vertical direction thereof, and the brightness values L0 through L4 of the four surrounding pixels of the phase p+v. That is to say, the brightness value $F_{t+1}(p+v)$ can be represented by the following Expression (31).

[Mathematical Expression 30]

$$F_{t+1}(p+v)=(1-\alpha)(1-\beta)L0+\alpha(1-\beta)L1+(1-\alpha)\beta L2+\alpha\beta L3 \quad (31)$$

As described above, performing DFD evaluation computation using the brightness value $F_{t+1}$ (p+v) obtained by four-point interpolation processing allows deterioration in reliability of the evaluation value DFD to be suppressed without increasing the cost of hardware implementation. Note that while an example of applying this four-point interpolation will be described in the following computation such as for the evaluation DFD at the time of vector allocation and absolute value of brightness difference, but this four-point interpolation is applied to computation of the evaluation value dfv (evaluation value mDFD) in the case of evaluating vectors such as the above-described initial vector selection processing and vector detection processing and so forth, computation of evaluation value DFD for evaluating vector such as in the later-described allocation compensation processing, and the later-described image interpolation processing as well, as a matter of course.

Next, the details of vector allocation will be described with reference to the flowchart shown in FIG. 73. A frame t at point-in-time t of an image, which is an original frame of 24P signals, and a frame t+1 at point-in-time t+1, are input to the pixel information computing unit 701, evaluation value computing unit 61, and pixel of interest difference computing unit 703.

Upon a new original frame being input, the pixel information computing unit 701 controls the vector selection unit 705 so as to initialize the allocation flag of the allocation flag memory 56 to 0 (False) in step S701, and initialize the allocated-vector memory 55 with a 0 vector in step S702. Accordingly, consequently, 0 vectors are allocated to pixels where motion vectors are not allocated.

Also, in step S703 the pixel information computing unit 701 controls the evaluation value computing unit 61 such that the DFD0 value is calculated using 0 vectors for all pixels within the interpolation frame, and controls the vector selection unit 705 so as to store the evaluation value DFD0 of the 0 vectors calculated by the evaluation value computing unit 61 in the DFD table as smallest evaluation value as to each pixel in the interpolation frame. That is to say, in step S703, the evaluation value computing unit 61 calculates the evaluation value DFD using 0 vectors for all pixels in the interpolation frame, and outputs the calculated evaluation value DFD0 to the vector selection unit 705 via the vector evaluation unit 704. The vector selection unit 705 then stores the evaluation value DFD0 input via the vector evaluation unit 704 as the minimum evaluation value of the pixel corresponding to the DFD table.

In step S704, the pixel information computing unit 701 selects a pixel from the original frame in the detected-vector memory 53. Note that selection of pixels is made in raster scan order from the upper left of the frame.

In step S705, the pixel information computing unit 701 executes pixel position computing processing. Specifically, the pixel information computing unit 701 calculates an intersection between an acquired motion vector and interpolation frame, and sets a pixel for allocation from the intersection calculated from the motion vector and interpolation frame. At this time, in the event that the intersection matches a pixel position in the interpolation frame, the pixel information computing unit 701 sets this intersection to the pixel for allocation. On the other hand, in the event that the intersection does not match a pixel position in the interpolation frame, the pixel information computing unit 701 sets four pixels near the intersection in the interpolation frame to be the pixel for allocation.

The pixel information computing unit 701 calculates the position in the original frame correlated with the acquired motion vector, by shifting the acquired motion vector to the set pixel for allocation that has been set (parallel movement), and obtains the position of the intersection between the shifted motion vector and the original frame, using as a reference each pixel for allocation, which is necessary for the evaluation value computing unit 61 and the pixel of interest difference computing unit 703 to obtain the evaluation value DFD and absolute value of brightness difference.

In step S706, the pixel information computing unit 701 selects the calculated pixel for allocation, and outputs the selected pixel for allocation and the motion vector thereof to the vector selection unit 705. At this same time, the pixel information computing unit 701 outputs information of position on the original frame that is correlated with the motion vector to the evaluation value computing unit 61 and the pixel of interest difference computing unit 703, with the selected pixel for allocation as a reference. Note that in step S706, in the event that multiple pixels for allocation exist, the pixel information computing unit 701 selects from the pixel at the upper left.

In step S707, the pixel information computing unit 701 executes allocation vector evaluation processing with regard to the selected pixel for allocation. Details of this allocation vector evaluation processing will be described alter with reference to FIG. 74, in which allocation vector evaluation processing the evaluation value DFD and absolute value of brightness difference for the motion vector at the pixel for allocation are obtained, reliability of the motion vector at the pixel of allocation is determined, and as a results of this determination, the motion vector in the allocated-vector memory 55 is rewritten with a motion vector determined to have high reliability.

In step S708, the pixel information computing unit 701 determines whether or not processing of all pixels for allocation has ended. In the event that determination is made in step S708 that processing of all pixels for allocation has not ended, the flow returns to step S706, the next pixel for allocation is selected, and the subsequent processing is repeated.

In the event that processing of all pixels for allocation has been determined to have ended in step S708, in step S709 the pixel information computing unit 701 determines whether or not processing of all pixels in the frame in the detected-vector memory 53 has ended. In the event that determination is made in step S709 that processing of all pixels in the frame in the detected-vector memory 53 has not ended, the flow returns to step S704, the next pixel in the original frame in the detected-vector memory 53 is selected, and subsequent processing is repeated. Also, in the event that determination is made in step S709 that processing of all pixels in the frame in the detected-vector memory 53 has ended, the vector allocation processing is ended.

Next, the details of allocated vector evaluation processing will be described with reference to the flowchart in FIG. 74. Note that FIG. 74 illustrates an example of the allocated vector evaluation processing performed in step S707 in FIG. 73.

Figure 73:
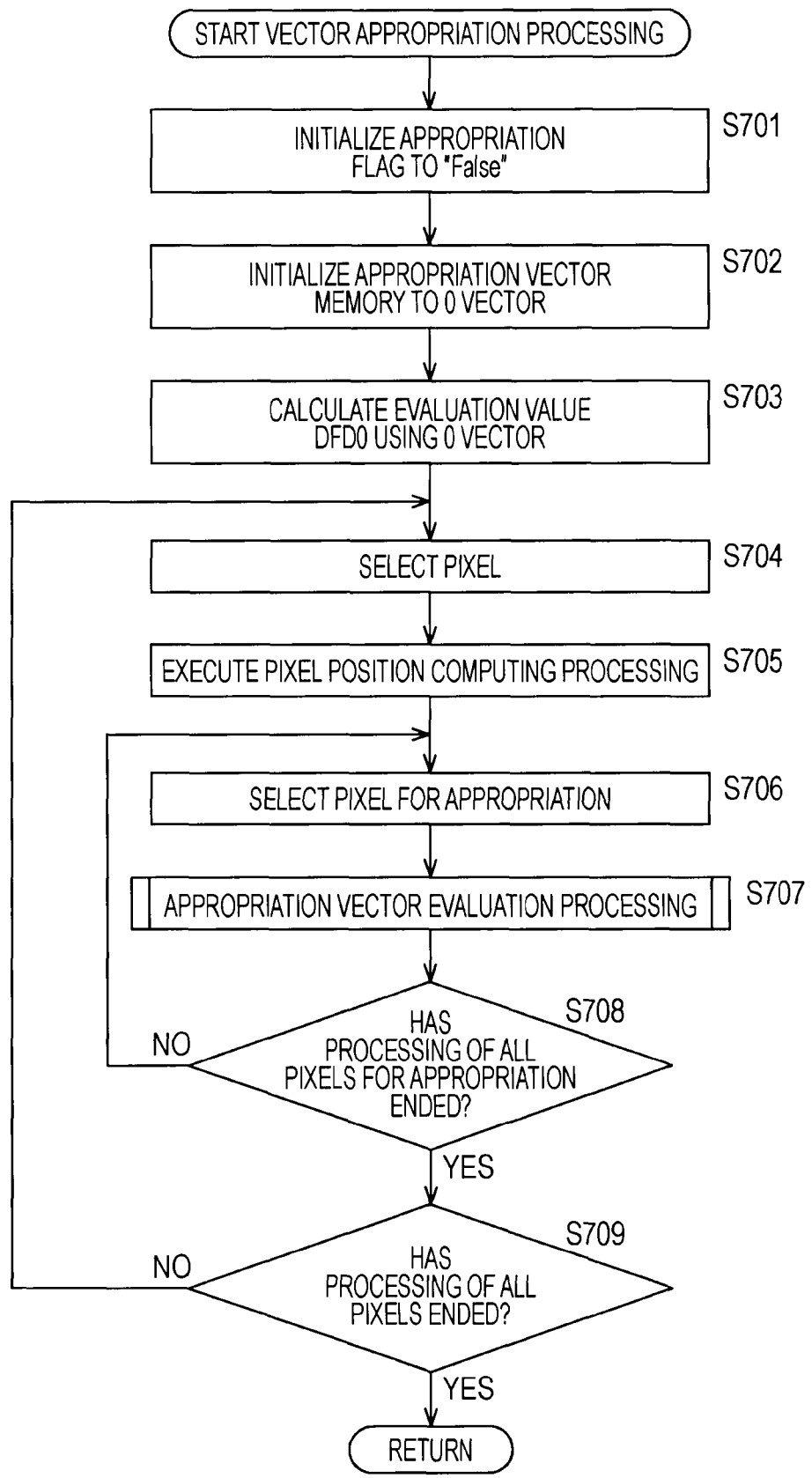
FIG. 73 is a flowchart for describing the vector allocation processing performed in step S83 in FIG. 16.
Figure 74:
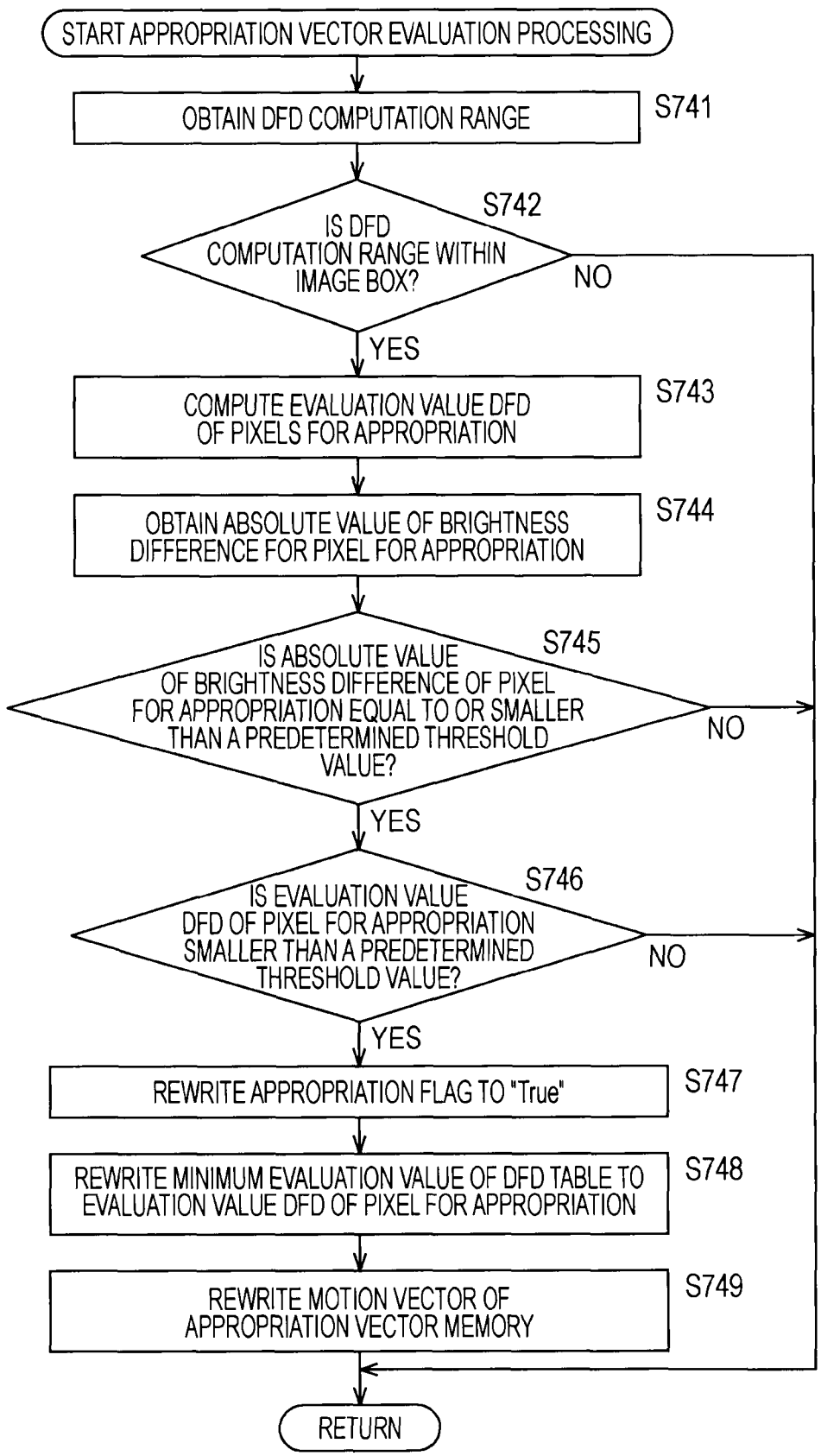
FIG. 74 a flowchart for describing the allocation vector evaluation processing performed in step S707 in FIG. 73.

In step S706 in FIG. 73, the position in the original frame correlated by the motion vector thereof is obtained with the selected pixel for allocation as a reference by the pixel information computing unit 701, and the information of the position in the original frame that is obtained is input to the evaluation value computing unit 61 and the pixel of interest difference computing unit 703.

Upon the information of the position in the original frame being input from the pixel information computing unit 701, in step S741 the evaluation value computing unit 61 obtains DFD computation ranges (m×n) centered on each of the positions on the frame t and the frame t+1, and in step S742 determines whether the obtained DFD computation ranges are within the image box.

In step S742, in the event that determination is made that the DFD computation range does not fit within the image box, the motion vector is determined not to be an allocation candidate vector for allocation to the pixel for allocation, and the processing of step S743 through S749 is skipped, the allocated vector evaluation processing is ended, and the processing returns to step S708. Accordingly, a motion vector wherein the DFD computation ranges centered on the point P on the frame t and the point Q on the frame t+1 do not fit within the image box is eliminated from the candidates.

In step S742, in the event that determination is made that an obtained DFD computation range is within the picture box, in step S743 the evaluation value computing unit 61 computes the evaluation value DFD of the pixel for allocation using the DFD computation range determined to be within the image box, and outputs the obtained evaluation value DFD to the evaluation value determining unit 712. At this time, in the event that the position in the original frame is sub-pixel, the above-described four-point interpolation is used to obtain the brightness value at the intersection on the original frame, thereby calculating the evaluation value DFD of the pixel for allocation.

On the other hand, upon information of the position on the original frame being input from the pixel information computing unit 701, in step S744, the absolute value of brightness difference dp at the pixel for allocation is obtained, and the obtained absolute value of brightness difference dp is output to the pixel difference determining unit 711. Note that in this case as well, in the event that the position in the original frame is sub-pixel, the above-described four-point interpolation is used by the pixel of interest difference computing unit 703 to obtain the brightness value at the intersection on the original frame, thereby calculating the absolute value of brightness difference dp of the pixel for allocation.

In step S745, the pixel difference determining unit 711 determines whether or not the absolute value of brightness difference dp of the pixel for allocation is equal to or below a predetermined threshold value. In the event that determination is made in step S745 that the absolute value of brightness difference dp of the pixel for allocation is greater than the predetermined threshold value, determination is made that the possibility that the intersections at frame t and frame t+1 belong to different objects is high, i.e., the reliability of this motion vector at the pixel for allocation is low, and will not serve as an allocation candidate vector for allocation to the pixel for allocation, so the processing skips step S746 through S749, allocation vector evaluation processing is ended, and the flow returns to step S708 in FIG. 73.

Accordingly, motion vectors wherein intersections at frame t and frame t+1 belong to different objects are eliminated from the candidates.

In the event that determination is made in step S745 that the absolute value of brightness difference dp of the pixel for allocation is equal to or lower than the predetermined threshold value, the flow proceeds to step S746. In step S746, the evaluation value determining unit 712 makes reference to the DFD table of the vector selection unit 705, and determines whether or not the evaluation DFD of the pixel for allocation from the evaluation value computing unit 61 is smaller than the minimum evaluation value for a pixel for allocation stored in the DFD table (in this case, the evaluation value DFD0 of a 0 vector). In the event that determination is made in step S746 that the evaluation DFD of the pixel for allocation from the evaluation value computing unit 61 is equal to or greater than the minimum evaluation value for a pixel for allocation stored in the DFD table, the reliability of the motion vector thereof is determined to not be high at the pixel for allocation, so the processing skips step S747 through S749, allocation vector evaluation processing is ended, and the flow returns to step S708 in FIG. 73.

On the other hand, in the event that determination is made in step S746 that the evaluation DFD of the pixel for allocation from the evaluation value computing unit 61 is smaller than the minimum evaluation value for a pixel for allocation stored in the DFD table, the evaluation value determining unit 712 determines that this motion vector has the highest reliability based on the evaluation value DFD of all of the motion vectors compared so far at the pixel for allocation, and outputs the evaluation value DFD of the pixel for allocation, regarding which determination has been made that reliability is high, to the vector selection unit 705.

Upon inputting the evaluation value DFD of the pixel for allocation from the evaluation value determining unit 712, in step S747 the vector selection unit 705 rewrites the flag of the pixel for allocation of the allocated-flag memory 56 to 1 (true), and in step S748 rewrites the minimum evaluation value to which the pixel for allocation in the DFD table corresponds to with the evaluation value DFD which the evaluation value determining unit 712 has determined to have high reliability.

The pixel for allocation selected from the pixel information computing unit 701 and the motion vector thereof have been input to the vector selection unit 705 in step S706. Accordingly, in step S749 the vector selection unit 705 rewrites the motion vector allocated to the pixel for allocation in the allocated-vector memory 55 with the motion vector corresponding to the evaluation value DFD which has been determined to have high reliability. Accordingly, allocation vector evaluation processing is ended, and the processing returns to step S708 in FIG. 73.

As described above, at the time of selecting a motion vector to be allocated to a pixel for allocation in an interpolation frame, in addition to the evaluation value DFD, the absolute value of brightness difference of the pixel for allocation obtained based on the position on the original frame correlated with a motion vector with the pixel for allocation as a reference is handed separately and evaluated, so a motion vector which is most likely can be selected from the allocation candidate vectors and allocated to the pixel for allocation, as compared with the conventional case of using only the evaluation value DFD. Accordingly, vector allocation precision improves, discontinuity in images generated in the latter image interpolation processing can be suppressed, and image quality can be improved.

Further, in the event that a pixel value of a sub-pixel position is necessary, such as in the case of obtaining the evaluation value DFD or absolute value of brightness difference, this is obtained by linear interpolation based on the distance of four nearby pixels of the sub-pixel position, so processing of sub-pixel position precision is enable, and further, the absolute value of brightness difference dp and evaluation value DFD can be obtained with good precision as compared to the conventional method wherein sub-pixel components are rounded off, and accordingly, a motion vector which is more likely for the pixel of interest can be allocated from the allocation candidate vectors. That is to say, the precision of vector allocation processing improves.

Next, description will be made regarding details of the configuration of an allocating compensation unit 57.

Figure 75:
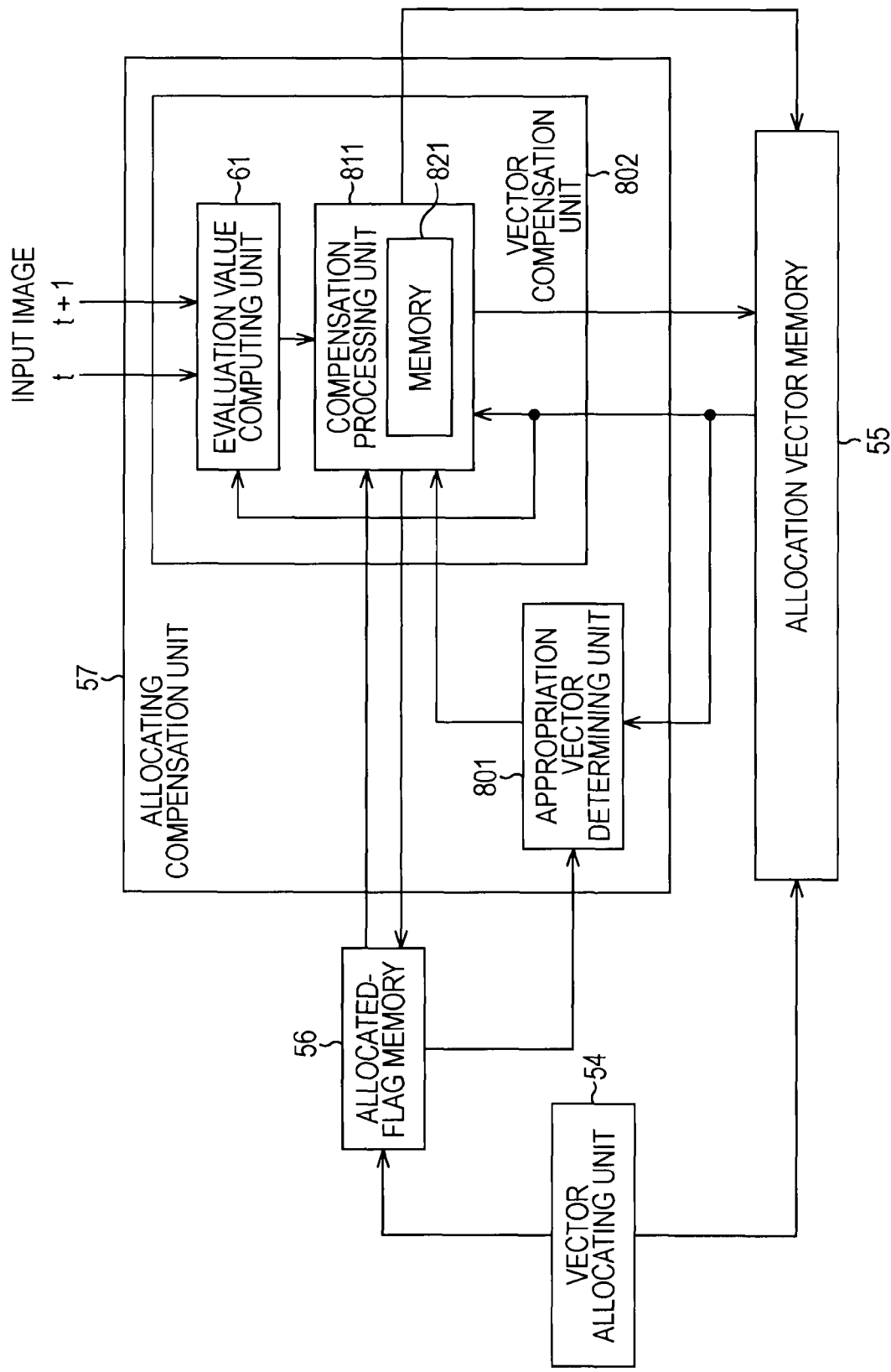
FIG. 75 is a block diagram illustrating the configuration of the allocation compensation unit shown in FIG. 2.

FIG. 75 is a block diagram illustrating the configuration of the allocating compensation unit 57. The allocating compensation unit 57 of which the configuration is shown in FIG. 75 is configured of an allocation vector determining unit 801 and vector compensation unit 802, and performs taking a pixel in an interpolation frame in 60P signals to which a motion vector has not been allocated by the vector allocation unit 54, and filling in motion vectors from the surrounding pixels and allocating this.

A motion vector has been allocated to pixels of the interpolation frame in the allocated-vector memory 55 by the vector allocation unit 54 upstream. Also, 1 (True) is written to the allocation flag in the allocation flag memory 56 of the pixels to which motion vectors have been allocated by the vector allocation unit 54, and 0 (False) is written to the allocation flag in the allocation flag memory 56 of the pixels to which motion vectors have not been allocated by the vector allocation unit 54.

The allocation vector determining unit 801 refers to the allocation flag of the allocation flag memory 56, and determines whether or not a motion vector has been allocated to a pixel of interest by the vector allocation unit 54. The allocation vector determining unit 801 selects a pixel of interest to which a motion vector has not been allocated by the vector allocation unit 54, controls the vector compensation unit 802 as to the selected pixel of interest, selects the motion vectors of surrounding pixels of the pixel of interest, and allocates in the interpolation frame in the allocated-vector memory 55.

The vector compensation unit 802 is configured of a compensation processing unit 811, and the evaluation value computing unit 61 described above with reference to FIG. 6.

The compensation processing unit 811 has memory 821 for storing the minimum evaluation value DFD and the motion vector of the minimum evaluation value DFD as a candidate vector (hereafter also referred to as compensation candidate vector), wherein the evaluation value DFD of a 0 vector is stored in the memory 821 as a minimum evaluation value, as the initial value of the pixel of interest selected by the allocation vector determining unit 801, and a 0 vector is stored in the memory 821 as a compensation candidate vector. The compensation processing unit 811 makes reference to the allocation flag memory 56 and determines whether or not there are motion vectors in surrounding pixels of the pixel of interest, obtains the motion vectors allocated to the surrounding pixels from the allocated-vector memory 55, and controls the evaluation value computing unit 61 to compute the evaluation value DFD of the motion vectors thereof.

Also, the compensation processing unit 811 determines whether or not the evaluation value DFD computed by the evaluation value computing unit 61 is smaller than the minimum evaluation value stored in the memory 821, and in the event that determination is made that the computed evaluation value DFD is smaller than the minimum evaluation value, the compensation candidate vector and the minimum evaluation value in the memory 821 are rewritten with the computed evaluation value DFD and the motion vector thereof, and finally, the motion vector of the surrounding pixels (compensation candidate vector) with the smallest evaluation value DFD is allocated to the pixel of interest in the allocated-vector memory 55 as the motion vector of the pixel of interest. Further, the compensation processing unit 811 rewrites the allocation flag of the allocation flag memory 56 for the pixel of interest to which the motion vector has been allocated, to 1 (True).

Upon acquiring the motion vector of the surrounding pixels from the allocated-vector memory 55, the evaluation value computing unit 61 computes the evaluation value DFD of the motion vector from the allocated-vector memory 55 using the image input frame t of 24P signals at point-in-time t and the image frame t+1 at point-in-time t+1, and outputs the computed evaluation value DFD to the compensation processing unit 811.

Figure 76:
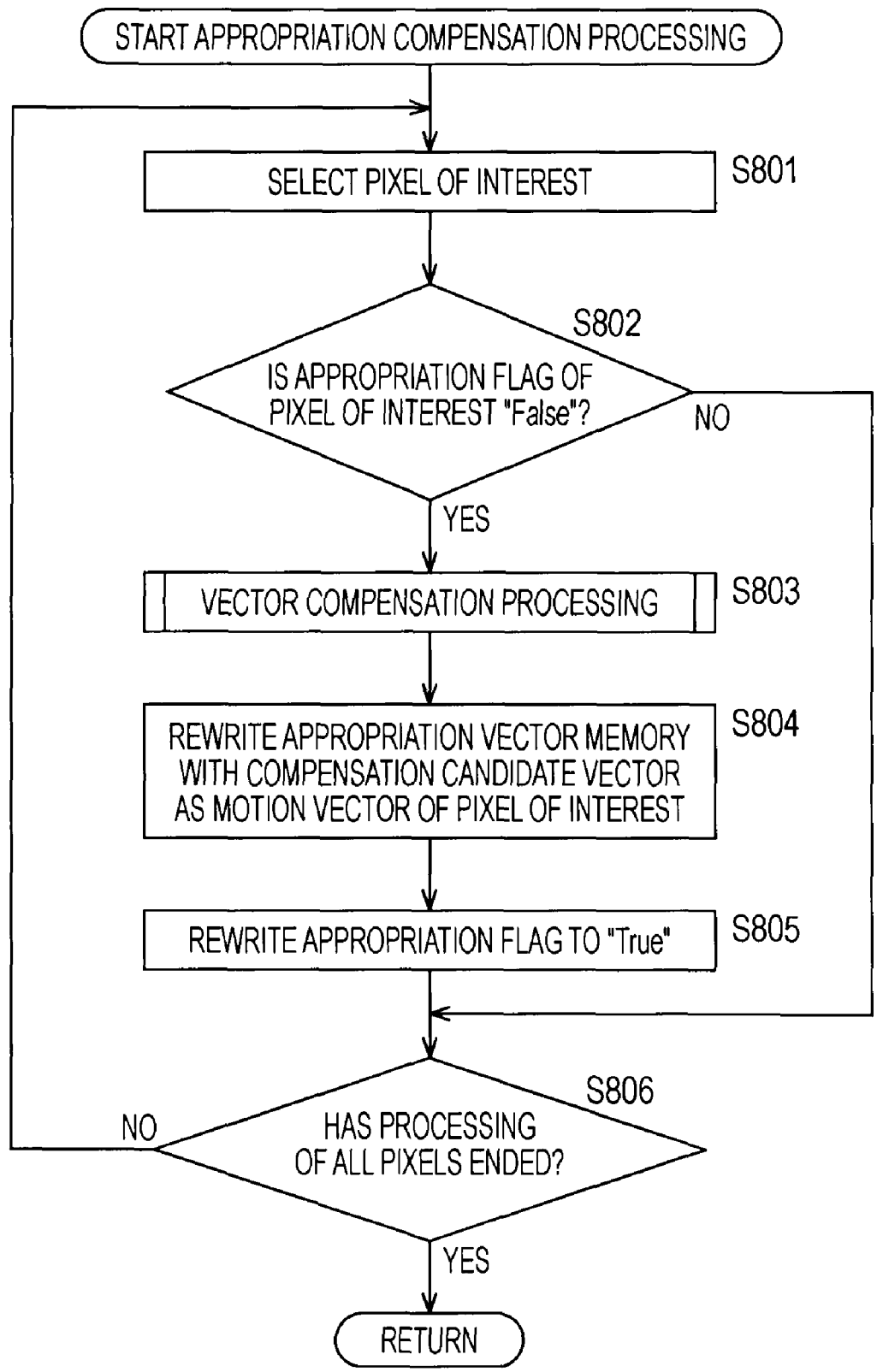
FIG. 76 is a flowchart for describing allocation compensation processing performed in step S84 in FIG. 16.

Next, details of the allocation compensation processing will be described with reference to the flowchart shown in FIG. 76. Motion vectors have been allocated to pixels in the interpolation frame in the allocated-vector memory 55, by the vector allocation unit 54 upstream. Also, 1 (True) has been written to allocation flags in the allocation flag memory 56, for pixels to which motion vectors have been allocated by the vector allocation unit 54, 0 (False) has been written to allocation flags in the allocation flag memory 56, for pixels to which motion vectors have not been allocated.

In step S801, the allocation vector determining unit 801 selects a pixel in the interpolation frame in the allocation flag memory 56 as a pixel of interest. At this time, the allocation vector determining unit 801 selects pixels in raster scan order from the pixel at the upper left of the frame.

In step S802, the allocation vector determining unit determines whether or not the allocation flag of the pixel of interest in the allocation flag memory 56 is 0 (False), and in the event that determination is made that the allocation flag of the pixel of interest in the allocation flag memory 56 is 0 (False), determination is made that a motion vector has not been allocated, and in step S803 the compensation processing unit 811 is controlled to execute vector compensation processing. Details of this vector compensation processing will be described later with reference to FIG. 77, and due to this vector compensation processing, the motion vector with the smallest evaluation value DFD is selected from the motion vectors allocated to the surrounding pixels and stored in the memory 821 as a compensation candidate vector.

In step S804, the compensation processing unit 811 allocates the compensation candidate vector in the memory 821 to the allocated-vector memory 55 as the motion vector of the pixel of interest, and in step S805 rewrites the allocation flag of the pixel of interest in the allocation flag memory 56 to 1 (True).

On the other hand, in the event that determination is made in step S802 that the allocation flag of the pixel of interest in the allocation flag memory 56 is 1 (True), determination is made that a motion vector has been allocated to the pixel of interest thereof, so the processing skips step S803 through S805, and the flow proceeds to step S806.

In step S806 the allocation vector determining unit 801 determines whether or not processing of all pixels in the interpolation frame within the allocation flag memory 56 has ended. In the event that determination is made in step S806 that processing of all pixels has not ended, the processing returns to step S801, the next pixel of the interpolation frame in the allocation flag memory 56 is selected as the pixel of interest, and subsequent processing is executed. In the event that determination is made in step S806 that processing of all pixels in the interpolation frame within the allocation flag memory 56 has ended, the allocation compensation processing ends.

Figure 77:
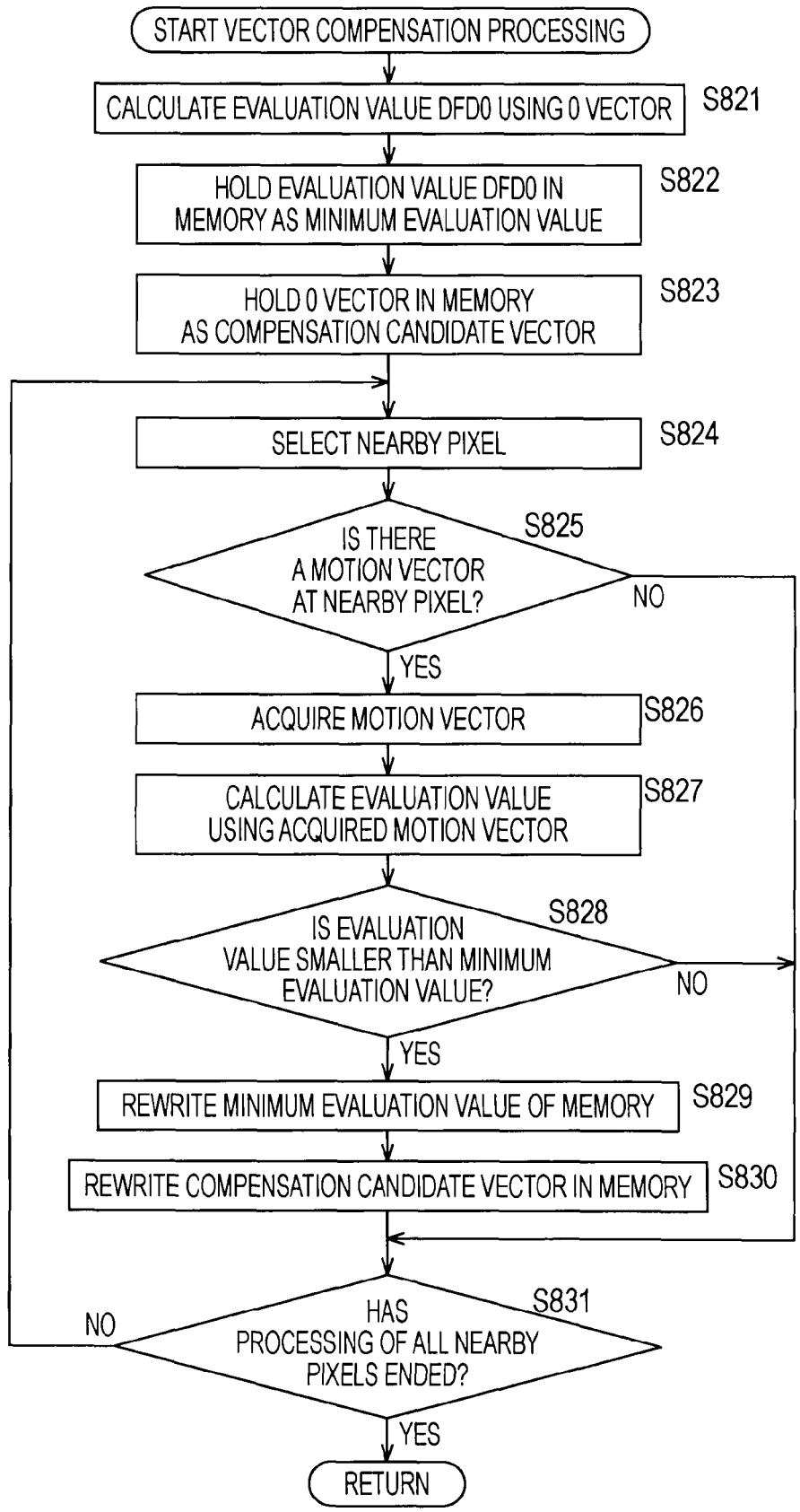
FIG. 77 is a flowchart for describing vector compensation processing performed in step S803 in FIG. 76.

Next, the vector compensation processing will be described in detail with reference to the flowchart in FIG. 77. Note that FIG. 77 shows an example of the vector compensation processing in step S803 in FIG. 76.

The compensation processing unit 811 controls the evaluation value computing unit 61 in step S821 and calculates the evaluation value DFD0 employing a 0 vector. Specifically, in step S821 the evaluation value computing unit 61 employs the image frame t at point-in-time t and the image frame t+1 at point-in-time t+1 to be input to compute the evaluation value DFD0 with the 0 vector for a pixel of interest, as described above with reference to FIG. 62, for example, and outputs the computed evaluation value DFD0 to the compensation processing unit 811.

In step S822, the compensation processing unit 811 stores the evaluation value DFD0 as a minimum evaluation value in the memory 821, and in step S823, stores the 0 vector as a compensation candidate vector in the memory 821. The compensation processing unit 811 selects one periphery pixel from eight periphery pixels of the pixel of interests selected by the allocation vector determining unit 801 in step S824. At this time, the compensation processing unit 811 selects the periphery pixels from the eight periphery pixels in a raster scan order from the upper left pixel.

The compensation processing unit 811 references the allocated-flag memory 56 in step S825 to determine whether or not there is any motion vector of the selected periphery pixels. If the allocated-flag is 1 (True) for the periphery pixels of the allocated-flag memory 56, determination is made in step S825 that there is a motion vector allocated to the selected periphery pixel, the flow is advanced to step S826, and the compensation processing unit 811 obtains the motion vector of the periphery pixel from the allocated-vector memory 55. At this time, the motion vector of the periphery pixel is also output from the allocation vector memory to the evaluation value computing unit 61.

Upon the motion vector of the periphery pixel being input from the allocated-vector memory 55, in step S827 the evaluation value computing unit 61 employs the image frame t at point-in-time t and the image frame t+1 at point-in-time t+1 to be input, to compute the evaluation value DFD of the motion vector from the allocated-vector memory 55 for the pixel of interests, and outputs the computed evaluation value DFD to the compensation processing unit 811.

Upon the evaluation value DFD being input from the evaluation value computing unit 61, the compensation processing unit 811 determines in step S828 whether or not the evaluation value DFD is smaller or not than the minimum evaluation value of the pixel of interests stored in the memory 821. In the case determination is made in step S828 that the evaluation value DFD is smaller than the minimum evaluation value of the pixel of interests stored in the memory 821, the compensation processing unit 811 rewrites the minimum evaluation value in the memory 821 into an evaluation value DFD determined to be smaller than the minimum evaluation value in step S829, and in step S830, the compensation candidate vector in the memory 821 is rewritten into the motion vector thereof with the minimum evaluation value.

On the other hand, in step S825, if the allocation flag for the periphery pixel in the allocated-flag memory 56 is 0 (False), determination is made that there is no motion vector allocated to the selected periphery pixels, the processing in steps S826 through S830 is skipped, and the flow is advanced to step S831. Also, in the case determination is made in step S828 that the evaluation value DFD is at or above the minimum evaluation value of the pixel of interests stored in the memory 821, the processing in step S829 and S830 is skipped, and the flow is advanced to step S831.

The compensation processing unit 811 determines in step S831 whether or not processing has ended for all the eight periphery pixels of the pixel of interests. In the case determination is made in step S831 that processing has not ended for all the eight periphery pixels of the pixel of interests, the flow is returned to step S824, the next periphery pixel is selected, and the processing thereafter is repeated. Also, in the case determination is made in step S831 that processing has ended for all the eight periphery pixels of the pixel of interests, the vector compensation processing is ended, and the flow is returned to step S804 in FIG. 76.

Thus, with the vector allocation processing, even relating to pixels which cannot be allocated, by using the fact that there is motion correlation therewith, a likely motion vector with high reliability based on the evaluation value DFD can be obtained from the motion vectors in the periphery of the pixel thereof. Thus, the accuracy of the vector allocation is improved as compared to the case wherein the vector is not allocated and a 0 vector or the like is allocated, so discontinuity of the image generated with the image interpolation processing at a later stage can be suppressed.

Also, an arrangement is made with the above-described allocation compensation processing to rewrite the allocated-flag of the pixels, wherein a motion vector is allocated to 1 (True), and the motion vector allocated with the allocation compensation processing is also employed as a compensation candidate vector of the next pixel, so pixels having roughly the same motion within an object are selected by a similar motion vector, whereby a stable motion vector with little error can be obtained. Consequently, block noise or powder noise of an image generated at a later stage can be suppressed, thereby improving the quality thereof.

Note that with the above description, vector compensation processing is performed as to the pixels not allocated with the vector allocation unit 54, but vector compensation processing may be performed as to the pixels not obtaining a motion vector with some processing, such as the pixels not detected with the vector detection unit 52 (0 vector was detected). Also, vector compensation processing may be performed as to pixels not having a correct detected motion vector or allocated motion vector (reliability is low).

Also, with the above description, the allocation compensation processing in increments of pixels is described, but the likely motion vectors allocated to pixels positioned in the periphery of predetermined block units can be allocated to all of the pixels of the predetermined blocks. Note that in the case there are pixels with a motion vector already allocated to a predetermined block, allocation can be made to the pixels other than these.

Next, the detailed configuration of the image interpolation unit 58 will be described in detail.

Figure 78:
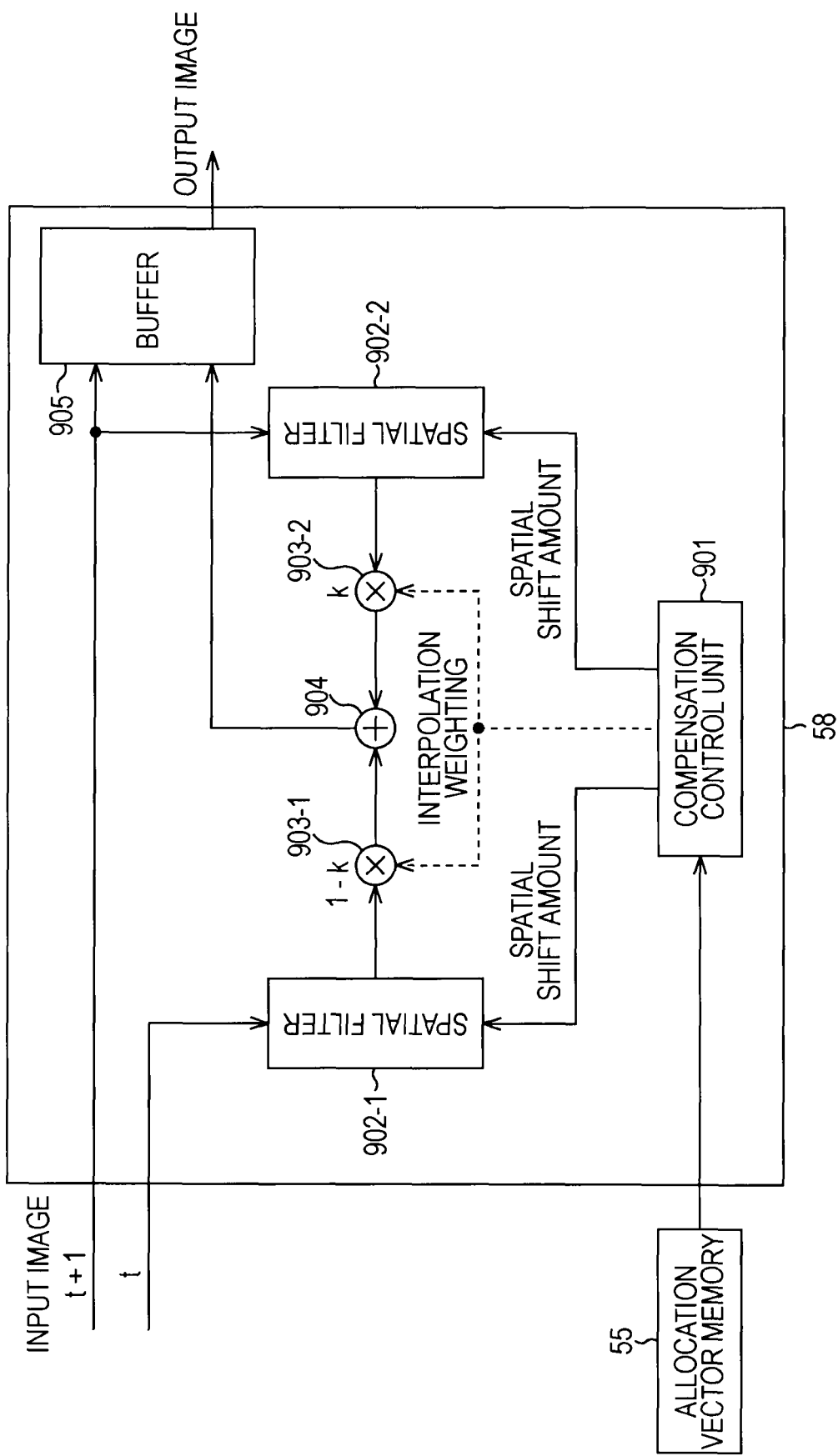
FIG. 78 is a block diagram illustrating the configuration of the image interpolation unit shown in FIG. 2.

FIG. 78 is a block diagram illustrating the configuration of the image interpolation unit 58. The image interpolation unit 58 with the configuration thereof shown in FIG. 78 uses the motion vector allocated to the interpolation frame in the allocated-vector memory 55 and the pixel values of the frame t and frame t+1 to interpolate/generate the pixel values of the interpolation frame, and performs processing to output the image of a 60P signal.

With the example in FIG. 78, the image frame t at point-in-time t is input in the spatial filter 92-1, and the image frame t+1 at point-in-time t+1 is input in the spatial filter 92-2 and buffer 95.

The interpolation control unit 91 selects a pixel in the interpolation frame of the allocated-vector memory 55, and based on the motion vector allocated to the selected pixel, the pixel on the interpolation frame and the positional relation between the two pixels for frame t and frame t+1 are each obtained. That is to say, with the pixel of the interpolation frame as a reference, the interpolation control unit 91 obtains the spatial shifting amount from the position on the frame t correlated with the motion vector thereof, and the position of the pixel on frame t corresponding to the pixel of the interpolation frame, and supplies the obtained spatial shifting amount to the spatial filter 92-1. Similarly, with the pixel of the interpolation frame as a reference, the interpolation control unit 91 obtains the spatial shifting amount from the position on the frame t+1 correlated with the motion vector thereof, and the position of the pixel on frame t+1 corresponding to the pixel of the interpolation frame, and supplies the obtained spatial shifting amount to the spatial filter 92-2.

Also, based on the time phase (point-in-time) of the interpolation frame set in advance, the interpolation control unit 91 obtains the interpolation weighting between the frame t and frame t+1, and sets the obtained interpolation weighting in multipliers 93-1 and 93-2. For example, in the case that the point-in-time of the interpolation frame is a point-in-time separated by "k" from the point-in-time t+1 of the frame t+1, and is a point-in-time separated by "1−k" from the point-in-time t of the frame t (i.e. in the case that the interpolation frame generates a point-in-time such that the point-in-time t and point-in-time t+1 are internally divided as "1−k": "k"), the interpolation control unit 91 sets the interpolation weighting to "1−k" at the multiplier 93-1, and sets the interpolation weighting to "k" at the multiplier 93-2.

The spatial filter 92-1 and 92-2 are configured by a cubic filter or the like, for example. The spatial filter 92-1 obtains the pixel value of the pixel on the frame t to be input and the pixel value on the frame t which corresponds to the image in the interpolation frame, based on the spatial shifting amount supplied from the interpolation control unit 91, and outputs the obtained pixel values to the multiplier 93-1. The spatial filter 92-2 obtains the pixel value of the pixel on the frame t+1 to be input and the pixel value on the frame t+1 which corresponds to the image in the interpolation frame, based on the spatial shifting amount supplied from the interpolation control unit 91, and outputs the obtained pixel values to the multiplier 93-2.

Note that in the case that the position of the pixel of the interpolation frame does not match the position of the pixel of the frame t or the frame t+1 (i.e. in the case the position of the pixel of the interpolation frame has a component at or below the pixel with the frame t or frame t+1), the spatial filters 92-1 and 92-2 use the pixel value of the periphery four pixels at the pixel position of the interpolation frame with the frame t or frame t+1 to obtain the sum of inverse ratios of the distances of the periphery four pixels, thereby obtaining the pixel values on the frame corresponding to the pixels of the interpolation frame. That is to say, a pixel value at or below the pixel position is obtained with linear interpolation wherein the distance between the periphery four pixels as described above with reference to FIG. 72 is the basis thereof.

The multiplier 93-1 multiplies the pixel value on the frame t input from the spatial filter 92-1 by the interpolation weighting "1−k" which is set by the interpolation control unit 91, and outputs the weighted pixel value to the adding unit 94. The multiplier 93-2 multiplies the pixel value on the frame t+1 input from the spatial filter 92-2 by the interpolation weighting "k" which is set by the interpolation control unit 91, and outputs the weighted pixel value to the adding unit 94.

The adding unit 94 adds the pixel value input from the multiplier 93-1 and the pixel value input from the multiplier 93-2, whereby the pixel value of the pixel of the interpolation frame is generated, and the pixel value of the generated interpolation frame is output to the buffer 95. The buffer 95 buffers the input frame t+1. The buffer 95 outputs the generated interpolation frame, and next, based on the time phase (point-in-time) of the 60P frame which is set beforehand, outputs the frame t+1 being subjected to buffering as needed, whereby the image of the 60P signal is output to an unshown later stage.

Figure 79:
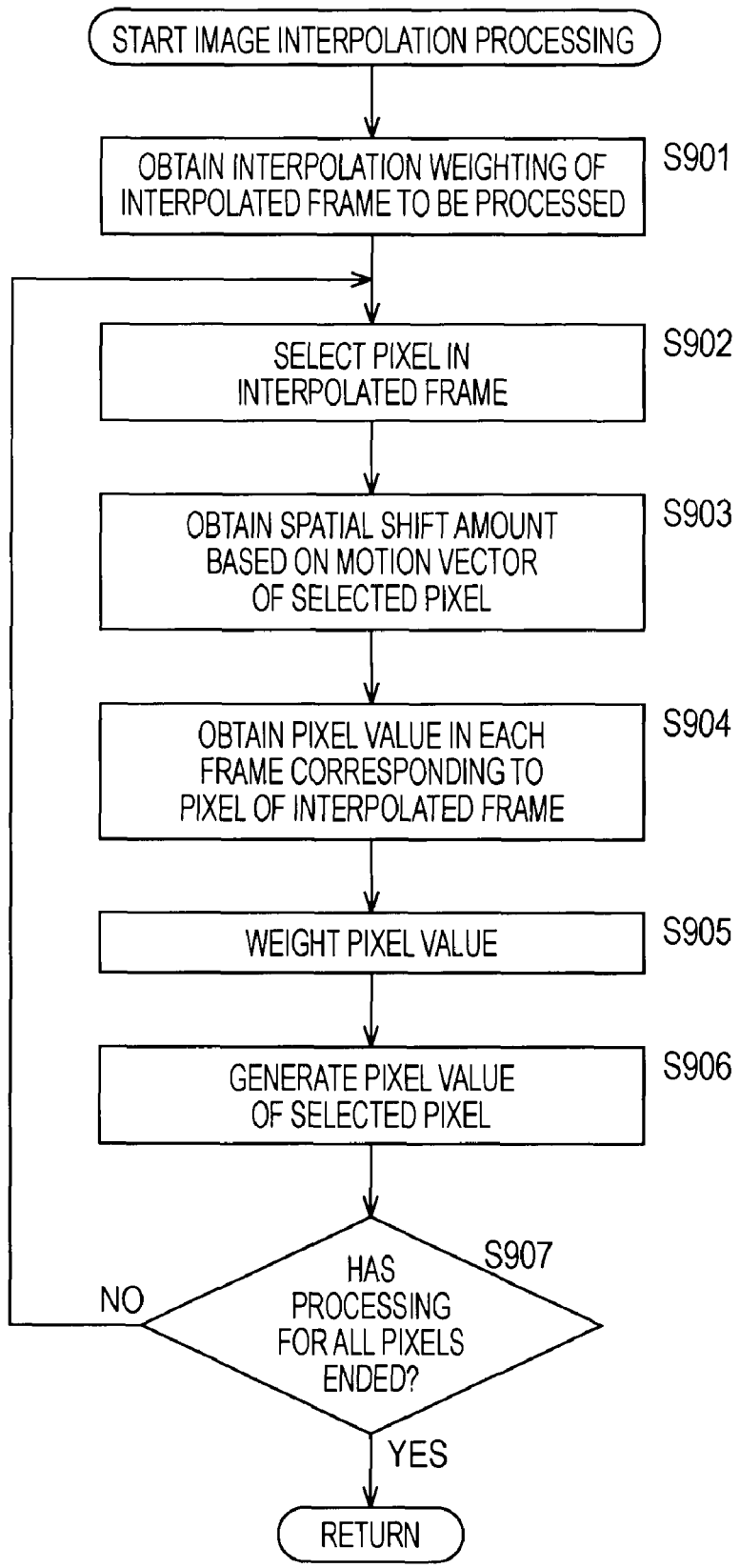
FIG. 79 is a flowchart for describing the image interpolation processing performed in step S85 in FIG. 16.

The details of the image interpolation processing of the image interpolation unit 58 thus configured will be described with reference to the flowchart in FIG. 79.

Based on the time phase of the interpolation frame to be processed, the interpolation control unit 91 obtains the interpolation weighting of the interpolation frame between the frame t and frame t+1 (for example, "k" and "1−k") in step S901, and sets the obtained interpolation weighting to each of the multipliers 93-1 and 93-2. The interpolation control unit 91 selects the pixel of the interpolation frame from the allocation vector memory. Note that the pixels on the interpolation frame are selected in a raster scan order from the pixel on the upper left of the frame.

Based on the motion vector allocated to the selected pixel, in step S903 the interpolation control unit 91 obtains the pixels on the interpolation frame and the positional relation between the two pixels for frame t and frame t+1 (spatial shifting amount), and supplies the obtained spatial shifting amount to each of the spatial filters 92-1 and 92-2. Specifically, in step S903, with the pixel of the interpolation frame as a reference, the interpolation control unit 91 obtains the spatial shifting amount from the position on the frame t correlated with the motion vector thereof, and the position of the pixel on frame t corresponding to the pixel of the interpolation frame, and supplies the obtained spatial shifting amount to the spatial filter 92-1. Similarly, with the pixel of the interpolation frame as a reference, the interpolation control unit 91 obtains the spatial shifting amount from the position on the frame t+1 correlated with the motion vector thereof, and the position of the pixel on frame t+1 corresponding to the pixel of the interpolation frame, and supplies the obtained spatial shifting amount to the spatial filter 92-2.

The pixel values of the frame t of an image at point-in-time t are input in the spatial filter 92-1, and the pixel values of the frame t+1 of an image at point-in-time t+1 are input in the spatial filter 92-2. In step S904, the spatial filter 92-1 and 92-2 obtain the pixel values of the pixels of the frame t and frame t+1 to be input, and the pixel values on each frame corresponding to the pixels of the interpolation frame, based on the spatial shifting amount supplied from the interpolation control unit 91, and outputs the obtained pixel values to each of the multipliers 93-1 and 93-2.

The multipliers 93-1 and 93-2 weight the interpolation weighting set by the interpolation control unit 91 to the pixel values on each frame input from the spatial filters 92-1 or 92-2 in step S905, and output the weighted pixel values to the adding unit 94. That is to say, the multiplier 93-1 multiplies the pixel value on the frame t input from the spatial filter 92-1 by the interpolation weighting "1−k" which is set by the interpolation unit 91, and outputs the weighted pixel values to the adding unit 94. The multiplier 93-2 multiplies the pixel value on the frame t+1 input from the spatial filter 92-2 by the interpolation weighting "k" which is set by the interpolation unit 91, and outputs the weighted pixel values to the adding unit 94.

The adding unit 94 adds the pixel values weighted by the multiplier 93-1 and the pixel values weighted by the multiplier 93-2 in step S906, whereby the pixel values of the pixels of the interpolation frame are generated, and the generated pixel values are output to the buffer 95. The interpolation control unit 91 determines in step S907 whether or not the processing for all the pixels on the interpolation frame has ended. In the case that determination is made in step S907 that processing for all the pixel on the interpolation frame have not ended, the flow is returned to step S902, and the processing thereafter is repeated. In the case determination is made that processing has ended for all pixels on the interpolation frame, the image interpolation processing is ended.

Thus, based on a motion vector allocated to an interpolation frame, when the pixel values of the interpolation frame are generated, the flow is returned to step S85 in the FIG. 16 described above, and in step S86 the interpolation frame is output by the buffer 95, following which the frame t+1 is output as needed, whereby the image of a 60P signal is output at a later stage. Accordingly, the most allocate motion vector is allocated to the pixels of the interpolation frame, so a highly accurate interpolation frame can be generated.

With the present embodiment, evaluation values in the event of selecting a motion vector are described employing evaluation value DFD, evaluation value mDFD, and evaluation value dfv which are difference absolute value sums, but this should not be limited to the evaluation value DFD, evaluation value mDFD, and evaluation value dfv, and other evaluation values may be used as long as the reliability of the motion vector can be evaluated.

Also, with the present embodiment, the blocks for performing the various processing is described as being configured as 8 pixels by 8 pixels, or 9 pixels by 9 pixels, but these are only example, and the number of pixels configuring a block to perform the various processing is not limited to the above-mentioned number of pixels.

Further, with the present embodiment, description is given with the example of a signal conversion from a 24P signal to a 60P signal, but the present invention can be applied as a frame frequency conversion for moving images, to convert interlaced signals or other frame rate conversion.

The above-described string of processing can be executed with hardware, but can also be executed with software. In the case of executing the string of processing with software, the program configuring the software thereof is installed from a program storage medium into a computer with built-in dedicated hardware, or a general-use personal computer, for example, which is capable of executing various types of functions by installing various types of programs.

The program storage medium to store the program in a state executable by a computer which is installed in a computer, is made of a removable recording medium (packaged media) such as a magnetic disk 31 (includes a flexible disk), optical disk 32 (includes CD-ROM (Compact Disc-Read Only Memory), and DVD (Digital Versatile Disc)), optical magnetic disc 33 (MD (Mini-Disc) (registered trademark)), or a semiconductor memory 34, as shown in FIG. 1.

Note that with the present specification, the steps shown in the flowchart include processing performed in a time-series manner according to the written order thereof, but are not necessarily processed in a time-series manner, and may include processing executed concurrently or individually.

The invention claimed is:

1. An image processing device configured to detect a motion vector from an image frame, comprising:
  valid pixels determining means for determining, based on pixel differences within a computation block serving as an object of gradient method computation for detecting a motion vector, whether or not a pixel within said computation block is valid for detection of said motion vector;
  one-sided gradient pixel determining means for determining whether or not a number of pixels, having no gradient in one of a horizontal direction and a vertical direction among valid pixels determined to be valid for detection of said motion vector by said valid pixels determining means, is greater than a predetermined threshold; and
  computation switchover means for switching said gradient method computation to an integrated gradient method computation employing a sum of squared differences or to independent gradient method computation to be executed in one of the horizontal direction and the vertical direction, based on the determination results by said one-sided gradient pixel determining means.

2. The image processing device according to claim 1, wherein said computation switchover means switches said gradient method computation to said integrated gradient method computation, in response to said one-sided gradient determining means determining that there are a few pixels having no gradient in one of the horizontal direction and the vertical direction;
  said image processing device further comprising:
  integrated gradient method computing means configured to execute said integrated gradient method computation switched by said computation switchover means employing valid pixels alone determined to be valid for detection of said motion vector by said valid pixels determining means, of the pixels within said computation block.

3. The image processing device according to claim 1, wherein said computation switchover means switches said gradient method computation to said independent gradient method computation to be executed for each of the horizontal direction and vertical direction, in response to said one-sided gradient determining means determining that there are many pixels having no gradient in one of the horizontal direction and the vertical direction;
  said image processing device further comprising:
  independent gradient method computing means configured to execute independent gradient method computation in the horizontal direction switched by said computation switchover means employing pixels alone having gradient in said horizontal direction, of valid pixels determined to be valid for detection of said motion vector by said valid pixels determining means, and execute independent gradient method computation in the vertical direction switched by said computation switchover means employing pixels alone having gradient in said vertical direction, of valid pixels determined to be valid for detection of said motion vector by said valid pixels determining means.

4. The image processing device according to claim 1, further comprising:
  vector evaluation means configured to correct the motion vector detected by said gradient method computation, according to a result of comparing an evaluation value of the motion vector detected by said gradient method computation and an evaluation value of a predetermined vector to be compared, based on the determination results by said one-sided gradient pixel determining means.

5. The image processing device according to claim 1, further comprising:
  iterative determining means configured to determine regarding whether to iterate said gradient method computation based on the determination results by said one-sided gradient pixel determining means.

6. The image processing device according to claim 1, further comprising:
  gradient detection means configured to detect whether or not valid pixels determined as to be valid for detection of said motion vector by said valid pixels determining means include a gradient in one of the horizontal direction and vertical direction;

wherein said one-sided gradient pixel determining means determine regarding whether or not there are many pixels having no gradient in one of the horizontal direction and vertical direction among said valid pixels, based on the determination results by said gradient detection means.

7. The image processing device according to claim 1, said valid pixels determining means comprising:
   first spatial difference calculating means for calculating the pixel difference of first space of a pixel within said computation block in a first frame from which said motion vector is detected;
   second spatial difference calculating means for calculating the pixel difference of second space of a pixel within said computation block in a second frame which is the next frame of said first frame;
   temporal difference calculation means for calculating the pixel difference in a temporal direction of a pixel within said computation block in said first frame and said second frame; and
   gradient condition determining means for determining whether or not the pixel within said computation block satisfies a condition focusing attention on a gradient in the horizontal direction, a condition focusing attention on a gradient in the vertical direction, and a condition focusing attention on a gradient in the horizontal direction and vertical direction, based on said first and second space calculated by said first and second spatial difference calculating means, and said temporal difference calculating means, and the pixel difference in said temporal direction;
   wherein in response to said gradient condition determining means determining that the pixel of said computation block satisfies at least one of said condition focusing attention on a gradient in the horizontal direction, said condition focusing attention on a gradient in the vertical direction, and said condition focusing attention on a gradient in the horizontal direction and vertical direction, determination is made that the pixel within said computation block is valid for detection of said motion vector.

8. The image processing device according to claim 7, wherein of said condition focusing attention on a gradient in the horizontal direction, said condition focusing attention on a gradient in the vertical direction, and said condition focusing attention on a gradient in the horizontal direction and vertical direction, based on a condition satisfied by valid pixels determined to be valid for detection of said motion vector by said gradient condition determining means, said one-sided gradient pixel determining means determine regarding whether or not there are many pixels having no gradient in one of the horizontal direction and vertical direction among said valid pixels.

9. An image processing method of an image processing device configured to detect a motion vector, and generate a pixel value based on the detected motion vector, said method comprising:
   a valid pixel determining step for determining, based on a pixel difference within a computation block which is an object of gradient method computation for detecting a motion vector, regarding whether or not a pixel within said computation block is valid for detection of said motion vector;
   a one-sided gradient pixel determining step for determining regarding whether or not a number of pixels, having no gradient in one of a horizontal direction and a vertical direction among valid pixels determined to be valid for detection of said motion vector by the processing in said valid pixel determining step, is greater than a predetermined threshold; and
   computation switchover step for switching said gradient method computation to integrated gradient method computation employing a sum of squared differences, or to independent gradient method computation to be executed in one of the horizontal direction and the vertical direction, based on the determination results by the processing in said one-sided gradient pixel determining step.

10. A non-transitory computer readable medium having stored thereon a program for causing a computer to execute processing for detecting a motion vector, and generating a pixel value based on the detected motion vector, said program comprising:
    a valid pixel determining step for determining, based on a pixel difference within a computation block which is an object of gradient method computation for detecting a motion vector, regarding whether or not a pixel within said computation block is valid for detection of said motion vector;
    a one-sided gradient pixel determining step for determining regarding whether or not a number of pixels, having no gradient in one of a horizontal direction and a vertical direction among valid pixels determined to be valid for detection of said motion vector by the processing in said valid pixel determining step, is greater than a predetermined threshold; and
    computation switchover step for switching said gradient method computation to integrated gradient method computation employing a sum of squared differences, or to independent gradient method computation to be executed in one of the horizontal direction and the vertical direction, based on the determination results by the processing in said one-sided gradient pixel determining step.

* * * * *